US007066813B1

(12) United States Patent
Sakamoto et al.

(10) Patent No.: US 7,066,813 B1
(45) Date of Patent: Jun. 27, 2006

(54) GAMING MACHINE WITH PROGRESSIVE STORY

(75) Inventors: Yoshikazu Sakamoto, Koutou-ku (JP); Hiroshi Yoshida, Koutou-ku (JP)

(73) Assignee: Aruze Corporation, Tokyo (JP)

( * ) Notice: Subject to any disclaimer, the term of this patent is extended or adjusted under 35 U.S.C. 154(b) by 743 days.

(21) Appl. No.: 09/456,833

(22) Filed: Dec. 7, 1999

(30) Foreign Application Priority Data

| | | |
|---|---|---|
| Dec. 18, 1998 | (JP) | 10-360382 |
| Nov. 12, 1999 | (JP) | 11-321973 |
| Nov. 30, 1999 | (JP) | 11-340201 |

(51) Int. Cl.
*A63F 13/00* (2006.01)

(52) U.S. Cl. .......... 463/20; 463/25

(58) Field of Classification Search .......... 463/16–28, 463/30

See application file for complete search history.

(56) References Cited

U.S. PATENT DOCUMENTS

| | | | | |
|---|---|---|---|---|
| 5,074,559 | A * | 12/1991 | Okada | 463/20 |
| 5,127,651 | A * | 7/1992 | Okada | 463/20 |
| 5,375,830 | A * | 12/1994 | Takemoto et al. | 273/138 |
| 6,012,982 | A * | 1/2000 | Piechowiak et al. | 463/16 |
| 6,068,552 | A * | 5/2000 | Walker et al. | 463/21 |
| 6,089,976 | A * | 7/2000 | Schneider | 463/16 |
| 6,106,393 | A * | 8/2000 | Sunaga et al. | 463/20 |
| 6,135,884 | A * | 10/2000 | Hedrick et al. | 463/20 |
| 6,159,098 | A * | 12/2000 | Slomiany et al. | 463/25 |
| 6,190,255 | B1 * | 2/2001 | Thomas et al. | 463/20 |
| 6,203,429 | B1 * | 3/2001 | Demar et al. | 463/20 |
| 6,224,484 | B1 * | 5/2001 | Okuda et al. | 463/27 |
| 6,227,970 | B1 * | 5/2001 | Shimizu et al. | 463/20 |
| 6,231,442 | B1 * | 5/2001 | Mayeroff | 463/20 |
| 6,231,445 | B1 * | 5/2001 | Acres | 463/42 |

FOREIGN PATENT DOCUMENTS

| | | | |
|---|---|---|---|
| EP | 0 253 584 | | 1/1988 |
| EP | 0 875 870 | A2 | 11/1998 |
| GB | 2 083 936 | A | 3/1982 |
| GB | 2 262 642 | A | 6/1993 |
| JP | 09056895 | * | 3/1997 |
| JP | 09056896 | * | 3/1997 |
| JP | 09248373 | * | 9/1997 |

* cited by examiner

*Primary Examiner*—John M. Hotaling, II
(74) *Attorney, Agent, or Firm*—Snider & Associates; Ronald R. Snider

(57) ABSTRACT

In a gaming machine (1) comprising a variable display device (5*a* to 5*c*) for variably displaying a plurality of kinds of symbols necessary for gaming, a starting device (20) for starting variable display of the symbols, and a stopping device (21), disposed so as to be operable by a player, for stopping the symbols being variably displayed, wherein, on condition that a combination of symbols displayed when the symbols are stopped constitutes a predetermined special winning mode, the player is allowed to start playing a special game which is more advantageous to the player than is a normal game; an image display (13) for displaying special game information in the special game to the player is provided.

22 Claims, 165 Drawing Sheets

FIG.5

| ITEM | GAME HISTORY | TODAY'S RANKING | TODAY'S TOP |
|---|---|---|---|
| TOTAL No. ACQUIRED | 423 | 8 | 455 |
| IN NORMAL GAMES | 63 | 6 | 95 |
| IN JAC GAMES | 360 | 1 | 360 |
| TOTAL No. INSERTED | 64 | 3 | 75 |
| IN NORMAL GAMES | 36 | 4 | 51 |
| IN JAC GAMES | 28 | 6 | 24 |
| NET No. ACQUIRED | 359 | 3 | 380 |
| IN NORMAL GAMES | 27 | 4 | 44 |
| IN JAC GAMES | 332 | 5 | 336 |
| No. OF FAILED WINNINGS ALTHOUGH REPLAY FLAG IS ESTABLISHED DURING NORMAL GAMES | 1 | 4 | 2 |

FIG.6

1 MEDAL BET

IN JAC GAME

IDENTICAL LEFT, CENTER AND RIGHT APPEARING SYMBOL SELECTION TABLE FOR READY-STATE ATTRACTION FOR INTERNALLY ELECTED BB

FIG.22A

| IDENTICAL LEFT, CENTER AND RIGHT SYMBOL | |
|---|---|
| 7 | 6553 |
| Do | 26214 |
| CAKE | 19661 |
| COOKIE | 13107 |

IDENTICAL LEFT, CENTER AND RIGHT APPEARING SYMBOL SELECTION TABLE FOR READY-STATE ATTRACTION FOR INTERNALLY ELECTED RB

FIG.22B

| IDENTICAL LEFT, CENTER AND RIGHT SYMBOL | |
|---|---|
| BAR | 6553 |
| Do | 13107 |
| CAKE | 19661 |
| COOKIE | 26214 |

LOSING READY-HAND APPEARING SYMBOL SELECTION TABLE FOR READY-STATE ATTRACTION

FIG.22C

| READY-HAND APPEARING SYMBOL | |
|---|---|
| 7 | 13107 |
| BAR | 13107 |
| Do | 13107 |
| CAKE | 13107 |
| COOKIE | 13107 |

LOSING CENTER APPEARING SYMBOL SELECTION TABLE FOR SPECIFIC MODE OF READY-STATE ATTRACTION

FIG.22D

| READY-HAND APPEARING SYMBOL | CENTER |
|---|---|
| 7 | BAR |
| BAR | Do |
| Do | E |
| CAKE | COOKIE |
| COOKIE | 7 |

FIG.23

| SAMPLED VALUE | WINNING DEFINITION DATA | GAME-STARTING SOUND | BLINKING PATTERN AFTER STOPPING ALL REELS |
|---|---|---|---|
| FLASH DATA TABLE 9 | DIAMOND DURING INTERNAL ELECTION OF BB OR RB | | |
| 028 | NO | STARTING SOUND 1 | 4 |
| 022 | NO | STARTING SOUND 1 | 5 |
| 050 | YES | STARTING SOUND 1 | 7 |
| 156 | NO | STARTING SOUND 2 | NO |
| FLASH DATA TABLE 0 | MISS IN NORMAL GAME | | |
| 225 | NO | STARTING SOUND 1 | NO |
| 001 | NO | STARTING SOUND 1 | 5 |
| 013 | NO | STARTING SOUND 2 | NO |
| 013 | NO | STARTING SOUND 2 | NO |
| 001 | NO | STARTING SOUND 2 | 2 |
| 001 | NO | STARTING SOUND 2 | 3 |
| 001 | NO | STARTING SOUND 2 | 5 |
| 001 | NO | STARTING SOUND 2 | NO |
| FLASH DATA TABLE 1 | GROUP 1 IN NORMAL GAME | | |
| 163 | NO | STARTING SOUND 1 | NO |
| 006 | NO | STARTING SOUND 1 | 2 |
| 003 | NO | STARTING SOUND 1 | 3 |
| 041 | NO | STARTING SOUND 2 | NO |
| 001 | NO | STARTING SOUND 2 | 7 |
| 026 | NO | STARTING SOUND 2 | NO |
| 002 | NO | STARTING SOUND 2 | 6 |
| 010 | NO | STARTING SOUND 2 | NO |
| 004 | NO | STARTING SOUND 2 | 2 |

FIG.24

| SAMPLED VALUE | WINNING DEFINITION DATA | GAME-STARTING SOUND | BLINKING PATTERN AFTER STOPPING ALL REELS |
|---|---|---|---|
| FLASH DATA TABLE 2 | DG IN NORMAL GAME | | |
| 188 | NO | STARTING SOUND 1 | NO |
| 010 | NO | STARTING SOUND 1 | 1 |
| 002 | NO | STARTING SOUND 1 | 6 |
| 001 | NO | STARTING SOUND 2 | NO |
| 001 | NO | STARTING SOUND 2 | NO |
| 013 | NO | STARTING SOUND 2 | NO |
| 036 | NO | STARTING SOUND 2 | NO |
| 001 | NO | STARTING SOUND 2 | 2 |
| 004 | NO | STARTING SOUND 2 | 6 |
| FLASH DATA TABLE 3 | DIAMOND IN NORMAL GAME | | |
| 113 | NO | STARTING SOUND 1 | NO |
| 002 | NO | STARTING SOUND 1 | 4 |
| 001 | NO | STARTING SOUND 1 | 5 |
| 002 | NO | STARTING SOUND 2 | NO |
| 018 | NO | STARTING SOUND 2 | 4 |
| 120 | NO | STARTING SOUND 2 | NO |
| FLASH DATA TABLE 4 | REPLAY IN NORMAL GAME | | |
| 196 | NO | STARTING SOUND 1 | NO |
| 010 | NO | STARTING SOUND 1 | 1 |
| 002 | NO | STARTING SOUND 1 | 6 |
| 022 | NO | STARTING SOUND 2 | NO |
| 022 | NO | STARTING SOUND 2 | NO |
| 001 | NO | STARTING SOUND 2 | NO |
| 001 | NO | STARTING SOUND 2 | NO |
| 001 | NO | STARTING SOUND 2 | 2 |
| 001 | NO | STARTING SOUND 2 | 6 |

FIG.25

| SAMPLED VALUE | WINNING DEFINITION DATA | GAME-STARTING SOUND | BLINKING PATTERN AFTER STOPPING ALL REELS |
|---|---|---|---|
| FLASH DATA TABLE 5 | BB, RB IN NORMAL_GAME | | |
| 114 | NO | STARTING SOUND 1 | NO |
| 001 | NO | STARTING SOUND 1 | 4 |
| 001 | YES | STARTING SOUND 1 | 7 |
| 001 | YES | STARTING SOUND 2 | 8 |
| 009 | NO | STARTING SOUND 2 | NO |
| 001 | NO | STARTING SOUND 2 | 7 |
| 020 | NO | STARTING SOUND 2 | NO |
| 005 | NO | STARTING SOUND 2 | 2 |
| 020 | NO | STARTING SOUND 2 | NO |
| 002 | NO | STARTING SOUND 2 | 2 |
| 004 | YES | STARTING SOUND 2 | 6 |
| 026 | NO | STARTING SOUND 2 | NO |
| 004 | NO | STARTING SOUND 2 | 3 |
| 045 | NO | STARTING SOUND 2 | NO |
| 003 | NO | STARTING SOUND 2 | 5 |
| FLASH DATA TABLE 6 | MISS DURING INTERNAL ELECTION OF BB OR RB | | |
| 154 | NO | STARTING SOUND 1 | NO |
| 006 | NO | STARTING SOUND 1 | 5 |
| 006 | YES | STARTING SOUND 1 | 3 |
| 011 | YES | STARTING SOUND 2 | 4 |
| 012 | YES | STARTING SOUND 2 | 5 |
| 005 | NO | STARTING SOUND 2 | 2 |
| 035 | NO | STARTING SOUND 2 | 3 |
| 027 | NO | STARTING SOUND 2 | 5 |

FIG.26

| SAMPLED VALUE | WINNING DEFINITION DATA | GAME-STARTING SOUND | BLINKING PATTERN AFTER STOPPING ALL REELS |
|---|---|---|---|
| FLASH DATA TABLE 7 | GROUP 1 DURING INTERNAL ELECTION OF BB OR RB | | |
| 027 | NO | STARTING SOUND 1 | NO |
| 028 | NO | STARTING SOUND 1 | 2 |
| 042 | NO | STARTING SOUND 1 | 3 |
| 003 | YES | STARTING SOUND 1 | 8 |
| 001 | NO | STARTING SOUND 2 | NO |
| 021 | NO | STARTING SOUND 2 | 7 |
| 038 | NO | STARTING SOUND 2 | NO |
| 006 | NO | STARTING SOUND 2 | 6 |
| 085 | NO | STARTING SOUND 2 | NO |
| 005 | NO | STARTING SOUND 2 | 2 |
| FLASH DATA TABLE 8 | DG, REPLAY DURING INTERNAL ELECTION OF BB OR RB | | |
| 079 | NO | STARTING SOUND 1 | NO |
| 021 | NO | STARTING SOUND 1 | 1 |
| 014 | YES | STARTING SOUND 1 | 5 |
| 014 | NO | STARTING SOUND 1 | 6 |
| 023 | NO | STARTING SOUND 2 | NO |
| 020 | NO | STARTING SOUND 2 | NO |
| 001 | NO | STARTING SOUND 2 | NO |
| 019 | NO | STARTING SOUND 2 | 6 |
| 036 | NO | STARTING SOUND 2 | NO |
| 004 | NO | STARTING SOUND 2 | 2 |
| 025 | YES | STARTING SOUND 2 | 7 |

FIG.27
BLINKING PATTERN 1
| STAGE | BLINKING PATTERN | | |
|---|---|---|---|
| 1 | (1) | (2) | (3) |
| | (4) | (5) | (6) |
| | (7) | (8) | (9) |
PATTERN SHIFTING TIME
(103.25ms)
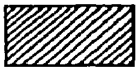 ON  OFF

BLINKING PATTERN 2

BLINKING PATTERN 3

BLINKING PATTERN 6

BLINKING PATTERN 8

FIG.35

READY-STATE ATTRACTION DATA SELECTION TABLE FOR NORMAL GAME (STARTING SOUND 1)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 60115 | | | | | | | 65535 |
| | a | 5000 | | | | | | | |
| | b | 50 | 60000 | 50000 | | | | | |
| | c | 50 | | | 25000 | 5000 | | | |
| | d | 50 | | | 15000 | 15000 | | | |
| | e | 10 | | | 5000 | 25000 | | | |
| | f | 50 | | | | | 40000 | 30000 | |
| | g | 50 | | | | | 10000 | 20000 | |
| | h | 10 | | | | | 1000 | 1000 | |
| | i | | | | | | | | |
| A | NONE | | | | | | | | |
| | a | | | | | | | | |
| | b | 10 | 5535 | 15535 | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| B | NONE | | | | | | | | |
| | a | | | | | | | | |
| | b | | | | | | | | |
| | c | 10 | | | 15000 | 535 | | | |
| | d | 10 | | | 5000 | 5000 | | | |
| | e | 50 | | | 535 | 15000 | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | | | | |
| | f | 10 | | | | | 12000 | 10000 | |
| | g | 10 | | | | | 2400 | 4000 | |
| | h | 50 | | | | | 156 | 535 | |
| | i | | | | | | | | |
| D | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |

FIG.36

READY-STATE ATTRACTION DATA SELECTION TABLE FOR NORMAL GAME(STARTING SOUND 2)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 45867 | 65535 | 65535 | 65535 | 65535 | 65535 | 65535 | 65535 |
| | a | 1 | | | | | | | |
| | b | 1000 | | | | | | | |
| | c | 7000 | | | | | | | |
| | d | 2100 | | | | | | | |
| | e | 1 | | | | | | | |
| | f | 7000 | | | | | | | |
| | g | 1060 | | | | | | | |
| | h | 1 | | | | | | | |
| | i | | | | | | | | |
| A | NONE | | | | | | | | |
| | a | | | | | | | | |
| | b | 1 | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| B | NONE | | | | | | | | |
| | a | | | | | | | | |
| | b | | | | | | | | |
| | c | 800 | | | | | | | |
| | d | 201 | | | | | | | |
| | e | 1 | | | | | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | | | | |
| | f | 300 | | | | | | | |
| | g | 201 | | | | | | | |
| | h | 1 | | | | | | | |
| | i | | | | | | | | |
| D | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |

FIG.37

READY-STATE ATTRACTION DATA SELECTION TABLE
FOR INTERNALLY ELECTED BONUS HAND (STARTING SOUND 1)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 60115 | | | | | | | 65535 |
| | a | 5000 | | | | | | | |
| | b | 50 | 35535 | 5535 | | | | | |
| | c | 50 | | | 25000 | 5000 | | | |
| | d | 50 | | | 15000 | 15000 | | | |
| | e | 10 | | | 5000 | 25000 | | | |
| | f | 50 | | | | | 20000 | 535 | |
| | g | 50 | | | | | 20000 | 4000 | |
| | h | 10 | | | | | 6000 | 20000 | |
| | i | | | | | | | | |
| A | NONE | | | | | | | | |
| | a | | | | | | | | |
| | b | 10 | 30000 | 60000 | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| B | NONE | | | | | | | | |
| | a | | | | | | | | |
| | b | | | | | | | | |
| | c | 10 | | | 15000 | 535 | | | |
| | d | 10 | | | 5000 | 5000 | | | |
| | e | 50 | | | 535 | 15000 | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | | 5000 | 1000 | |
| | f | 10 | | | | | 9000 | 10000 | |
| | g | 10 | | | | | 5535 | 30000 | |
| | h | 50 | | | | | | | |
| | i | | | | | | | | |
| D | NONE | | | | | | | | |
| | a | | | | | | | | |
| | b | | | | | | | | |
| | c | | | | | | | | |
| | d | | | | | | | | |
| | | | | | | | | | |
| | f | | | | | | | | |
| | g | | | | | | | | |
| | h | | | | | | | | |
| | i | | | | | | | | |

FIG.38

READY-STATE ATTRACTION DATA SELECTION TABLE
FOR INTERNALLY ELECTED BONUS HAND (STARTING SOUND 2)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 65535 | 65535 | 65535 | 65535 | 65535 | 65535 | 65535 | 65535 |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| A | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| B | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| D | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |

F I G.39

READY-STATE ATTRACTION DATA SELECTION TABLE
FOR CASE WITH DEFINITION DATA (STARTING SOUND 1)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 65535 | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| A | NONE | | | | | | | | |
| | a | | | | | | | | |
| | b | | 65535 | 65500 | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| B | NONE | | | | | | | | |
| | a | | | | | | | | |
| | b | | | | | | | | |
| | c | | | | 15000 | 15000 | | | |
| | d | | | | 20000 | 20000 | | | |
| | e | | | | 30535 | 30500 | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | | | | |
| | f | | | | | | 15000 | 15000 | |
| | g | | | | | | 20000 | 20000 | |
| | h | | | | | | 30535 | 30500 | |
| | i | | | | | | | | |
| D | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | 35 | | 35 | | 35 | |
| E | | | | | | | | | 65535 |

WHOLE REELS ROTATION

FIG.40

READY-STATE ATTRACTION DATA SELECTION TABLE
FOR CASE WITH DEFINITION DATA (STARTING SOUND 2)

| READY-STATE NOTICE | READY-STATE ATTRACTION | ALL STOP FLASH PATTERN | | | | | | | |
|---|---|---|---|---|---|---|---|---|---|
| | | 0 OR 1 | 2 | 3 | 4 | 5 | 6 | 7 | 8 |
| NONE | NONE | 65535 | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| A | NONE | | | | | | | | |
| | a | | | | | | | | |
| | b | | 65535 | 65023 | | | | | |
| | c | | | | | | | | |
| | d | | | | | | | | |
| | e | | | | | | | | |
| | f | | | | | | | | |
| | g | | | | | | | | |
| | h | | | | | | | 1024 | |
| | i | | | | | | | | |
| B | NONE | | | | | | | | |
| | a | | | | | | | | |
| | b | | | 512 | | | | | |
| | c | | | | 15000 | 15000 | | | |
| | d | | | | 20000 | 20000 | | | |
| | e | | | | 30535 | 29511 | | | |
| | f | | | | | | | | |
| | g | | | | | | | | |
| | h | | | | | | | | |
| | i | | | | | | | | |
| C | NONE | | | | | | | | |
| | a | | | | | | | | |
| | b | | | | | | | | |
| | c | | | | | | | | |
| | d | | | | | | | | |
| | e | | | | | 1024 | | | |
| | f | | | | | | 15000 | 15000 | |
| | g | | | | | | 20000 | 20000 | |
| | h | | | | | | 30535 | 29511 | |
| | i | | | | | | | | |
| D | NONE | | | | | | | | |
| | a | | | | | | | | |
| | b | | | | | | | | |
| | c | | | | | | | | |
| | d | | | | | | | | |
| | e | | | | | | | | |
| | f | | | | | | | | |
| | g | | | | | | | | |
| | h | | | | | | | | |
| | i | | | | | | | | |
| E | | | | | | | | | 65535 |

WHOLE REELS ROTATION

FIG.41A SINGLE CHARACTER ATTRACTION SELECTION TABLE FOR NORMAL GAME

| | INTERNALLY ELECTED HAND | | | | | | |
|---|---|---|---|---|---|---|---|
| | GROUP 1 | DG | DIAMOND | REPLAY | RB | BB | MISS |
| a | 52427 | | | | 3277 | 3277 | |
| b | 6554 | | | | 13107 | 13107 | |
| c | | 32768 | | | 3277 | 3277 | |
| d | | 3277 | | | 13107 | 13107 | |
| e | | | 52427 | | 3277 | 3277 | |
| f | | | 6554 | | 13107 | 13107 | |
| g | | | | 65535 | 13107 | 13107 | |
| NONE | 6554 | 29490 | 6554 | | 3276 | 3277 | 65535 |

FIG.41B SINGLE CHARACTER ATTRACTION SELECTION TABLE FOR INTERNALLY ELECTED BONUS HAND

| | INTERNALLY ELECTED HAND | | | | | | |
|---|---|---|---|---|---|---|---|
| | GROUP 1 | DG | DIAMOND | REPLAY | RB | BB | MISS |
| a | 19660 | 3277 | 4369 | 6554 | | | |
| b | 26214 | 3277 | 4369 | 6554 | | | |
| c | 4369 | 22936 | | 6554 | | | |
| d | 4369 | 22936 | 4369 | 6554 | | | |
| e | 4369 | | 19660 | 6554 | | | |
| f | | 3277 | 26214 | 6554 | | | |
| g | | 3277 | 4369 | 13105 | | | |
| NONE | 6554 | 6553 | 6554 | 13106 | | | 65535 |

FIG.42A APPEARING SYMBOL SELECTION TABLE FOR NORMAL GAME

| | | GROUP 1 | DG | DIAMOND | REPLAY | MISS | RB | BB |
|---|---|---|---|---|---|---|---|---|
| 1st | "E" | 1966 | 7864 | 7864 | 1 | 11796 | 2621 | 1310 |
| 2nd | "X" | 1310 | 22937 | 7864 | 1 | 12451 | 2621 | 1310 |
| 3rd | "T" | 39976 | 8519 | 7864 | 1 | 12451 | 2621 | 1310 |
| | "R" | 1966 | 7864 | 7864 | 65523 | 12451 | 2621 | 1310 |
| | "A" | 1310 | 8519 | 7864 | 1 | 13107 | 2621 | 1310 |
| | "7" | 659 | 659 | 7867 | 4 | 659 | 6558 | 22288 |
| | "BAR" | 655 | 1310 | 1310 | 1 | 655 | 18349 | 6553 |
| | "Do" | 16383 | 1966 | 5898 | 1 | 655 | 6553 | 11796 |
| | "CAKE" | 655 | 2621 | 5570 | 1 | 655 | 10485 | 9174 |
| | "COOKIE" | 655 | 3276 | 5570 | 1 | 655 | 10485 | 9174 |
| | | 65535 | 65535 | 65535 | 65535 | 65535 | 65535 | 65535 |

FIG.42B APPEARING SYMBOL SELECTION TABLE FOR INTERNALLY ELECTED BONUS HAND

| | | GROUP 1 | DG | DIAMOND | REPLAY | MISS (RB) | MISS (BB) |
|---|---|---|---|---|---|---|---|
| 1st | "E" | 1966 | 1310 | 20971 | 9830 | 1 | 3276 |
| 2nd | "X" | 1310 | 42597 | 4587 | 9830 | 11796 | 11796 |
| 3rd | "T" | 1966 | 1310 | 4587 | 9830 | 3276 | 1 |
| | "R" | 1310 | 3276 | 4587 | 13107 | 11794 | 12451 |
| | "A" | 39321 | 3276 | 4587 | 9830 | 12451 | 11794 |
| | "7" | 1315 | 1971 | 5248 | 168 | 3938 | 6559 |
| | "BAR" | 1310 | 1966 | 5242 | 163 | 6553 | 3932 |
| | "Do" | 14417 | 2621 | 5242 | 4259 | 5242 | 5242 |
| | "CAKE" | 1310 | 3276 | 5242 | 4259 | 5242 | 5242 |
| | "COOKIE" | 1310 | 3932 | 5242 | 4259 | 5242 | 5242 |
| | | 65535 | 65535 | 65535 | 65535 | 65535 | 65535 |

FIG.43

FLASH DATA SELECTION TABLE FOR NORMAL GAME

| INTERNALLY ELECTED HAND | FLASH DATA No. |
|---|---|
| MISS | 0 |
| GROUP 1(DB OR CHERRY) | 1 |
| DG | 2 |
| DIAMOND | 3 |
| REPLAY | 4 |
| RB | 5 |
| BB | 5 |

FLASH DATA SELECTION TABLE FOR INTERNALLY ELECTED BONUS HAND

| INTERNALLY ELECTED HAND | FLASH DATA No. |
|---|---|
| MISS | 6 |
| GROUP 1(DB OR CHERRY) | 7 |
| DG | 8 |
| DIAMOND | 9 |
| REPLAY | 8 |

SELECTION RANDOM NUMBER VALUE 0-255

FIG.44

TRANSMISSION COMMAND

| | |
|---|---|
| GAMING STATE | DURING NORMAL GAME |
| | NORMAL GAME IN BB |
| | DURING RB INTERNAL ELECTION |
| | DURING BB INTERNAL ELECTION |
| | DURING RB ACTION |

| | | |
|---|---|---|
| INTERNALLY ELECTED STATE | MISS | |
| | GROUP 1 | CHERRY |
| | | DRAGON BREAK(DB) |
| | DRAGON(DG) | |
| | DIAMOND | |
| | RB | |
| | BB | |
| | REPLAY | |

| | |
|---|---|
| GAME-STARTING SOUND | 1 |
| | 2 |

| | |
|---|---|
| ALL STOP FLASH PATTERN | 0 |
| | 1 |
| | 2 |
| | 3 |
| | 4 |
| | 5 |
| | 6 |
| | 7 |
| | 8 |

| | |
|---|---|
| DEFINITION DATA | 0 (NO) |
| | 1 (YES) |

| | |
|---|---|
| READY-STATE ATTRACTION SELECTING RANDOM NUMBER VALUE | 0-65535 |

| | |
|---|---|
| APPEARING SYMBOL ATTRACTION SELECTING RANDOM NUMBER VALUE(LEFT) | 0-65535 |
| APPEARING SYMBOL ATTRACTION SELECTING RANDOM NUMBER VALUE(RIGHT) | 0-65535 |
| APPEARING SYMBOL ATTRACTION SELECTING RANDOM NUMBER VALUE(CENTER) | 0-65535 |

| | |
|---|---|
| SINGLE CHARACTER ATTRACTION SELECTING RANDOM NUMBER VALUE | 0-65535 |

FIG. 171
FIG. 172
SUPER
Mr. Do!
SUPER
Mr. Do!
CHANCE!!

F I G. 279
F I G. 280
CALL STAFF
C.E
SELECTOR CHOKED
H.E
FEED MEDALS
CALL

FIG. 285A

WAIT FOR CLIENT

| Contents | Maker name display | Model name display | Dividend display | Game explanation |
|---|---|---|---|---|
| Fig. | 45-47 | 48-50 | 51-65 | 66-77 |

FIG. 285B

ONE GAME

| Contents | Before changing appearing symbol | Single character notification | Ready-state notice | Rotation | (Ready-state) | Internally elected hand notification | BB game |
|---|---|---|---|---|---|---|---|
| Fig. | 93-95 | 284 | 78-92 | 95 | 114-205 | 98-113 | 206-276 |

FIG. 285C

BEFORE CHANGING APPEARING SYMBOL

| Contents | Medal insertion | Wait | Start |
|---|---|---|---|
| Fig. | 93 | 94 | 95 |

FIG. 285D

READY-STATE NOTICE

| Contents | 1 | 2 | 3 |
|---|---|---|---|
| Fig. | 78-82 | 83-87 | 88-92 |

FIG. 285E

READY-STATE ATTRACTION

| Contents | Normal | Super | Hyper |
|---|---|---|---|
| Fig. | 114-115 | 116-118 | 119-205 |

FIG. 285F

BB GAME

| Contents | 1st normal game | 1st JAC | 2nd normal game | 2nd JAC | 3rd normal game | 3rd JAC | Ending pattern |
|---|---|---|---|---|---|---|---|
| Fig. | 206-215 | 235-253 | 216-219 | 254-262 | 220-225 | 263-273 | 227-234, 274-276 |

FIG. 285G

BB ENDING PATTERN

| Contents | All consumed | Puncture in JAC | Not entering JAC |
|---|---|---|---|
| Fig. | 227-229 | 274-276 | 230-234 |

FIG. 285H

ERROR DISPLAY

| Contents | |
|---|---|
| Fig. | 277-282 |

GAMING MACHINE WITH PROGRESSIVE STORY

RELATED APPLICATIONS

This application claims the priorities of Japanese Patent Application No. 10-360382 filed on Dec. 18, 1998, Japanese Patent Application No. 11-321973 filed on Nov. 12, 1999 and Japanese Patent Application No. 11-340201 filed on Nov. 30, 1999 which are incorporated herein by reference.

BACKGROUND OF THE INVENTION

1. Field of the Invention

The present invention relates to a gaming machine and, in particular, to a gaming machine in which a player can reliably and effectively recognize special game information in a special game and the like.

2. Description of the Prior Art

As a gaming machine of this kind, a slot machine 50 shown in FIG. 9, for example, has conventionally been known.

FIG. 9 is a front view of the conventional slot machine 50.

Here, members having functions similar to those of members in a slot machine 1, which is an example of gaming machine in accordance with the present invention to be explained later, will be explained with reference to numerals identical to the latter members.

As shown in FIG. 9, the conventional slot machine 50 has a housing 3 whose front side is provided with a front door 2 which is adapted to open and close. The front door 2 is formed with a display window 4 at an upper part near the center of the front face thereof, whereas the respective outer peripheral faces of three reels 5*a* to 5*c* disposed within the housing 3 face the display window 4. Also, five winning line indicators 6 for indicating respective effective winning lines are formed across the display window 4 so as to extend to the peripheries thereof.

On the left end side of the respective winning line indicators 6, effective line indicator lamps 7*a* to 7*e* for indicating the respective effective winning lines are provided. Disposed on the right side of the winning line indicators 6 are a replay display lamp 8 for indicating that a combination of symbols displayed in their stopped state is in a replay winning mode, a game stop display lamp 9 for indicating the wait time from the starting of the last game until the starting of the next game, a winning display lamp 10 for indicating that a combination of symbols displayed in their stopped state constitutes a predetermined winning mode, a game start display lamp 11 for indicating that a start switch 20 is operable, and a game medal insertion lamp 12 for indicating that game medals are permitted to be inserted.

Below the above-mentioned display window 4, the front door 2 is provided with display sections such as a credit number display section 51 for indicating the number of game medals stored (hereinafter referred to as credited), a chance display section 52 for indicating that there is a possibility of a special game occurring, a bonus number display section 53 for indicating the number of possible elections and number of playable normal games in a special gaming state, a payout number display section 54 for displaying the number of game medals to be paid out at the time of winning, and the like. Also, an upper part on the front face of the housing 3 is provided with a dividend display section 26 for indicating the number of game medals to be paid out in reward for a winning. Further, the uppermost part in the front face of the housing 3 is provided with a decorating section 27 in which a plurality of decorating lamps (not depicted) is arranged.

Below the above-mentioned credit number display section 51 and the like, the front face of the front door 2 is provided with a medal insertion slot 14 for inserting game medals used for gaming, a first bet switch 16 for inserting, one by one, game medals used for gaming within a credited range, a second bet switch 17 for inserting, two by two, game medals used for gaming within the credited range, and a max bet switch 18 for inserting the game medals used for gaming up to the maximum permissible bet number (e.g., three) within the credited range.

Below the above-mentioned medal insertion slot 14 and the like, the front face of the front door 2 is provided with a C/P (credit/payout) switch 19 for changeover between the credit and the payout of the medals acquired by the player, a start switch 20 for starting rotating each of the reels 5*a* to 5*c* on condition that a game medal is inserted, and three stop switches 21*a* to 21*c* for stopping rotating the respective reels 5*a* to 5*c*.

Further, the lowermost part of the front door 2 is provided with a medal tray 22 for receiving the game medals paid out as a prize, and a medal payout slot 23 facing the medal tray 22. A sound transmission hole 24 is formed on the right side of the medal payout slot 23, whereas a speaker (not depicted) is provided within the housing 3 so as to face the sound transmission hole 24.

Such a conventional slot machine 50 can start a game when a game medal is inserted therein. When a player operates the start switch 20 after a game starting condition is set in order, a plurality of reels 5*a* to 5*c* rotate, so that a plurality of symbols formed on the surface of each of the reels 5*a* to 5*c* move at a high speed. Then, when the player operates the respective stop switches 21*a* to 21*c* corresponding to the individual reels 5*a* to 5*c*, the latter stop rotating, whereby a plurality of symbols formed on the surfaces of reels 5*a* to 5*c* are displayed in their stopped state.

Here, in the case where the symbols thus displayed in their stopped state constitute a predetermined combination, then game medals are paid out as a prize. Also, on condition that the combination of symbols displayed in their stopped state constitutes a predetermined special winning mode, a special game more advantageous to the player than a normal game is allowed to start.

This special game is a game known as a so-called big bonus or regular bonus, in which a greater number of game medals can be acquired than in a normal game.

In a big bonus game, for example, games substantially similar to a normal game with a raised sampling probability of small hands, i.e., normal games in a big bonus game (normal games in BB), can be played up to 30 times after the gaming state has shifted to this big bonus game. While this game similar to a normal game is being played, if the combination of symbols displayed on an effective winning line in their stopped state constitutes a particular winning mode, then so-called JAC games are allowed to play up to 3 times.

In a JAC game, with insertion of a predetermined number of game medals, e.g., one game medal, the start switch 20 is operated so as to start rotating the reels 5*a* to 5*c*, and then the stop switches 21*a* to 21*c* are operated so as to stop rotating the respective reels 5*a* to 5*c*.

If a combination of stopped symbols constitutes a winning mode in the JAC game, then a predetermined number of game medals are paid out.

In the JAC game, the maximum number of games and the maximum number of winnings are restricted. For example, when the above-mentioned games similar to a normal game are played 12 times, which constitute the maximum game number, or the number of the above-mentioned winnings reaches 8, which is the maximum winning number, then the JAC game ends.

Except for the lack of replay winning modes and the existence of particular winning modes for shifting to JAC games in place of special winning modes acting as a starting condition for special games, the normal games in BB are played under conditions substantially similar to those of normal games played not during the big bonus game in terms of the combinations of stopped symbols constituting winning modes, the number of game medals paid out when winning modes are attained, and the like.

Here, specific examples of winning modes include, as frequently occurring winning modes in general, so-called small hands such as cherry, orange, bell, and watermelon, and those known as replay by which the next game can be played without game medal insertion. Usually, if no winning occurs in an internally elected game, the established internally elected hand will not be transferred to the next and later games. Also, a relatively small number of game medals, i.e., 15 or less medals, are paid out. On the other hand, there are winning modes which are generated at the time of special games such as big bonuses (e.g., CT-attached big bonuses including games known as challenge time (CT) in which stop control for the reels 5*a* to 5*c* by random number sampling is stopped for a predetermined period after the completion of a big bonus game) known as a special winning mode, regular bonuses, and the like, and when combinations of special game starting symbols align on the winning lines, by which games can be played for a predetermined period in a state where winning hands occur at a higher probability than in normal games. Since the internal sampling probability of these winning modes is much lower than that of small hands or replay winning, their internally elected state is configured so as to be transferable to the next and later games even when no winning occurs (no special winning mode is constructed on a winning line) in the internally elected game. Also, a large number of game medals, i.e., on the order of 350 to 450 for a big bonus and about 120 for a regular bonus, can be acquired in one special game.

In the following explanation, "stop mode" refers to the stationary displaying of variably displayed symbols in their stopped state in response to a player's stopping operation regardless of whether winning hands align on a winning line or not, i.e., whether a game is won or not, or the state thereof. Also, "winning mode" refers to, of the stop mode, the stationary displaying of symbols in a state where a winning occurs, or the state thereof. Further, "established flag" or "flag is established" refers to an internal elected state of each winning hand according to a sampled random number and a probability sampling table, or occurrence of this state. In this case, when the player carries out a stopping operation of the stop switches 21*a* to 21*c* so as to construct a winning mode corresponding to an established flag, the reels 5*a* to 5*c* are regulated to stop so as to construct the winning mode. When the flag is not established, by contrast, even if the player carries out a stopping operation of the stop switches 21*a* to 21*c* so as to construct a winning mode, control is made so as not to attain the winning mode.

Notification of Game Information

Though the above-mentioned conventional slot machine 50 notifies the player of special game information in special games, it has not been able to reliably and effectively notify the player of this special game information.

Namely, for notifying the player of special game information in the above-mentioned conventional slot machine 50, a plurality of display sections separately disposed on the front face of the slot machine 50 are respectively indicated, a decorating lamp is lit or blinked, or sound effects are generated from the speaker.

However, as mentioned above, the front face of the conventional slot machine 50 is provided with a plurality of display sections and decorating lamps for enhancing the fun of gaming, which are lit or blinked. Further, various sound effects are generated from the speaker. As a consequence, when indications are simply made in a display section which does not particularly stand out from the other display sections, or alarming sounds are generated between various sound effects, the player has not always been able to recognize game information reliably and effectively.

Specifically, the following notifications have been made according to the special game information to be reported to the player.

State of Progress of Special Game

In the conventional slot machine 50, as mentioned above, when a combination of stopped symbols constitutes a special winning mode, so that the gaming state shifts to a big bonus which is a special game, then a predetermined number of normal games in BB and a predetermined number of JAC games can be played.

In such a big bonus game, a greater number of game medals can be acquired than in a normal game, thus yielding a scene in which the player can fully enjoy the fun of gaming. Consequently, while a big bonus game is being played, it has been a matter of great importance for the player to know to what extent the game has now progressed and how much the big bonus game can be enjoyed from now.

Therefore, in the conventional slot machine 50, the number of probable winnings and the number of probable normal games in BB are displayed in the bonus number display section 53 constituted by a seven-segment indicator or the like, so as to notify the player of the state of progress of the big bonus game.

However, the display in the bonus number display section 53 is relatively small, while the player looks at the movement of reels 5*a* to 5*c* during the big bonus game in particular, whereby it has been difficult to reliably report the state of progress of the big bonus game to the player by the display in the bonus number display section 53 alone. Hence, the player may suddenly notice that the big bonus game ends, thus losing the fun of gaming.

In view of the foregoing circumstances, it is an object of the present invention to provide a gaming machine which can reliably report the state of progress of special games to the player, so that the player can fully enjoy the fun of gaming.

Game Medal Payout History

Upon each occurrence of winning, the conventional slot machine 50 displays the number of paid-out game medals in the payout number display section 54.

In normal games until the occurrence of a big bonus, which is a special game, the number of game medals to be paid out as a prize is smaller than the number of game medals inserted in general, whereby the player consumes game medals while waiting for the big bonus to be played soon.

Here, even during a normal game with a lower winning probability, the player has tried to generate winnings (mainly winning hands known as small hands such as bell, watermelon, and the like) at any rate so as to receive the payout of game medals, thus suppressing the investment per unit game.

Though the conventional slot machine 50 has means for displaying the number of games until a big bonus occurs, it lacks means for ascertaining the investment per unit game. Therefore, it has been difficult for the player to grasp the investment per unit game, whereby the player may not fully enjoy the fun of gaming.

Meanwhile, a big bonus game is a scene in which the player can acquire a greater number of game medals than in a normal game, thus being able to fully enjoy the fun of gaming. Consequently, when the big bonus game is being played, it has been a matter of great importance for the player to know how many game medals are acquired.

Therefore, upon each occurrence of winning, the conventional slot machine 50 displays the number of paid-out game medals in the payout number display section 54 constituted by a seven-segment indicator or the like.

However, it has been difficult to call the attention of the player by simply displaying the number of paid-out game medals in the payout number display section 54. Also, since the display by the payout number display section 54 is effected upon each occurrence of winning, the player cannot see the total number of acquired game medals, thus failing to fully enjoy the pleasure of winning.

On the other hand, how many game medals have been acquired by other players in the same slot machine 50 is important reference information for the player to see the own objective gaming skill.

However, the conventional slot machine 50 has no means for indicating the number of game medals acquired by other players, thus failing to fully provide the player with the fun of gaming in this regard as well.

In view of the foregoing circumstances, it is an object of the present invention to provide a gaming machine which can reliably notify the player of the history of provision of value information provided as a profit to the player, so that the player can fully enjoy the fun of gaming.

Winning History

Upon each occurrence of winning, the conventional slot machine 50 displays the number of paid-out game medals in the payout number display section 54.

In general, as mentioned above, in normal games until the occurrence of a big bonus, which is a special game, the number of game medals to be paid out as a prize is smaller than the number of game medals inserted.

As a consequence, it is at the time when a special winning mode for shifting to a big bonus, which is a special game, occurs and at the time when a large number of game medals are paid out that the player can actually feel the profit and get into games. By contrast, a large number of game medals are rarely paid out during normal games, so that the player tends to lose interest in games.

Also, as mentioned above, when a combination of stopped symbols constitutes a special winning mode, so that the gaming state shifts to a big bonus, which is a special game, then a predetermined number of normal games and a predetermined number of JAC games can be played.

In such a big bonus game, since the maximum number of normal games in BB is limited, what number of normal game in BB is being played has been a matter of great importance for the player. Similarly, since the maximum number of games and the maximum number of winnings in JAC games are limited, what number of normal game is being played or what number of winning is attained has been a matter of great importance for the player.

Namely, in a big bonus, the number of acquirable game medals will decrease unless the gaming state shifts to a JAC game, in which the player can play a game under a condition advantageous to the player, before the normal games in BB reach the maximum number. For example, unless a particular winning mode for shifting to a JAC game is attained 3 times during the maximum number of normal games in BB, i.e., 30 games, the number of JAC games becomes 2 or 1.

Also, during normal games in BB, a predetermined number of game medals will be paid out if a combination of stopped symbols constitutes a winning mode. Therefore, if the gaming state has rapidly shifted to a JAC game, then the total number of acquirable game medals will decrease. For example, if the particular winning mode for shifting to the 3rd JAC game has been constructed before the number of normal games in BB reaches the maximum game number of 30, normal games in BB cannot be played anymore. On the other hand, under the best condition in which, while the normal games in BB are played until they reach the maximum game number of 30, the particular winning mode for shifting to the 3rd JAC game is constructed in the 30th normal game in BB, the maximum number of game medals in reward for winning modes in normal games in BB can be acquired.

Further, in JAC games, the total number of acquirable game medals will decrease if winnings do not reach the maximum winning number before the number of games reaches the maximum game number. For example, unless winning modes in JAC games are attained 8 times, which constitute the maximum winning number, during 12 games which constitute the maximum game number in JAC games, the total number of acquirable game medals will decrease.

Therefore, the conventional slot machine 50 indicates the number of possible elections in a big bonus game and the possible number of normal games in BB by means of the bonus number display section 53 constituted by a seven-segment indicator or the like. Hence, with reference to the display in the bonus number display section 53, the player can exert so-called “see-and-push” skill or the like, so as to play the big bonus game under more advantageous conditions.

However, the display in the bonus number display section 53 is relatively small, while the player looks at the movement of reels 5*a* to 5*c* during the big bonus game in particular, whereby it has been difficult to reliably report the winning history to the player. Hence, the player may overlook the maximum number of games or the maximum number of winnings and fail to obtain the number of game medals that should have been acquired, thereby losing the fun of gaming.

In view of the foregoing circumstances, it is an object of the present invention to provide a gaming machine which can reliably notify the player of the winning history in special games, so that the player can fully enjoy the fun of gaming.

Gaming Mode

In the conventional slot machine 50, as mentioned above, when the gaming state shifts to a big bonus, which is a special game, a predetermined number of normal games in BB and a predetermined number of JAC games can be played.

The JAC game is a game which can be played if a particular winning mode is attained in normal games in BB. The JAC game is played in a mode different from that of the normal games in BB. Namely, in the JAC game, the maximum permissible bet number and winning modes are different from those of normal games in BB, whereby the player must play the game according to each gaming mode.

Therefore, the conventional slot machine 50 changes the blinking mode of decorating lamps disposed in the decorating section 27, so as to indicate whether a normal game in BB or a JAC game is being played.

However, when the blinking mode of the decorating lamps arranged in the decorating section 27 is simply changed, the player may fail to notice the change in gaming mode and be puzzled at the fact that the maximum permissible bet number or the winning mode has changed, thus failing to fully enjoy the fun of gaming.

In view of the foregoing circumstances, it is an object of the present invention to provide a gaming machine which can reliably notify the player of gaming modes in special games, so that the player can fully enjoy the fun of gaming.

Maximum Permissible Bet Number

In the conventional slot machine 50, as mentioned above, the normal games in BB and the JAC games having gaming modes different from each other can be played in a big bonus game, which is a special game.

In a normal game in BB, the maximum permissible bet number is set to 3, for example, whereby the game can be played while up to three game medals are inserted. In a JAC game, on the other hand, the maximum permissible bet number is set to 1, for example, whereby the game can be played while only one game medal is allowed to be inserted.

Meanwhile, in the normal game in BB, as the number of inserted game medals increases, the number of effective winning lines increases accordingly, thus enhancing the probability of winning. For example, the winning probability for watermelon is 1/50 when two game medals are inserted, whereas it is 1/15 when three game medals are inserted. Hence, as the number of inserted game medals increases, the player can play games under conditions more advantageous thereto.

The conventional slot machine 50 displays the number of inserted game medals by lighting the effective line display lamps 7*a* to 7*e* and lighting back lamps (not depicted) for illuminating the respective reels 5*a* to 5*c* from inside. Also, the blinking mode of the decorating lamps arranged in the decorating section 27 is changed, so as to indicate whether a normal game in BB or a JAC game is being played.

However, since the conventional slot machine 50 has no means for indicating changes in the maximum permissible bet number, the player may insert only one game medal although a normal game in BB is being played, thus lowering the total number of game medals acquirable by the player. The player who has failed to obtain the profit to be acquired (a higher-probability sampling due to betting of three game medals) may lose the fun of gaming.

On the other hand, when two or more game medals are tried to be inserted although a JAC game is being played, then the game medals are returned. As a consequence, not only useless actions will occur in gaming operations, whereby the player may fail to fully enjoy the fun of gaming, but also the slot machine 50 may erroneously be considered to be out of order, whereby unnecessary troubles may occur.

In view of the foregoing circumstances, it is an object of the present invention to provide a gaming machine which can reliably notify the player of changes in the maximum permissible input unit of bet information in special games, so that the player can fully enjoy the fun of gaming.

Ending of Special Game

In the conventional slot machine 50, as mentioned above, when a predetermined number of normal games or a predetermined number of JAC games are played in a big bonus, which is a special game, then the big bonus ends.

The ending of the big bonus has been reported by generating sound effects from the speaker so as to indicate that a big bonus is over. The player absorbed in the big bonus may fail to notice the sound effects indicating the ending of the game. To such a player, the big bonus appears to end suddenly. Hence, the player may lose the fun of gaming.

In view of the foregoing circumstances, it is an object of the present invention to provide a gaming machine which can reliably notify the player of the ending of special games, so that the player can fully enjoy the fun of gaming.

SUMMARY OF THE INVENTION

For achieving the above-mentioned objects, the gaming machine in accordance with the present invention is configured as follows.

The gaming machine in accordance with the present invention comprises:

variable display means for variably displaying a plurality of kinds of symbols necessary for gaming;

starting means for starting variably displaying the symbols; and stopping means, disposed so as to be operable by a player, for stopping the symbols being variably displayed;

wherein, on condition that a combination of symbols displayed when the symbols are stopped constitutes a predetermined special winning mode, the player is allowed to start playing a special game which is more advantageous to the player than is a normal game, the gaming machine further comprising an image display section for displaying special game information in the special game to the player.

The gaming machine in accordance with the present invention may be a slot machine comprising:

variable display means comprising a plurality of reels displaying a plurality of symbols necessary for gaming;

starting means comprising a start switch for starting rotating the plurality of reels; and stopping means comprising a stop switch for individually stopping the plurality of reels;

wherein the player is provided with a predetermined unit of value information if a combination of symbols displayed when the plurality of reels is stopped constitutes a predetermined stop mode.

Here, value information is information by which gaming is allowed in a gaming machine. When it is under the player's hand, it refers to cash, game medals, and information equivalent thereto stored in a prepaid card. When it is stored within a gaming machine, it refers to credited numbers.

The gaming machine in accordance with the present invention may be configured such that:

the special game information displayed in the image display section is special game information concerning a state of progress of the special game.

The gaming machine in accordance with the present invention may be configured such that:

the special game information displayed in the image display section is special game information concerning a history of provision of value information provided as a profit for the player in the special game.

The gaming machine in accordance with the present invention may be configured such that:

the special game information displayed in the image display section is special game information concerning a winning history in the special game.

The gaming machine in accordance with the present invention may be configured such that:

the special game information displayed in the image display section is special game information concerning a gaming mode in the special game.

The gaming machine in accordance with the present invention may be configured such that:

the starting means uses an input of predetermined bet information as an actuating condition; and the special game information displayed in the image display section is special game information concerning a maximum permissible input unit of the bet information in the special game.

Here, the bet information is information concerning whether a bet operation is effected or not.

The gaming machine in accordance with the present invention may be configured such that:

the special game information displayed in the image display section is special game information for indicating that the special game is over.

The gaming machine in accordance with the present invention may further comprise an indicating section for indicating related special game information relating to the special game information displayed in the image display section.

The gaming machine in accordance with the present invention may be configured such that:

the special game information displayed in the image display section is also displayable while the normal game is being played.

In another aspect, the gaming machine in accordance with the present invention comprises:

variable display means for variably displaying a plurality of kinds of symbols necessary for gaming;

starting means for starting variably displaying the symbols; and stopping means, disposed so as to be operable by a player, for stopping the symbols being variably displayed;

wherein, on condition that a combination of symbols displayed when the symbols are stopped constitutes a predetermined special winning mode, the player is allowed to start playing a special game which is more advantageous to the player than is a normal game, the gaming machine further comprising an image display section for displaying game information to the player, the game information displayed in the image display section being game information concerning a history of provision of value information provided as a profit for the player.

In still another aspect, the gaming machine in accordance with the present invention comprises:

variable display means for variably displaying a plurality of kinds of symbols necessary for gaming;

starting means for starting variably displaying the symbols; and stopping means, disposed so as to be operable by a player, for stopping the symbols being variably displayed;

wherein, on condition that a combination of symbols displayed when the symbols are stopped constitutes a predetermined special winning mode, the player is allowed to start playing a special game which is more advantageous to the player than is a normal game, the gaming machine further comprising an image display section for displaying game information to the player, the game information displayed in the image display section being game information concerning a winning history.

In still another aspect, the gaming machine in accordance with the present invention comprises:

variable display means for variably displaying a plurality of kinds of symbols necessary for gaming;

starting means for starting variably displaying the symbols; and stopping means, disposed so as to be operable by a player, for stopping the symbols being variably displayed;

wherein, on condition that a combination of symbols displayed when the symbols are stopped constitutes a predetermined special winning mode, the player is allowed to start playing a special game which is more advantageous to the player than is a normal game, the gaming machine further comprising an image display section for displaying game information to the player, the game information displayed in the image display section being an explanation of an operation of a game.

In still another aspect, the gaming machine in accordance with the present invention comprises:

variable display means for variably displaying a plurality of kinds of symbols necessary for gaming;

starting means for starting variably displaying the symbols; and stopping means, disposed so as to be operable by a player, for stopping the symbols being variably displayed;

wherein, on condition that a combination of symbols displayed when the symbols are stopped constitutes a predetermined special winning mode, the player is allowed to start playing a special game which is more advantageous to the player than is a normal game, the gaming machine further comprising an image display section for displaying game information to the player, the game information displayed in the image display section being an indication of an error of the gaming machine.

In these aspects of the present invention, the gaming machine may be a slot machine comprising:

variable display means comprising a plurality of reels displaying a plurality of symbols necessary for gaming;

starting means comprising a start switch for starting rotating the plurality of reels; and stopping means comprising a stop switch for individually stopping the plurality of reels;

wherein the player is provided with a predetermined unit of value information if a combination of symbols displayed when the plurality of reels is stopped constitutes a predetermined stop mode.

The gaming machine in accordance with the present invention may be configured such that:

the game information displayed in the image display section is a moving image.

BRIEF DESCRIPTION OF THE DRAWINGS

FIG. 5 is an explanatory view of special game information (history of provision of value information) displayed in the image display section;

FIG. 6 is an explanatory view of special game information (maximum permissible input unit of bet information) displayed in the image display section;

FIGS. 22A to 22D are explanatory charts of appearing symbol selection tables at the time when a ready state is produced;

FIG. 23 is an explanatory chart showing relationships between flash data tables/selection random number values and reel blinking patterns/game-starting sounds;

FIG. 24 is an explanatory chart showing relationships between flash data tables/selection random number values and reel blinking patterns/game-starting sounds;

FIG. 25 is an explanatory chart showing relationships between flash data tables/selection random number values and reel blinking patterns/game-starting sounds;

FIG. 26 is an explanatory chart showing relationships between flash data tables/selection random number values and reel blinking patterns/game-starting sounds;

FIG. 27 is an explanatory chart of reel blinking pattern (1);

FIG. 35 is an explanatory chart of a ready-state attraction data selection table (normal game: game-starting sound 1);

FIG. 36 is an explanatory chart of a ready-state attraction data selection table (normal game: game-starting sound 2);

FIG. 37 is an explanatory chart of a ready-state attraction data selection table (while a bonus hand being internally elected: game-starting sound 1);

FIG. 38 is an explanatory chart of a ready-state attraction data selection table (while a bonus hand being internally elected: game-starting sound 2);

FIG. 39 is an explanatory chart of a ready-state attraction data selection table (when definition data exist: game-starting sound 1);

FIG. 40 is an explanatory chart of a ready-state attraction data selection table (when definition data exist: game-starting sound 2);

FIGS. 41A and 41B are explanatory charts of single character attraction selection tables;

FIGS. 42A and 42B are explanatory charts of appearing symbol selection tables;

FIG. 43 is an explanatory chart of flash data selection tables and selection random number values;

FIG. 44 is an explanatory chart of transmission commands transmitted from the main control board to the sub-control board;

FIG. 120 is an explanatory view of game information (notice of the internally elected hand by the ready-state attraction: ready-state attraction 3) displayed in the image display section in accordance with the other embodiment;

FIG. 121 is an explanatory view of game information (notice of the internally elected hand by the ready-state attraction: ready-state attraction 3) displayed in the image display section in accordance with the other embodiment;

FIG. 122 is an explanatory view of game information (notice of the internally elected hand by the ready-state attraction: ready-state attraction 3) displayed in the image display section in accordance with the other embodiment;

FIG. 123 is an explanatory view of game information (notice of the internally elected hand by the ready-state attraction: ready-state attraction 3) displayed in the image display section in accordance with the other embodiment;

FIG. 124 is an explanatory view of game information (notice of the internally elected hand by the ready-state attraction: ready-state attraction 3) displayed in the image display section in accordance with the other embodiment;

FIG. 125 is an explanatory view of game information (notice of the internally elected hand by the ready-state attraction: ready-state attraction 3) displayed in the image display section in accordance with the other embodiment;

FIG. 126 is an explanatory view of game information (notice of the internally elected hand by the ready-state attraction: ready-state attraction 3) displayed in the image display section in accordance with the other embodiment;

FIG. 127 is an explanatory view of game information (notice of the internally elected hand by the ready-state attraction: ready-state attraction 3) displayed in the image display section in accordance with the other embodiment;

FIG. 128 is an explanatory view of game information (notice of the internally elected hand by the ready-state attraction: ready-state attraction 3) displayed in the image display section in accordance with the other embodiment;

FIG. 129 is an explanatory view of game information (notice of the internally elected hand by the ready-state attraction: ready-state attraction 3) displayed in the image display section in accordance with the other embodiment;

FIG. 130 is an explanatory view of game information (notice of the internally elected hand by the ready-state attraction: ready-state attraction 3) displayed in the image display section in accordance with the other embodiment;

FIG. 131 is an explanatory view of game information (notice of the internally elected hand by the ready-state attraction: ready-state attraction 3) displayed in the image display section in accordance with the other embodiment;

Figure 132:
Figure 133:
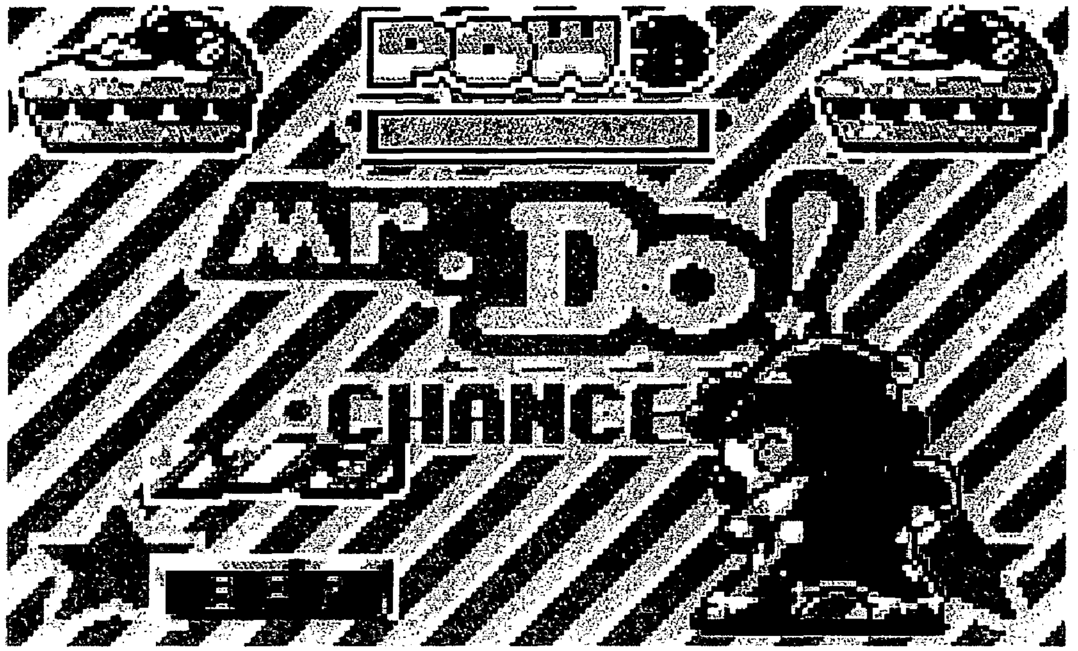
Figure 134:
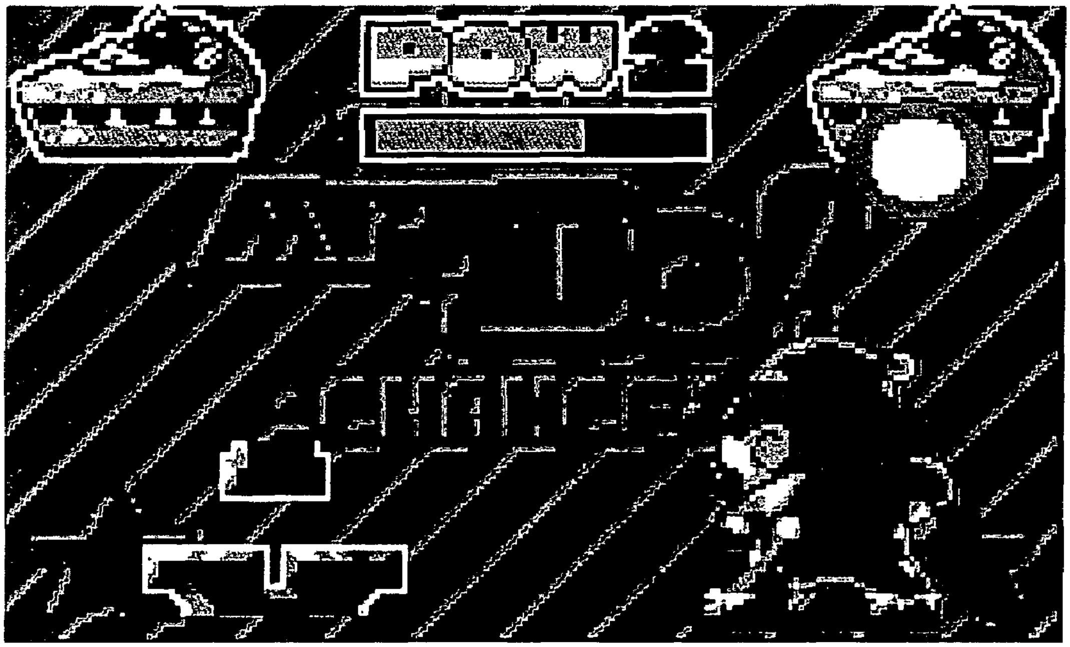
Figure 135:
Figure 136:
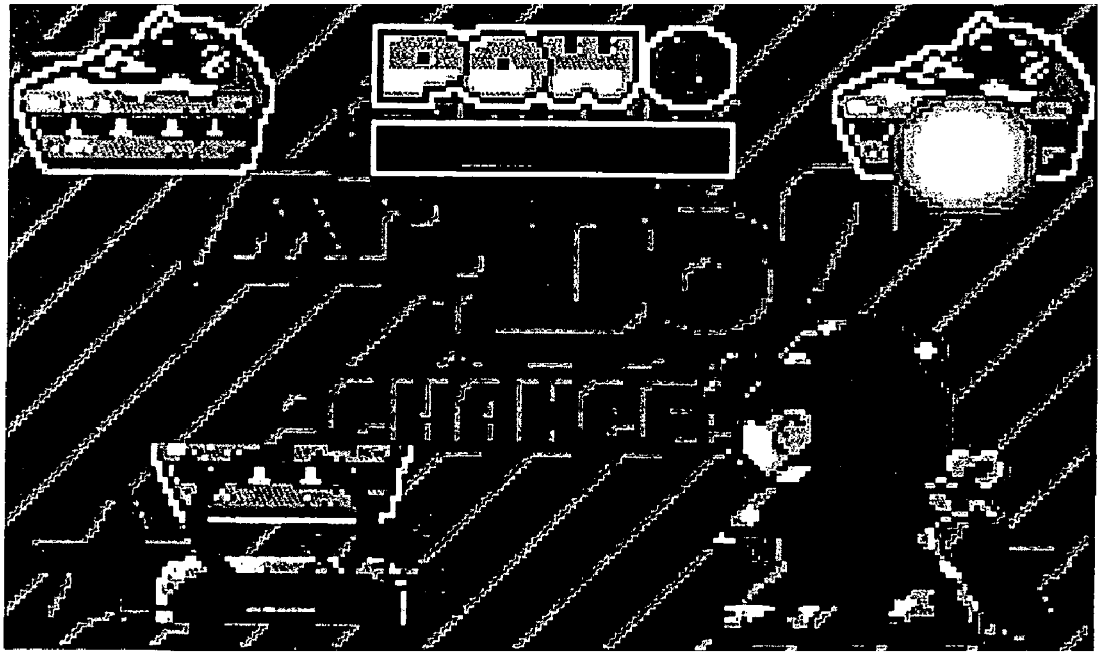
Figure 137:
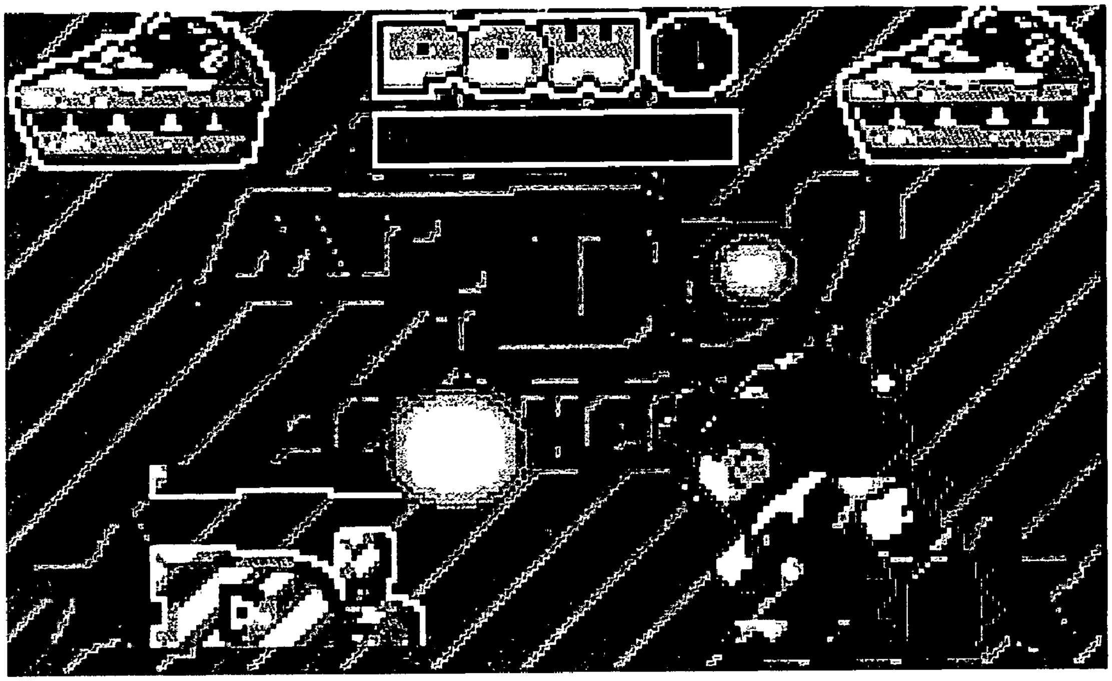
Figure 138:
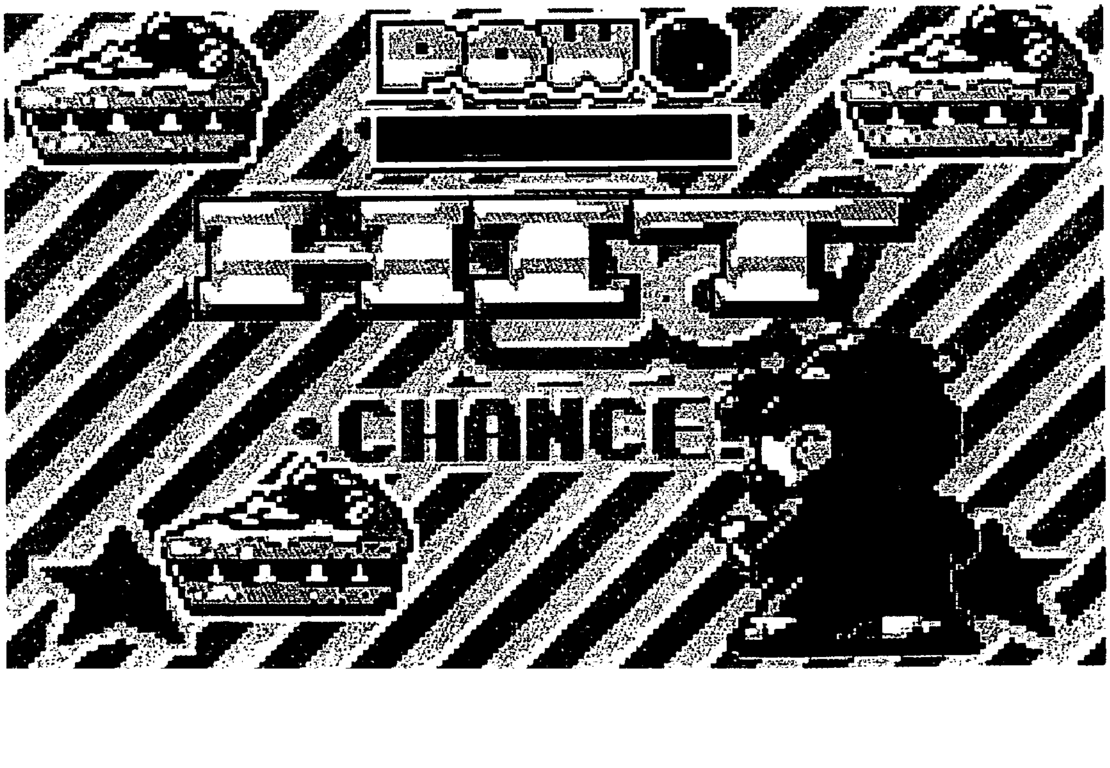
Figure 139:
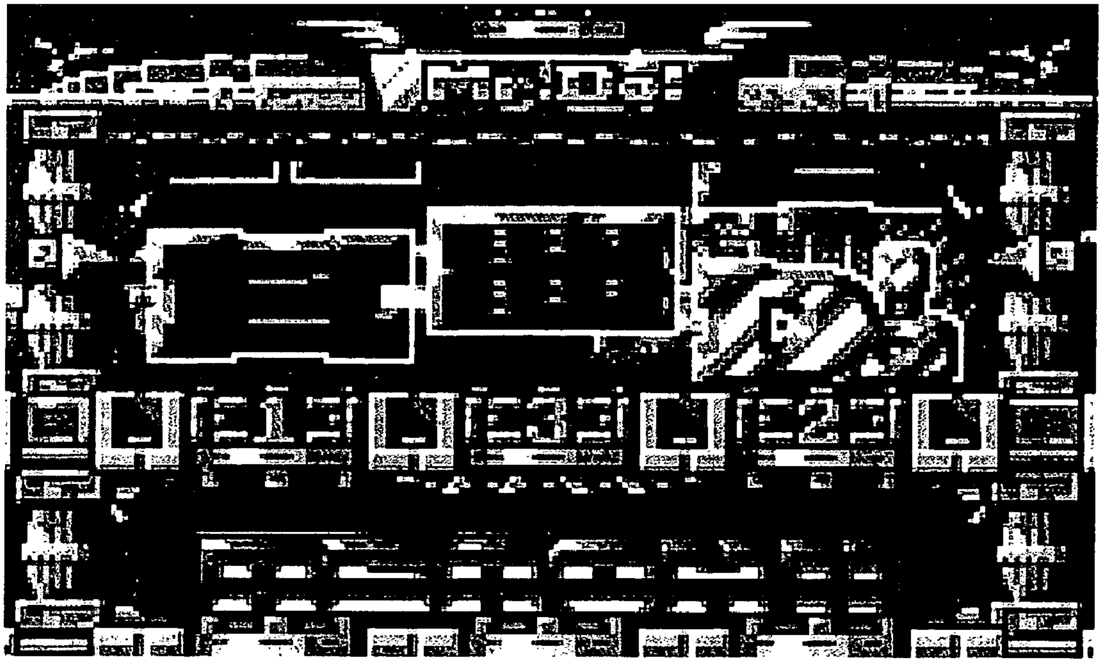
Figure 140:
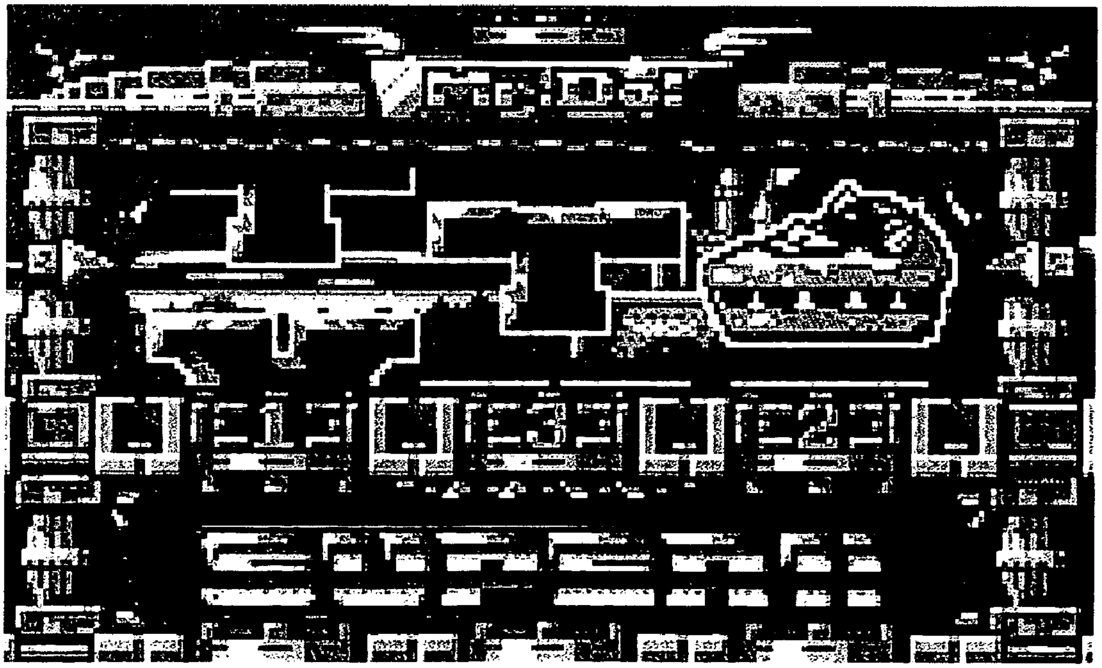
Figure 141:
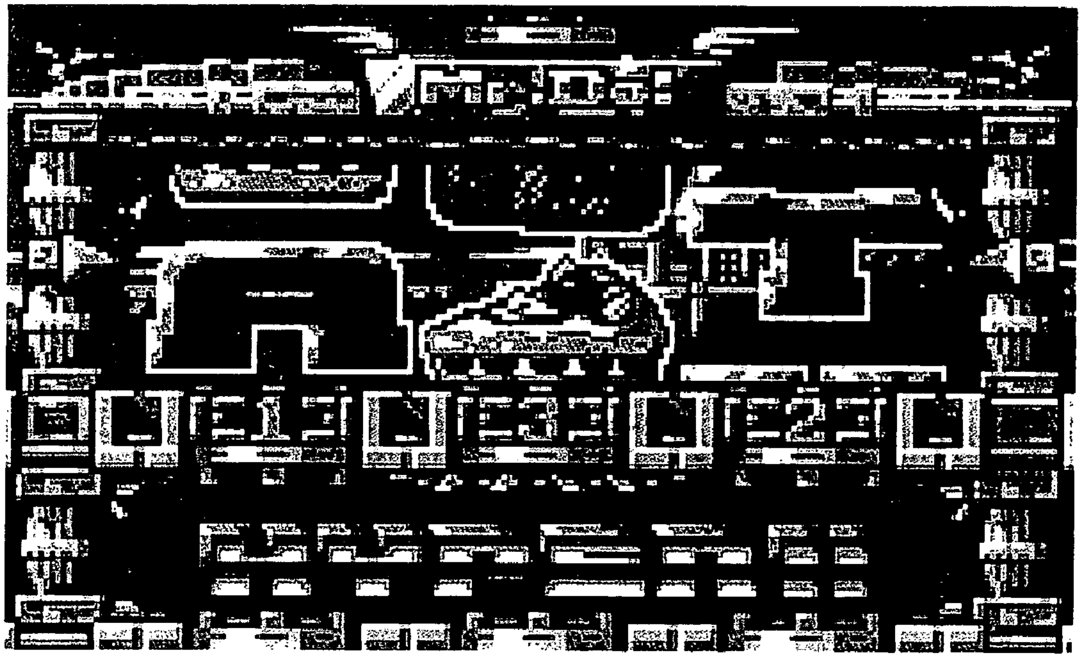
Figure 142:
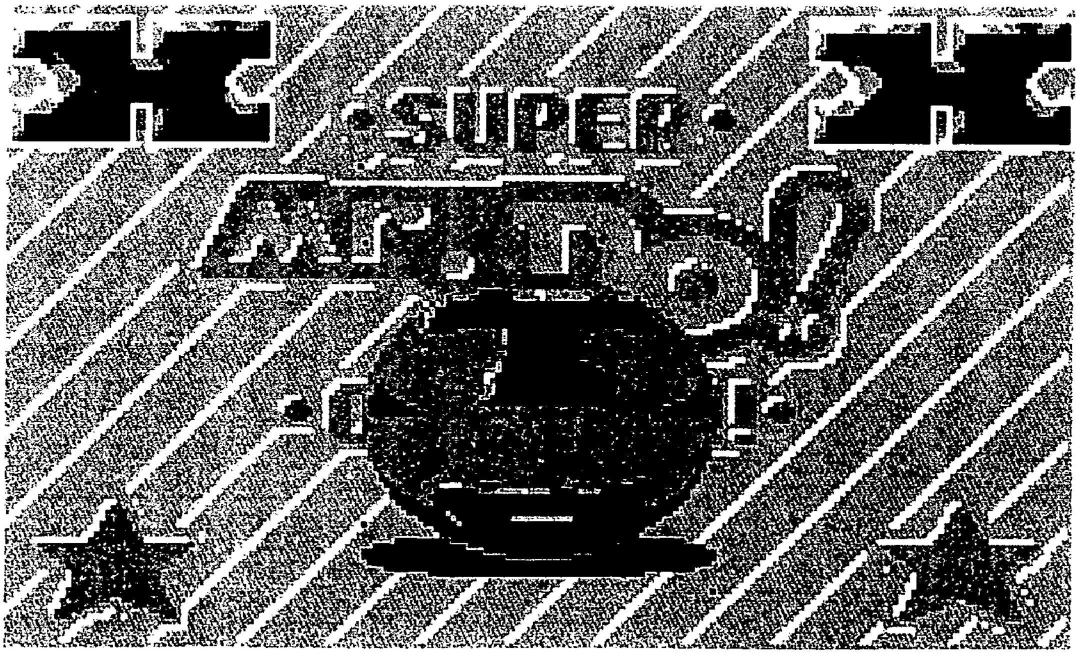
Figure 143:
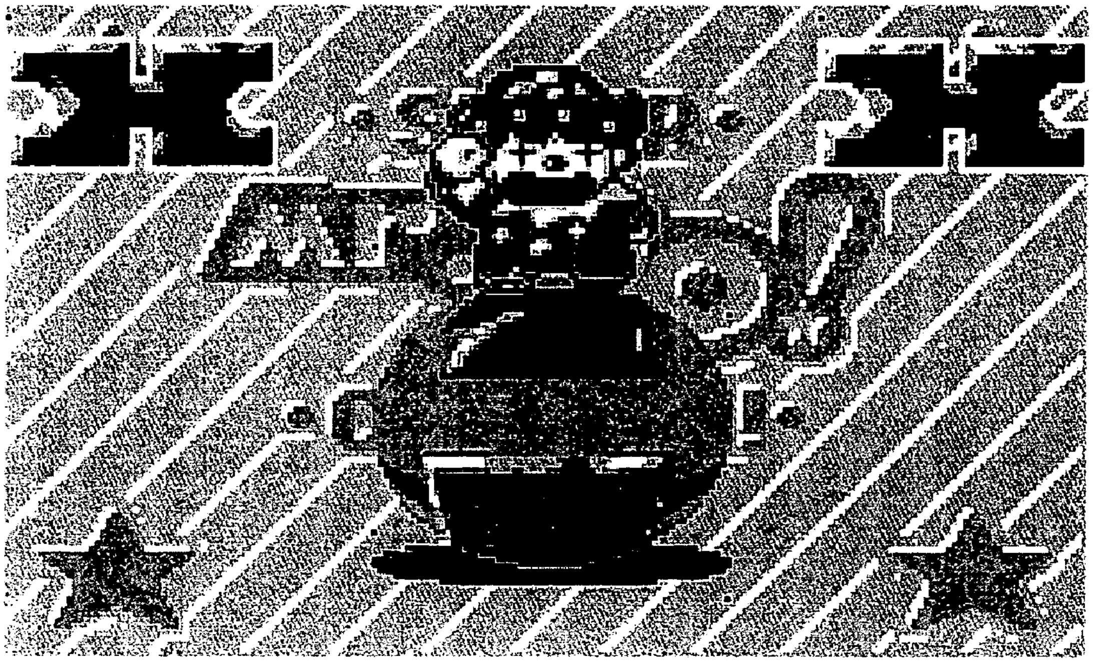
Figure 144:
Figure 145:
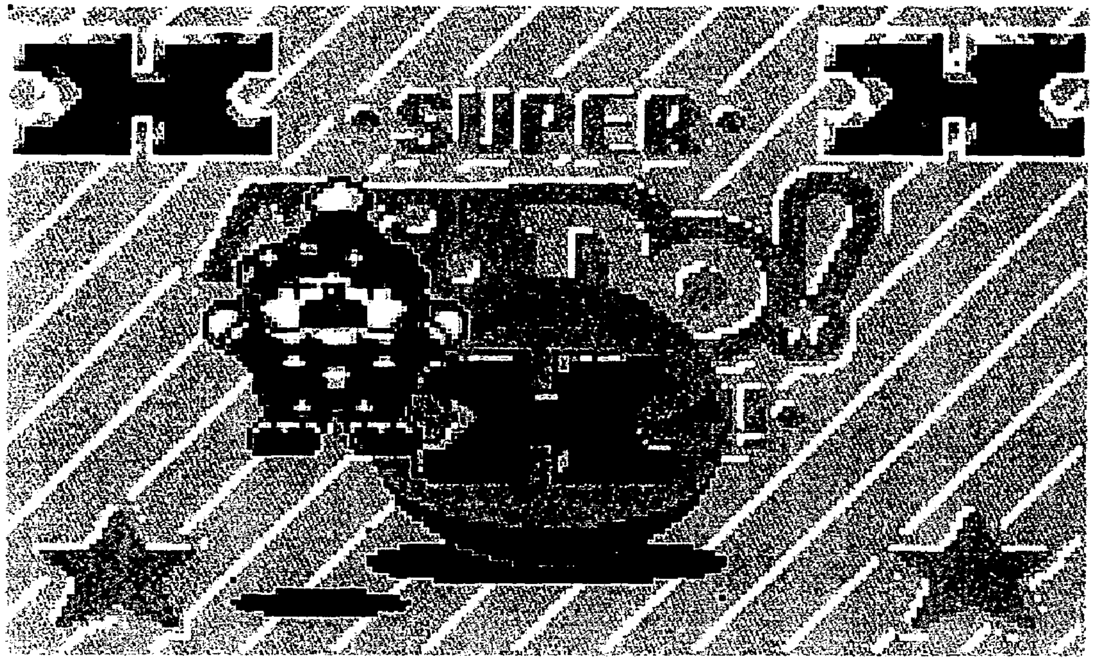
Figure 146:
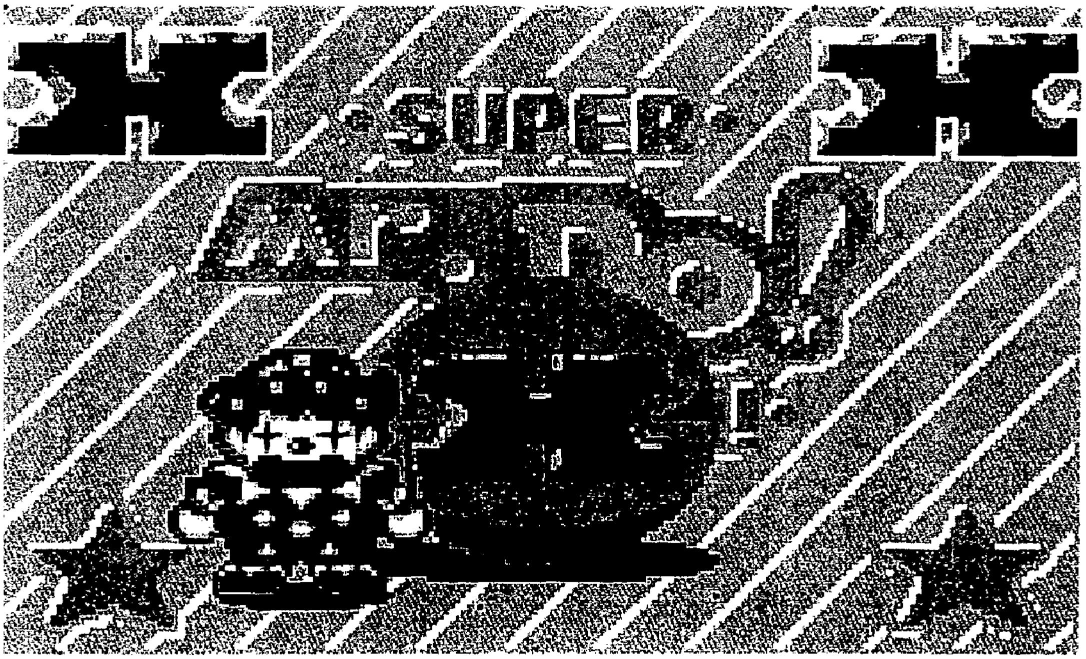
Figure 147:
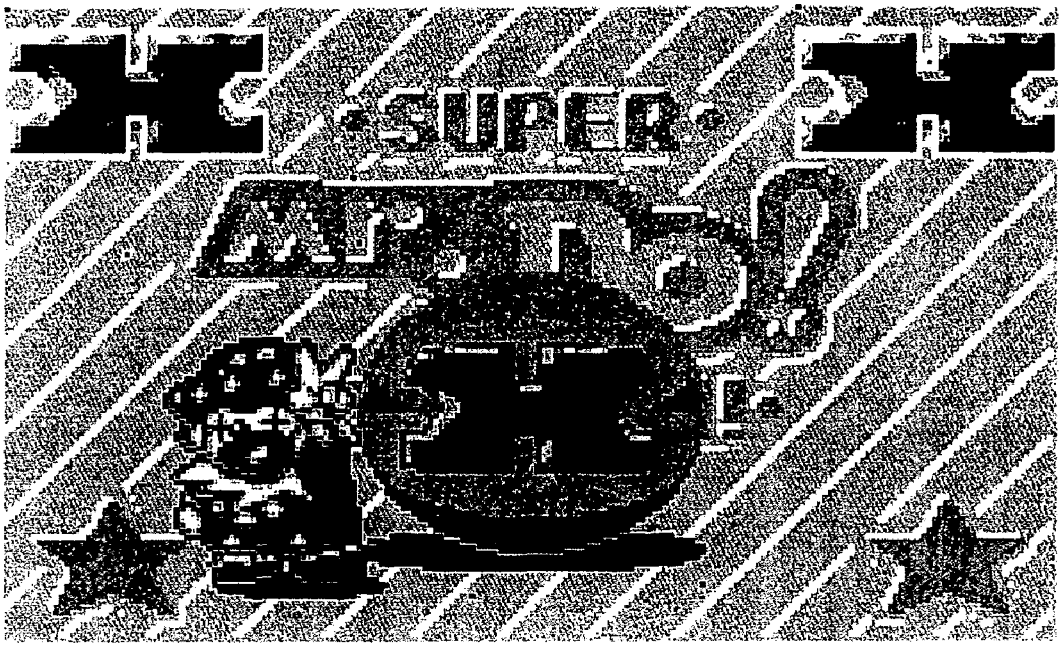
Figure 148:
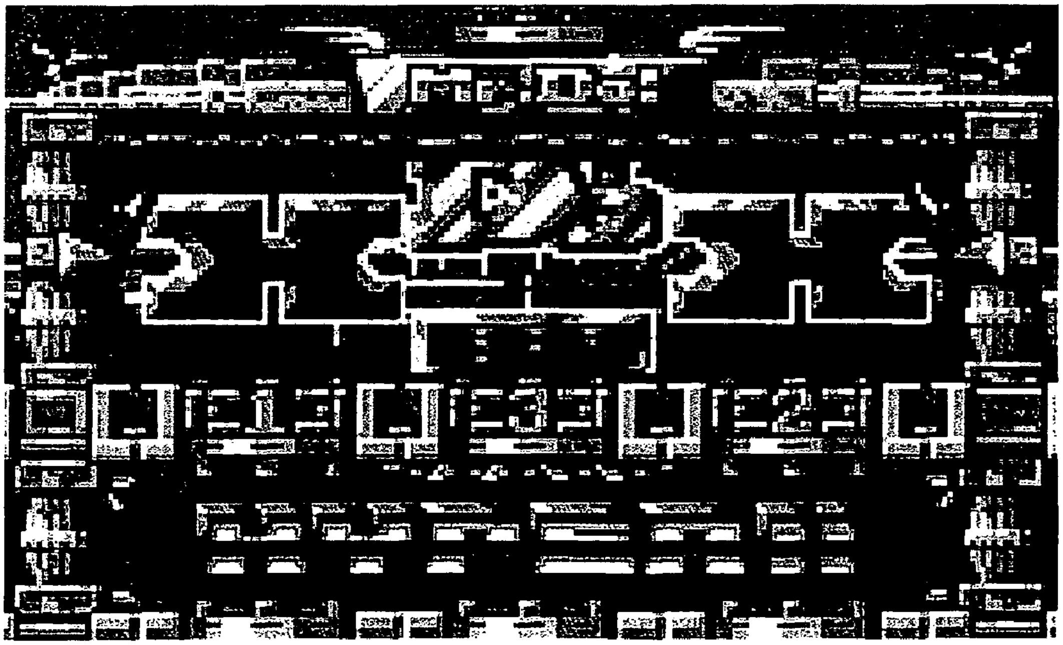
Figure 149:
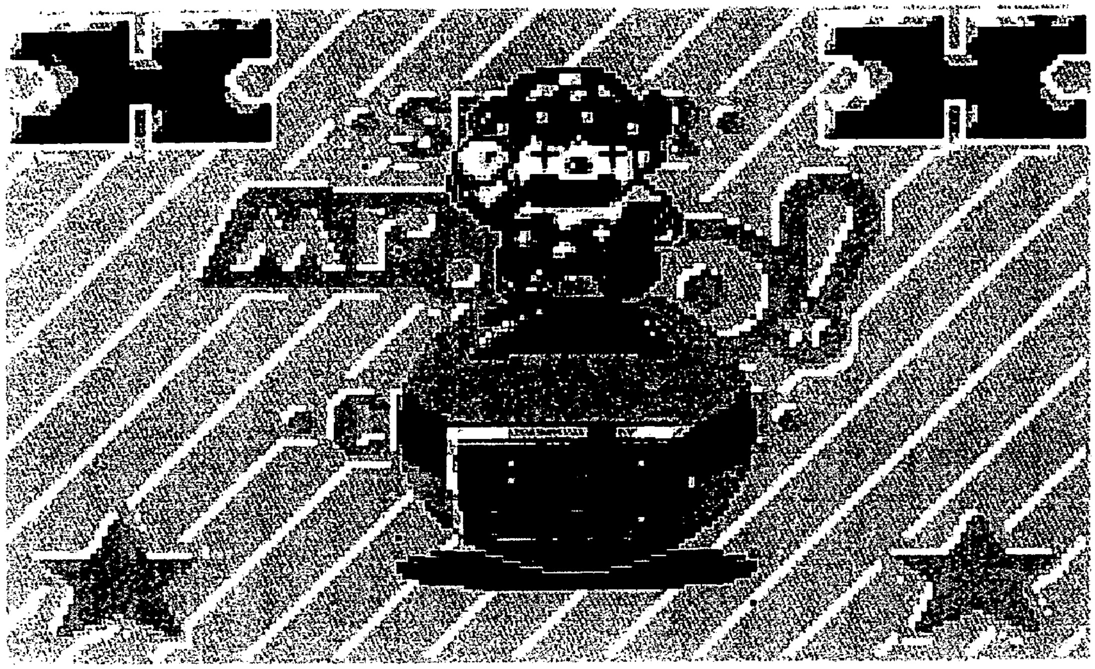
Figure 150:
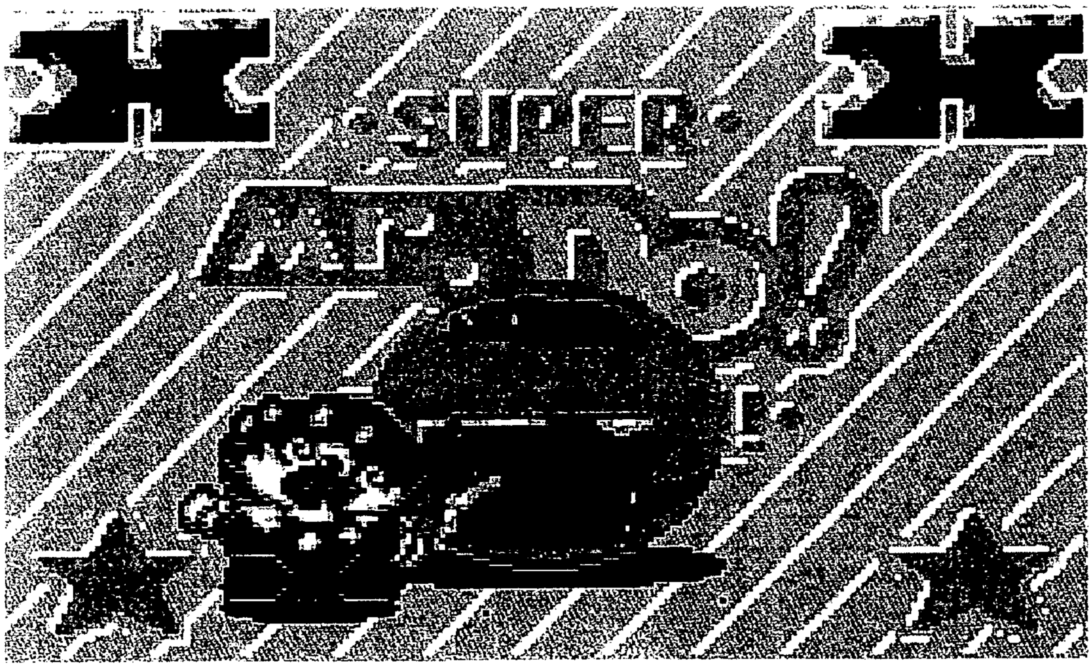
Figure 151:
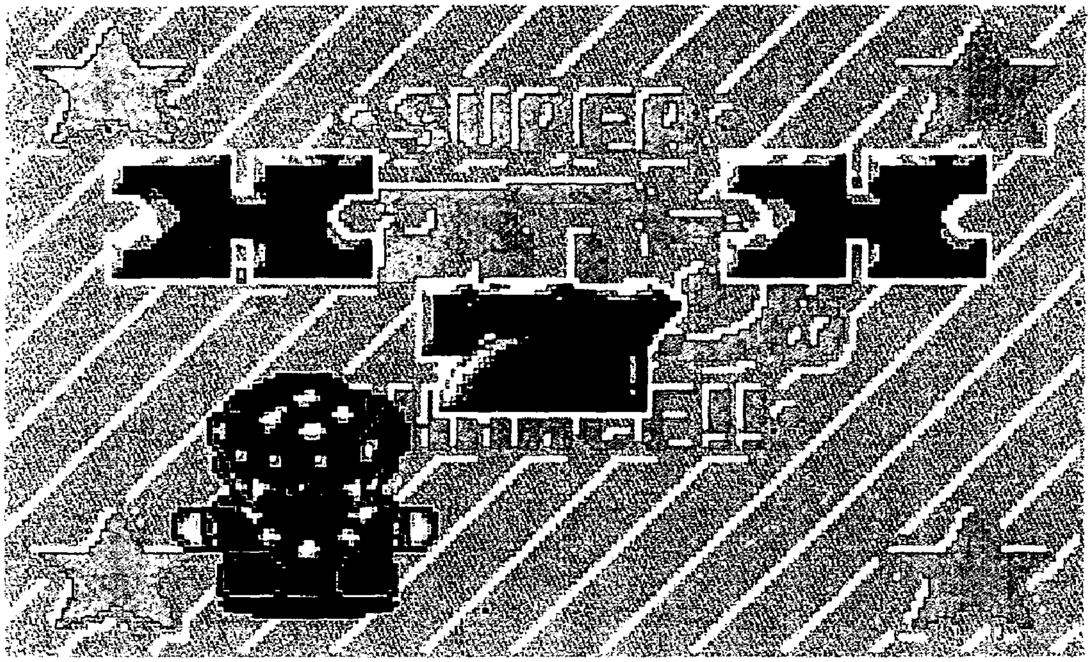
Figure 152:
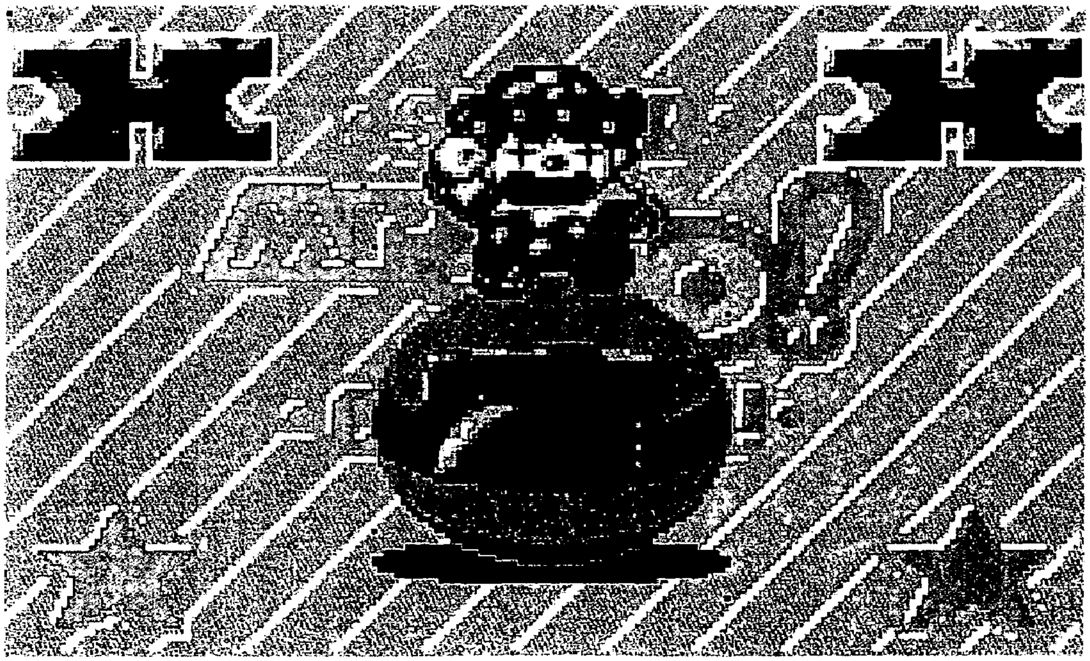
Figure 153:
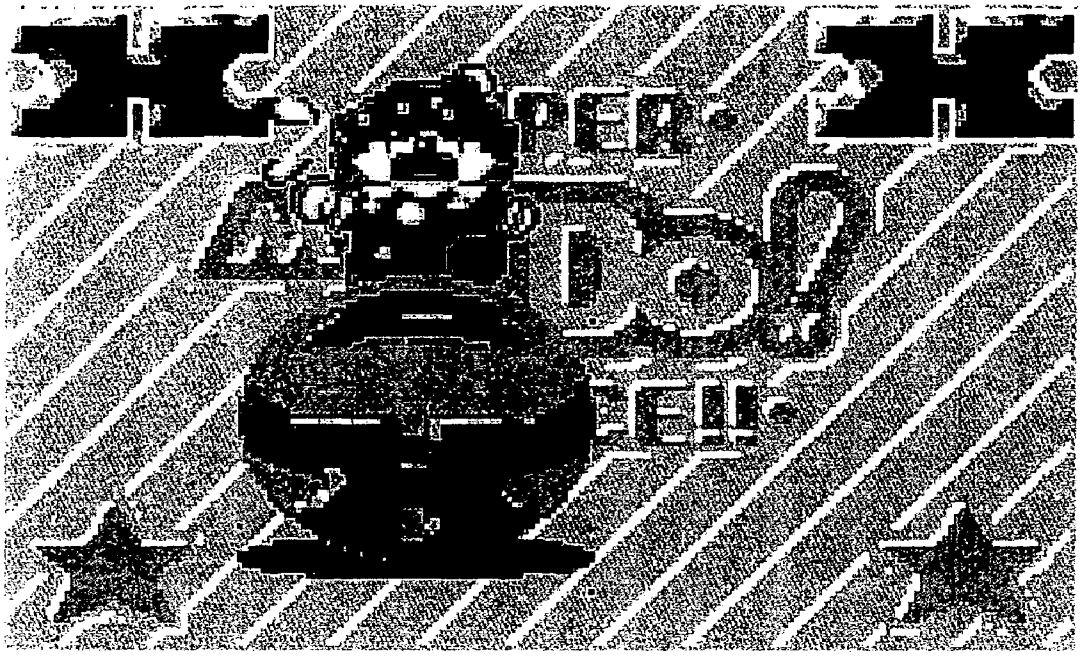
Figure 154:
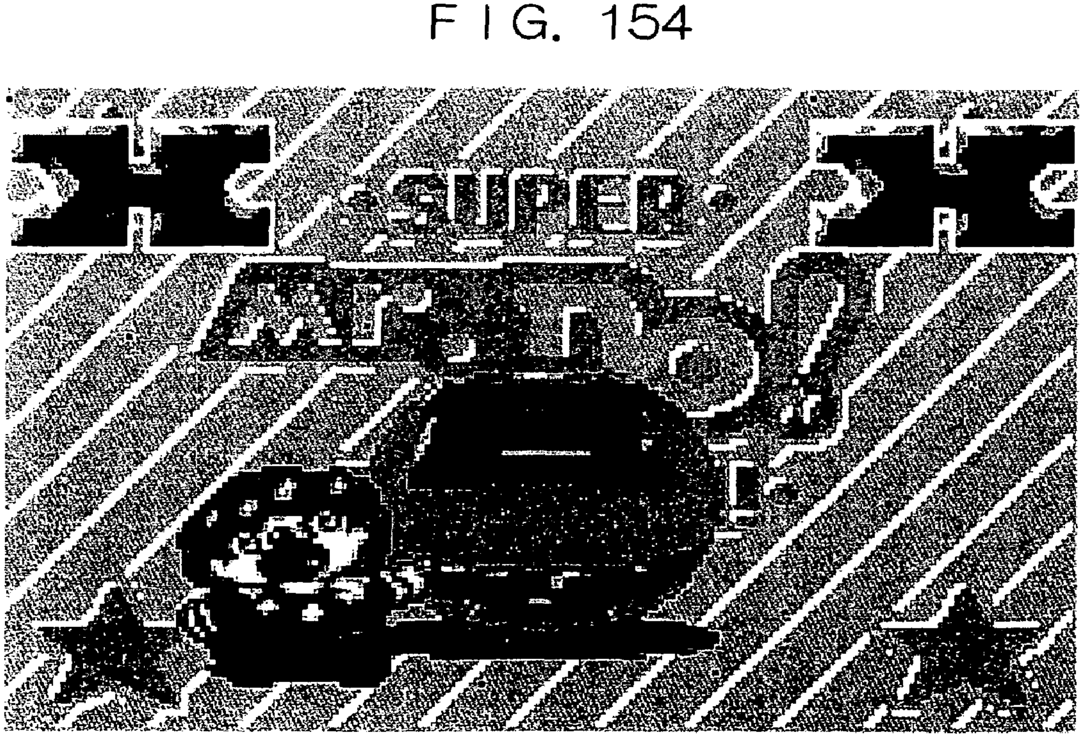
Figure 155:
Figure 156:
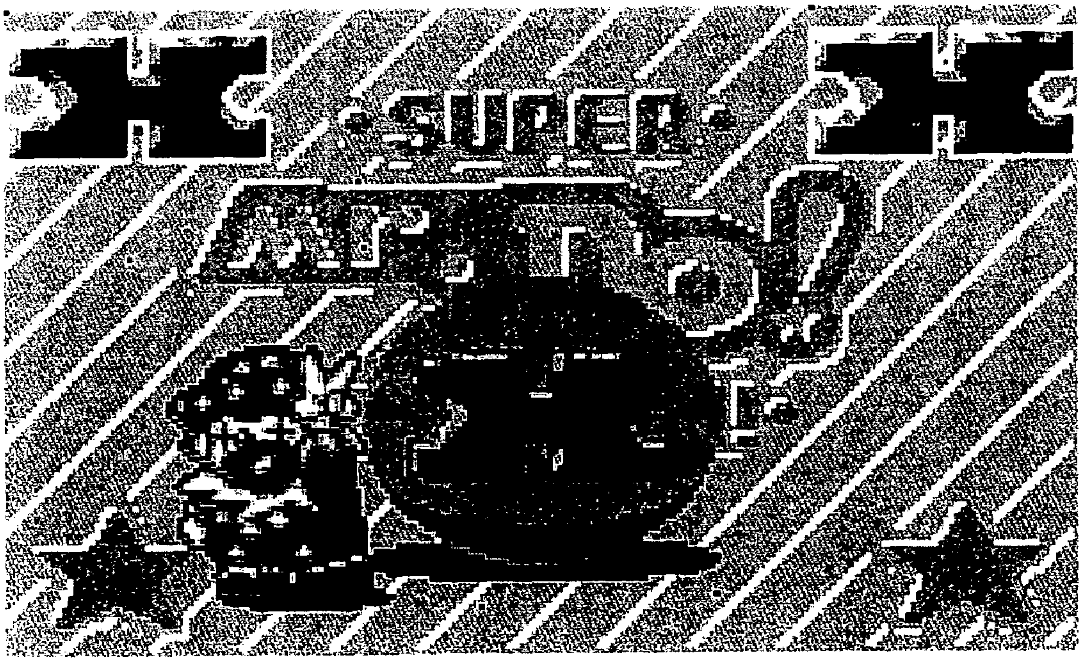
Figure 157:
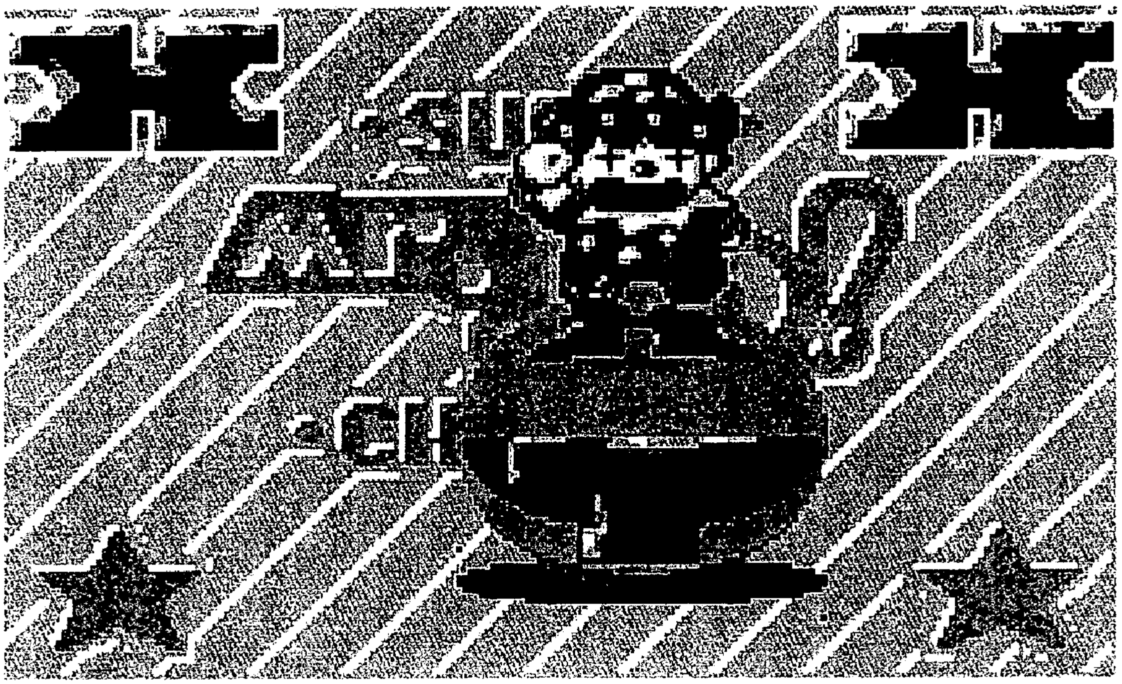
Figure 158:
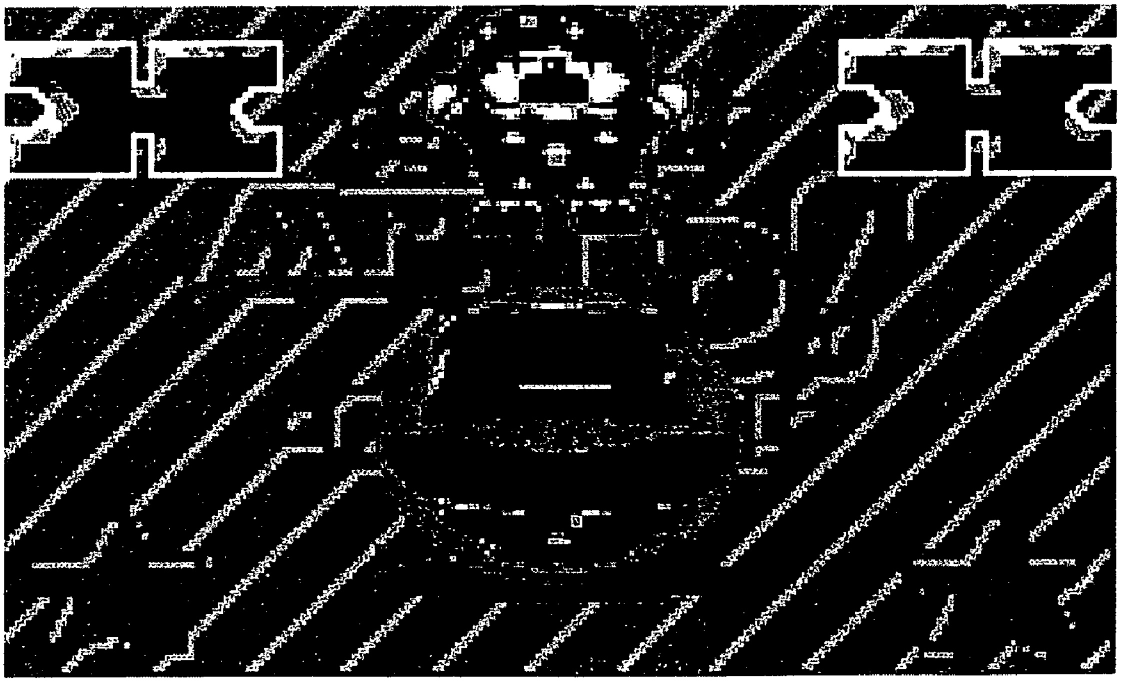
Figure 159:
Figure 160:
Figure 161:
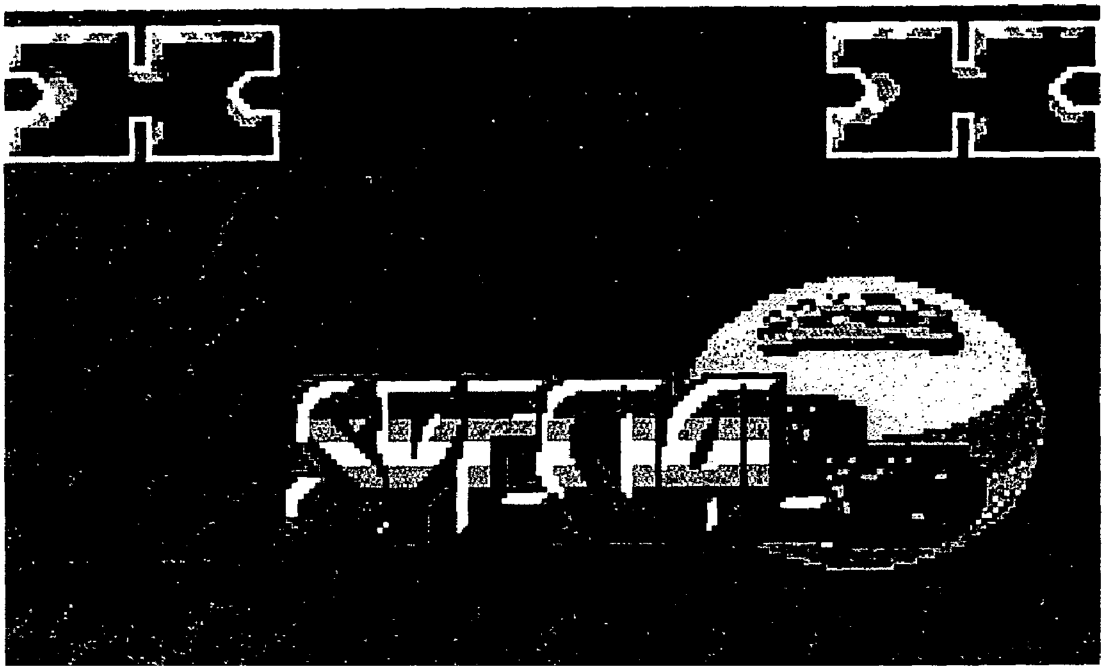
Figure 162:
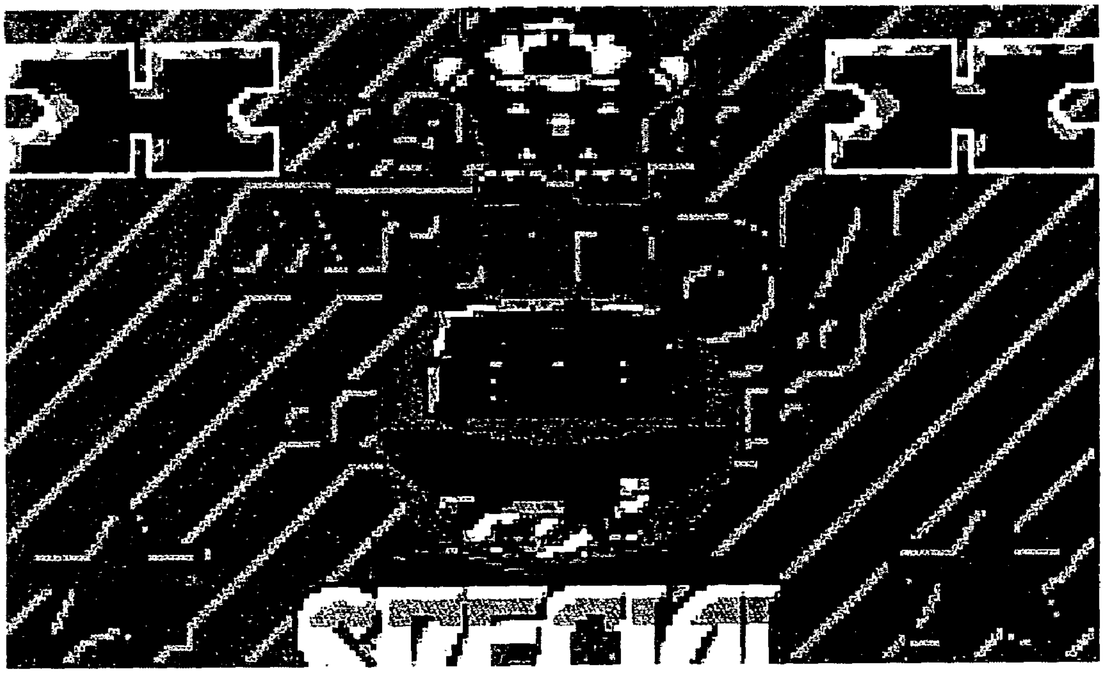
Figure 163:
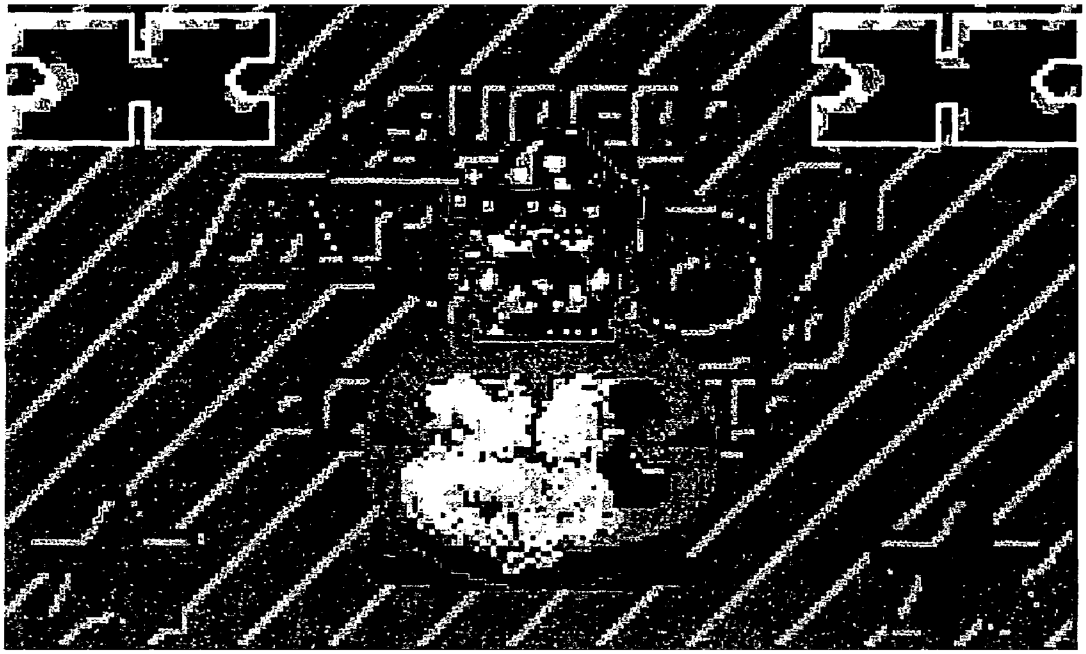
Figure 164:
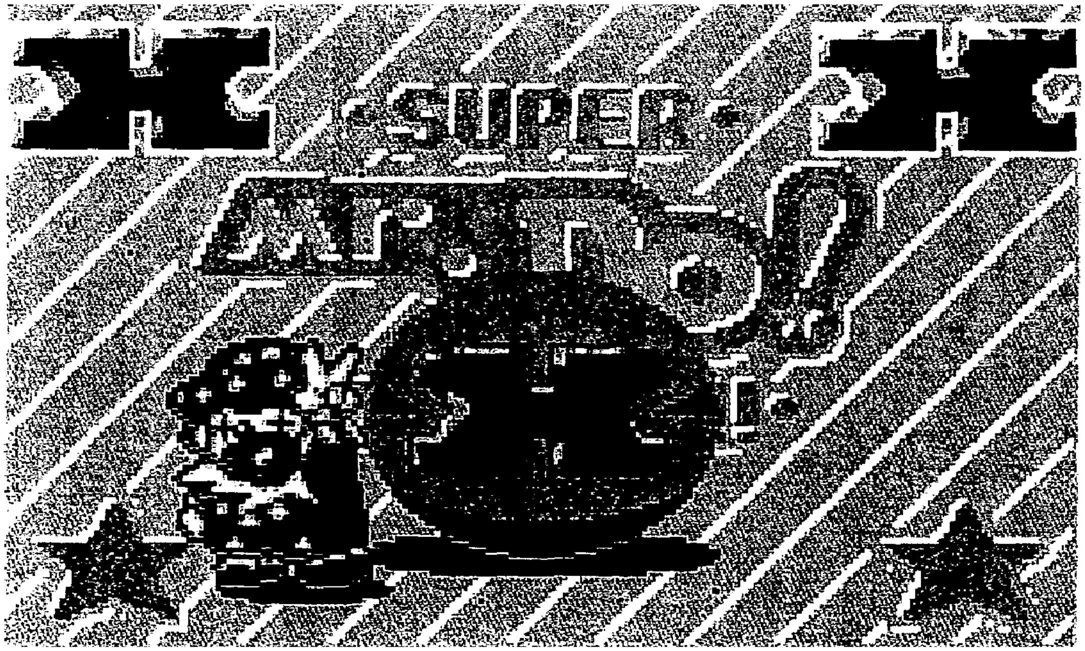
Figure 165:
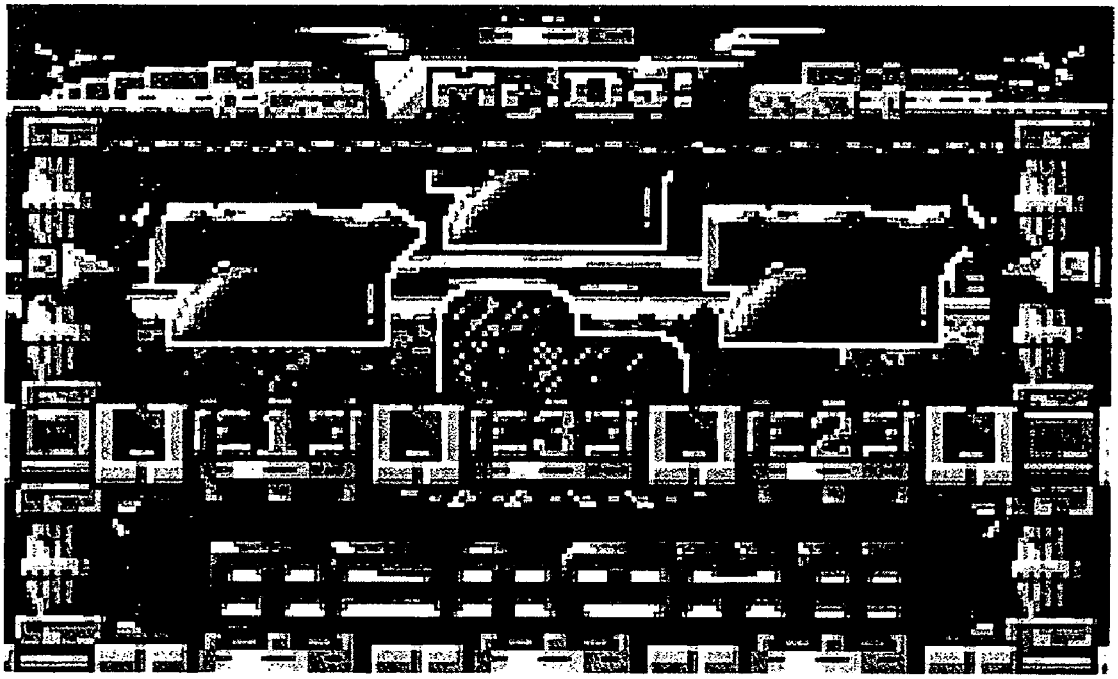
Figure 166:
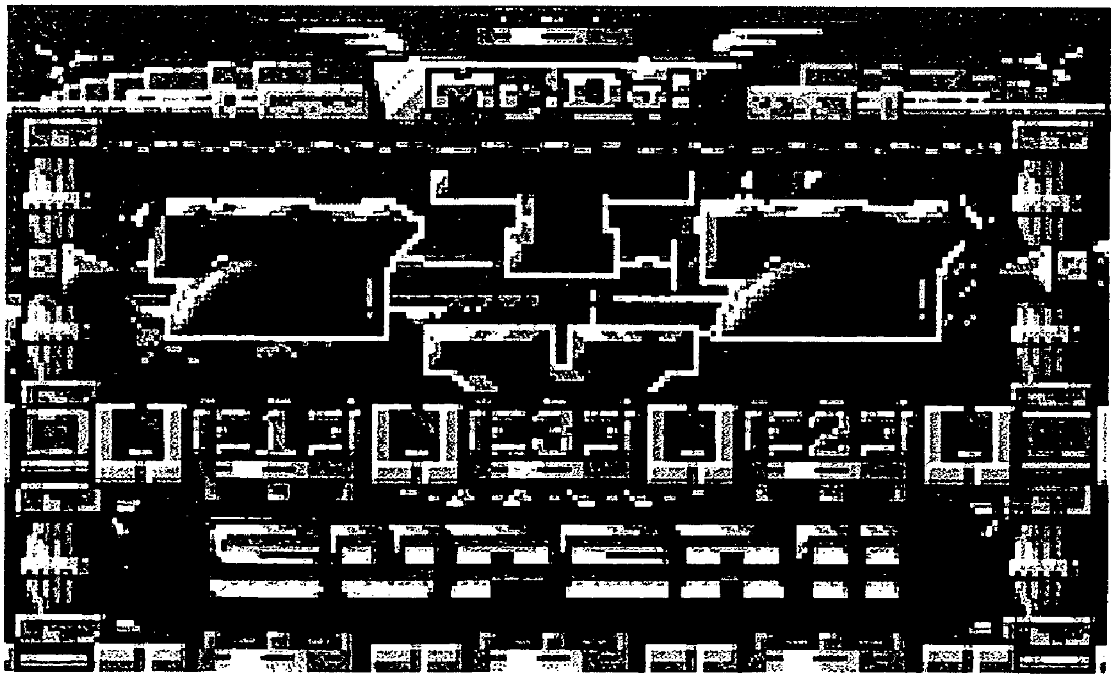
Figure 167:
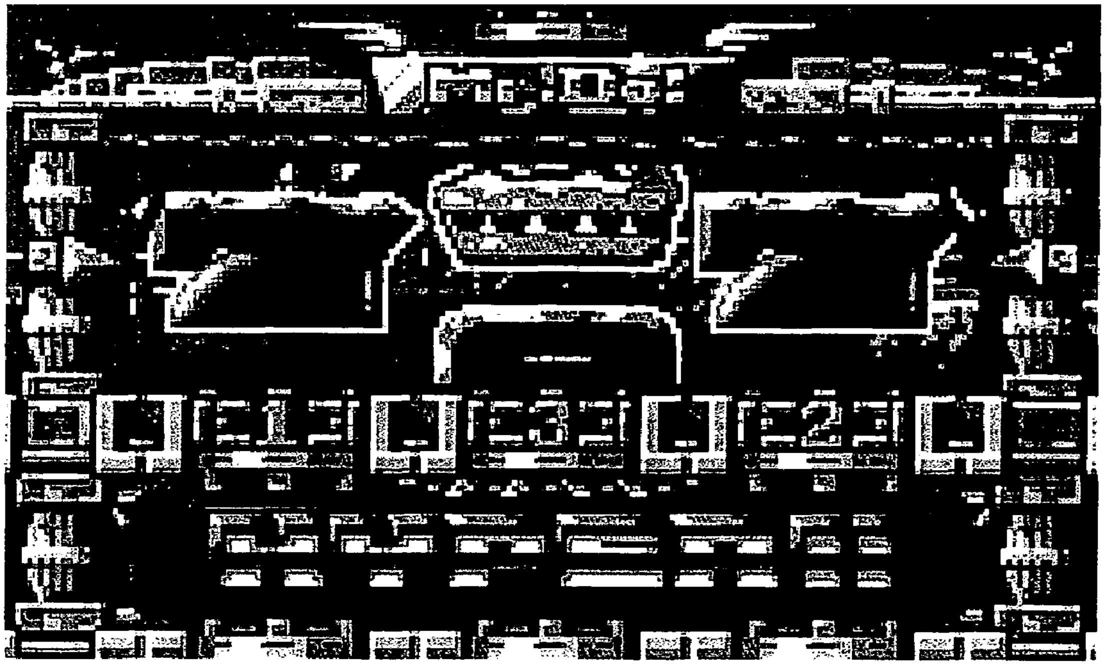
Figure 168:
Figure 169:
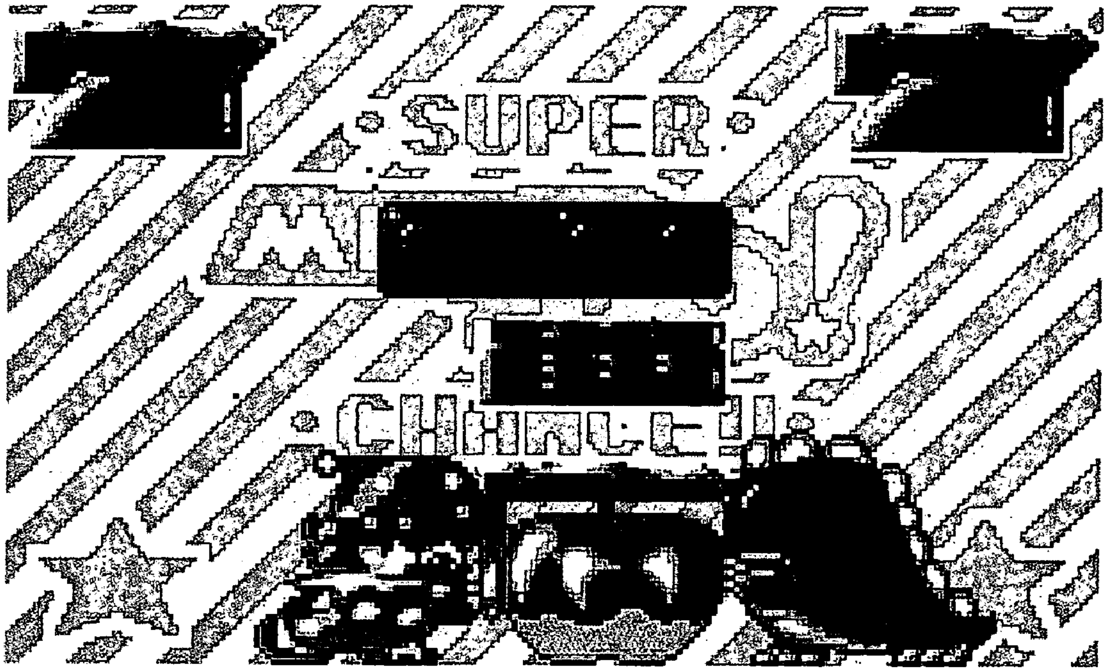
Figure 170:
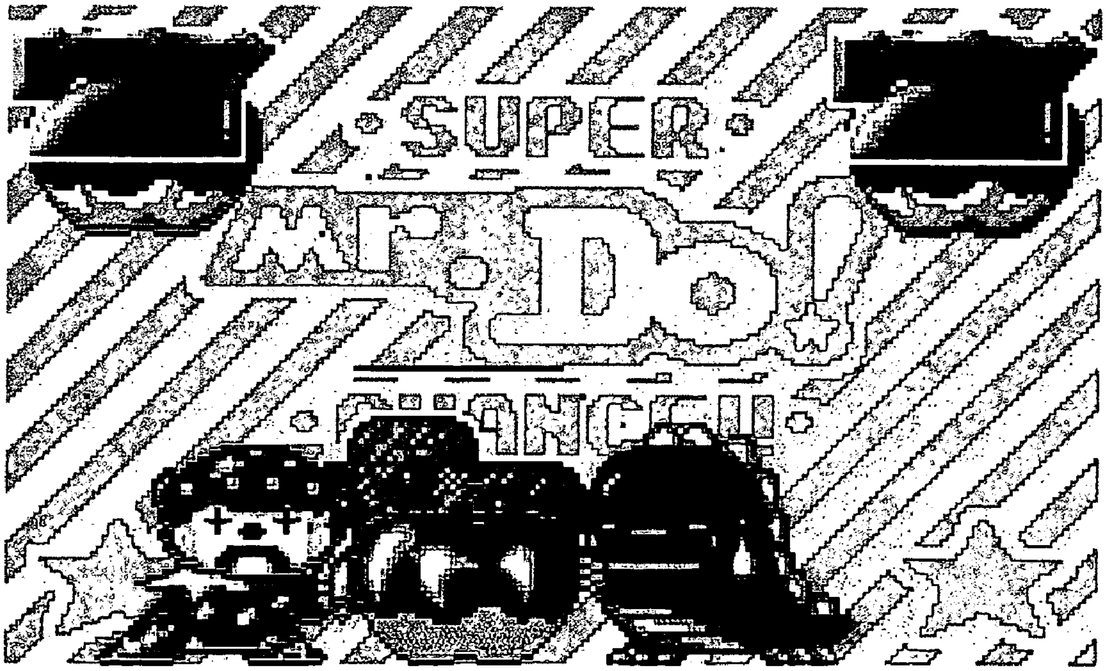
Figure 171:
Figure 172:
Figure 173:
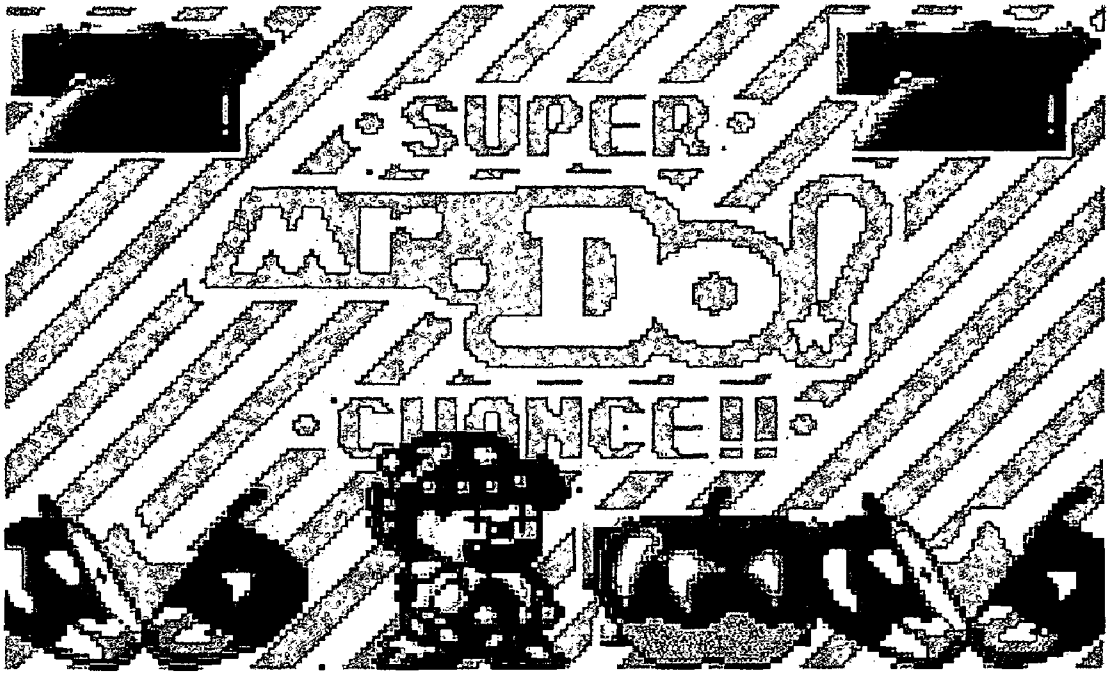
Figure 174:
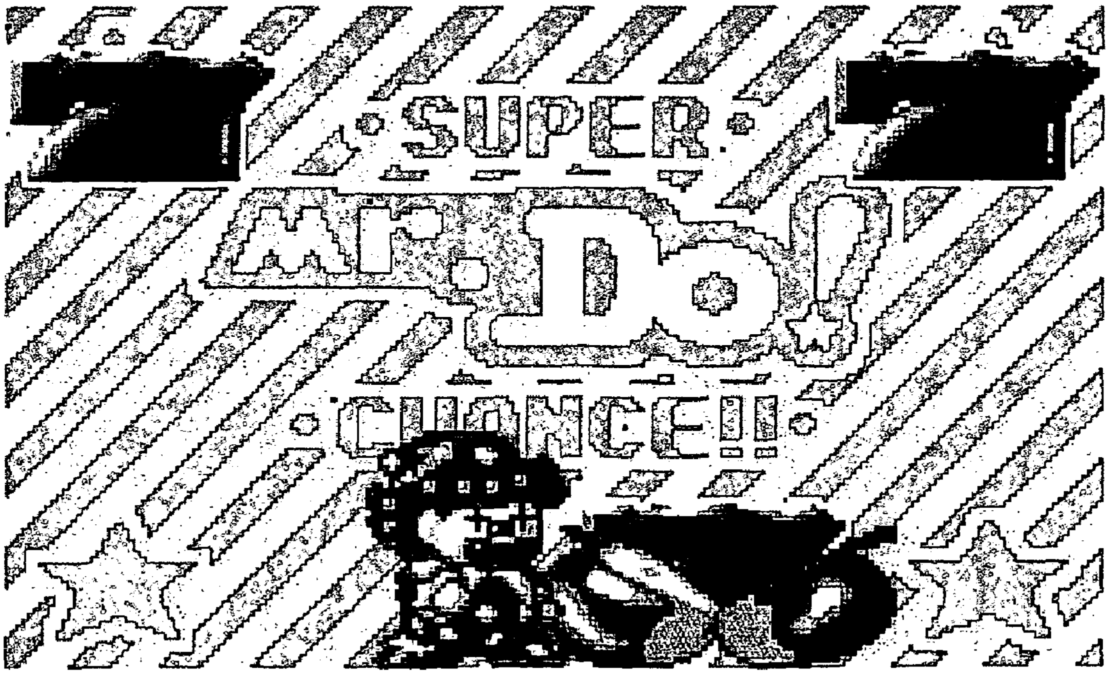
Figure 175:
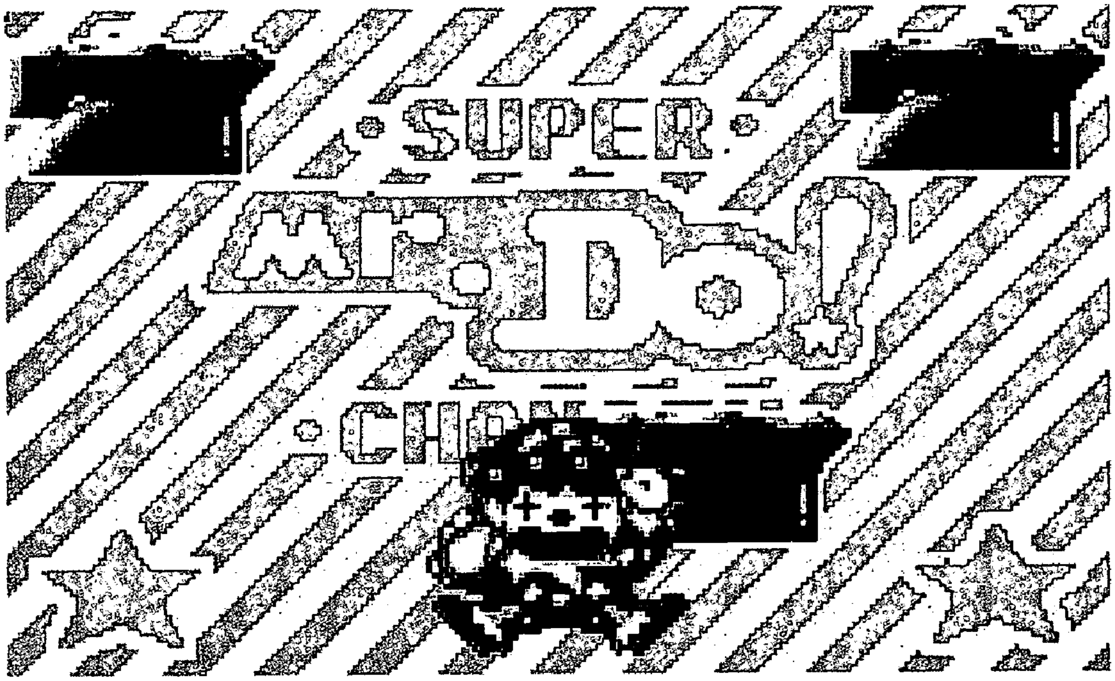
Figure 176:
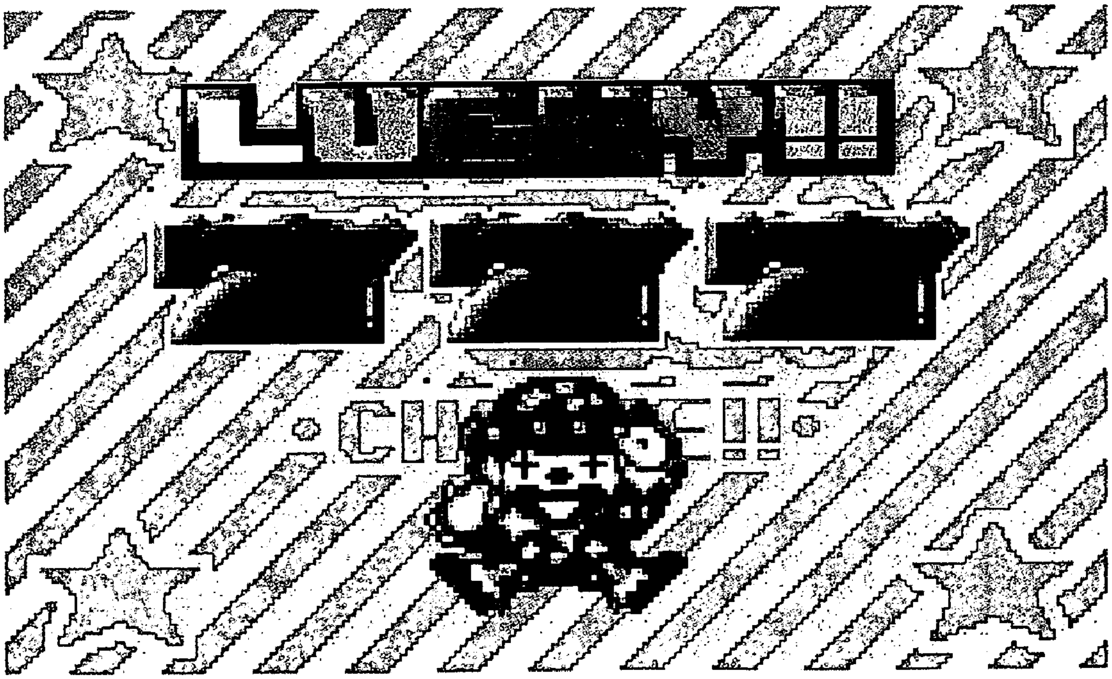
Figure 177:
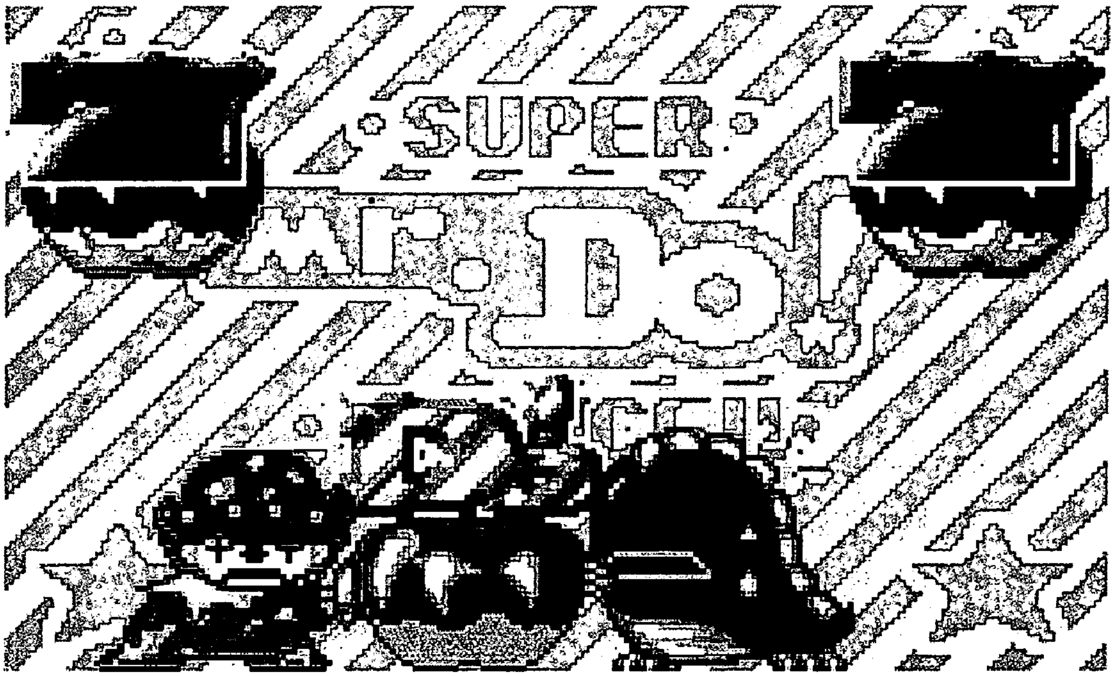
Figure 178:
Figure 179:
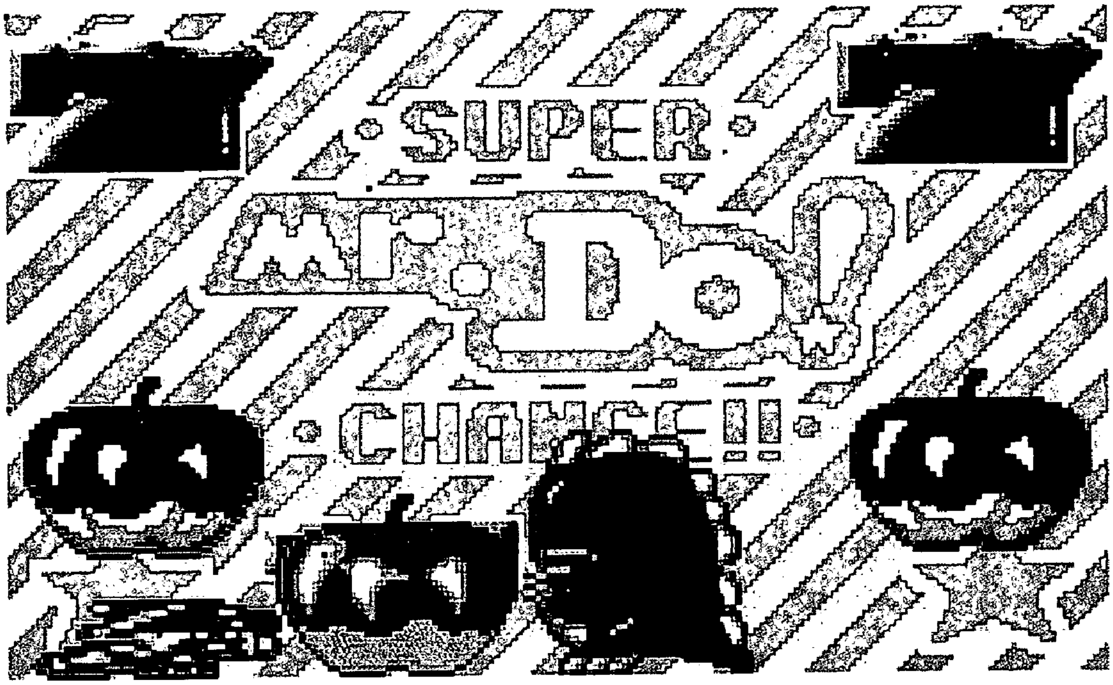
Figure 180:
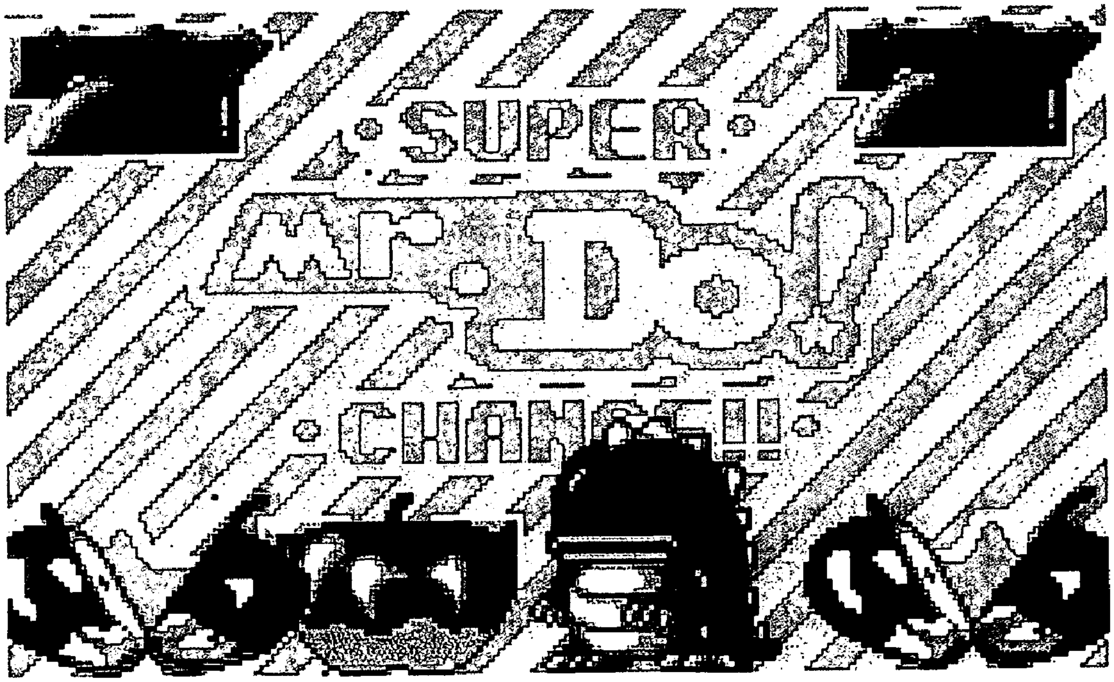
Figure 181:
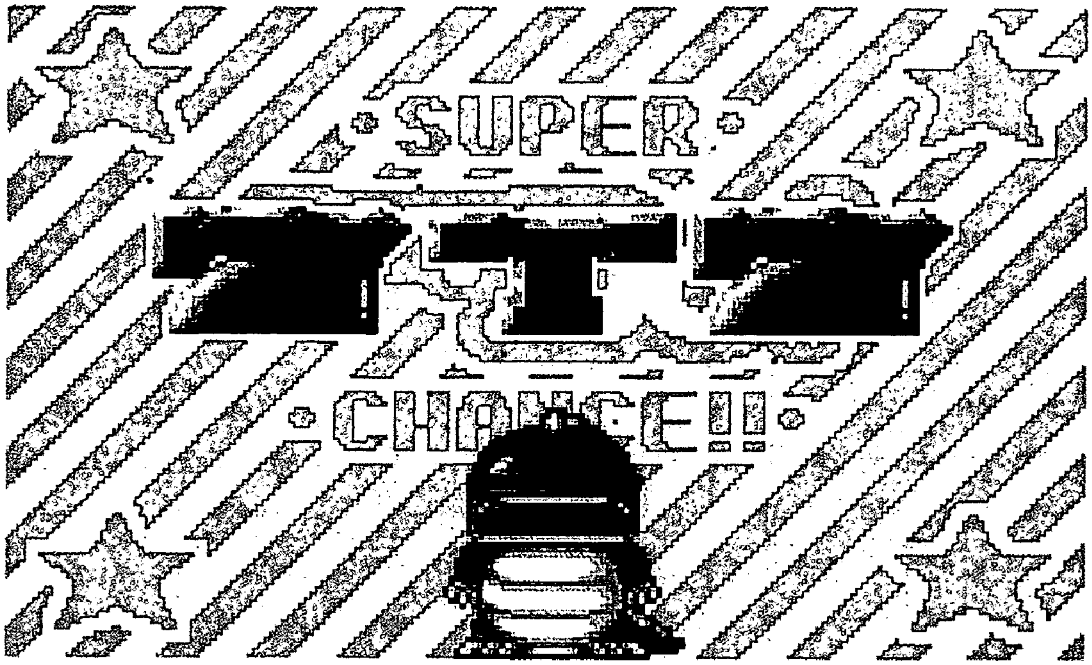
Figure 182:
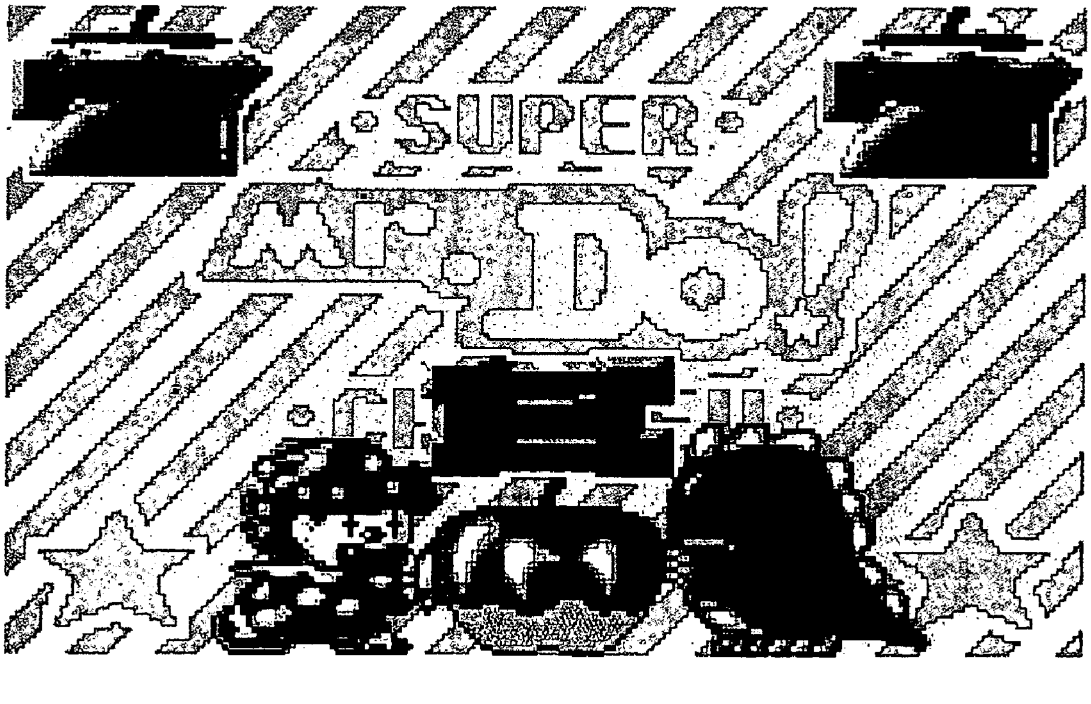
Figure 183:
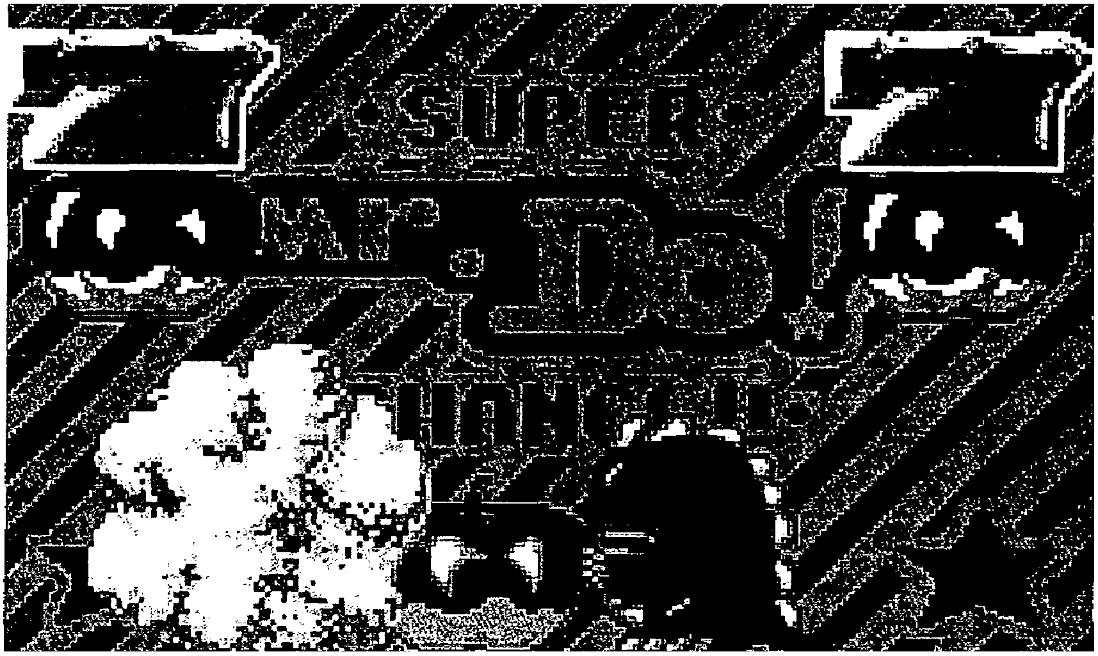
Figure 184:
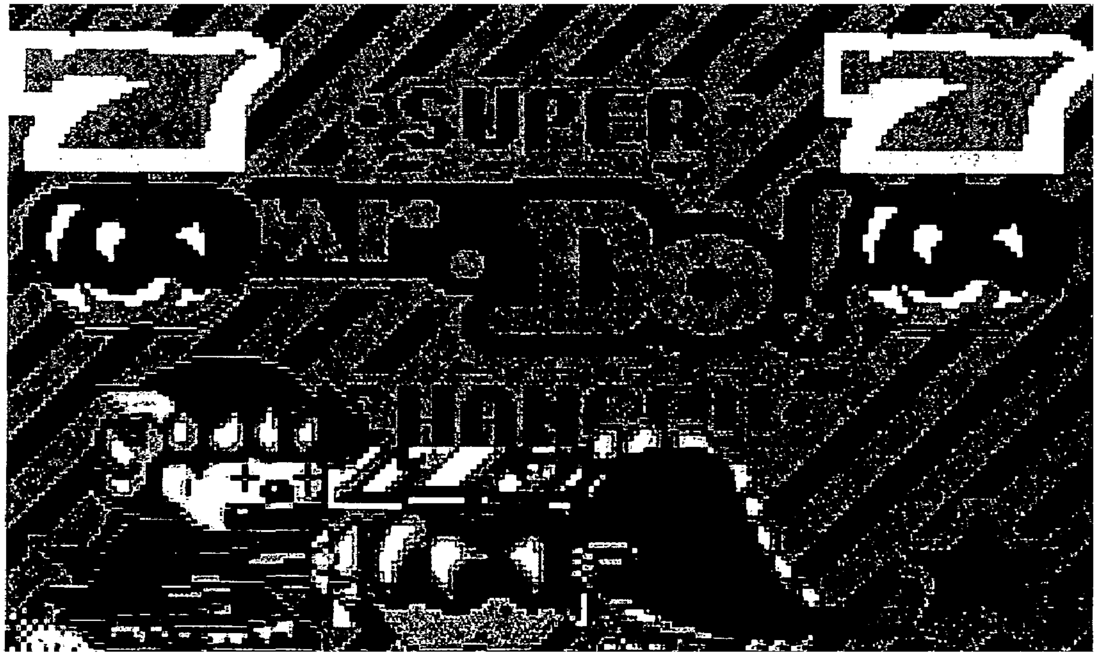
Figure 185:
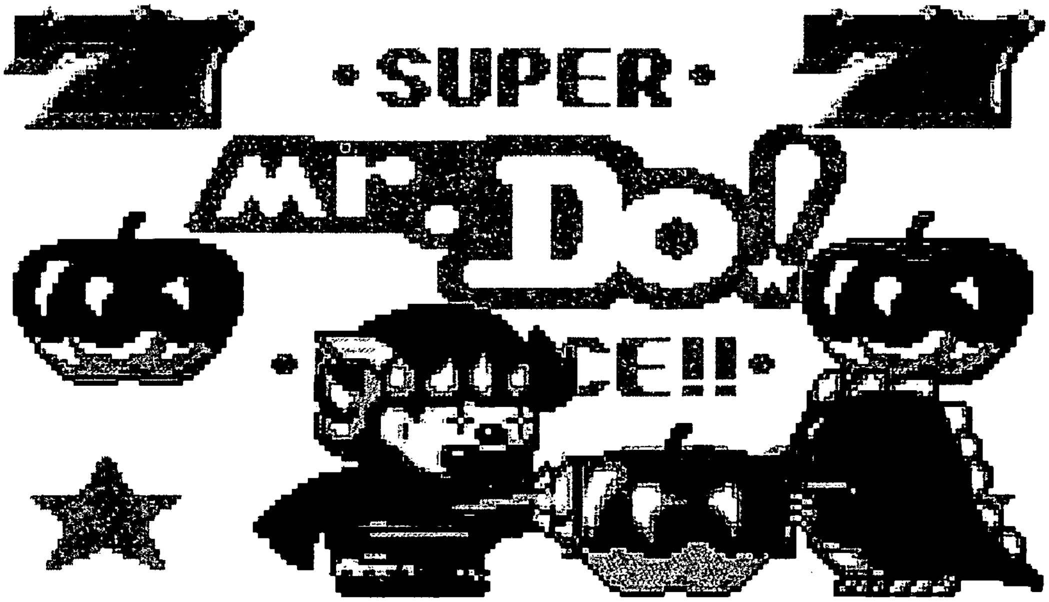
Figure 186:
Figure 187:
Figure 188:
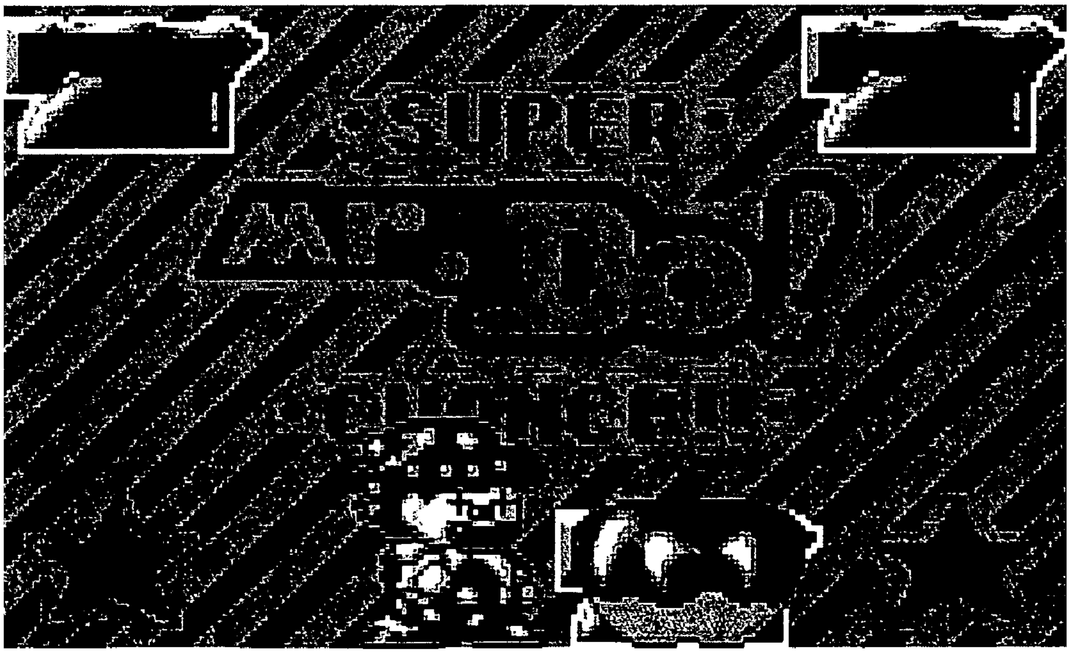
Figure 189:
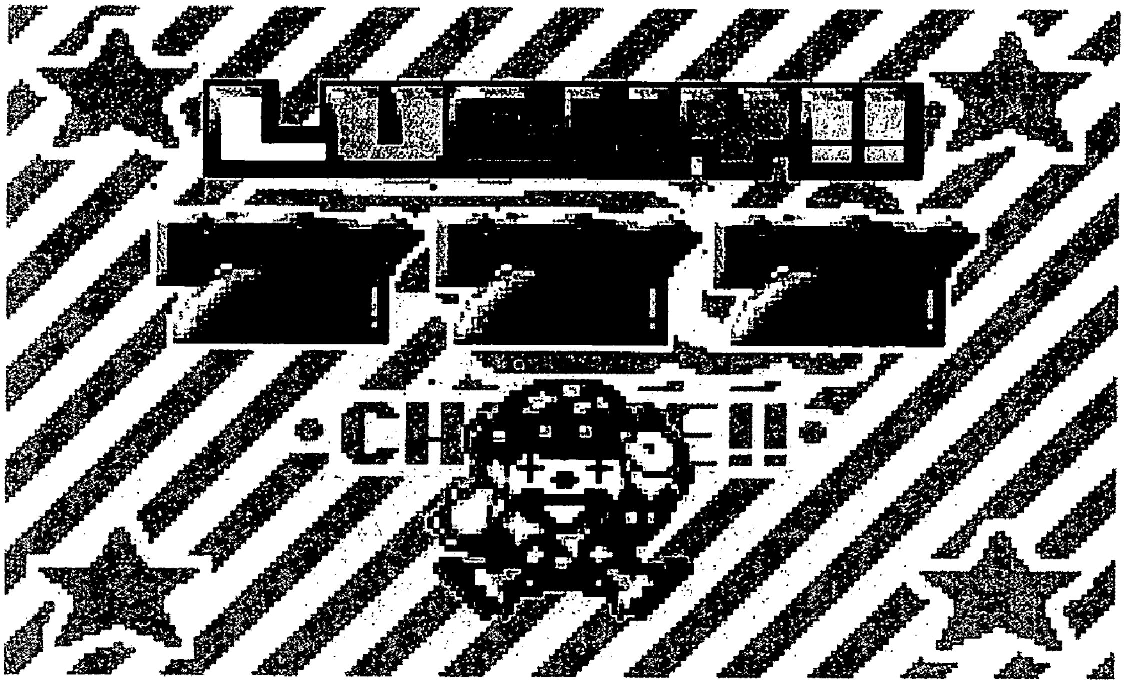
Figure 190:
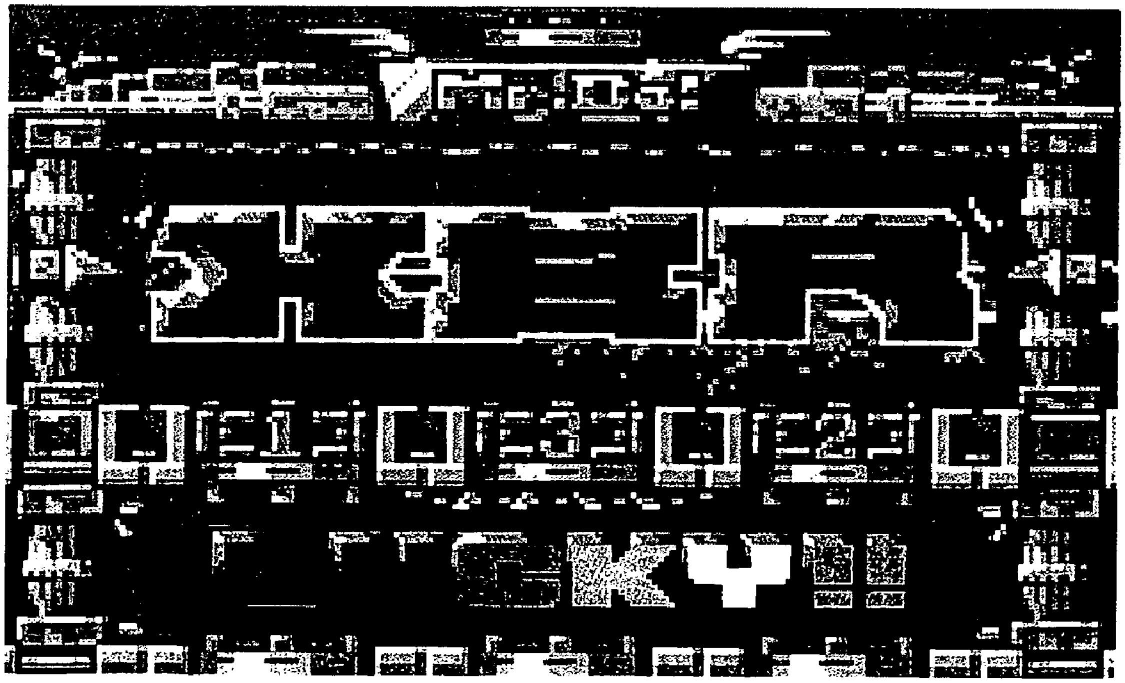
Figure 191:
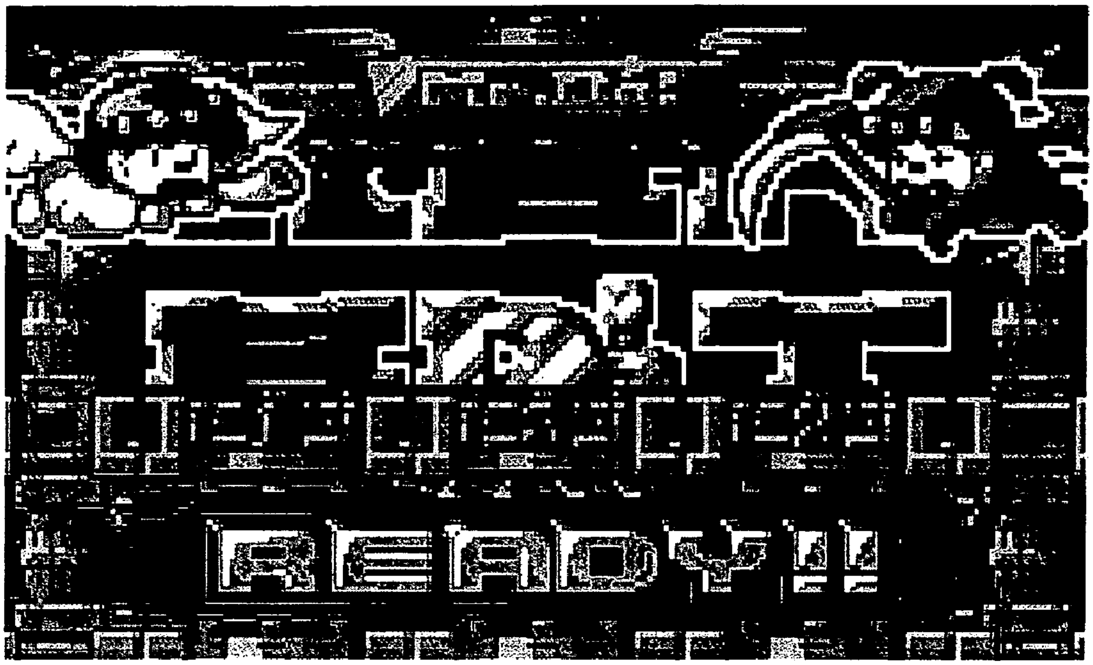
Figure 192:
Figure 193:
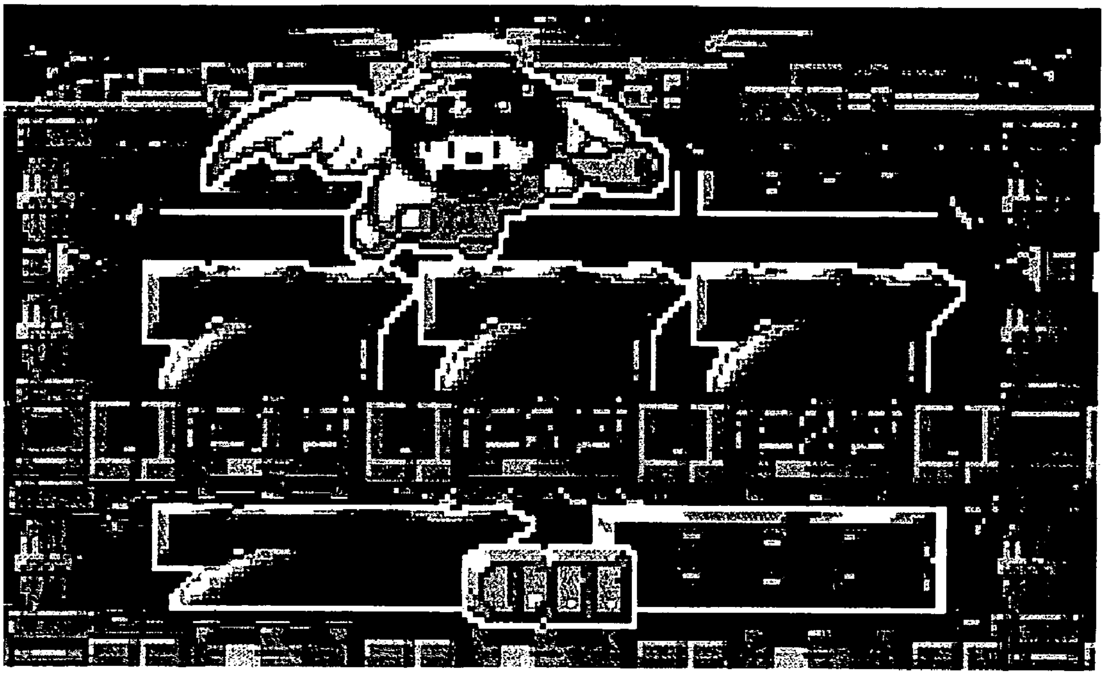
Figure 194:
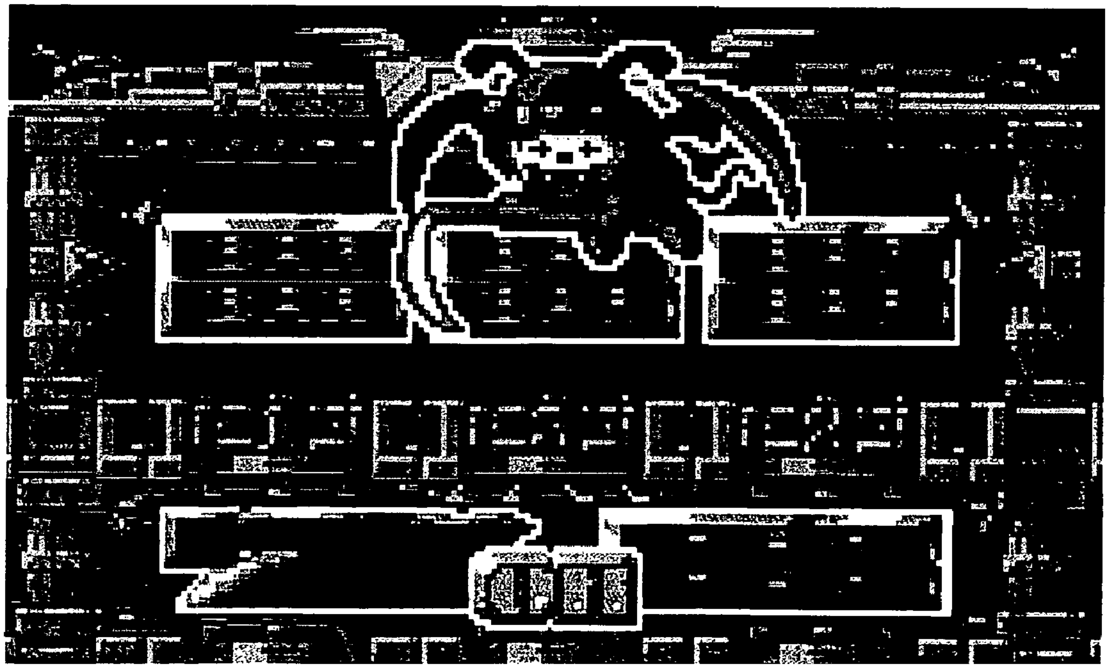
Figure 195:
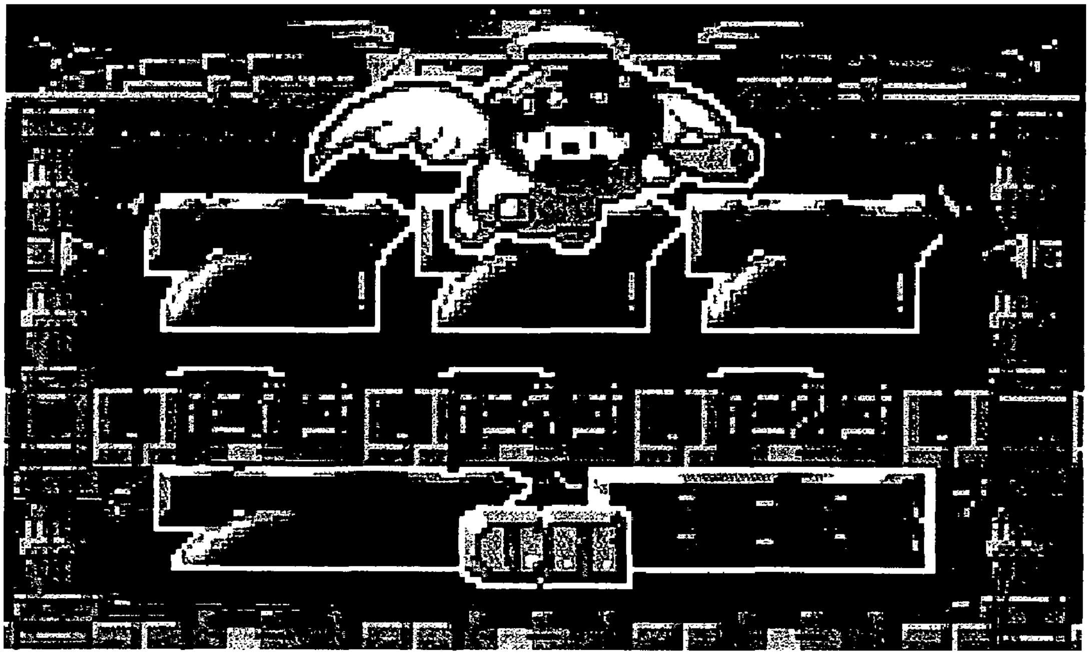
Figure 196:
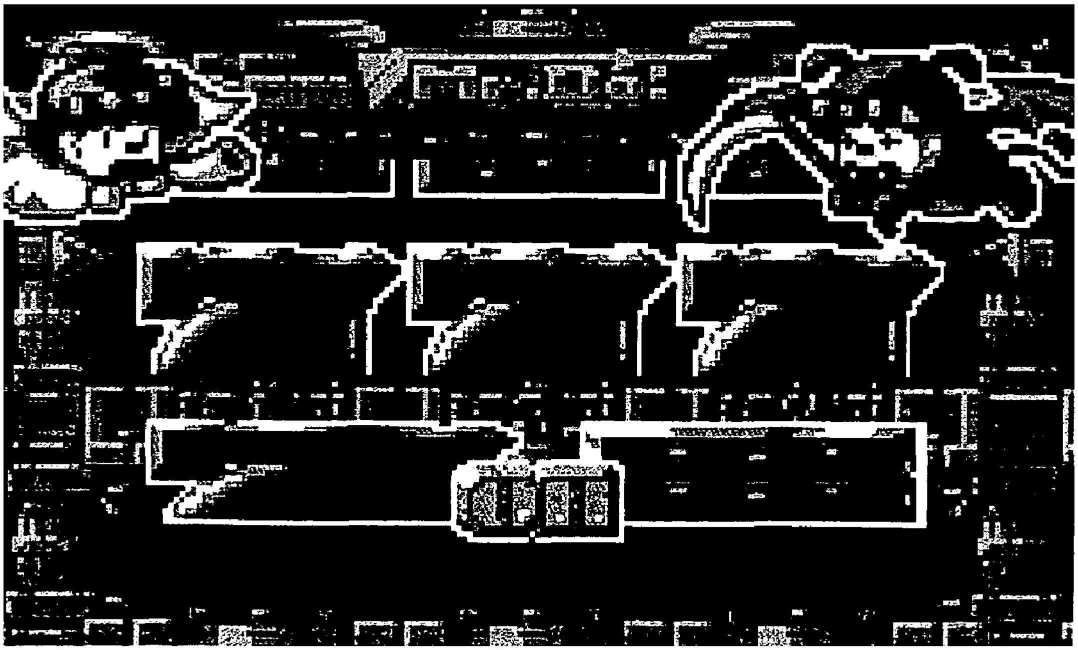
Figure 197:
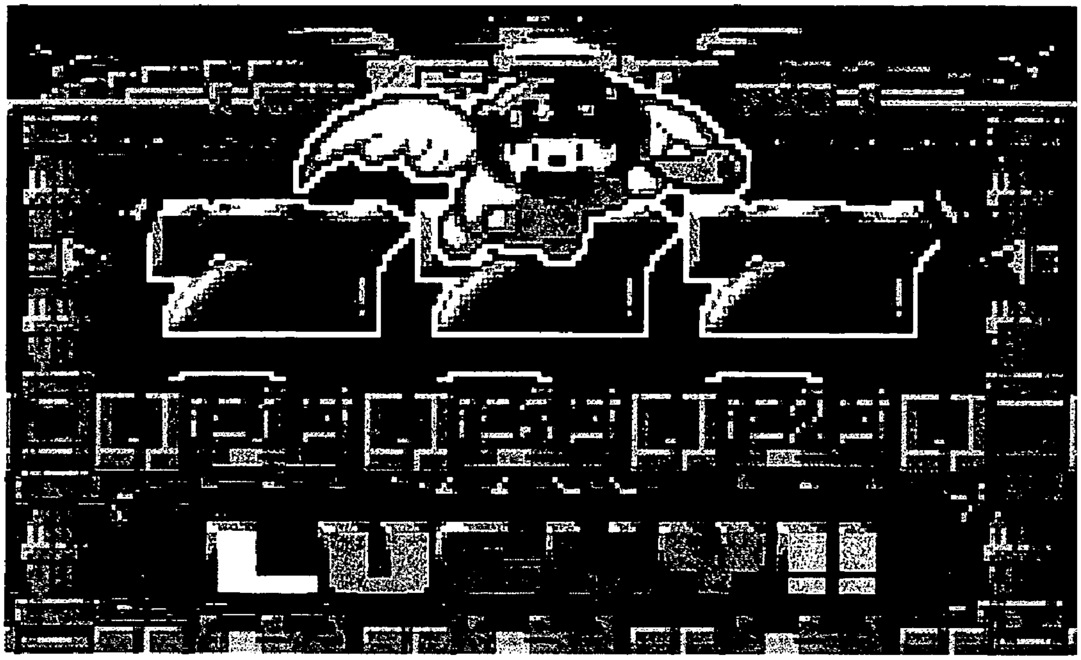
Figure 198:
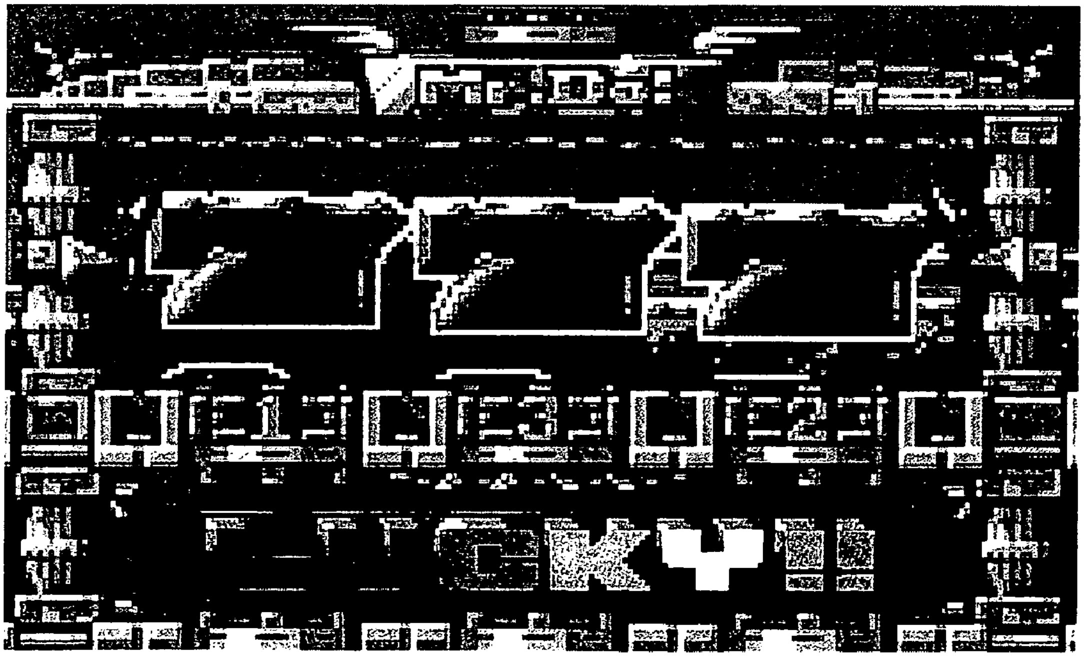
Figure 199:
Figure 200:
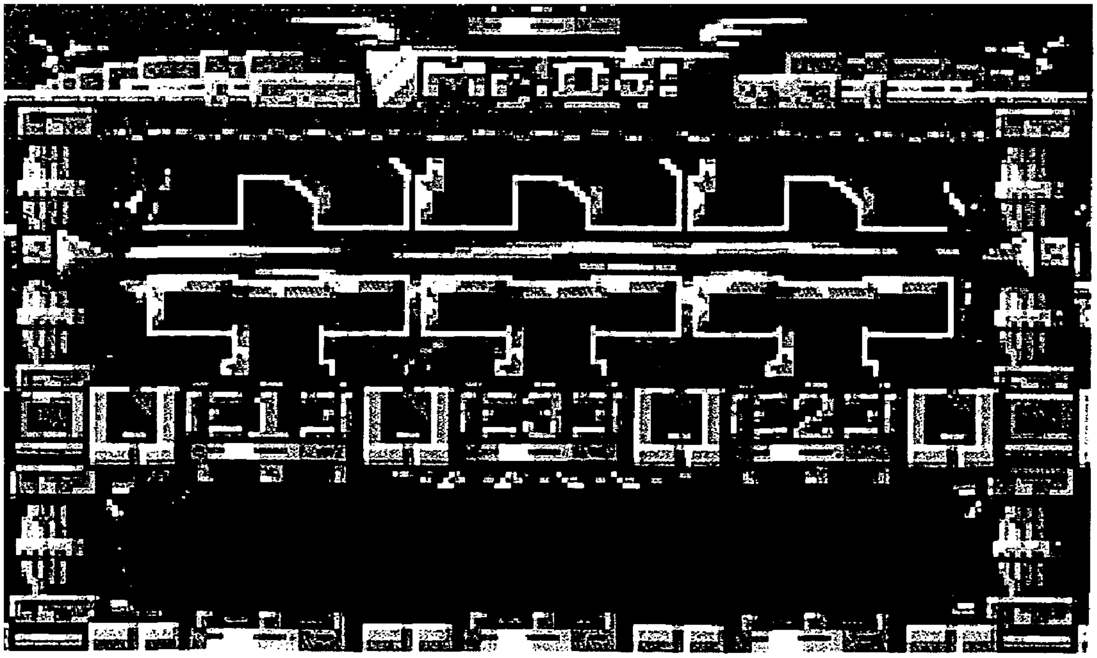
Figure 201:
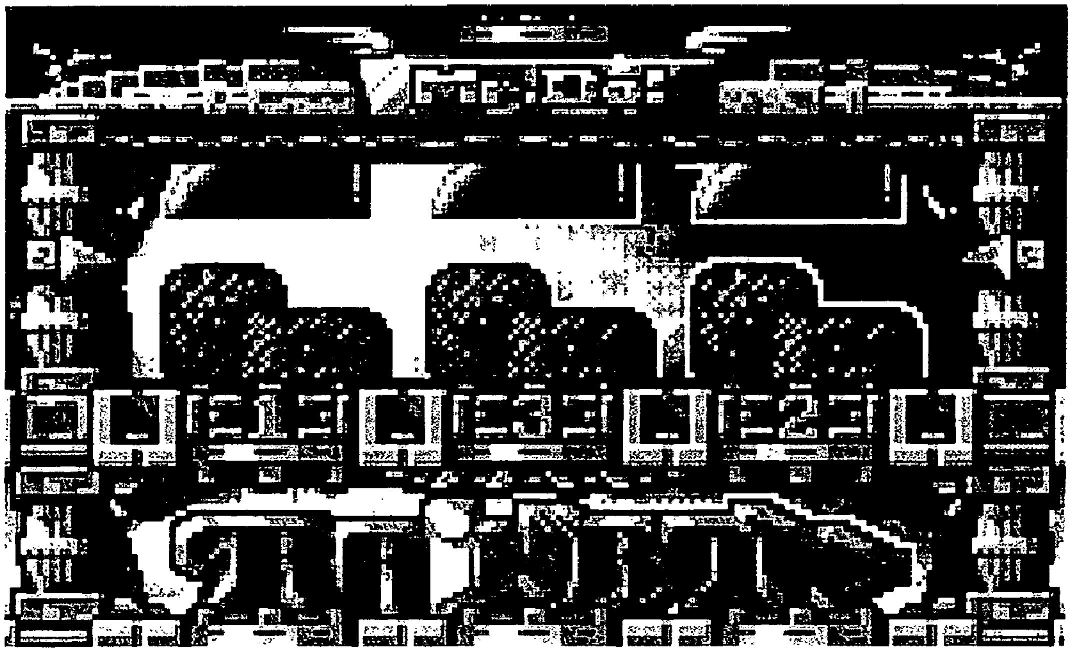
Figure 202:
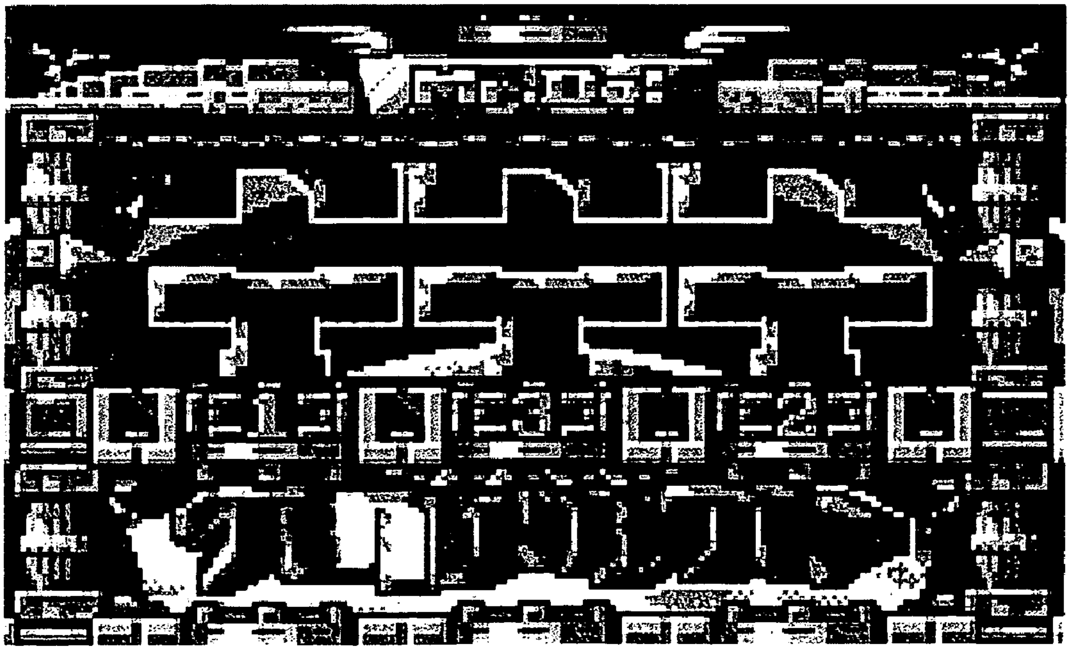
Figure 203:
Figure 204:
Figure 205:
Figure 206:
Figure 207:
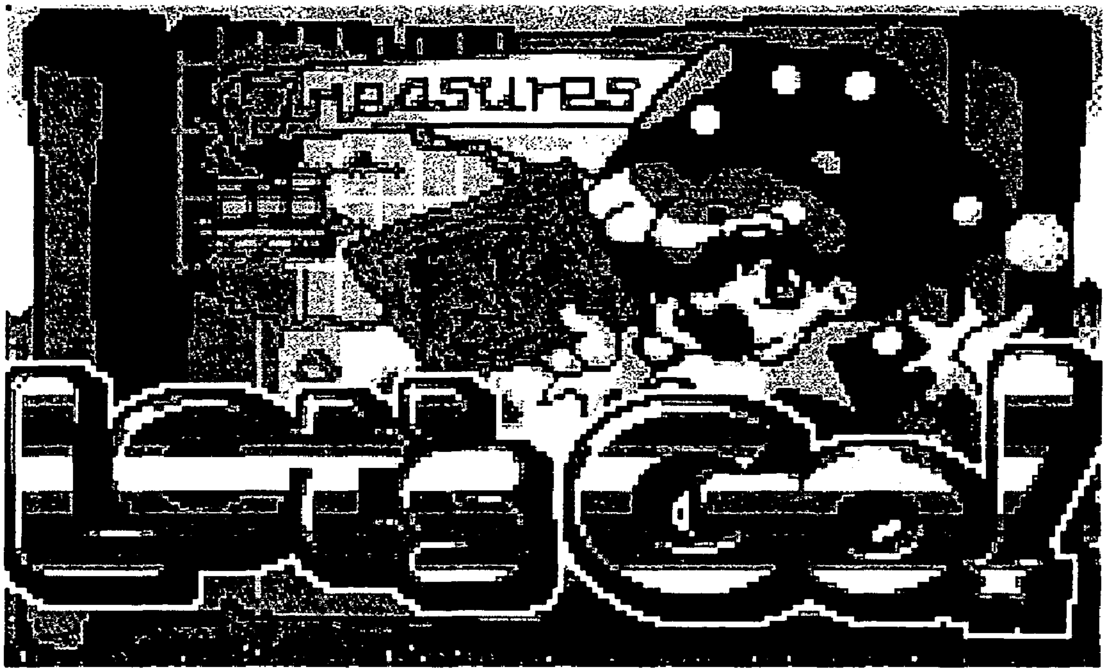
Figure 208:
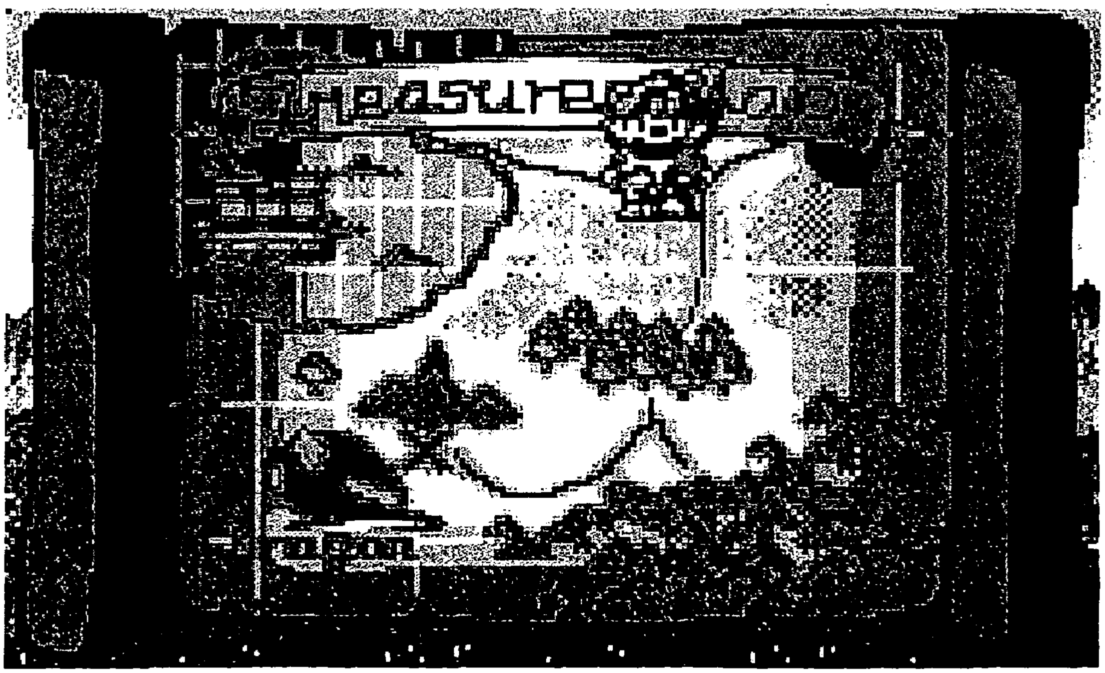
Figure 209:
Figure 210:
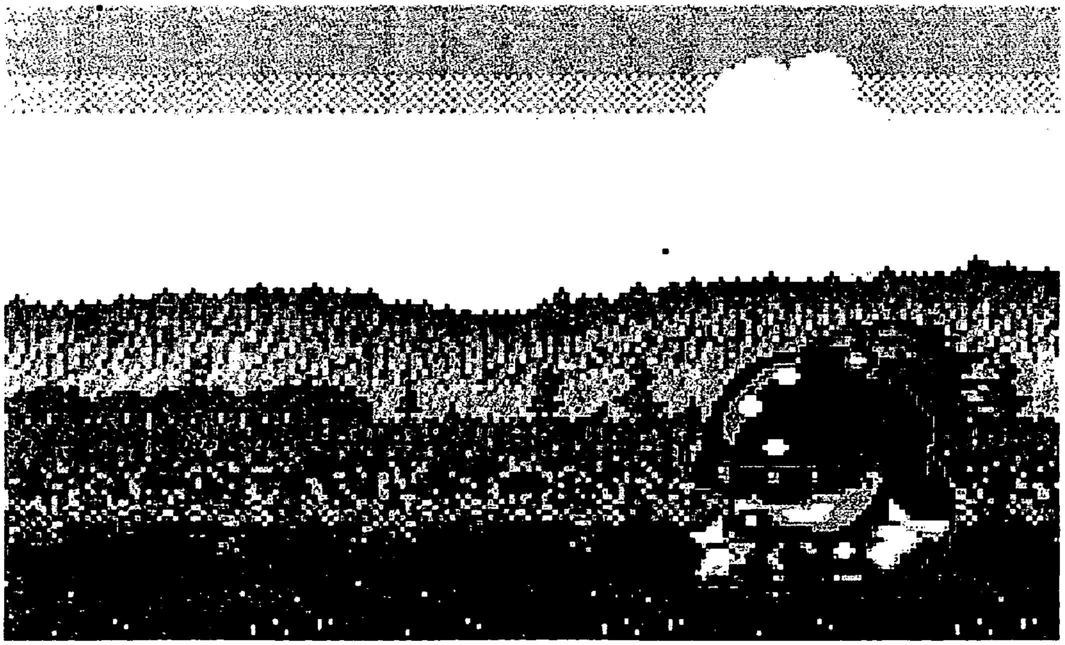
Figure 211:
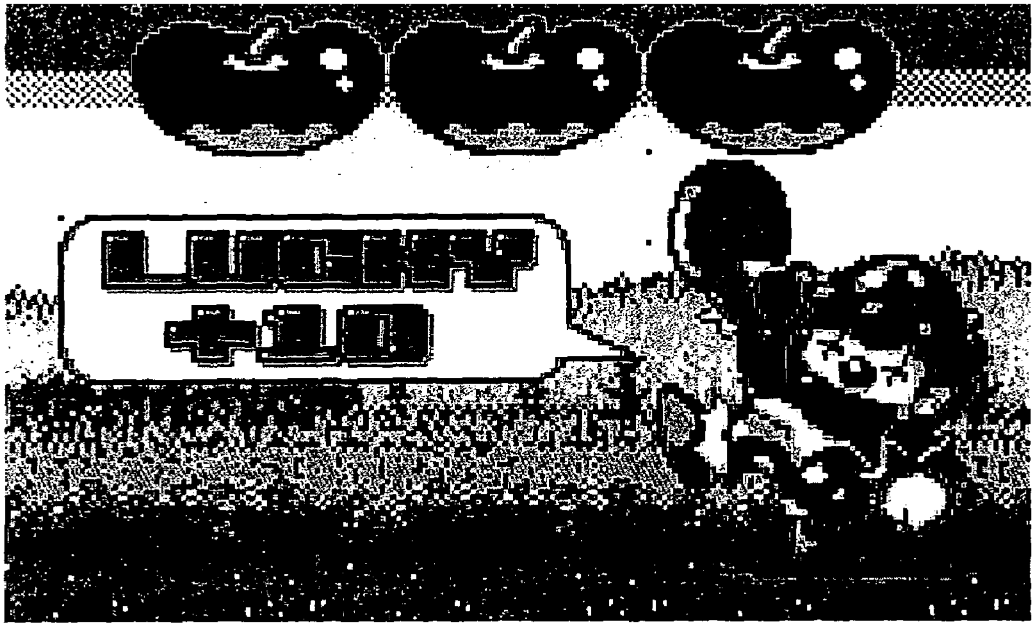
Figure 212:
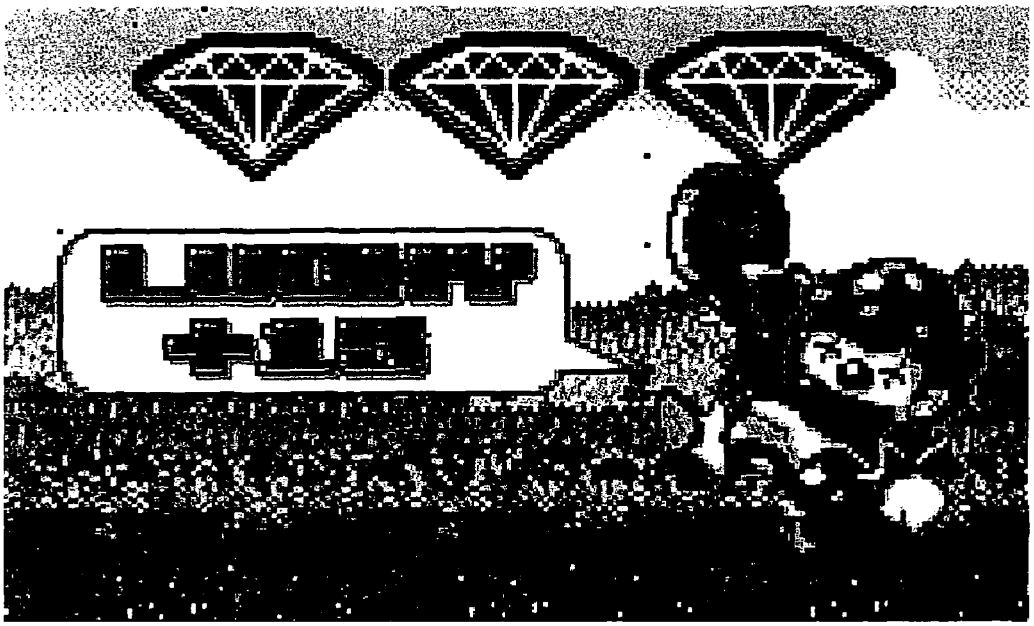
Figure 213:
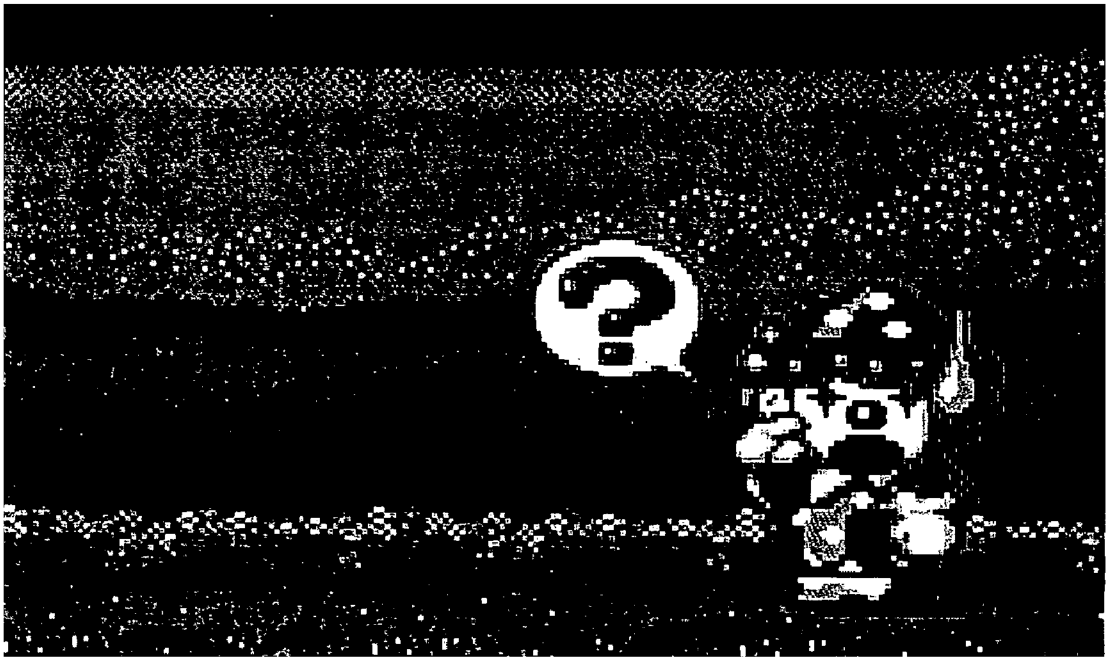
Figure 214:
Figure 215:
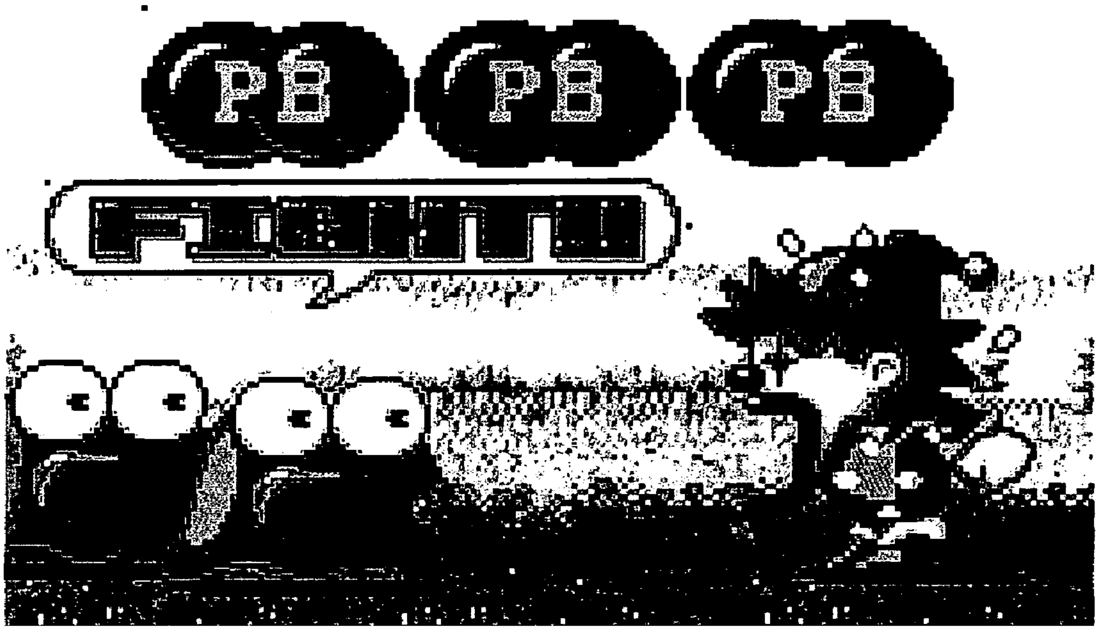
Figure 216:
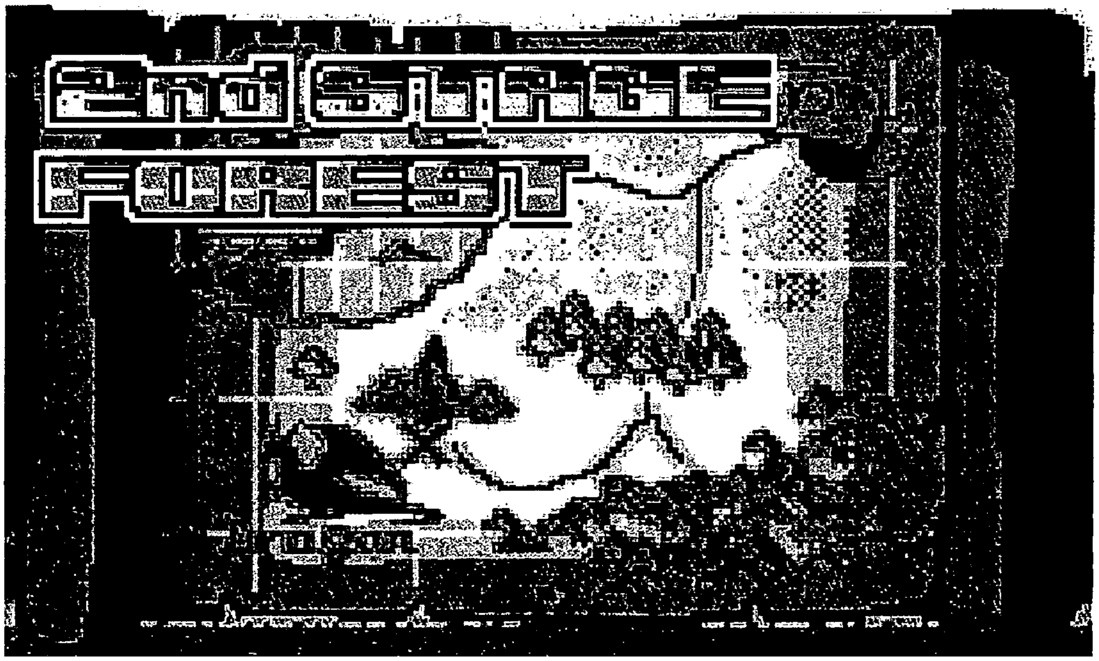
Figure 217:
Figure 218:
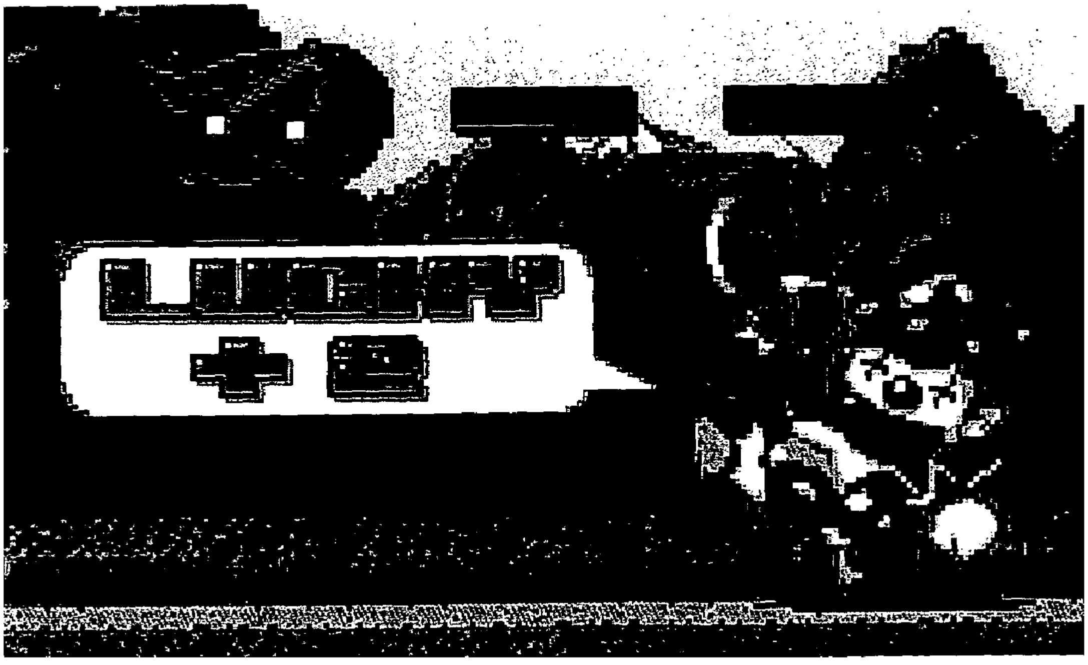
Figure 219:
Figure 220:
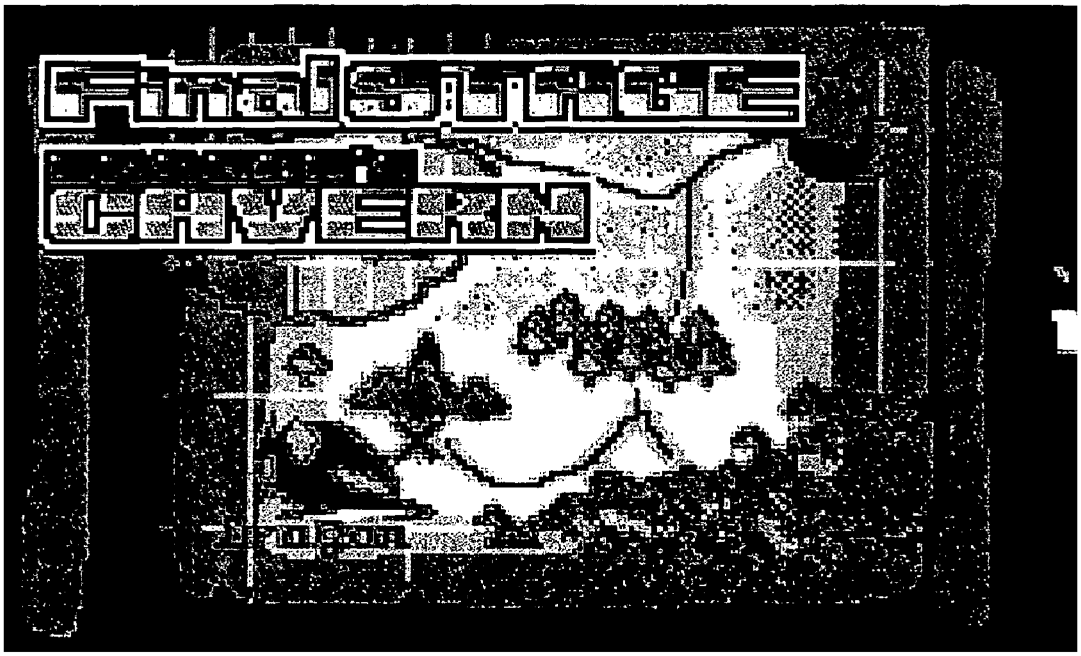
Figure 221:
Figure 222:
Figure 223:
Figure 224:
Figure 225:
Figure 226:
Figure 227:
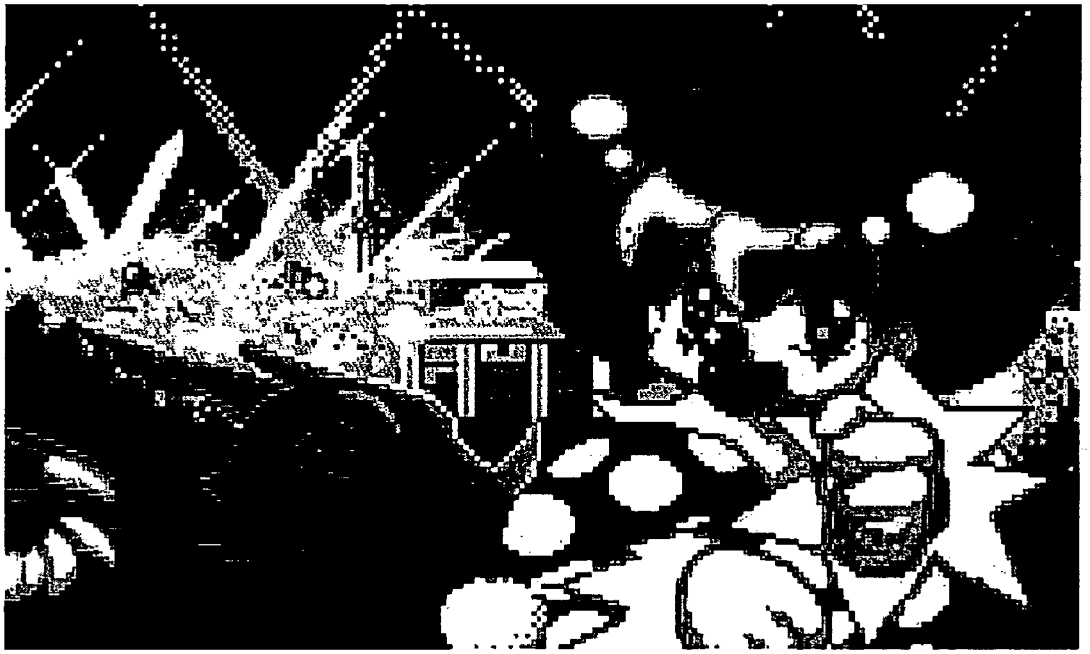
Figure 228:
Figure 229:
Figure 230:
Figure 231:
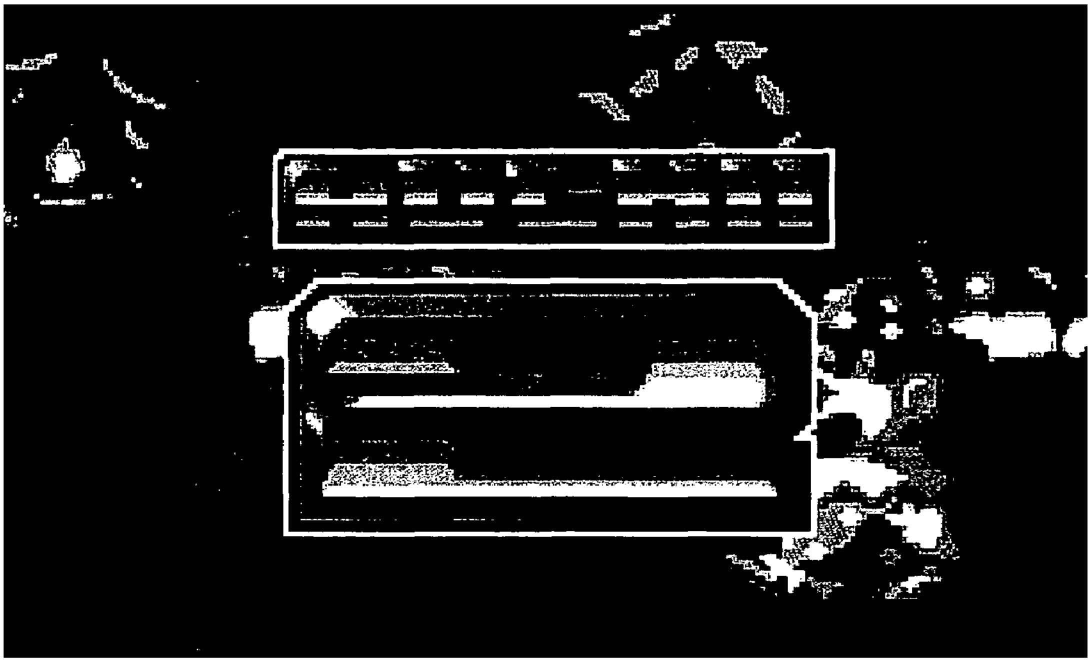
Figure 232:
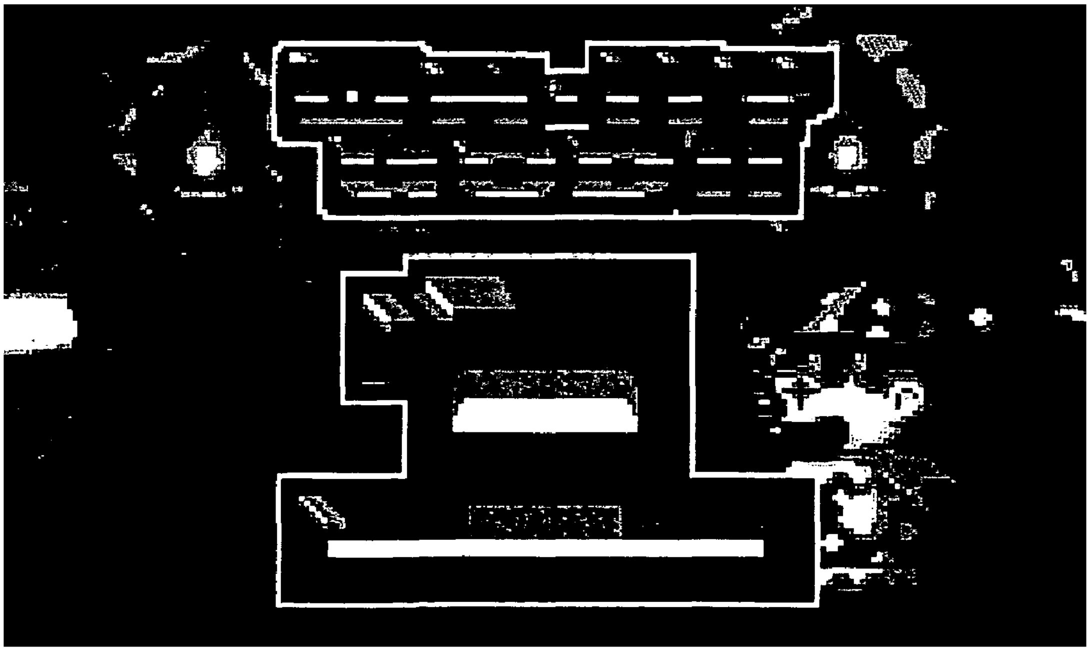
Figure 233:
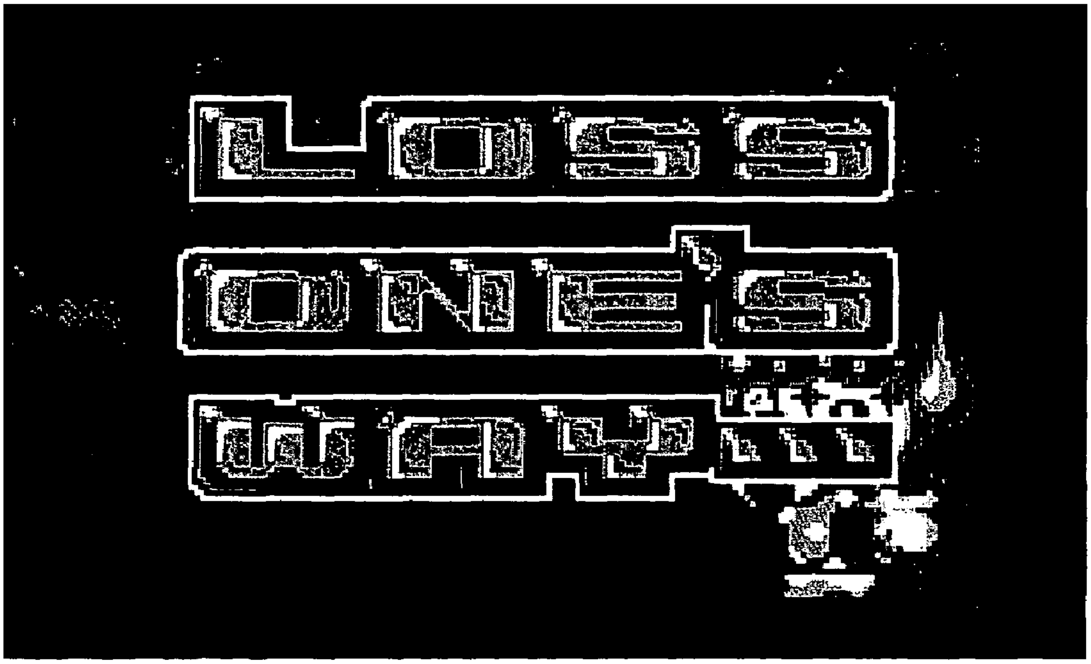
Figure 234:
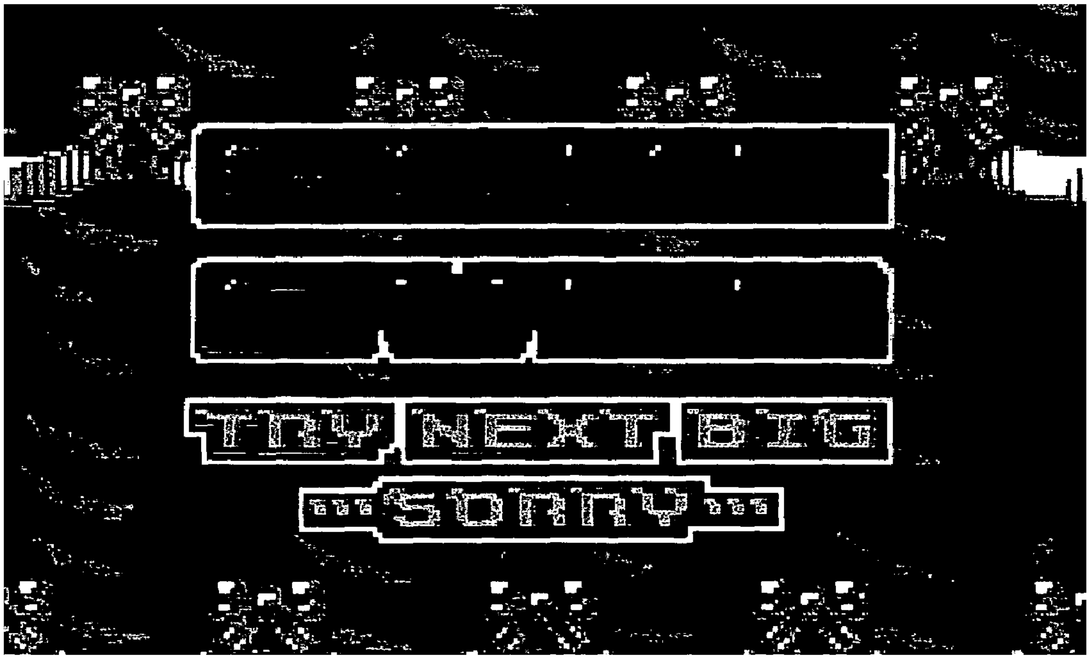
Figure 235:
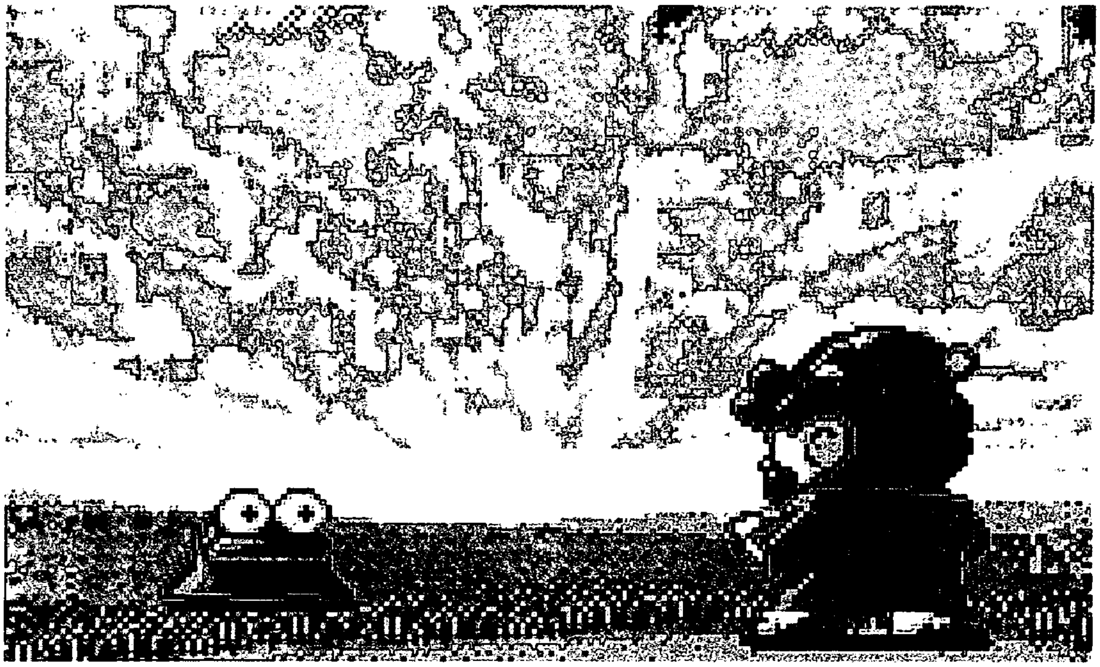
Figure 236:
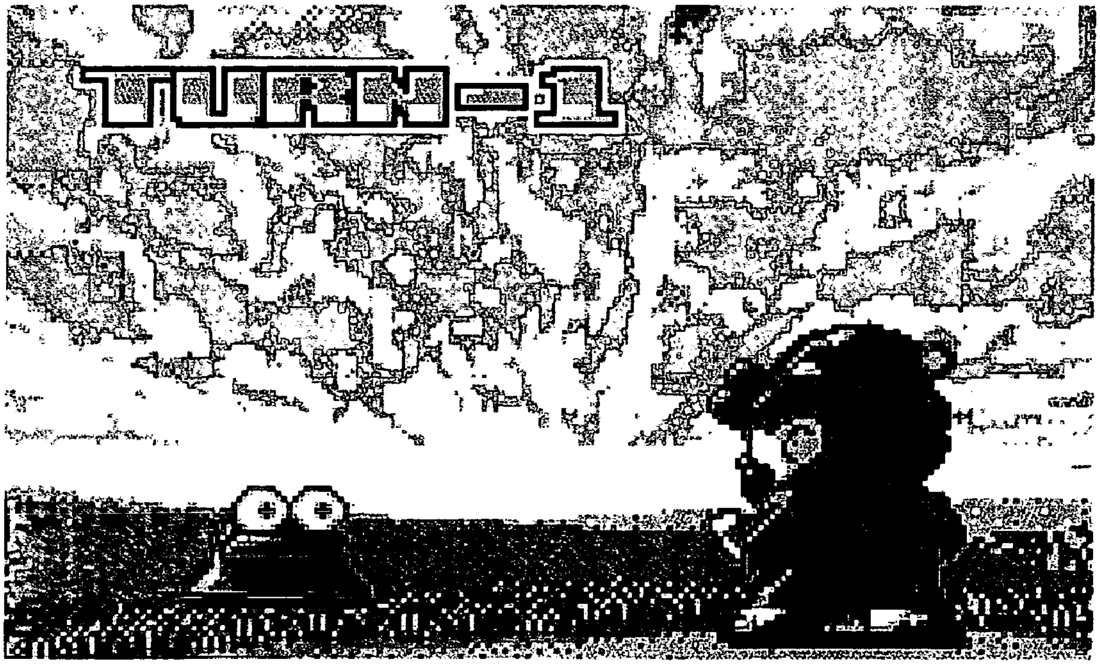
Figure 237:
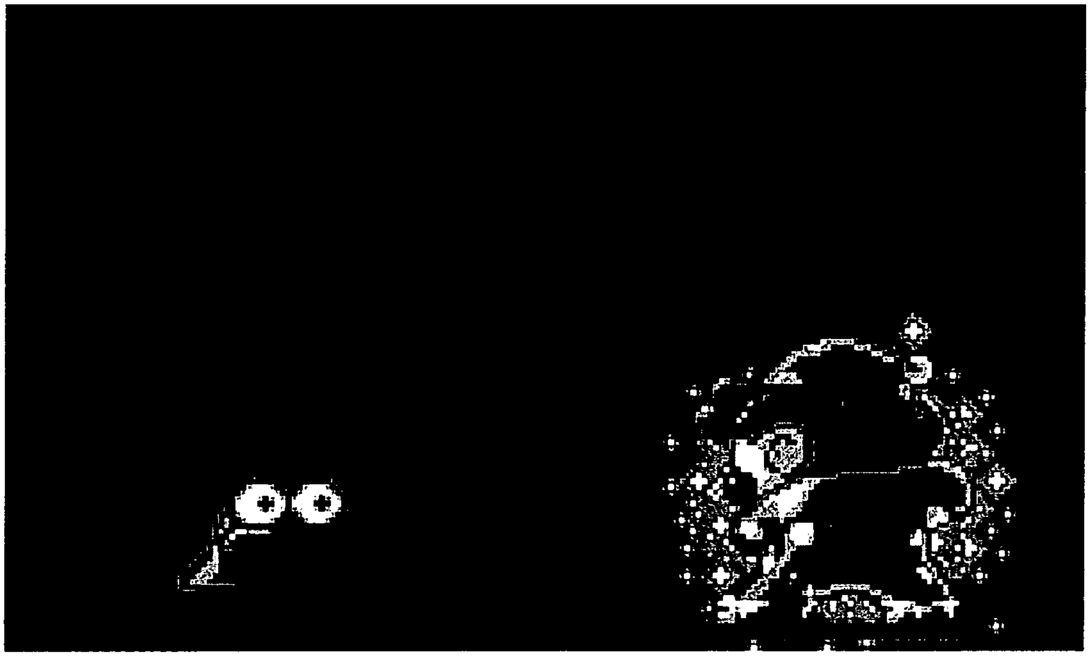
Figure 238:
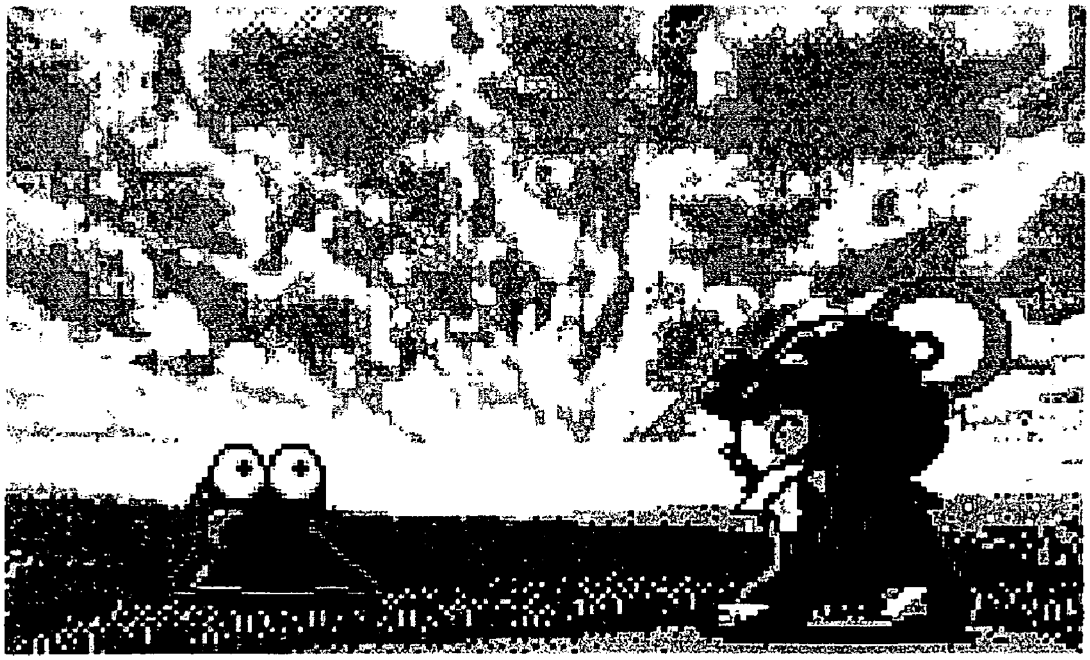
Figure 239:
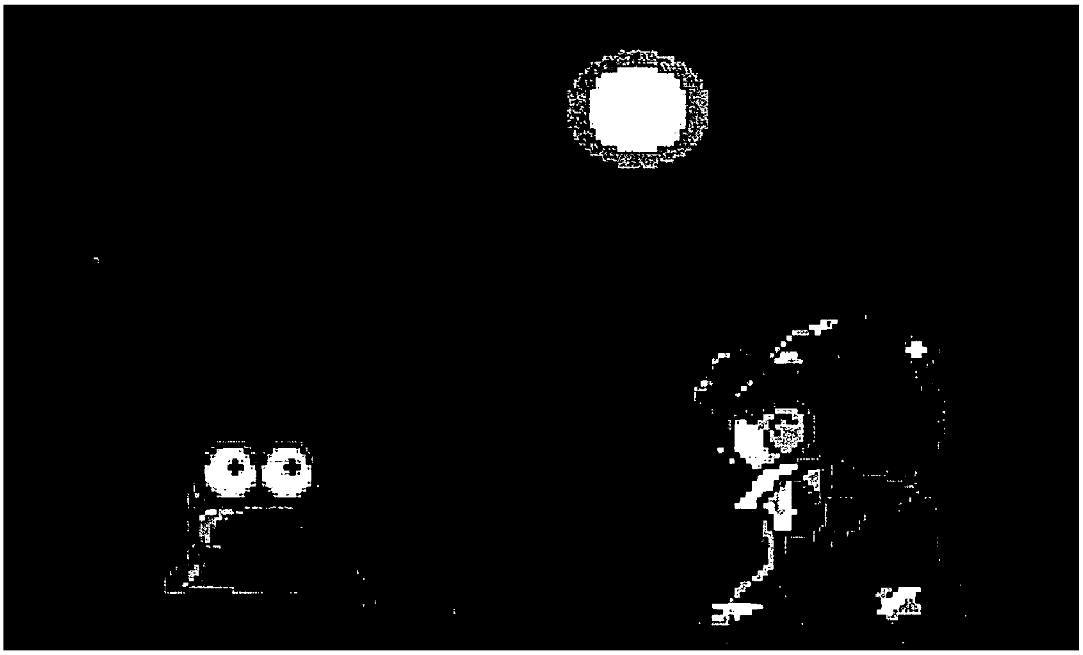
Figure 240:
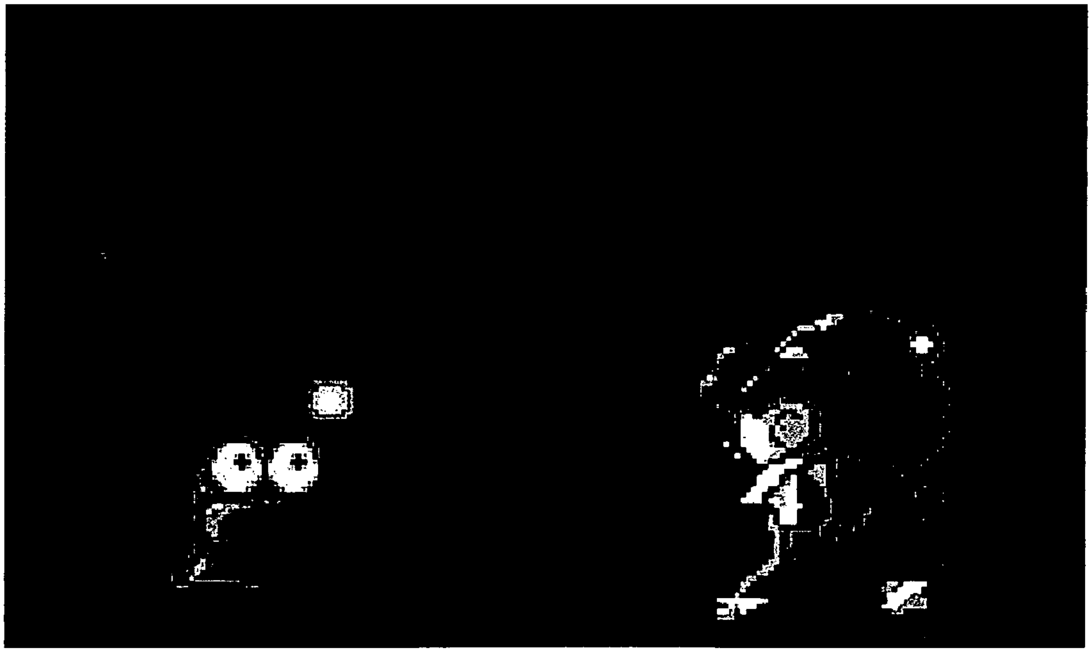
Figure 241:
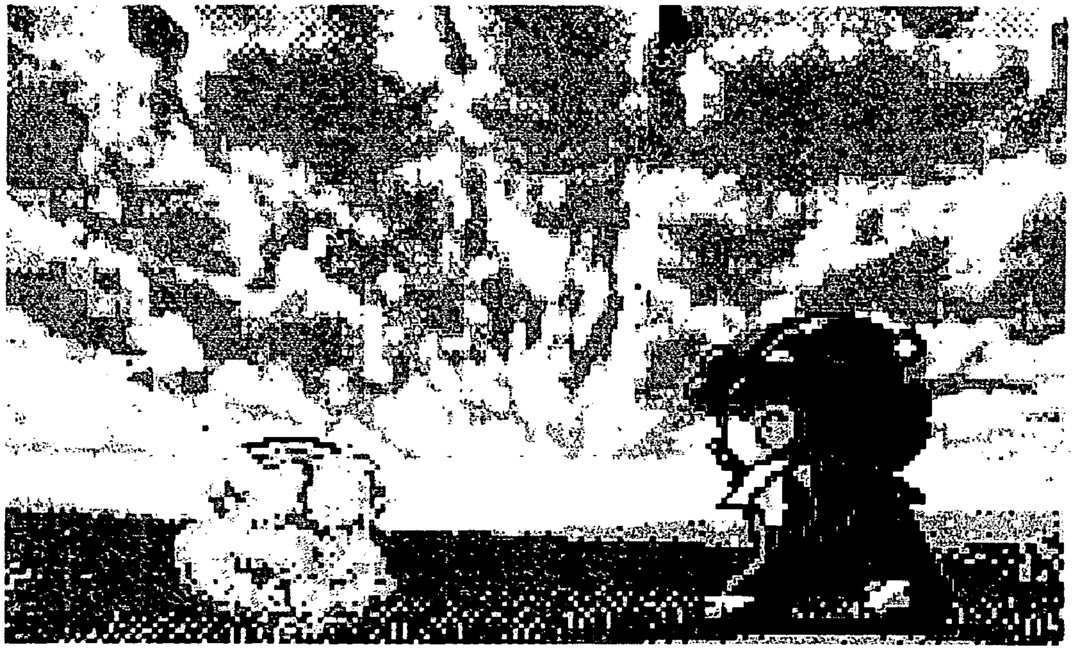
Figure 242:
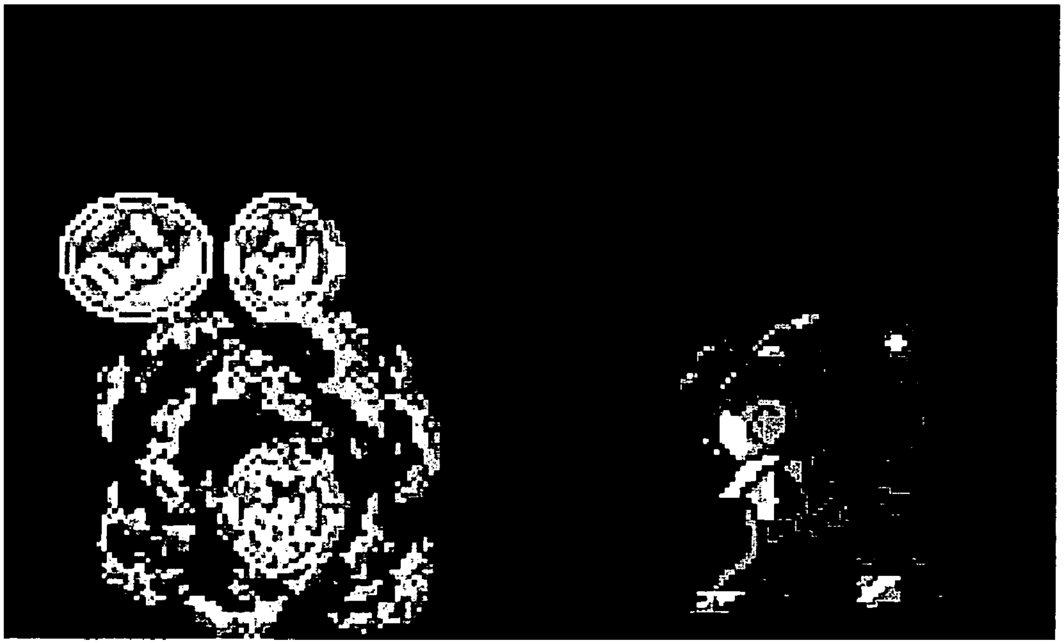
Figure 243:
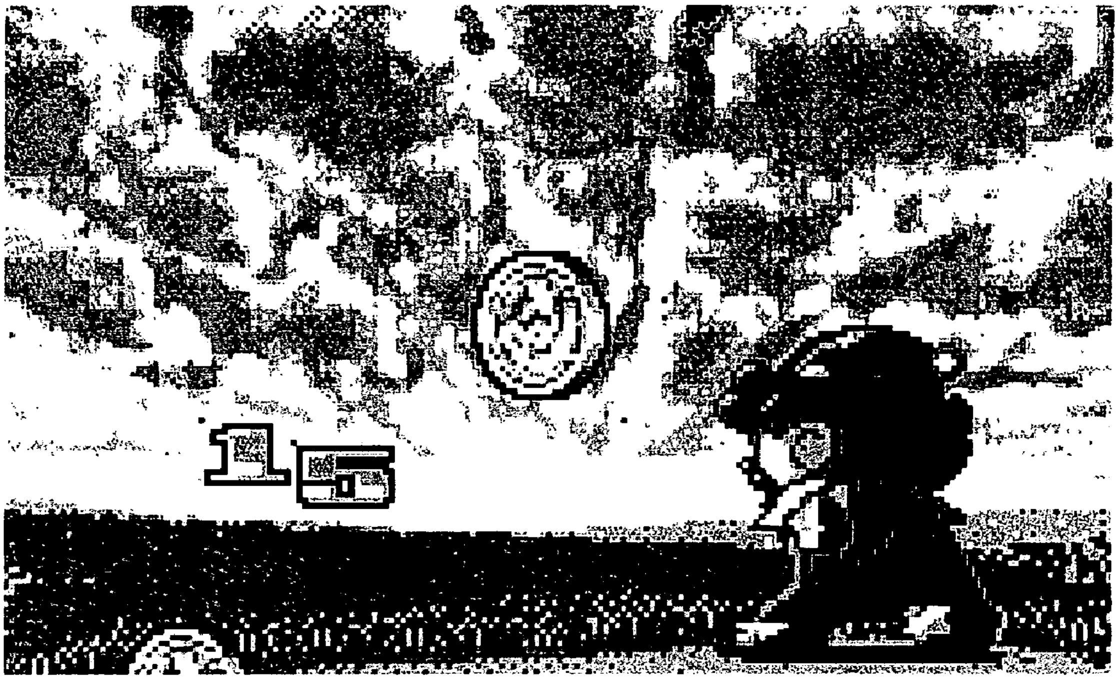
Figure 244:
Figure 245:
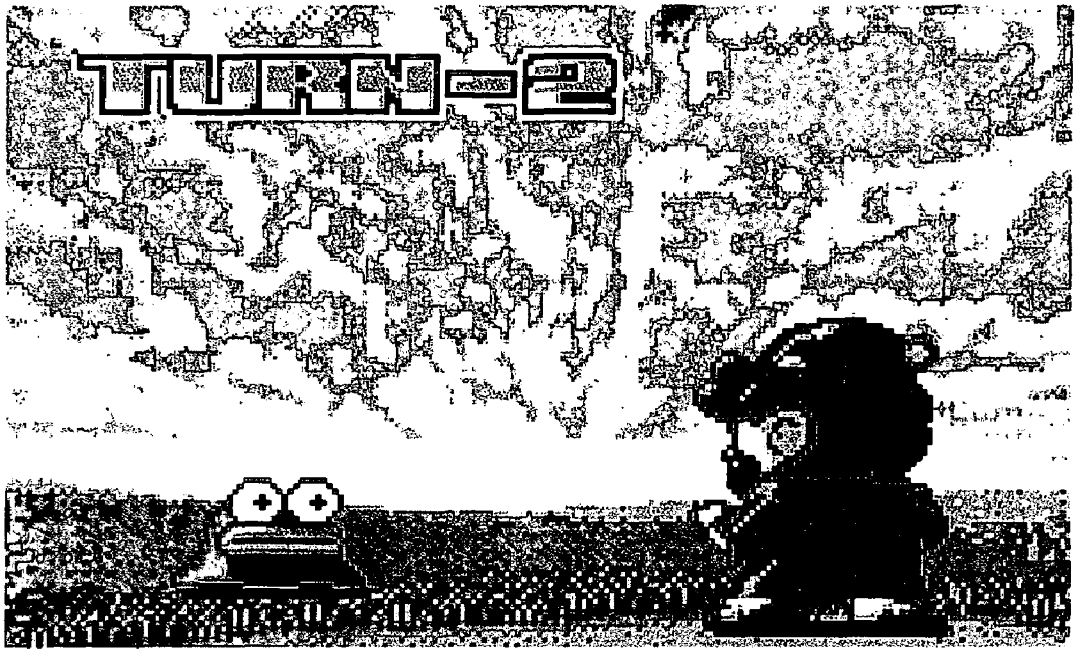
Figure 246:
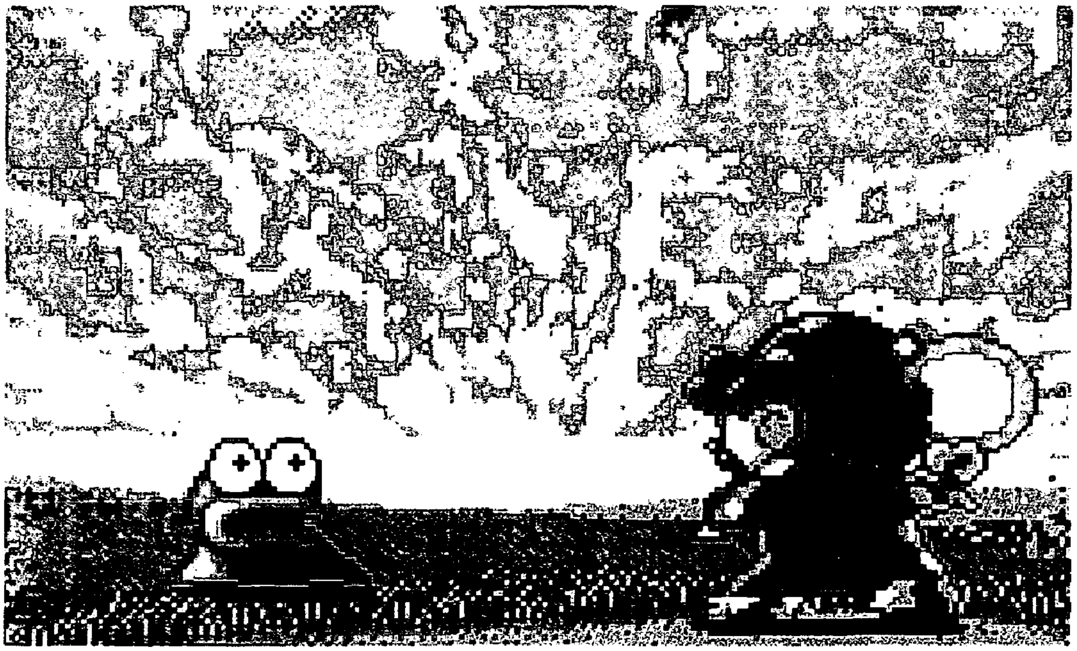
Figure 247:
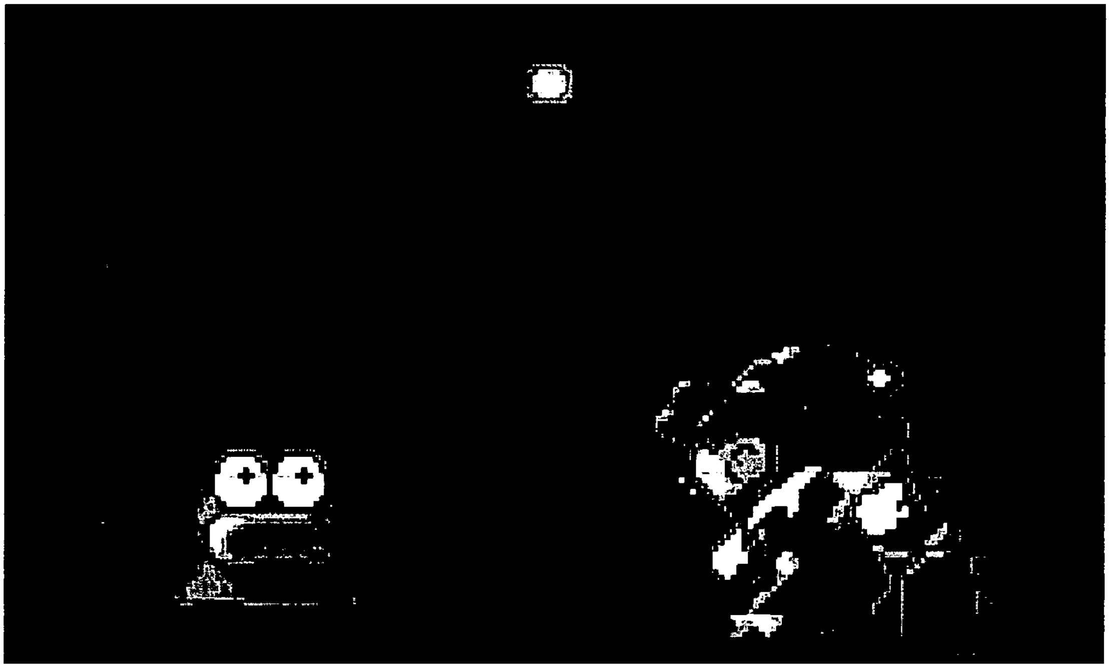
Figure 248:
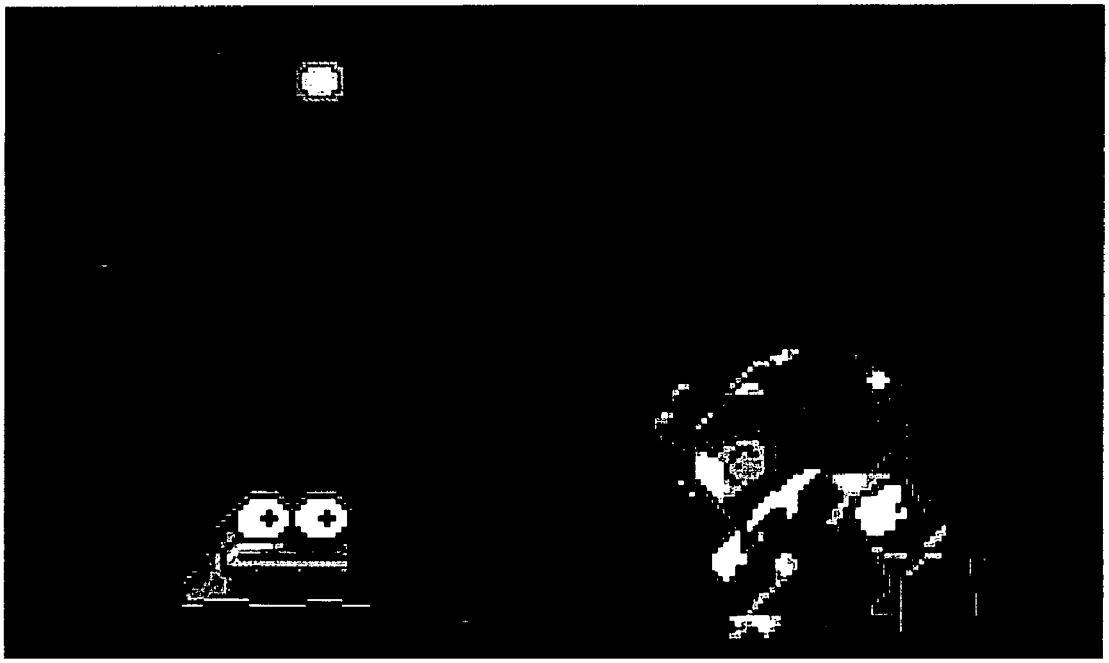
Figure 249:
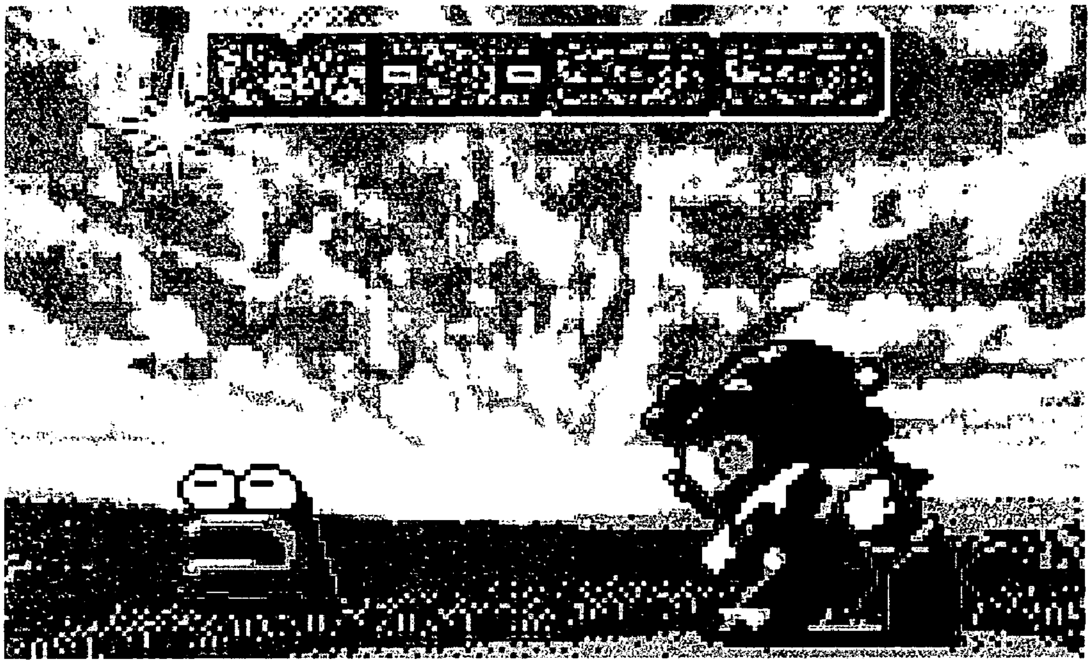
Figure 250:
Figure 251:
Figure 252:
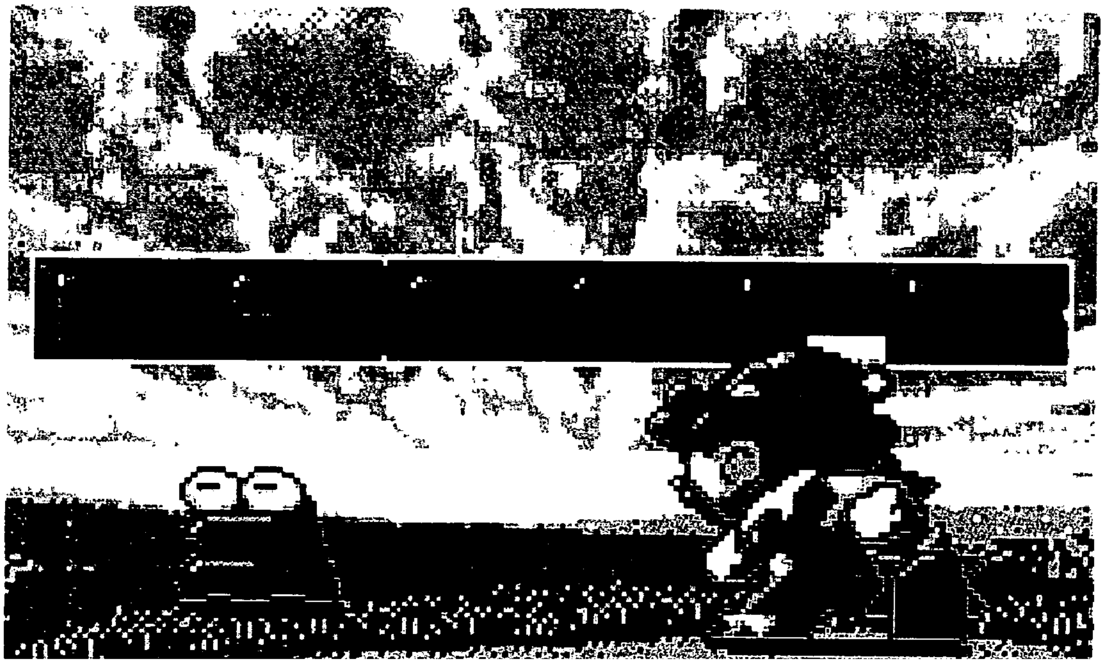
Figure 253:
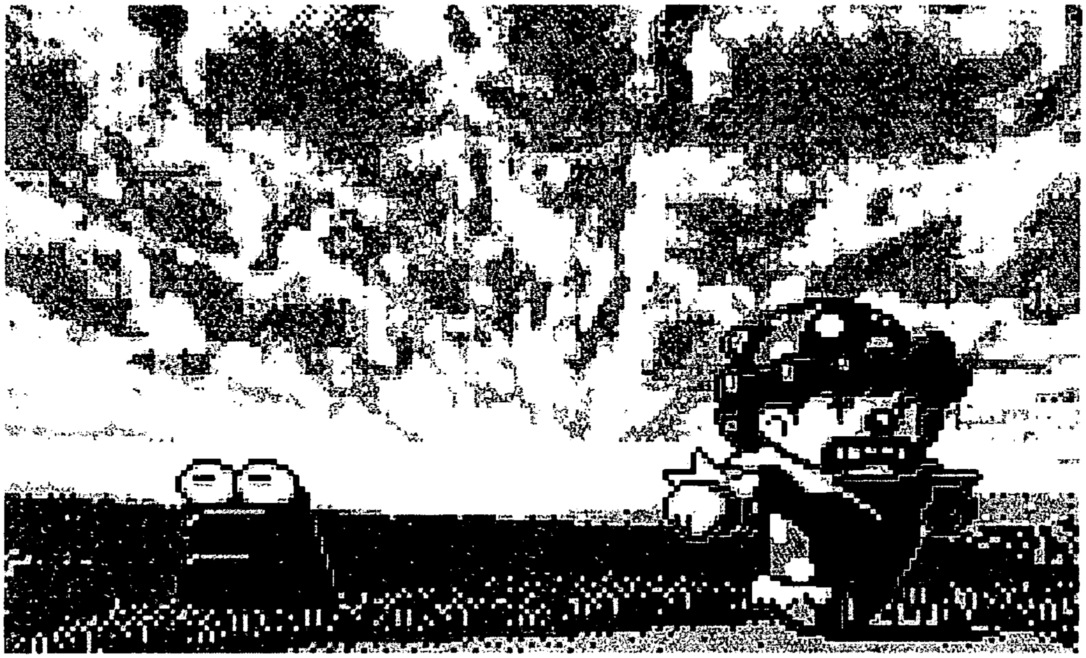
Figure 254:
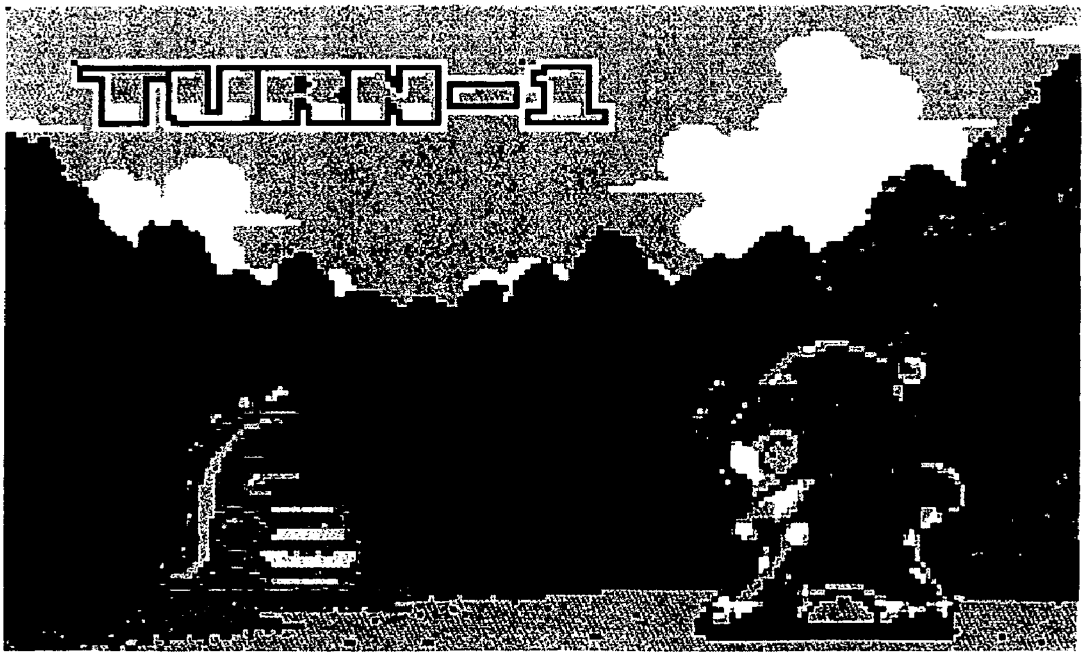
Figure 255:
Figure 256:
Figure 257:
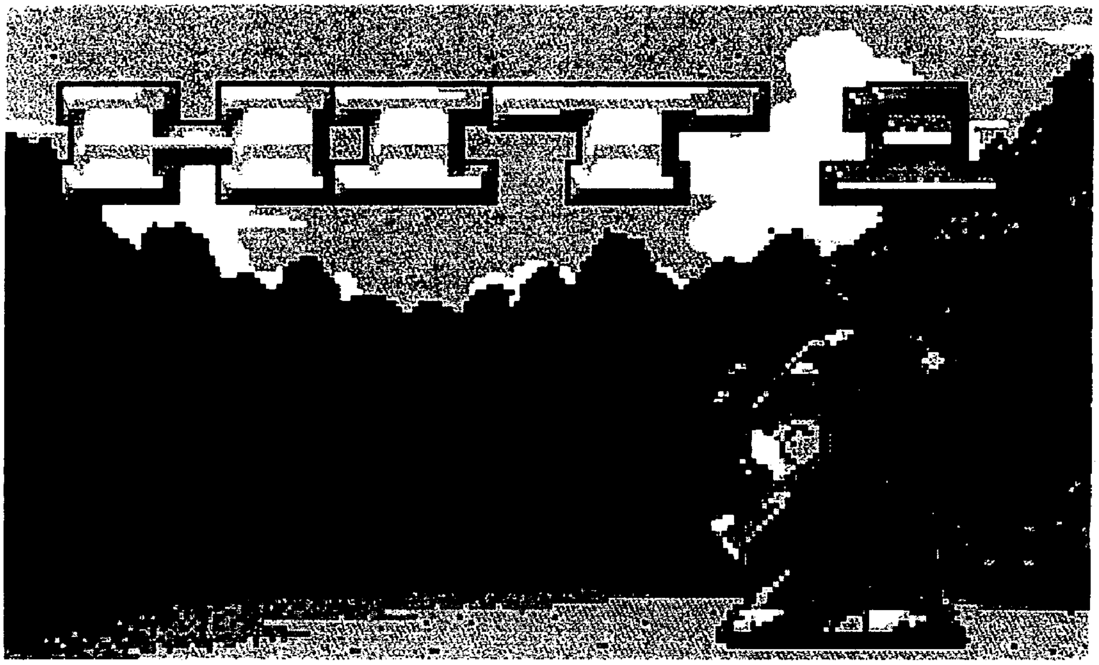
Figure 258:
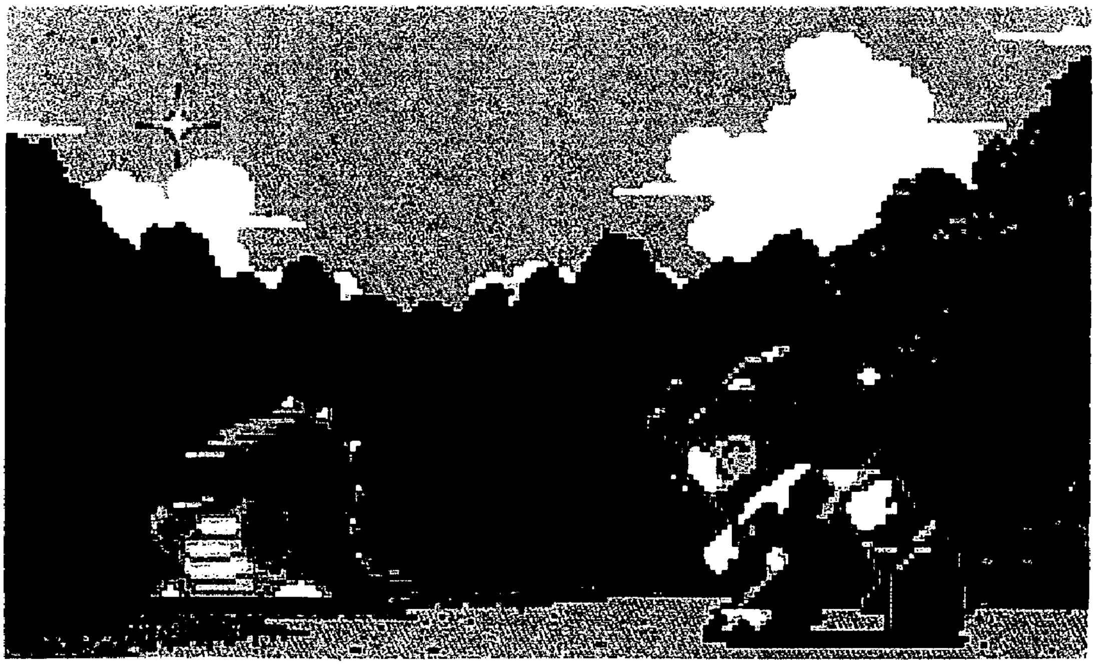
Figure 259:
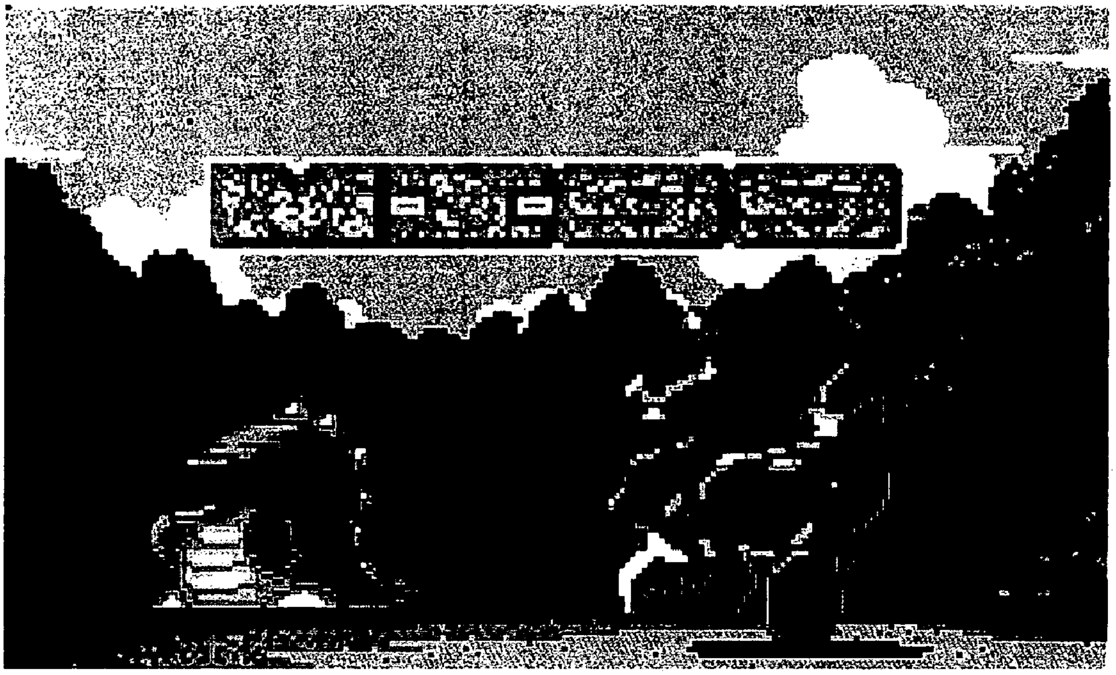
Figure 260:
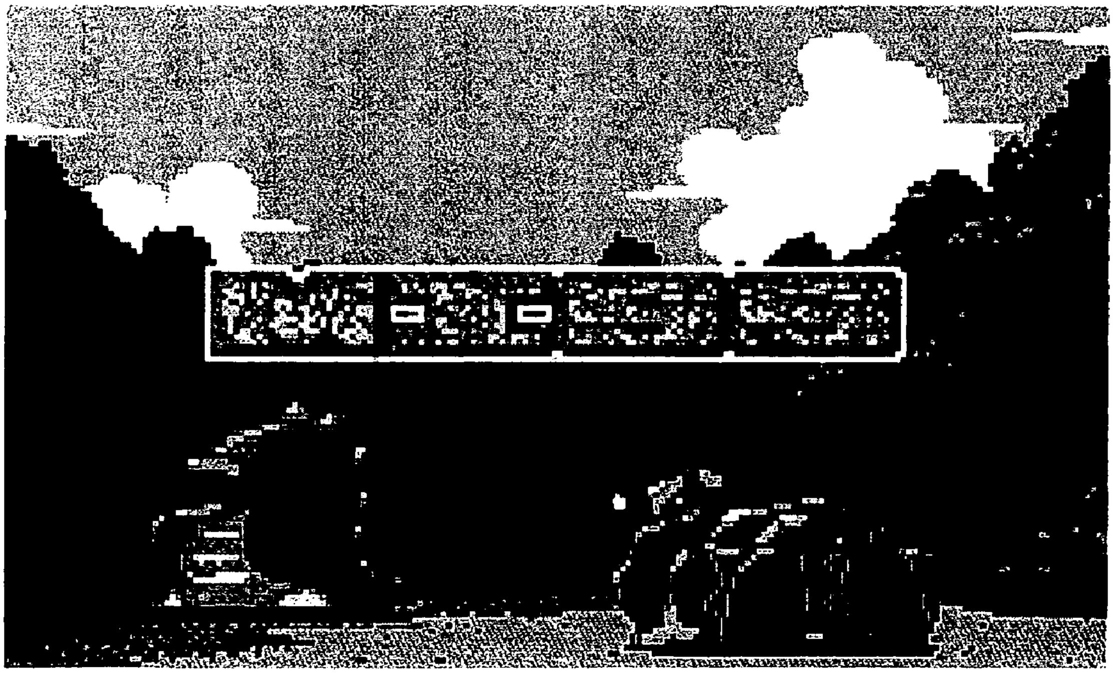
Figure 261:
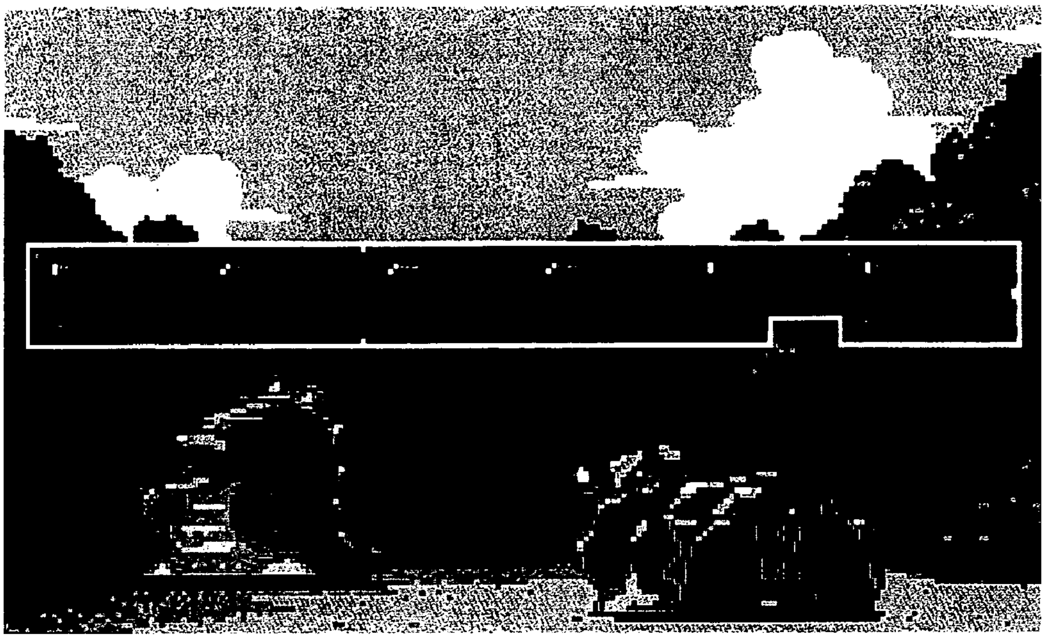
Figure 262:
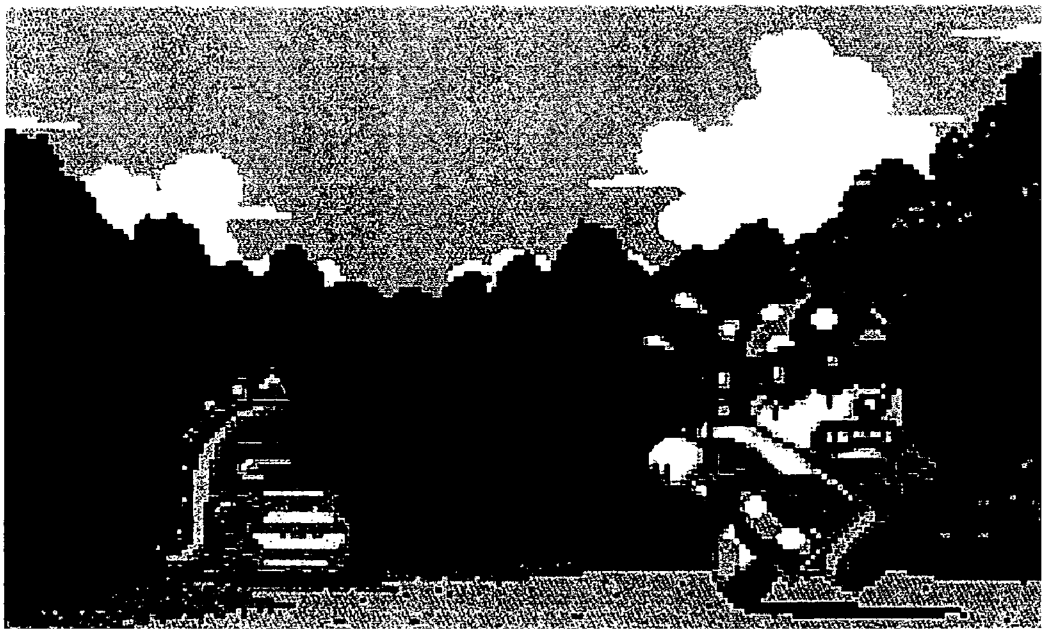
Figure 263:
Figure 264:
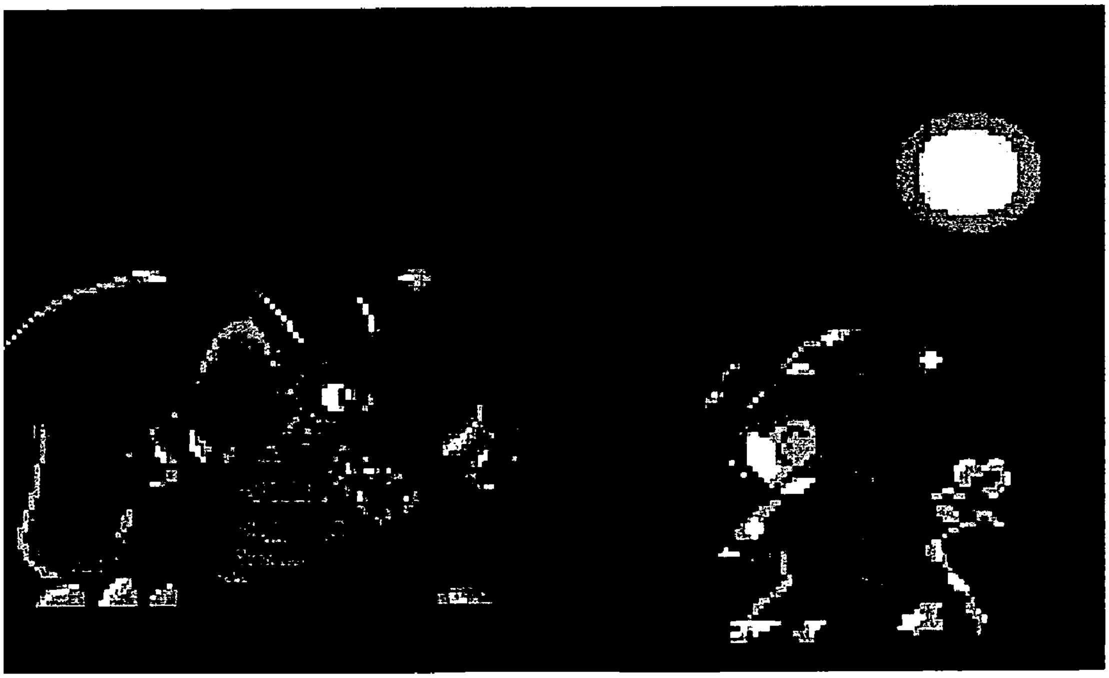
Figure 265:
Figure 266:
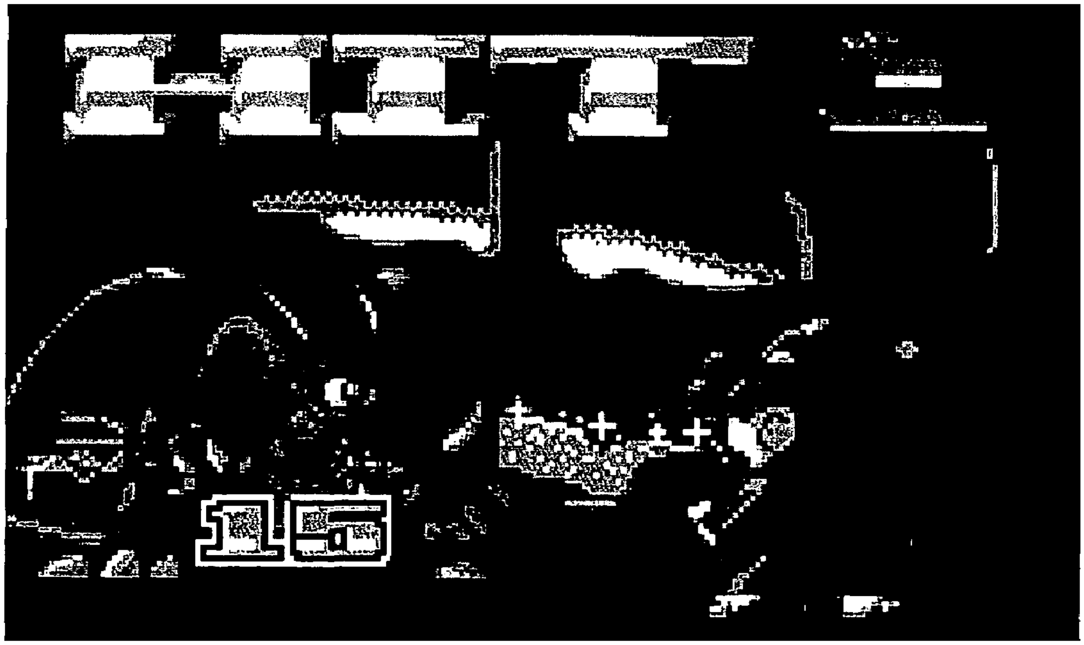
Figure 267:
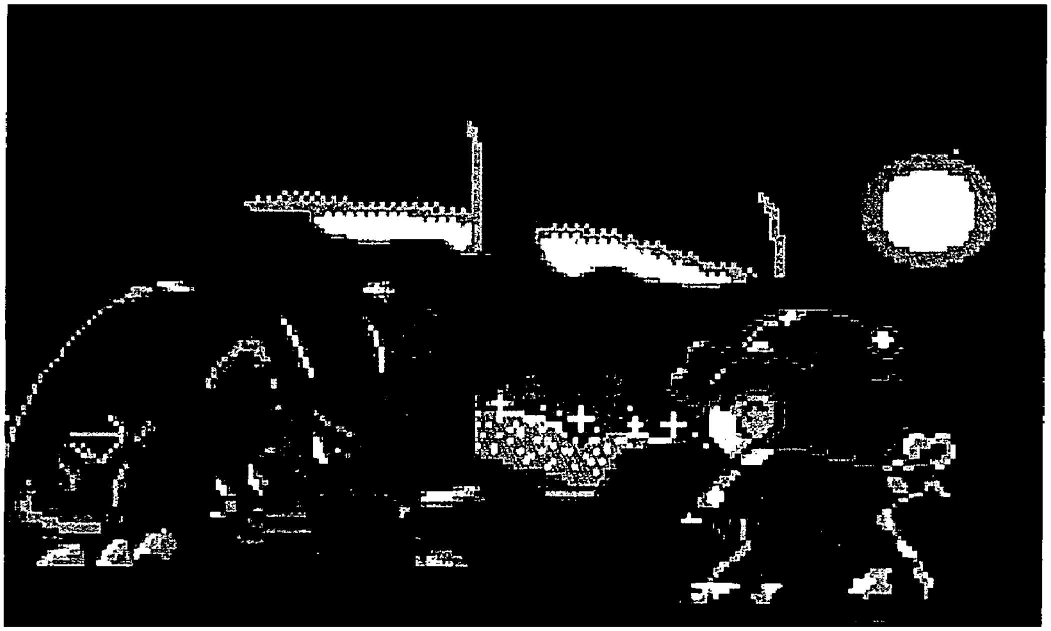
Figure 268:
Figure 269:
Figure 270:
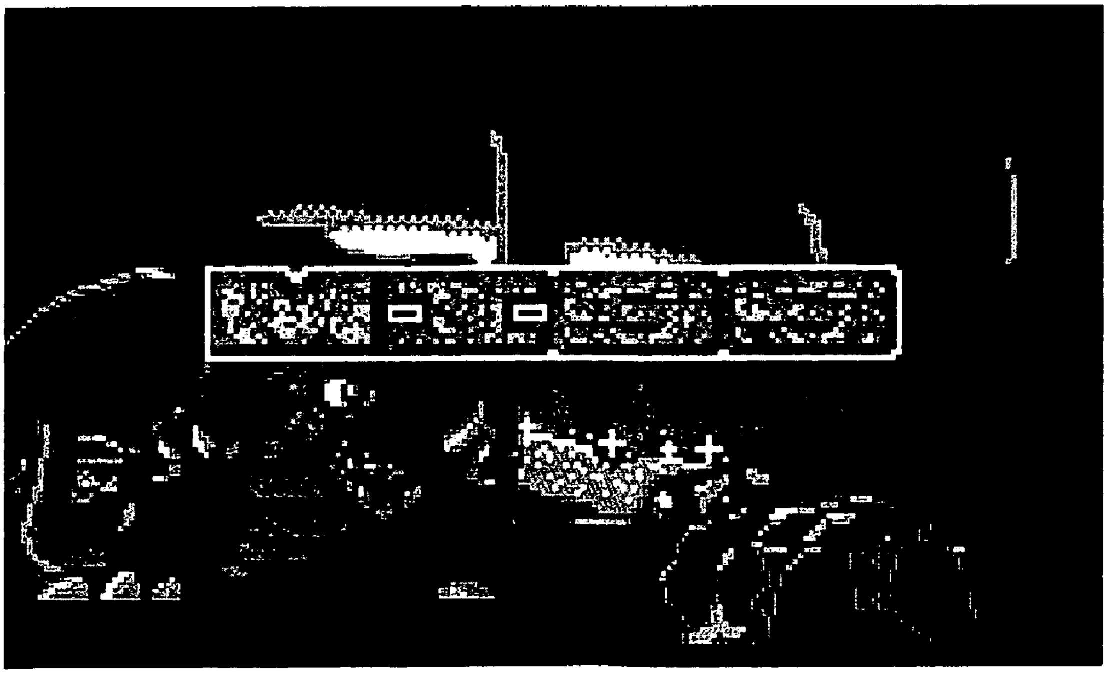
Figure 271:
Figure 272:
Figure 273:
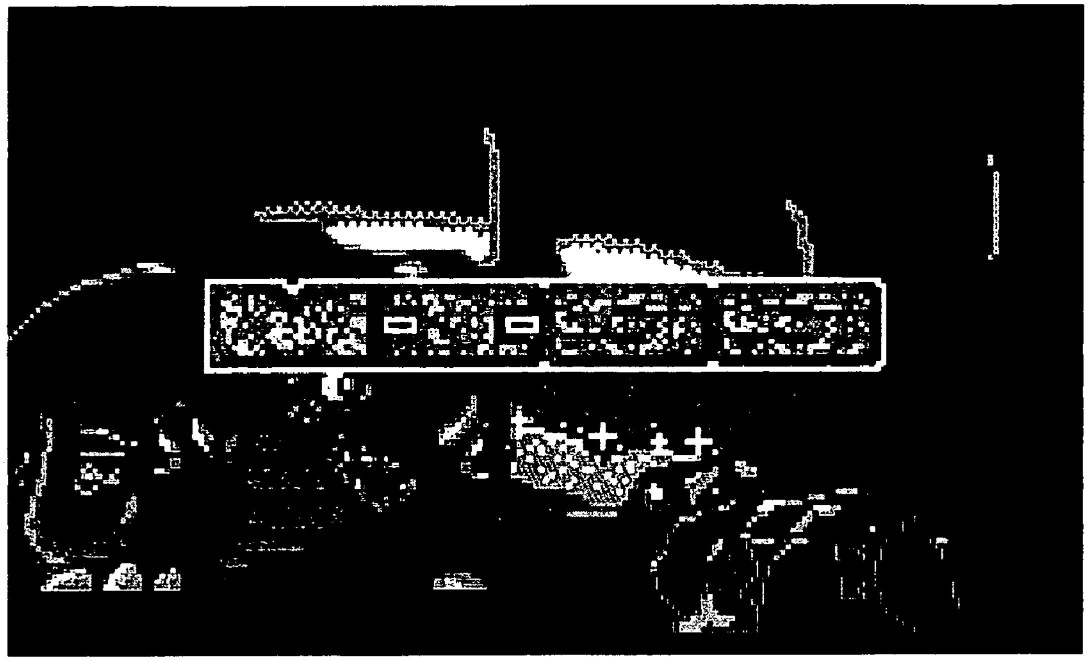
Figure 274:
Figure 275:
Figure 276:
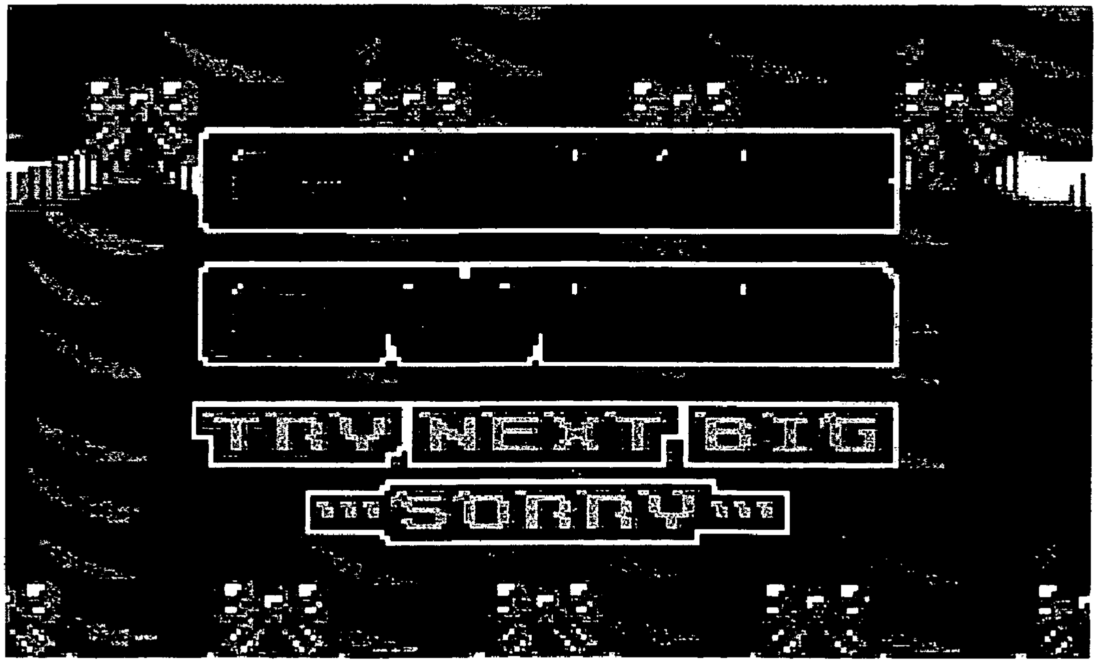
Figure 277:
Figure 278:
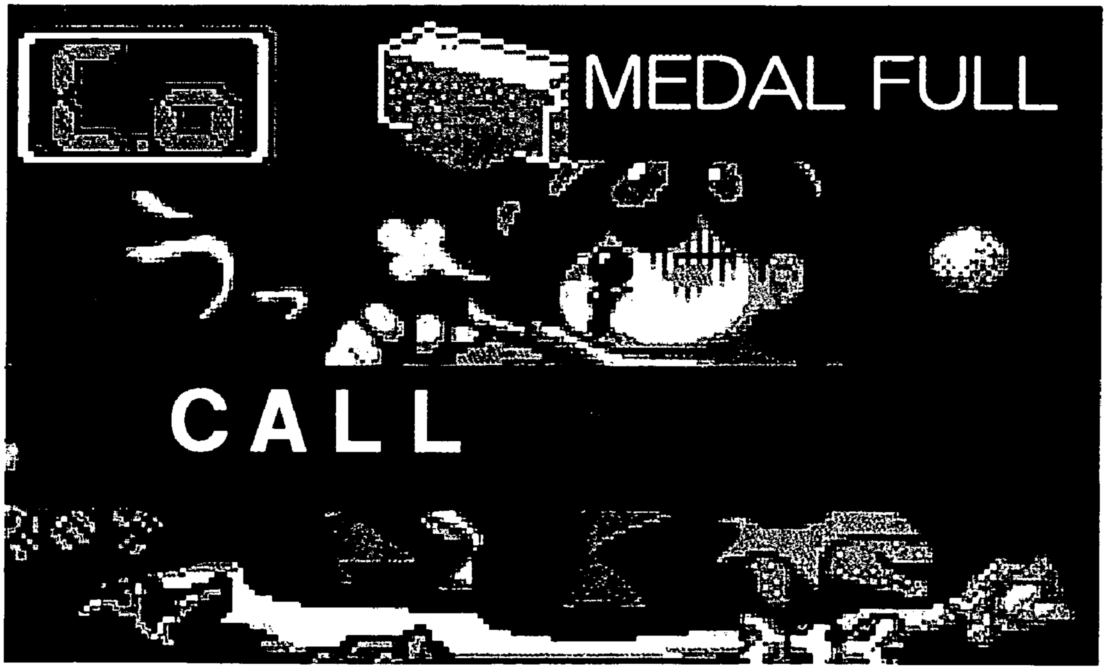
Figure 279:
Figure 280:
Figure 281:
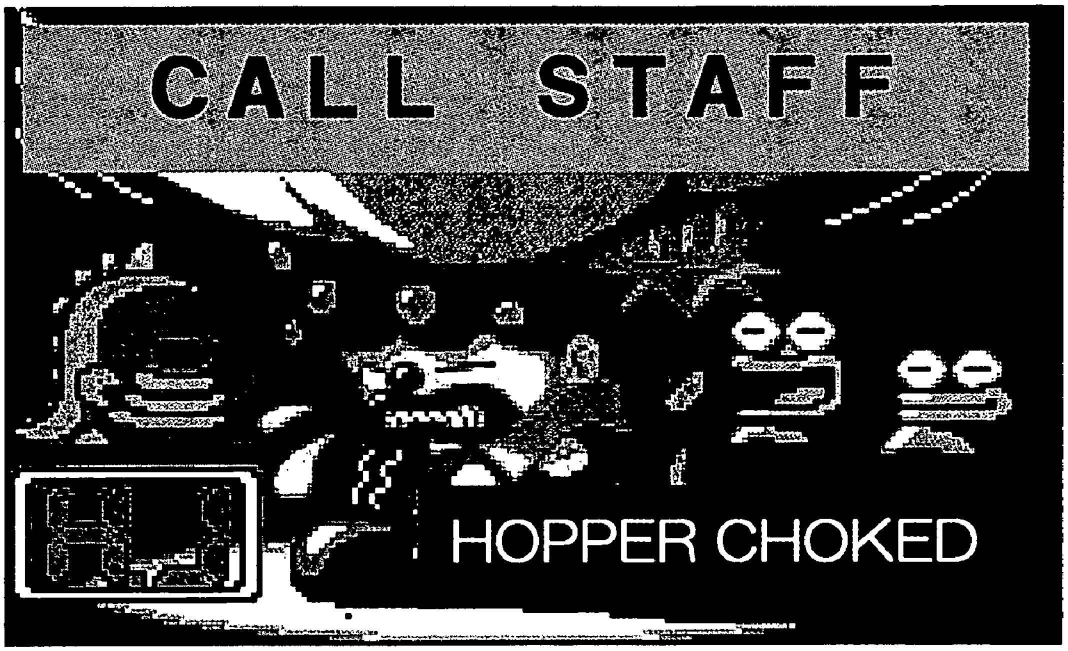
Figure 282:
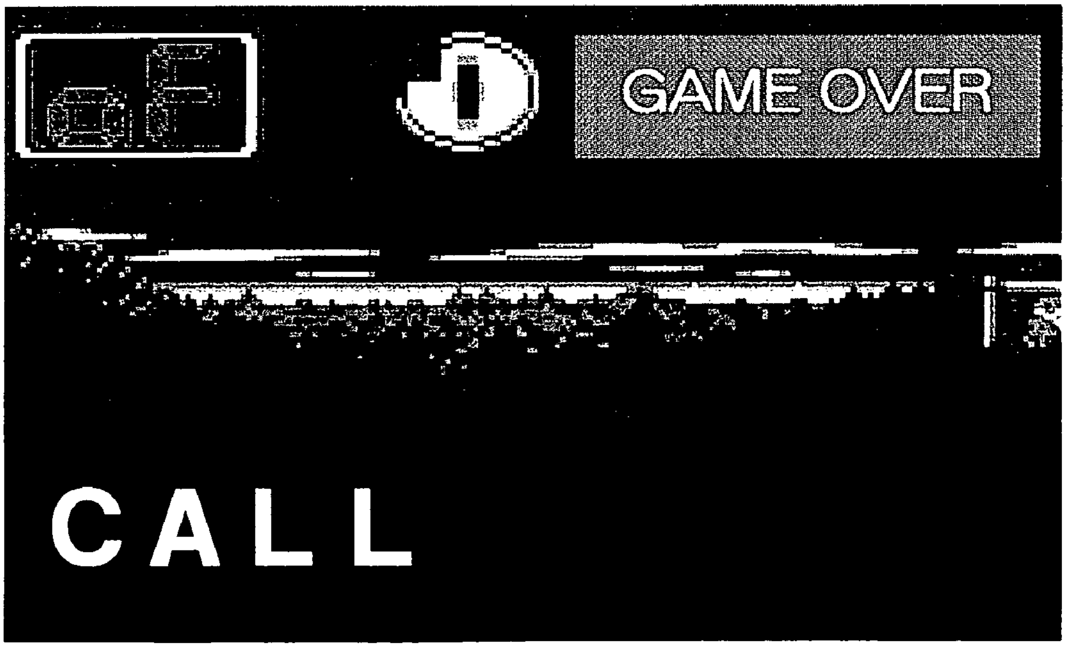
Figure 283:
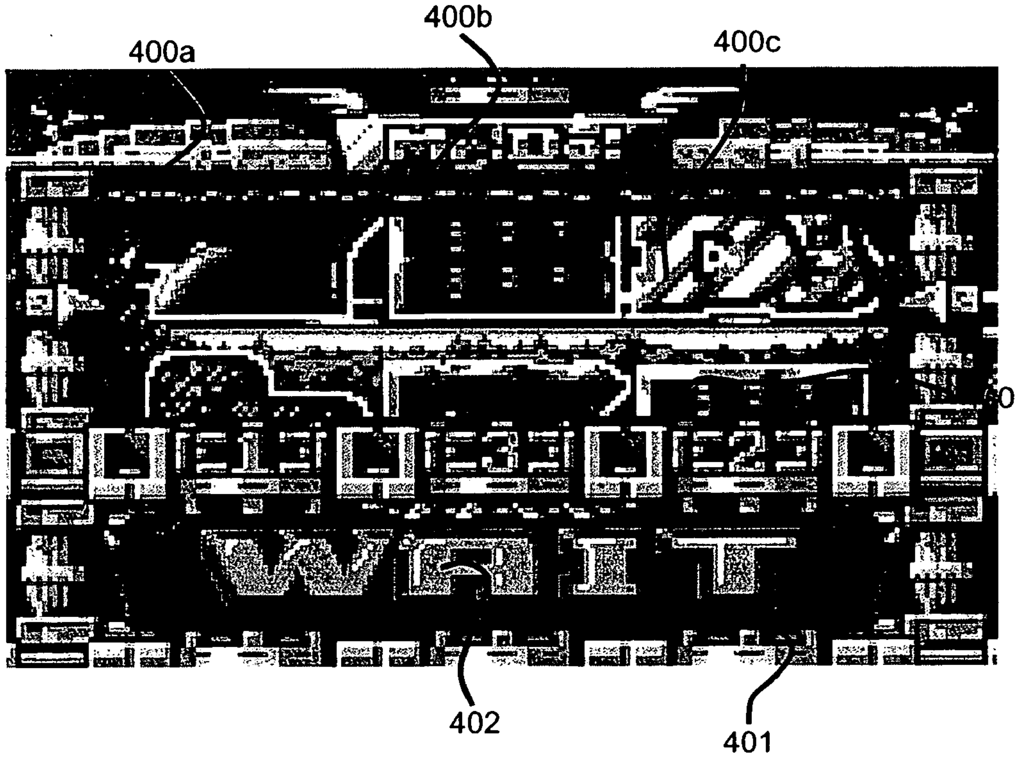

FIG. 132 is an explanatory view of game information (notice of the internally elected hand by the ready-state attraction: ready-state attraction 3) displayed in the image display section in accordance with the other embodiment;

FIG. 133 is an explanatory view of game information (notice of the internally elected hand by the ready-state attraction: ready-state attraction 3) displayed in the image display section in accordance with the other embodiment;

FIG. 134 is an explanatory view of game information (notice of the internally elected hand by the ready-state attraction: ready-state attraction 3) displayed in the image display section in accordance with the other embodiment;

FIG. 135 is an explanatory view of game information (notice of the internally elected hand by the ready-state attraction: ready-state attraction 3) displayed in the image display section in accordance with the other embodiment;

FIG. 136 is an explanatory view of game information (notice of the internally elected hand by the ready-state attraction: ready-state attraction 3) displayed in the image display section in accordance with the other embodiment;

FIG. 137 is an explanatory view of game information (notice of the internally elected hand by the ready-state attraction: ready-state attraction 3) displayed in the image display section in accordance with the other embodiment;

FIG. 138 is an explanatory view of game information (notice of the internally elected hand by the ready-state attraction: ready-state attraction 3) displayed in the image display section in accordance with the other embodiment;

FIG. 139 is an explanatory view of game information (notice of an internally elected hand by a ready-state attraction: ready-state attraction 4) displayed in the image display section in accordance with the other embodiment;

FIG. 140 is an explanatory view of game information (notice of the internally elected hand by the ready-state attraction: ready-state attraction 4) displayed in the image display section in accordance with the other embodiment;

FIG. 141 is an explanatory view of game information (notice of the internally elected hand by the ready-state attraction: ready-state attraction 4) displayed in the image display section in accordance with the other embodiment;

FIG. 142 is an explanatory view of game information (notice of the internally elected hand by the ready-state attraction: ready-state attraction 4) displayed in the image display section in accordance with the other embodiment;

FIG. 143 is an explanatory view of game information (notice of the internally elected hand by the ready-state attraction: ready-state attraction 4) displayed in the image display section in accordance with the other embodiment;

FIG. 144 is an explanatory view of game information (notice of the internally elected hand by the ready-state attraction: ready-state attraction 4) displayed in the image display section in accordance with the other embodiment;

FIG. 145 is an explanatory view of game information (notice of the internally elected hand by the ready-state attraction: ready-state attraction 4) displayed in the image display section in accordance with the other embodiment;

FIG. 146 is an explanatory view of game information (notice of the internally elected hand by the ready-state attraction: ready-state attraction 4) displayed in the image display section in accordance with the other embodiment;

FIG. 147 is an explanatory view of game information (notice of the internally elected hand by the ready-state attraction: ready-state attraction 4) displayed in the image display section in accordance with the other embodiment;

FIG. 148 is an explanatory view of game information (notice of the internally elected hand by the ready-state attraction: ready-state attraction 4) displayed in the image display section in accordance with the other embodiment;

FIG. 149 is an explanatory view of game information (notice of the internally elected hand by the ready-state attraction: ready-state attraction 4) displayed in the image display section in accordance with the other embodiment;

FIG. 150 is an explanatory view of game information (notice of the internally elected hand by the ready-state attraction: ready-state attraction 4) displayed in the image display section in accordance with the other embodiment;

FIG. 151 is an explanatory view of game information (notice of the internally elected hand by the ready-state attraction: ready-state attraction 4) displayed in the image display section in accordance with the other embodiment;

FIG. 152 is an explanatory view of game information (notice of the internally elected hand by the ready-state attraction: ready-state attraction 4) displayed in the image display section in accordance with the other embodiment;

FIG. 153 is an explanatory view of game information (notice of the internally elected hand by the ready-state attraction: ready-state attraction 4) displayed in the image display section in accordance with the other embodiment;

FIG. 154 is an explanatory view of game information (notice of the internally elected hand by the ready-state attraction: ready-state attraction 4) displayed in the image display section in accordance with the other embodiment;

FIG. 155 is an explanatory view of game information (notice of the internally elected hand by the ready-state attraction: ready-state attraction 4) displayed in the image display section in accordance with the other embodiment;

FIG. 156 is an explanatory view of game information (notice of the internally elected hand by the ready-state attraction: ready-state attraction 4) displayed in the image display section in accordance with the other embodiment;

FIG. 157 is an explanatory view of game information (notice of the internally elected hand by the ready-state attraction: ready-state attraction 4) displayed in the image display section in accordance with the other embodiment;

FIG. 158 is an explanatory view of game information (notice of the internally elected hand by the ready-state attraction: ready-state attraction 4) displayed in the image display section in accordance with the other embodiment;

FIG. 159 is an explanatory view of game information (notice of the internally elected hand by the ready-state attraction: ready-state attraction 4) displayed in the image display section in accordance with the other embodiment;

FIG. 160 is an explanatory view of game information (notice of the internally elected hand by the ready-state attraction: ready-state attraction 4) displayed in the image display section in accordance with the other embodiment;

FIG. 161 is an explanatory view of game information (notice of the internally elected hand by the ready-state attraction: ready-state attraction 4) displayed in the image display section in accordance with the other embodiment;

FIG. 162 is an explanatory view of game information (notice of the internally elected hand by the ready-state attraction: ready-state attraction 4) displayed in the image display section in accordance with the other embodiment;

FIG. 163 is an explanatory view of game information (notice of the internally elected hand by the ready-state attraction: ready-state attraction 4) displayed in the image display section in accordance with the other embodiment;

FIG. 164 is an explanatory view of game information (notice of the internally elected hand by the ready-state attraction: ready-state attraction 4) displayed in the image display section in accordance with the other embodiment;

FIG. 165 is an explanatory view of game information (notice of an internally elected hand by a ready-state attraction: ready-state attraction 5) displayed in the image display section in accordance with the other embodiment;

FIG. 166 is an explanatory view of game information (notice of the internally elected hand by the ready-state attraction: ready-state attraction 5) displayed in the image display section in accordance with the other embodiment;

FIG. 167 is an explanatory view of game information (notice of the internally elected hand by the ready-state attraction: ready-state attraction 5) displayed in the image display section in accordance with the other embodiment;

FIG. 168 is an explanatory view of game information (notice of the internally elected hand by the ready-state attraction: ready-state attraction 5) displayed in the image display section in accordance with the other embodiment;

FIG. 169 is an explanatory view of game information (notice of the internally elected hand by the ready-state attraction: ready-state attraction 5) displayed in the image display section in accordance with the other embodiment;

FIG. 170 is an explanatory view of game information (notice of the internally elected hand by the ready-state attraction: ready-state attraction 5) displayed in the image display section in accordance with the other embodiment;

FIG. 171 is an explanatory view of game information (notice of the internally elected hand by the ready-state attraction: ready-state attraction 5) displayed in the image display section in accordance with the other embodiment;

FIG. 172 is an explanatory view of game information (notice of the internally elected hand by the ready-state attraction: ready-state attraction 5) displayed in the image display section in accordance with the other embodiment;

FIG. 173 is an explanatory view of game information (notice of the internally elected hand by the ready-state attraction: ready-state attraction 5) displayed in the image display section in accordance with the other embodiment;

FIG. 174 is an explanatory view of game information (notice of the internally elected hand by the ready-state attraction: ready-state attraction 5) displayed in the image display section in accordance with the other embodiment;

FIG. 175 is an explanatory view of game information (notice of the internally elected hand by the ready-state attraction: ready-state attraction 5) displayed in the image display section in accordance with the other embodiment;

FIG. 176 is an explanatory view of game information (notice of the internally elected hand by the ready-state attraction: ready-state attraction 5) displayed in the image display section in accordance with the other embodiment;

FIG. 177 is an explanatory view of game information (notice of the internally elected hand by the ready-state attraction: ready-state attraction 5) displayed in the image display section in accordance with the other embodiment;

FIG. 178 is an explanatory view of game information (notice of the internally elected hand by the ready-state attraction: ready-state attraction 5) displayed in the image display section in accordance with the other embodiment;

FIG. 179 is an explanatory view of game information (notice of the internally elected hand by the ready-state attraction: ready-state attraction 5) displayed in the image display section in accordance with the other embodiment;

FIG. 180 is an explanatory view of game information (notice of the internally elected hand by the ready-state attraction: ready-state attraction 5) displayed in the image display section in accordance with the other embodiment;

FIG. 181 is an explanatory view of game information (notice of the internally elected hand by the ready-state attraction: ready-state attraction 5) displayed in the image display section in accordance with the other embodiment;

FIG. 182 is an explanatory view of game information (notice of the internally elected hand by the ready-state attraction: ready-state attraction 5) displayed in the image display section in accordance with the other embodiment;

FIG. 183 is an explanatory view of game information (notice of the internally elected hand by the ready-state attraction: ready-state attraction 5) displayed in the image display section in accordance with the other embodiment;

FIG. 184 is an explanatory view of game information (notice of the internally elected hand by the ready-state attraction: ready-state attraction 5) displayed in the image display section in accordance with the other embodiment;

FIG. 185 is an explanatory view of game information (notice of the internally elected hand by the ready-state attraction: ready-state attraction 5) displayed in the image display section in accordance with the other embodiment;

FIG. 186 is an explanatory view of game information (notice of the internally elected hand by the ready-state attraction: ready-state attraction 5) displayed in the image display section in accordance with the other embodiment;

FIG. 187 is an explanatory view of game information (notice of the internally elected hand by the ready-state attraction: ready-state attraction 5) displayed in the image display section in accordance with the other embodiment;

FIG. 188 is an explanatory view of game information (notice of the internally elected hand by the ready-state attraction: ready-state attraction 5) displayed in the image display section in accordance with the other embodiment;

FIG. 189 is an explanatory view of game information (notice of the internally elected hand by the ready-state attraction: ready-state attraction 5) displayed in the image display section in accordance with the other embodiment;

FIG. 190 is an explanatory view of game information (notice of an internally elected hand by a ready-state attraction: ready-state attraction 6) displayed in the image display section in accordance with the other embodiment;

FIG. 191 is an explanatory view of game information (notice of the internally elected hand by the ready-state attraction: ready-state attraction 6) displayed in the image display section in accordance with the other embodiment;

FIG. 192 is an explanatory view of game information (notice of the internally elected hand by the ready-state attraction: ready-state attraction 6) displayed in the image display section in accordance with the other embodiment;

FIG. 193 is an explanatory view of game information (notice of the internally elected hand by the ready-state attraction: ready-state attraction 6) displayed in the image display section in accordance with the other embodiment;

FIG. 194 is an explanatory view of game information (notice of the internally elected hand by the ready-state attraction: ready-state attraction 6) displayed in the image display section in accordance with the other embodiment;

FIG. 195 is an explanatory view of game information (notice of the internally elected hand by the ready-state attraction: ready-state attraction 6) displayed in the image display section in accordance with the other embodiment;

FIG. 196 is an explanatory view of game information (notice of the internally elected hand by the ready-state attraction: ready-state attraction 6) displayed in the image display section in accordance with the other embodiment;

FIG. 197 is an explanatory view of game information (notice of the internally elected hand by the ready-state attraction: ready-state attraction 6) displayed in the image display section in accordance with the other embodiment;

FIG. 198 is an explanatory view of game information (notice of the internally elected hand by the ready-state attraction: ready-state attraction 6) displayed in the image display section in accordance with the other embodiment;

FIG. 199 is an explanatory view of game information (notice of an internally elected hand by a ready-state attraction: ready-state attraction 7) displayed in the image display section in accordance with the other embodiment;

FIG. 200 is an explanatory view of game information (notice of the internally elected hand by the ready-state attraction: ready-state attraction 7) displayed in the image display section in accordance with the other embodiment;

FIG. 201 is an explanatory view of game information (notice of the internally elected hand by the ready-state attraction: ready-state attraction 7) displayed in the image display section in accordance with the other embodiment;

FIG. 202 is an explanatory view of game information (notice of the internally elected hand by the ready-state attraction: ready-state attraction 7) displayed in the image display section in accordance with the other embodiment;

FIG. 203 is an explanatory view of game information (notice of the internally elected hand by the ready-state attraction: ready-state attraction 7) displayed in the image display section in accordance with the other embodiment;

FIG. 204 is an explanatory view of game information (notice of the internally elected hand by the ready-state attraction: ready-state attraction 7) displayed in the image display section in accordance with the other embodiment;

FIG. 205 is an explanatory view of game information (notice of the internally elected hand by the ready-state attraction: ready-state attraction 7) displayed in the image display section in accordance with the other embodiment;

FIG. 206 is an explanatory view of game information (attraction in a special game: the first normal game attraction in a big bonus game) displayed in the image display section in accordance with the other embodiment;

FIG. 207 is an explanatory view of game information (attraction in the special game: the first normal game attraction in the big bonus game) displayed in the image display section in accordance with the other embodiment;

FIG. 208 is an explanatory view of game information (attraction in the special game: the first normal game attraction in the big bonus game) displayed in the image display section in accordance with the other embodiment;

FIG. 209 is an explanatory view of game information (attraction in the special game: the first normal game attraction in the big bonus game) displayed in the image display section in accordance with the other embodiment;

FIG. 210 is an explanatory view of game information (attraction in the special game: the first normal game attraction in the big bonus game) displayed in the image display section in accordance with the other embodiment;

FIG. 211 is an explanatory view of game information (attraction in the special game: the first normal game attraction in the big bonus game) displayed in the image display section in accordance with the other embodiment;

FIG. 212 is an explanatory view of game information (attraction in the special game: the first normal game attraction in the big bonus game) displayed in the image display section in accordance with the other embodiment;

FIG. 213 is an explanatory view of game information (attraction in the special game: the first normal game attraction in the big bonus game) displayed in the image display section in accordance with the other embodiment;

FIG. 214 is an explanatory view of game information (attraction in the special game: the first normal game attraction in the big bonus game) displayed in the image display section in accordance with the other embodiment;

FIG. 215 is an explanatory view of game information (attraction in the special game: the first normal game attraction in the big bonus game) displayed in the image display section in accordance with the other embodiment;

FIG. 216 is an explanatory view of game information (attraction in the special game: the second normal game attraction in the big bonus game) displayed in the image display section in accordance with the other embodiment;

FIG. 217 is an explanatory view of game information (attraction in the special game: the second normal game attraction in the big bonus game) displayed in the image display section in accordance with the other embodiment;

FIG. 218 is an explanatory view of game information (attraction in the special game: the second normal game attraction in the big bonus game) displayed in the image display section in accordance with the other embodiment;

FIG. 219 is an explanatory view of game information (attraction in the special game: the second normal game attraction in the big bonus game) displayed in the image display section in accordance with the other embodiment;

FIG. 220 is an explanatory view of game information (attraction in the special game: the third normal game attraction in the big bonus game) displayed in the image display section in accordance with the other embodiment;

FIG. 221 is an explanatory view of game information (attraction in the special game: the third normal game attraction in the big bonus game) displayed in the image display section in accordance with the other embodiment;

FIG. 222 is an explanatory view of game information (attraction in the special game: the third normal game attraction in the big bonus game) displayed in the image display section in accordance with the other embodiment;

FIG. 223 is an explanatory view of game information (attraction in the special game: the third normal game attraction in the big bonus game) displayed in the image display section in accordance with the other embodiment;

FIG. 224 is an explanatory view of game information (attraction in the special game: an ending attraction for the big bonus game) displayed in the image display section in accordance with the other embodiment;

FIG. 225 is an explanatory view of game information (attraction in the special game: the ending attraction for the big bonus game) displayed in the image display section in accordance with the other embodiment;

FIG. 226 is an explanatory view of game information (attraction in the special game: the ending attraction for the big bonus game) displayed in the image display section in accordance with the other embodiment;

FIG. 227 is an explanatory view of game information (attraction in the special game: the ending attraction for the big bonus game) displayed in the image display section in accordance with the other embodiment;

FIG. 228 is an explanatory view of game information (attraction in the special game: the ending attraction for the big bonus game) displayed in the image display section in accordance with the other embodiment;

FIG. 229 is an explanatory view of game information (attraction in the special game: the ending attraction for the big bonus game) displayed in the image display section in accordance with the other embodiment;

FIG. 230 is an explanatory view of game information (attraction in the special game: the ending attraction for the big bonus game) displayed in the image display section in accordance with the other embodiment;

FIG. 231 is an explanatory view of game information (attraction in the special game: the ending attraction for the big bonus game) displayed in the image display section in accordance with the other embodiment;

FIG. 232 is an explanatory view of game information (attraction in the special game: the ending attraction for the big bonus game) displayed in the image display section in accordance with the other embodiment;

FIG. 233 is an explanatory view of game information (attraction in the special game: the ending attraction for the big bonus game) displayed in the image display section in accordance with the other embodiment;

FIG. 234 is an explanatory view of game information (attraction in the special game: the ending attraction for the big bonus game) displayed in the image display section in accordance with the other embodiment;

FIG. 235 is an explanatory view of game information (attraction in the special game: the first JAC game attraction) displayed in the image display section in accordance with the other embodiment;

FIG. 236 is an explanatory view of game information (attraction in the special game: the first JAC game attraction) displayed in the image display section in accordance with the other embodiment;

FIG. 237 is an explanatory view of game information (attraction in the special game: the first JAC game attraction) displayed in the image display section in accordance with the other embodiment;

FIG. 238 is an explanatory view of game information (attraction in the special game: the first JAC game attraction) displayed in the image display section in accordance with the other embodiment;

FIG. 239 is an explanatory view of game information (attraction in the special game: the first JAC game attraction) displayed in the image display section in accordance with the other embodiment;

FIG. 240 is an explanatory view of game information (attraction in the special game: the first JAC game attraction) displayed in the image display section in accordance with the other embodiment;

FIG. 241 is an explanatory view of game information (attraction in the special game: the first JAC game attraction) displayed in the image display section in accordance with the other embodiment;

FIG. 242 is an explanatory view of game information (attraction in the special game: the first JAC game attraction) displayed in the image display section in accordance with the other embodiment;

FIG. 243 is an explanatory view of game information (attraction in the special game: the first JAC game attraction) displayed in the image display section in accordance with the other embodiment;

FIG. 244 is an explanatory view of game information (attraction in the special game: the first JAC game attraction) displayed in the image display section in accordance with the other embodiment;

FIG. 245 is an explanatory view of game information (attraction in the special game: the first JAC game attraction) displayed in the image display section in accordance with the other embodiment;

FIG. 246 is an explanatory view of game information (attraction in the special game: the first JAC game attraction) displayed in the image display section in accordance with the other embodiment;

FIG. 247 is an explanatory view of game information (attraction in the special game: the first JAC game attraction) displayed in the image display section in accordance with the other embodiment;

FIG. 248 is an explanatory view of game information (attraction in the special game: the first JAC game attraction) displayed in the image display section in accordance with the other embodiment;

FIG. 249 is an explanatory view of game information (attraction in the special game: the first JAC game attraction) displayed in the image display section in accordance with the other embodiment;

FIG. 250 is an explanatory view of game information (attraction in the special game: the first JAC game attraction) displayed in the image display section in accordance with the other embodiment;

FIG. 251 is an explanatory view of game information (attraction in the special game: the first JAC game attraction) displayed in the image display section in accordance with the other embodiment;

FIG. 252 is an explanatory view of game information (attraction in the special game: the first JAC game attraction) displayed in the image display section in accordance with the other embodiment;

FIG. 253 is an explanatory view of game information (attraction in the special game: the first JAC game attraction) displayed in the image display section in accordance with the other embodiment;

FIG. 254 is an explanatory view of game information (attraction in the special game: the second JAC game attraction) displayed in the image display section in accordance with the other embodiment;

FIG. 255 is an explanatory view of game information (attraction in the special game: the second JAC game attraction) displayed in the image display section in accordance with the other embodiment;

FIG. 256 is an explanatory view of game information (attraction in the special game: the second JAC game attraction) displayed in the image display section in accordance with the other embodiment;

FIG. 257 is an explanatory view of game information (attraction in the special game: the second JAC game attraction) displayed in the image display section in accordance with the other embodiment;

FIG. 258 is an explanatory view of game information (attraction in the special game: the second JAC game attraction) displayed in the image display section in accordance with the other embodiment;

FIG. 259 is an explanatory view of game information (attraction in the special game: the second JAC game attraction) displayed in the image display section in accordance with the other embodiment;

FIG. 260 is an explanatory view of game information (attraction in the special game: the second JAC game attraction) displayed in the image display section in accordance with the other embodiment;

FIG. 261 is an explanatory view of game information (attraction in the special game: the second JAC game attraction) displayed in the image display section in accordance with the other embodiment;

FIG. 262 is an explanatory view of game information (attraction in the special game: the second JAC game attraction) displayed in the image display section in accordance with the other embodiment;

FIG. 263 is an explanatory view of game information (attraction in the special game: the third JAC game attraction) displayed in the image display section in accordance with the other embodiment;

FIG. 264 is an explanatory view of game information (attraction in the special game: the third JAC game attraction) displayed in the image display section in accordance with the other embodiment;

FIG. 265 is an explanatory view of game information (attraction in the special game: the third JAC game attraction) displayed in the image display section in accordance with the other embodiment;

FIG. 266 is an explanatory view of game information (attraction in the special game: the third JAC game attraction) displayed in the image display section in accordance with the other embodiment;

FIG. 267 is an explanatory view of game information (attraction in the special game: the third JAC game attraction) displayed in the image display section in accordance with the other embodiment;

FIG. 268 is an explanatory view of game information (attraction in the special game: the third JAC game attraction) displayed in the image display section in accordance with the other embodiment;

FIG. 269 is an explanatory view of game information (attraction in the special game: the third JAC game attraction) displayed in the image display section in accordance with the other embodiment;

FIG. 270 is an explanatory view of game information (attraction in the special game: the third JAC game attraction) displayed in the image display section in accordance with the other embodiment;

FIG. 271 is an explanatory view of game information (attraction in the special game: the third JAC game attraction) displayed in the image display section in accordance with the other embodiment;

FIG. 272 is an explanatory view of game information (attraction in the special game: the third JAC game attraction) displayed in the image display section in accordance with the other embodiment;

FIG. 273 is an explanatory view of game information (attraction in the special game: the third JAC game attraction) displayed in the image display section in accordance with the other embodiment;

FIG. 274 is an explanatory view of game information (attraction in the special game: the third JAC game attraction) displayed in the image display section in accordance with the other embodiment;

FIG. 275 is an explanatory view of game information (attraction in the special game: the third JAC game attraction) displayed in the image display section in accordance with the other embodiment;

FIG. 276 is an explanatory view of game information (attraction in the special game: the third JAC game attraction) displayed in the image display section in accordance with the other embodiment;

FIG. 277 is an explanatory view of game information (error indication) displayed in the image display section in accordance with the other embodiment;

FIG. 278 is an explanatory view of game information (error indication) displayed in the image display section in accordance with the other embodiment;

FIG. 279 is an explanatory view of game information (error indication) displayed in the image display section in accordance with the other embodiment;

FIG. 280 is an explanatory view of game information (error indication) displayed in the image display section in accordance with the other embodiment;

FIG. 281 is an explanatory view of game information (error indication) displayed in the image display section in accordance with the other embodiment;

FIG. 282 is an explanatory view of game information (error indication) displayed in the image display section in accordance with the other embodiment;

FIG. 283 is an explanatory view of a variable display area for appearing symbols displayed in the image display section;

FIGS. 284A to 284G are explanatory views of single characters used for noticing internally elected hands; and FIGS. 285A to 285H are charts showing relationships between the overall flows of game information displayed in the image display section of the slot machine in accordance with the other embodiment and the drawings used for their explanations.

DESCRIPTION OF THE PREFERRED EMBODIMENTS

In the following, embodiments of the gaming machine in accordance with the present invention will be explained.

By way of example, a slot machine will be explained as a typical gaming machine in the following.

Slot Machine

Figure 1:
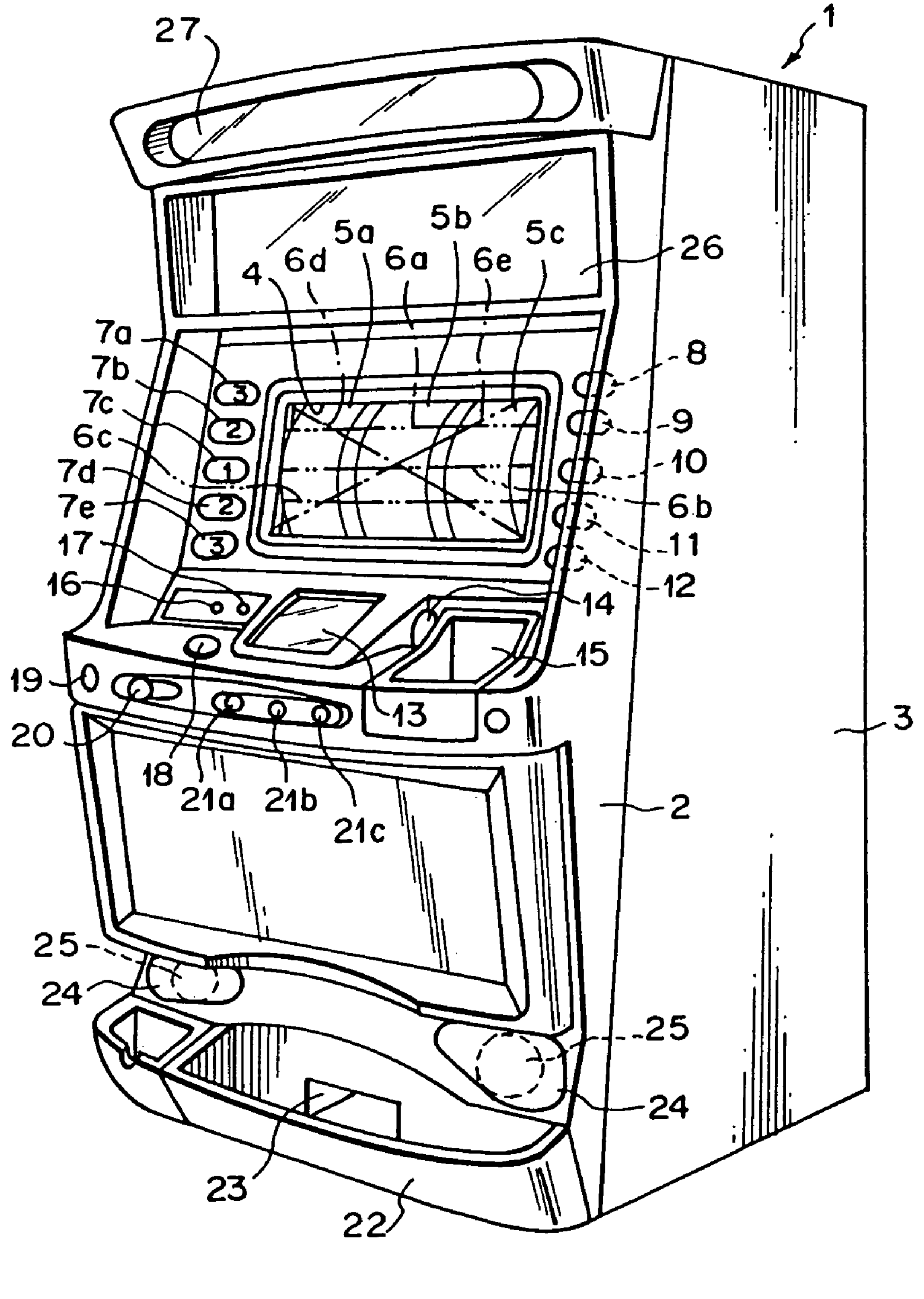
FIG. 1 is a perspective view of a slot machine in accordance with an embodiment of the present invention.

FIG. 1 is a perspective view showing an embodiment of the slot machine in accordance with the present invention.

As shown in FIG. 1, the slot machine 1 in accordance with the present invention has a housing 3 whose front side is provided with a front door 2 which is adapted to open and close. The front door 2 is formed with a display window 4 located above near the center of the front face thereof, whereas the respective outer peripheral surfaces of three reels 5*a* to 5*c* disposed within the housing 3 face the display window 4. Also, winning line indicators 6*a* to 6*e* for indicating respective effective winning lines are formed across the display window 4 so as to extend to the peripheries thereof. Here, five winning line indicators 6*a* to 6*e* in total constituted by three horizontal ones and two oblique ones crossing the horizontal ones are provided. Also, on the left end side of the respective winning line indicators 6*a* to 6*e*, effective line indicator lamps 7*a* to 7*e* for indicating the respective effective winning lines are provided.

Though the three reels 5*a* to 5*c* are disposed within one display window 4 in the embodiment shown in FIG. 1, discrete display windows may be provided so as to correspond to the respective reels 5*a* to 5*c*. Also, though five effective winning lines are provided here, they may have any number, such as seven, nine, and so forth.

Disposed on the right end side of the winning line indicators 6*a* to 6*e* are a replay display lamp 8 which is lit at the time of a replay winning, a game stop display lamp 9 for displaying a wait time from the starting of the last reel rotation until the next reel rotation is permitted to start, a winning display lamp 10 for indicating that a winning is generated, a game start display lamp 11 for indicating that a start switch 20 is made effective, and a game medal insertion lamp 12 for indicating that game medals are permitted to be inserted.

Disposed in the front face of the front door 2 nearly at the center thereof below the display window 4 is an image display section 13 for displaying game information. The image display section 13 is made of, for example, a liquid-crystal display, a plasma display, an EL display, a CRT display, a dot-matrix indicator, or the like, and is capable of displaying each special game information item, which will be explained later in detail, and the like.

Though the reels 5*a* to 5*c*, which are variable display means, and the image display section 13 are constructed as devices separate from each other, both of them may be displayed in the same display device by use of a CRT display having a size of about 17 inches, or the like. In this case, simulated reels can be displayed on the CRT in place of the reels 5a to 5c.

Disposed on the right side of the image display section 13 are a medal insertion slot 14 for inserting, one by one, game medals used for gaming; and a collective medal insertion slot 15 for simultaneously inserting a plurality of game medals used for gaming. Disposed on the left side of the image display section 13 are a first bet switch 16 for inserting, one by one, game medals used for gaming within a credited range; a second bet switch 17 for inserting, two by two, game medals used for gaming within the credited range; and a max bet switch 18 for inserting game medals used for gaming up to a maximum bet number (three in this embodiment) within the credited range.

Though not depicted, a card unit may be attached to the slot machine 1 so as to form a card type slot machine which accepts a valued medium such as a prepaid card or the like for loaning out game medals, so that credit can be made in a credit section as in the case where the game medals are inserted into the slot machine 1. Also, the card type slot machine may be configured such that, while the card unit is attached to the slot machine 1, a hopper of the slot machine main body is actuated upon a game medal loan-out operation, so as to loan out a predetermined number of game medals to a medal tray 22.

Below the image display section 13, the front face of the front door 2 is provided with a C/P switch 19 for changeover between the credit and the payout of the medals acquired by the player, the start switch 20 for starting rotating each of the reels 5a to 5c on condition that a game medal is inserted, and three stop switches 21a to 21c for stopping rotating the respective reels 5a to 5c.

Further provided in the lower part of the front door 2 is the medal tray 22 for receiving, the game medals paid out as a prize, and a medal payout slot 23 facing the medal tray 22. Above the medal tray 22, the front face of the front door 2 is provided with a pair of right and left sound transmission holes 24, 24, whereas speakers 25, 25 are provided within the housing 3 so as to face the respective sound transmission holes 24, 24.

The upper part of the front face of the housing 3 is provided with a dividend display section 26 for displaying the number of dividend game medals to be paid out in reward for a winning, whereas a decorating section 27 provided with a plurality of decorating lamps (not depicted) is disposed above the dividend display section 26. The decorating section 27 is divided into a plurality of (e.g., 8) lateral sections, each section including a decorating lamp therewithin which is lit or blinked according to the state of gaming, thus being able to enhance the fun of gaming.

Within the housing 3, the reels 5a to 5c are rotatably disposed at their respective positions where their outer peripheral surfaces face the display window 4, whereas a hopper (not depicted) for paying out game medals as a prize is disposed at a position communicating with the medal payout slot 23. Also, a control unit (not depicted) for electrically controlling the slot machine 1 is disposed within the housing 3.

A light-transparent reel tape having a plurality of kinds of symbols displayed thereon at predetermined intervals is attached to the outer peripheral surface of each of the reels 5a to 5c. The kinds of symbols include "7," "BAR," "watermelon," "cherry," "plum," and the like, for example, and each of the reels 5a to 5c displays 21 symbols. Here, the kinds of symbols and the number of symbols displayed in each of the reels 5a to 5c can be changed as appropriate. For example, the kinds of symbols may include, in addition to those mentioned above, "bell," "orange," "person," "animal," "fish," "JAC," and the like. Further, a plurality of colors may be applied to each symbol, such that the symbols are distinguishable from each other.

Disposed inside each of the reels 5a to 5c are three back lamps (not depicted) in a vertical row for illuminating from inside the respective reel 5a to 5c in a transmitting manner the symbols seen through the display window 4. As the back lamps are lit, each of the reels 5a to 5c can be illuminated from inside, whereby the symbols displayed in their stopped state on effective winning lines can be highlighted.

Game in Gaming Machine

To begin with, for playing a game with the slot machine 1, game medals are actually inserted into the medal insertion slot 14, 15, or any of the bet switches 16, 17, 18 is operated such that game medals used for gaming are inserted within the credited range. Here, effective winning lines are determined according to the number of inserted game medals, and their corresponding effective line indicator lamps 7a to 7e are lit. For example, one horizontal line in the middle becomes effective when one game medal is inserted; three horizontal lines in the upper, middle, and lower parts become effective when two game medals are inserted; and five lines in total consisting of three horizontal lines in the upper, middle, and lower parts and two oblique lines become effective when three game medals, which constitute the maximum permissible bet number, are inserted.

Subsequently, when the player operates the start switch 20, all the reels 5a to 5c start rotating at once, whereby a plurality of kinds of symbols formed on the respective outer peripheral surfaces of the reels 5a to 5c are displayed while vertically moving within the display window 4. When the rotation of each reel 5a to 5c reaches a predetermined speed, its corresponding stop switch 21a to 21c is made effective. Then, as the player operates each stop switch 21a to 21c, its corresponding reel 5a to 5c stops rotating.

Here, in the case where the combination of the symbols displayed on an effective winning line in their stopped state constitutes a predetermined winning mode, the number of game medals corresponding to this winning mode are paid out as a prize or added as a credit.

Winning Mode

Predetermined winning modes include normal winning modes, and special winning modes to become a starting condition for special games which are more advantageous to the player than normal games. Further, the special winning modes include those of so-called big bonus and those of so-called regular bonus.

The normal winning modes include, for example, the cases where the combination of the symbols displayed on an effective winning line in their stopped state is constituted by "watermelon," "watermelon," and "watermelon"; where "cherry" is displayed in its stopped state on the left side of the display window; and the like, whereby a predetermined number of, e.g., 2 to 10, game medals are paid out. In this embodiment, 10 game medals are paid out when the combination of the symbols displayed on an effective winning line in their stopped state is constituted by "watermelon," "watermelon," and "watermelon"; 2 game medals are paid out when "cherry" is displayed in its stopped state on the left side of the display window; and so forth.

In addition, replay winning modes are set, so as to allow the player to play a game again under the same condition as that of the last game when the combination of the symbols displayed on an effective winning line in their stopped state is constituted by "plum," "plum," and "plum."

Big Bonus

The winning modes of big bonus are concerned with games started on condition that the combination of symbols displayed on an effective winning line in their stopped state is constituted by "7," "7," and "7," for example, whereby a predetermined number of, e.g., 15, game medals are paid out, and then a big bonus game in which the player can advantageously acquire a greater number of game medals than in a normal game can be played.

In this big bonus game, as mentioned above, games similar to a normal game with a raised sampling probability of small hands, i.e., normal games in a big bonus game (normal games in BB), can be played up to 30 times. While this game similar to a normal game is being played, if the combination of symbols displayed on an effective winning line in their stopped state is constituted by "watermelon," "watermelon," and "watermelon," then 10 game medals are paid out; if "cherry" is displayed on the left side of the display window in its stopped state, then 2 game medals are paid out; and, if the combination of symbols displayed on an effective winning line in their stopped state is constituted by "plum," "plum," and "plum," then 5 game medals are paid out and JAC games are allowed to play up to 3 times.

Here, normal games in BB are played under conditions substantially similar to those of normal games not played during the big bonus game in terms of the combinations of stopped symbols constituting winning modes, the number of game medals paid out when winning modes are attained, and the like, except for the lack of replay winning modes and the existence of special winning modes for shifting to JAC games in place of special winning modes which act as starting conditions for special games.

JAC Game

In a JAC game, with insertion of a predetermined number of game medals, e.g., one game medal, the start switch 20 is operated so as to start rotating the reels 5*a* to 5*c*, and then the stop switches 21*a* to 21*c* are operated so as to stop rotating the respective reels 5*a* to 5*c*.

If stopped symbols constitute a predetermined combination, e.g., "plum," "plum," and "plum," then a predetermined number of, e.g., 15, game medals are paid out.

In the JAC game, the maximum number of games and the maximum number of winnings are restricted. For example, when the above-mentioned game similar to a normal game is played 12 times, which constitute the maximum game number, or the number of the above-mentioned winnings reaches 8, which is the maximum winning number, then the JAC game ends.

Regular Bonus

In addition to the above-mentioned big bonus, there are special game modes known as so-called regular bonus.

The winning modes of regular bonus are concerned with games started on condition that the combination of symbols displayed on an effective winning line in their stopped state is constituted by "BAR," "BAR," and "BAR," for example, whereby a predetermined number of, e.g., 15, game medals are paid out, and then regular bonus games are allowed to be played.

In a regular bonus game, the acquirable profit is smaller than that in the above-mentioned big bonus game. For example, the above-mentioned JAC game is allowed to be played only once.

Winning Mode Occurring Condition

The foregoing series of gaming operations are controlled by the control unit disposed within the housing 3.

For example, occurrences of winning modes and special winning modes are controlled by the control unit. Namely, for balancing the profits between the game parlor and the player and enhancing the fun of gaming, the reels 5*a* to 5*c* are not stopped according to the operations of stop switches 21*a* to 21*c* alone. Namely, whether to permit a special game to occur or not is sampled beforehand in the control unit, and the individual reels 5*a* to 5*c* are controlled to stop such that a combination of stopped symbols constitutes a special winning mode only when the sampled results permits the special game to occur.

For example, in the case where the sampled result permits the special game to occur, even when the operating timing of the stop switches 21*a* to 21*c* slightly deviates from a timing at which symbols constituting the special winning mode are displayed in their stopped state, a rotation control operation for reels 5*a* to 5*c* known as so-called draw-in is effected such that the combination of stopped symbols constitutes the special winning mode. In the case where the sampled result does not permit a special game to be played, on the other hand, even when the stop switches 21*a* to 21*c* are operated at a timing at which symbols constituting the special winning mode are displayed in their stopped state, a rotation control operation for the reels 5*a* to 5*c* known as so-called slip is effected such that the combination of stopped symbols does not constitute the special winning mode.

Such a control operation by the control unit is also carried out for the occurrence of a winning mode in a big bonus which is a special game.

Notification of Special Game Information

The special game information displayed by the image display section 13 during a special game in the above-mentioned slot machine 1 will now be explained specifically with reference to the drawings.

FIGS. 2 to 7C are explanatory views for explaining the special game information displayed by the image display section 13 during a special game in the above-mentioned slot machine 1.

State of Progress, Winning History, and Gaming Mode in Special Game

Figure 2:
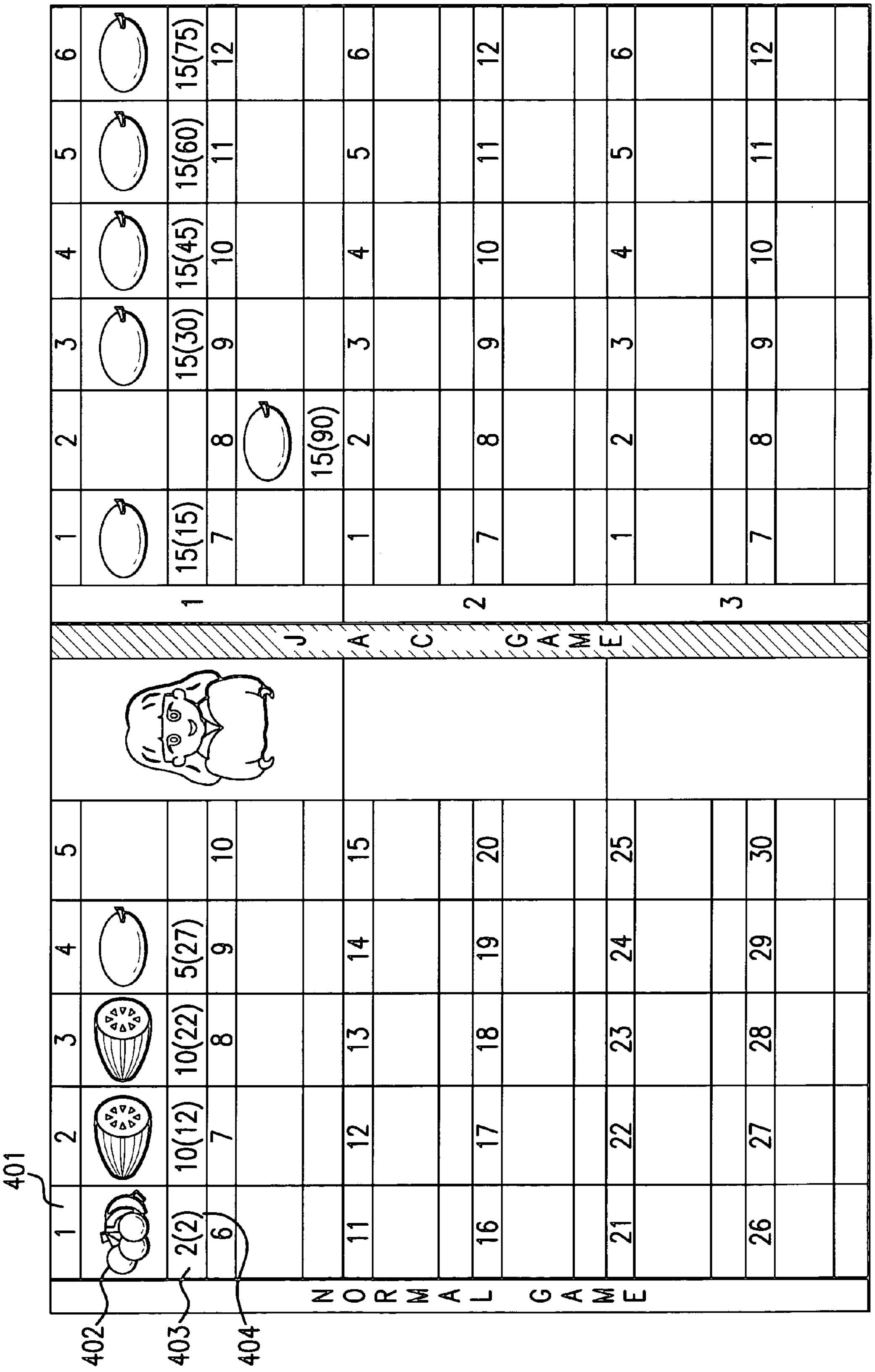
FIG. 2 is an explanatory view of special game information (the state of progress, winning history, and gaming mode of a special game) displayed in an image display section.
Figure 3:
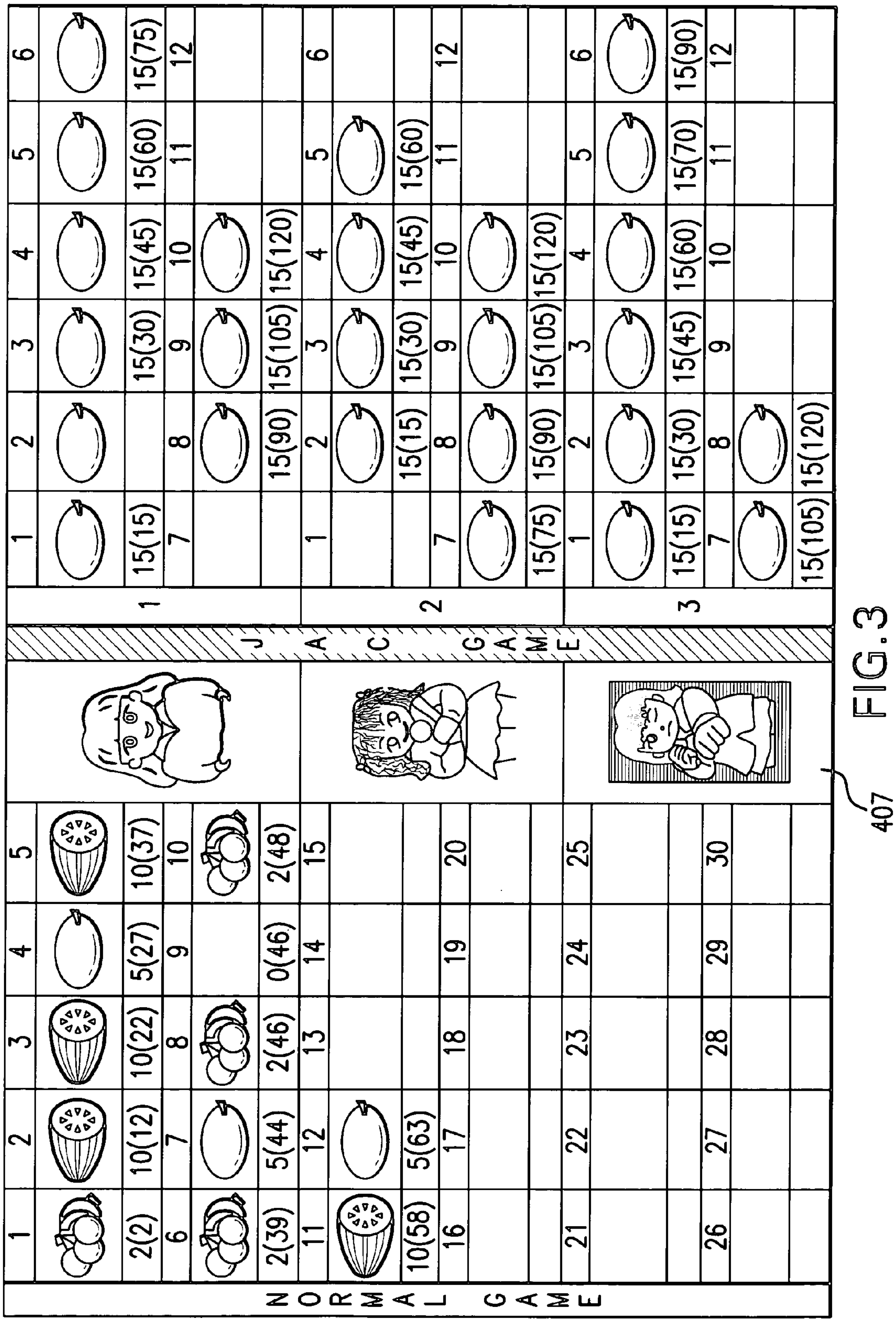
FIG. 3 is an explanatory view of special game information (the state of progress, winning history, and gaming mode of a special game) displayed in the image display section.

When a combination of stopped symbols constitutes a special winning mode, so that the gaming state shifts to a big bonus, which is a special game, then the state of progress of big bonus is displayed as shown in FIGS. 2 and 3.

Namely, in the examples shown in FIGS. 2 and 3, characters, combinations of symbols constituting winning modes, the number of paid-out game medals in reward for each winning, and the total number of paid-out game medals at present are displayed in the image display section 13, so as to indicate the state of progress of big bonus and winning history.

The example shown in FIG. 2 indicates the state where, after a particular winning mode for shifting to a JAC game, composed of "plum," "plum," and "plum," was displayed in their stopped state in the 4th normal game in BB, the gaming state has shifted to the 1st JAC game, and the 8th game is over in the first JAC game. The example shown in FIG. 3 indicates the state where, after the particular winning mode for shifting to a JAC game, composed of "plum," "plum," and "plum," was displayed in their stopped state in the 12th normal game in BB, the gaming state has shifted to the 3rd JAC game, and the 8th game is over in the 3rd JAC game, among which 8 winnings have been obtained.

Since a JAC game is over after 12 games are played or 8 winnings are attained, it can be seen that the JAC game will be over if 4 more games are played or 2 more winnings are attained in the case of FIG. 2, and that the entire big bonus has been consumed in the case of FIG. 3.

The display of the image display section is divided into three sections, i.e., left, center, and right sections. Information concerning normal games in BB is displayed in the left section, whether a normal game in BB or a JAC game is being played is indicated in the center section, and information concerning the JAC game is displayed in the right section.

In the left section, 30 frames are displayed. Each frame displays the number of games 401 on the upper part, a winning mode 402 on the middle part, and the number of paid-out game medals 403 and the total number of paid-out game medals 404 until the current game are displayed in the lower part.

The right section for displaying information concerning the JAC game is divided into three stages, i.e., upper, middle, and lower stages, each stage displaying the number of JAC games and 12 frames. Each frame displays the number of games 401 on the upper part, a winning mode 402 on the middle part, and the number of paid-out game medals 403 and the total number of paid-out game medals 404 until the current game are displayed in the lower part.

Figure 4:
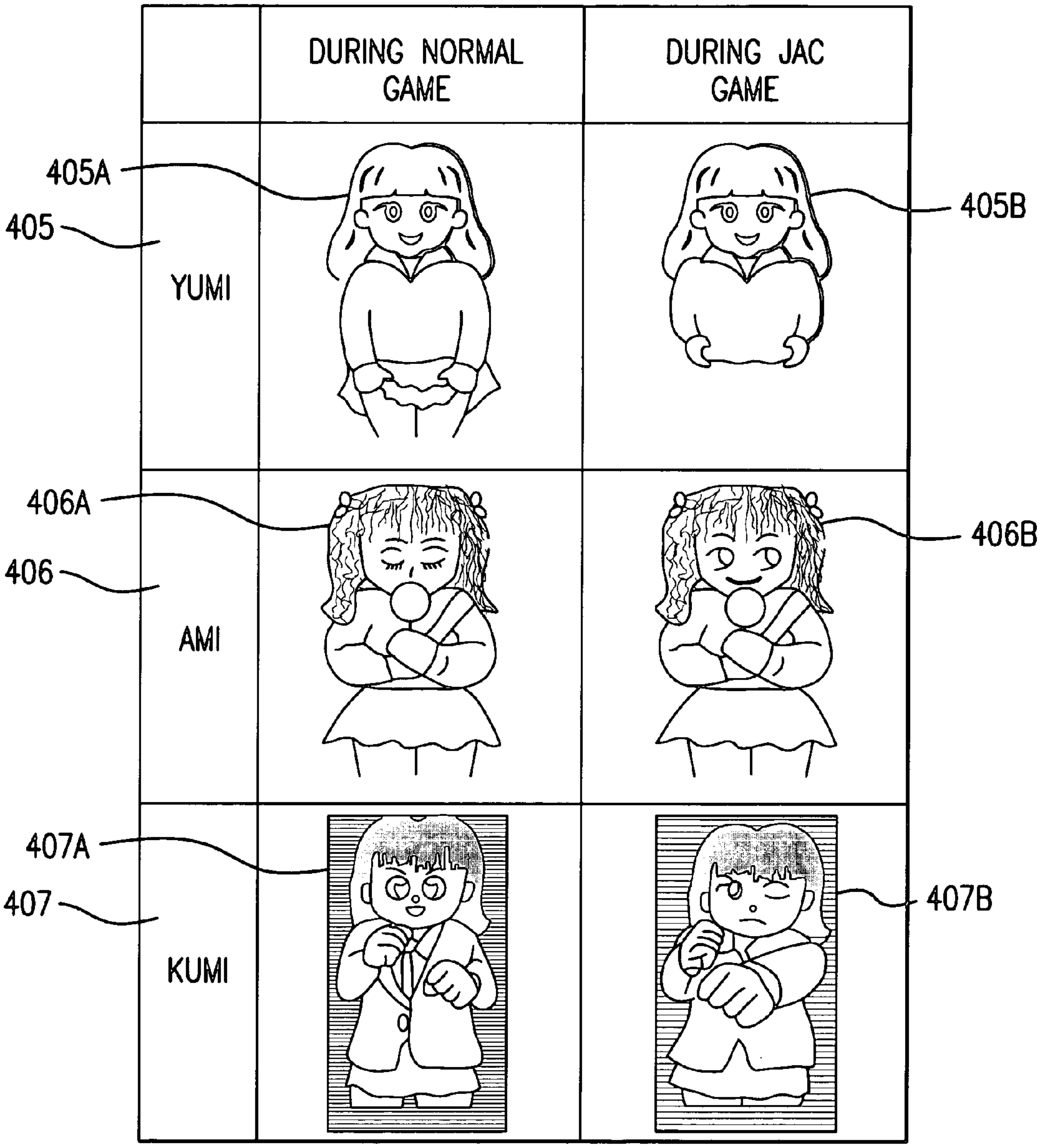
FIG. 4 is an explanatory view of special game information (gaming mode of a special game) displayed in the image display section.

As shown in FIG. 4, the center section for displaying information for distinguishing the normal game in BB and the JAC game from each other is divided into three stages, i.e., upper, middle, and lower stages, displaying respective female characters different from each other. These three female characters ("Yumi" 405, "Ami" 406, and "Kumi" 407) indicate the number of JAC games, and change their poses so as to indicate whether the normal game in BB or the JAC game is being played.

For example, during normal games before shifting to the first JAC game after the game state has shifted to a big bonus, "Yumi" 405A "during normal game in BB" is displayed; and, during the first JAC game, "Yumi" 405B in "during JAC game" is displayed. During normal games before shifting to the second JAC game after the first JAC game is over, "Ami" 406A "during normal game in BB" is displayed; and, during the second JAC game, "Ami" 406B in "during JAC game" is displayed. During normal games before shifting to the third JAC game after the second JAC game is over, "Kumi" 407A "during normal game in BB" is displayed; and, during the third JAC game, "Kumi" 407B in "during JAC game" is displayed.

Namely, each character indicates that a normal game in BB is being played when it takes the left-side pose 405A, 406A, 407A in FIG. 4, and that a JAC game is being played when it takes the right-side pose 405B, 406B, 407B in FIG. 4.

Further, as shown in FIG. 2, letters of "NORMAL GAME" displayed in the information concerning normal games in BB or letters of "JAC GAME" displayed in the information concerning JAC games are highlighted, so as to indicate whether a normal game in BB or a JAC game is being played.

In the example shown in FIG. 2, it can be seen, as to the information concerning normal games in BB, 2 game medals were paid out in the 1st game as a result of "cherry" being displayed on the left reel 5*a* in its stopped state; 10 game medals were paid out in the 2nd game as a result of "watermelon," "watermelon," and "watermelon" being displayed in their stopped state, whereby the total number of paid-out game medals became 12; 10 game medals were paid out in the 3rd game as a result of "watermelon," "watermelon," and "watermelon" being displayed in their stopped state, whereby the total number of paid-out game medals became 22; and 5 game medals were paid out in the 4th game as a result of "plum," "plum," and "plum" being displayed in their stopped state, whereby the total number of paid-out game medals has become 27.

As to the information concerning JAC games, since the letters of "JAC GAME" are highlighted, while "Yumi" 405 takes the right-side pose 405B in FIG. 4, it can be seen that the first JAC game is currently being played. Also, it can be seen that 15 game medals were paid out in the 1st game as a result of "plum," "plum," and "plum" being displayed in their stopped state; no winning mode was constructed in the 2nd game; 15 game medals were paid out in the 3rd game as a result of "plum," "plum," and "plum" being displayed in their stopped state, whereby the total number of paid-out game medals became 30; games successively progressed; and 15 game medals were paid out in the 8th game as a result of "plum," "plum," and "plum" being displayed in their stopped state, whereby the total number of paid-out game medals has become 90.

In the example shown in FIG. 3, it can be seen, as to the information concerning normal games in BB, 2 game medals were paid out in the 1st game as a result of "cherry" being displayed on the left reel 5*a* in its stopped state; 10 game medals were paid out in the 2nd game as a result of "watermelon," "watermelon," and "watermelon" being displayed in their stopped state, whereby the total number of paid-out game medals became 12; games successively progressed; and 5 game medals were paid out in the 12th game as a result of "plum," "plum," and "plum" being displayed in their stopped state, whereby the total number of paid-out game medals has become 63. Here, it can be seen that no winning mode was constructed in the 9th game, whereby no game medals were paid out.

As to the information concerning JAC games, since the letters of "JAC GAME" are highlighted, while "Kumi" 407 takes the right-side pose 407B in FIG. 4, it can be seen that the 3rd JAC game is currently being played. Also, it can be seen that the maximum winning number was attained in the 10th game in the 1st JAC game, the maximum winning number was attained in the 10th game in the 2nd JAC game, and the maximum winning number was attained in the 8th game in the 3rd JAC game.

In the example shown in FIG. 3, though "plum" is displayed in the second game in the first JAC game, the number of paid-out game medals is not displayed. It indicates that "plum," "plum," and "plum" were not displayed in their stopped state, although the result of sampling in the control unit was an internally won state, i.e., a winning mode was permitted to occur.

Also, the fact that the winning mode in the ninth normal game in BB is not displayed indicates that the result of sampling was losing, whereby it can be seen that there was no winning as a matter of course.

By recognizing such special game information, the player can exert a so-called "see-and-push" skill in normal games in BB so as to intentionally keep a particular winning mode for shifting to a JAC game from occurring, thereby playing normal games in BB as many as possible up to the maximum game number, whereby a larger number of game medals can be acquired. In the JAC game, on the other hand, a larger number of game medals can be acquired when the maximum number of (8) winnings are acquired before the maximum game number (12) is attained.

Also, in games in which no winning modes are generated, those in which winning modes are inevitably kept from being generated since no internal winnings are generated and those in which winning modes fail to occur due to problems in timings at which the player operates the stop switches 21*a* to 21*c* although an internal winning is generated can be distinguished from each other, whereby a finer winning history can be displayed.

The display in the image display section 13 is not restricted to those mentioned above, and it may be of any mode as long as the state of progress, winning history, gaming mode, and the like of big bonus can be indicated.

Also, the front face of the front door 2 may be provided with a bonus number display section constituted by a seven-segment indicator or the like so as to display the number of possible elections and the number of possible normal games, while the above-mentioned display in the image display section 13 is carried out, so as to notify the player of the state of progress and winning history of special games. Further, while the above-mentioned display by the image display section 13 is being effected, the mode of blinking of decorating lamps disposed in the decorating section 27 may be changed, so as to notify the player whether a normal game in BB or a JAC game is being played.

Game Medal Payout History

As mentioned above, when a predetermined winning mode is constructed in a normal game in BB or in a JAC game, then a predetermined number of game medals are paid out as a prize. The number of game medals acquired in a big bonus game is a matter of great importance to the player, and how much game medals have been acquired by other players in the same slot machine 1 is important reference information for the player to see the own gaming skill.

Therefore, as shown in FIG. 5, the above-mentioned slot machine 1 displays the payout history of game medals in the slot machine 1 in the image display section 13, thereby enhancing the fun of gaming.

Namely, in the example shown in FIG. 5, the number of game medals paid out to the current player in the slot machine 1, the ranking of game medals acquired in the current day, and the highest number of game medals acquired in the current day, thereby indicating the payout history of game medals in a big bonus.

In the example shown in FIG. 5, the information of the current player, the ranking information of the current day, and the top information of the current day are displayed for each of the items of the total number of acquired game medals, the total number of inserted game medals, the net number of acquired game medals, and the number of times when winning modes were failed to be constructed although the result of sampling permitted winning modes to occur in JAC games. Here, the total number of acquired game medals refers to the total number of game medals paid out as a prize in the big bonus game; the total number of inserted game medals refers to the total number of game medals subjected to gaming in the big bonus game; and the net number of acquired game medals is the number of game medals obtained by subtracting the total number of inserted game medals from the total number of acquired game medals.

Though expression “replay flag” is used in the column indicating the number of times when winning modes cannot be constructed although the result of sampling permits winning modes to occur in JAC games, it is because of the fact that the particular winning mode acting as the condition for generating a JAC game is the same as the replay winning mode of “plum,” “plum,” and “plum” in normal games. Thus, though the same flag is used, no replay is carried out.

In each of the total number of acquired game medals, the total number of inserted game medals, and the net number of acquired game medals, the number of acquired or inserted game medals in normal games in BB and the number of acquired or inserted game medals in JAC games are displayed separately. Similarly, in each of the ranking information of the current day and the top information of the current day, information in normal games in BB and information in JAC games are displayed separately.

For example, the example shown in FIG. 5 is displayed so as to correspond to the example shown in FIG. 3, from which it can be seen that the current player inserted 64 game medals to play games, and 423 game medals were resultantly paid out as a prize, and 359 game medals were acquired after the deduction. Also, it can be seen that, of the total number of 423 acquired game medals, 63 were paid out in normal games in BB, whereas 360 were paid out during JAC games. Further, it can be seen that there is one game in which particular winning modes were failed to be constructed although the result of sampling permitted particular winning modes to occur.

It can also be seen that, in the ranking of the current day, the player takes the eighth place in the total number of acquired game medals, the third place in the net number of acquired game medals, and the fourth place in the number of times when particular winning modes were failed to be constructed although the result of sampling permitted particular winning modes to occur.

It can also be seen that, in the top of the current day in big bonus games in the slot machine 1, the total number of acquired game medals is 455, the total number of inserted game medals is 75, the net number of acquired game medals is 380, and the number of times when particular winning modes were failed to be constructed although the result of sampling permitted particular winning modes to occur is 2.

The current player in this slot machine 1 is, for example, a player during the period from when a big bonus game is started as a combination of stopped symbols constitutes a special winning mode until the big bonus game is over, but may be determined according to other criteria.

The display in the image display section 13 is not restricted to those mentioned above, and it may be of any mode as long as the payout history of game medals in big bonus games can be indicated.

Also, the front face of the front door 2 may be provided with a payout number display section constituted by a seven-segment indicator or the like so as to display the number of paid-out game medals, while the above-mentioned display in the image display section 13 is carried out.

Maximum Permissible Bet Number

In a big bonus, which is a special game, as mentioned above, normal games in BB and JAC games can be played with their respective different maximum permissible bet numbers. Namely, in a normal game in BB, the maximum permissible bet number is set to 3, for example, whereby the game can be played while up to three game medals are inserted. In a JAC game, on the other hand, the number of maximum permissible bet number is set to 1, for example, whereby the game can be played with only one medal being inserted.

Therefore, as shown in FIG. 6, the above-mentioned slot machine 1 displays the maximum permissible bet number of the current game in the image display section 13, so as to call the player's attention thereto.

The example shown in FIG. 6 displays the number of permissible bet number in JAC games, so as to indicate that only so-called “one medal bet” is permitted during JAC games. Though not depicted, during normal games in a big bonus game, it is displayed that so-called "three medal bet" is permitted, so as to indicate that the maximum permissible bet number is 3.

In normal games in BB, as the number of inserted game medals increases, the number of effective winning lines increases accordingly, thus enhancing the probability of winning. For example, the winning probability for watermelon is 1/50 when two game medals are inserted, whereas it is 1/15 when three game medals are inserted. Hence, as the number of inserted game medals increases, the player can play games under conditions more advantageous thereto.

The display in the image display section 13 is not restricted to those mentioned above, and it may be of any mode as long as the maximum permissible bet number in big bonus games can be indicated.

Also, while the above-mentioned display in the image display section 13 is being displayed, the effective line indicator lamps 7*a* to 7*e* and the back lamps for illuminating the individual reels 5*a* to 5*c* from inside may be lit according to the number of inserted game medals, so that the player can recognize the maximum permissible bet number.

Ending of Special Game

As mentioned above, in a big bonus, which is a special game, normal games in BB can be played up to 30 times, which constitute the maximum number of games; and, when a particular winning mode for shifting to a JAC game is attained during the normal games in BB, then JAC games can be played up to 3 times. In a JAC game, on the other hand, if 12 games, which constitute the maximum game number, are played or 8 winnings, which constitute the maximum winning number, are attained, then the JAC game is over. When 30 normal games in BB are played or 3 JAC games are played, then the big bonus game is over.

Figure 7A:
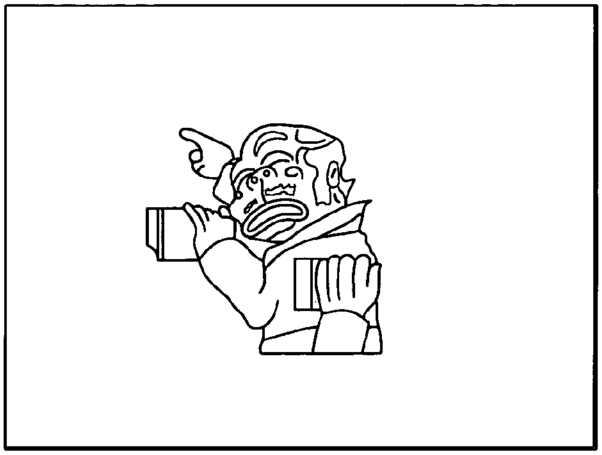
FIGS. 7A to 7C are explanatory views of special game information (ending of a special game) displayed in the image display section.
Figure 7B:
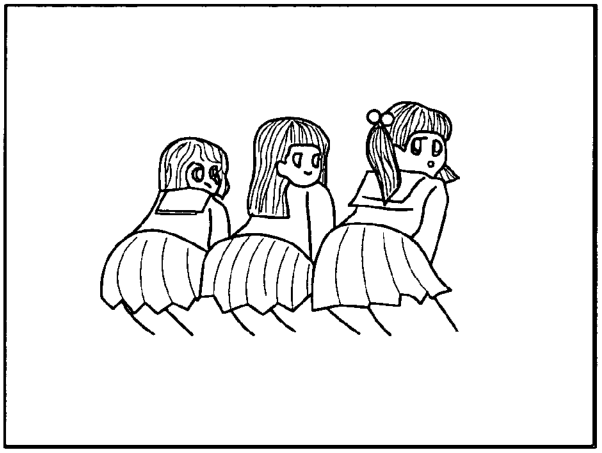
Figure 7C:
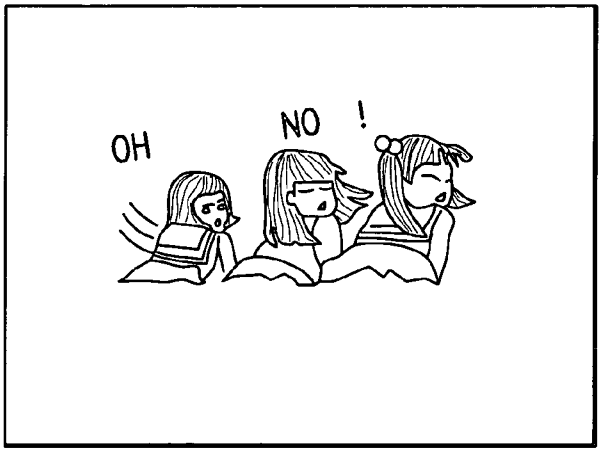

If any of the above-mentioned ending conditions is satisfied in a big bonus game, then a display for indicating the ending of the big bonus game is effected in the image display section 13 as shown in FIGS. 7A to 7C.

Namely, the example shown in FIGS. 7A to 7C displays characters and messages so as to indicate the ending of the big bonus, such that a male character (FIG. 7A) and a set of three female characters (FIG. 7B) are successively displayed, and then letters of "END" are displayed together with the three female characters (FIG. 7C), so as to indicate that the big bonus game is over.

The display in the image display section 13 is not restricted to those mentioned above, and it may be of any mode as long as the ending of the big bonus game can be indicated.

Also, while the above-mentioned display in the image display section 13 is being displayed, sound effects for indicating the ending of the big bonus may be generated from the speakers 25, so as to indicate that the big bonus game is over.

Display in Normal Game

Though the above-mentioned embodiment explains the display in each game information in the image display section 13 in the case where special games are being played, each of the above-mentioned special game information items may be displayed while normal games (including normal games in BB) are being displayed.

Figure 8:
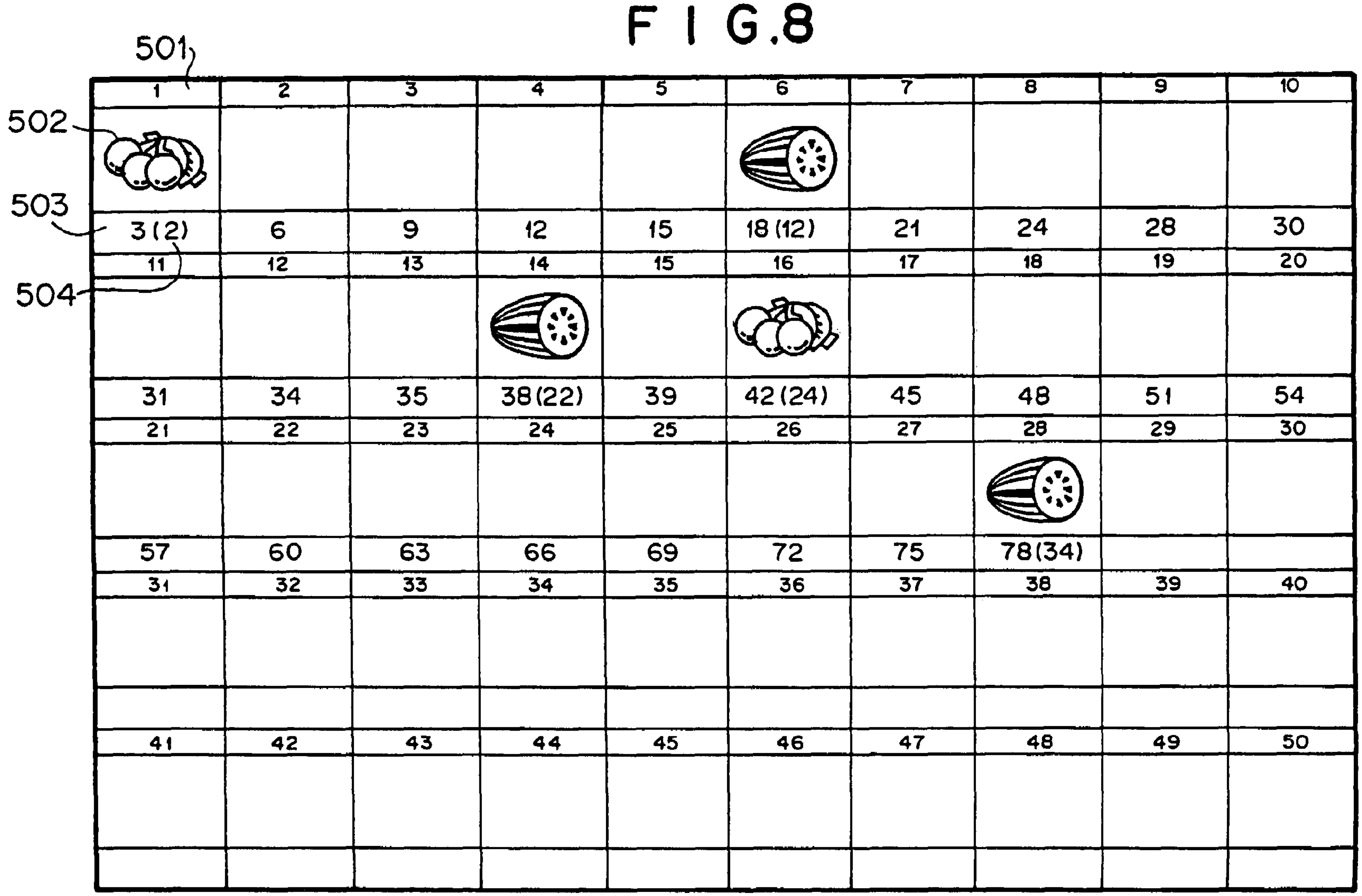
FIG. 8 is an explanatory view of special game information (winning history and history of provision of value information in a normal game) displayed in the image display section.
Figure 9:
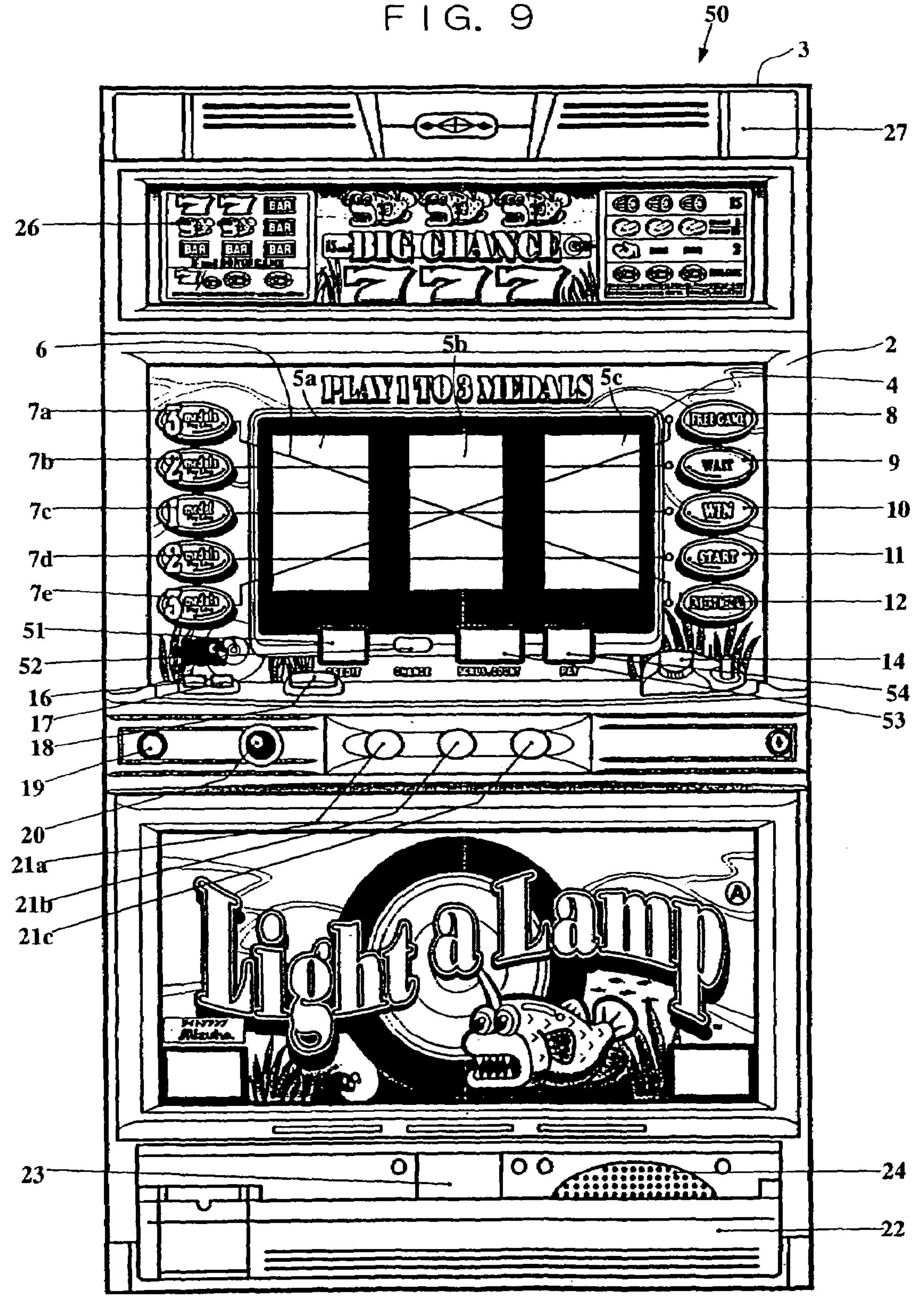
FIG. 9 is a front view of a conventional slot machine.

Also, in the image display section, the payout history of game medals and winning history in normal games other than those in big bonus games may be displayed as shown in FIG. 8.

In the example shown in FIG. 8, 50 frames are displayed in the image display section 13. Each of the frames displays the number of games 501 in the upper part, the winning mode 502 in the middle part, and the total number of inserted game medals 503 and the total number of paid-out game medals 504 in the lower part.

Namely, in the example shown in FIG. 8, it can be seen that, in the 1st game, 3 game medals were inserted, "cherry" was displayed on the left reel 5*a* in its stopped state, and 2 game medals were paid out; in each of the 2nd to 5th games, 3 game medals were inserted but no winning was attained; in the 6th game, 3 game medals were inserted, so that the total number of inserted game medals became 18, "watermelon," "watermelon," and "watermelon" were displayed in their stopped state, and 10 game medals were paid out, so that the total number of paid-out game medals became 12; games successively progressed; and, in the 28th game, 3 game medals were inserted, so that the total number of inserted game medals became 78, "watermelon," "watermelon," and "watermelon" were displayed in their stopped state, and 10 game medals were paid out, so that the total number of paid-out game medals has become 34.

The front face of the front door 2 may be provided with a payout number display section constituted by a seven-segment indicator or the like so as to display the number of paid-out game medals, while the above-mentioned display in the image display section 13 is carried out.

Indicating Section

While each game information is displayed by the image display section 13 as mentioned above, an indicating section for indicating related special game information relating to the special game information displayed in the image display section 13 may be provided, so as to indicate the related special game information.

This indicating section is constituted, for example, by the effective line indicator lamps 7*a* to 7*e*, the speakers 25, a plurality of lamps disposed in the decorating section 27, and the like. Also, though not depicted, back lamps for illuminating the respective reels 5*a* to 5*c* from inside, the bonus number display section, the payout number display section, and the like may constitute the indicating section as well. Further, another indicating section constituted by a seven-segment indicator, a dot-matrix indicator, a decorating lamp, an LED, or the like may be provided.

Any one of these indicating sections or a combination of a plurality of indicating sections may indicate the related game information. Also, one indicating section may indicate a plurality of related game information items.

Further, the indicating section may indicate the game medal payout history and winning history in normal games as well.

Regular Bonus

Though the above-mentioned embodiment explains the big bonus as an example of special games, each of the above-mentioned special game information items can be displayed similarly in regular bonus games as well.

Slot Machine of Another Embodiment

Figure 10:
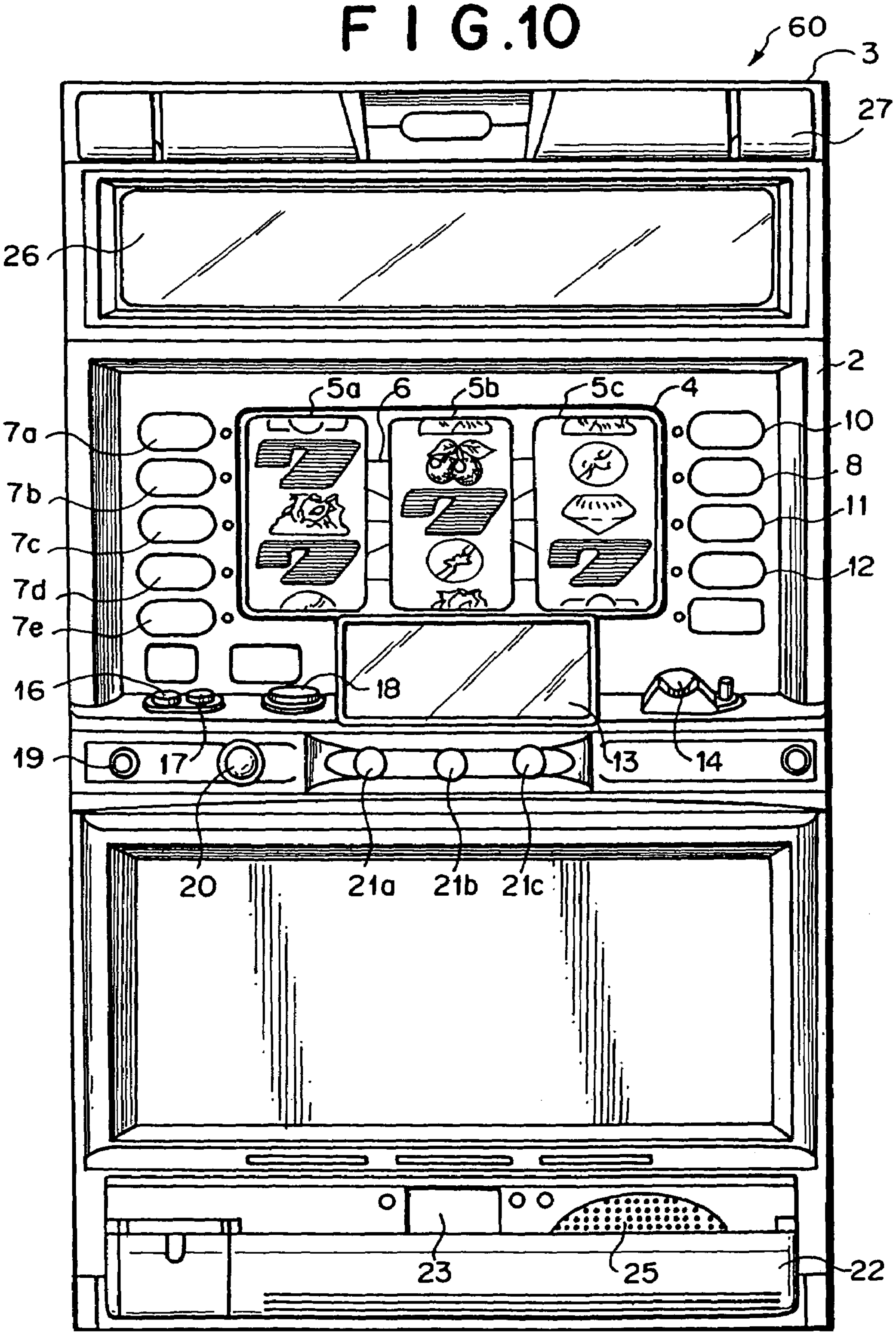
FIG. 10 is a front view of a slot machine in accordance with another embodiment of the present invention.

A slot machine 60 in accordance with another embodiment will now be explained. FIG. 10 is a front view of the slot machine in accordance with this embodiment.

As shown in FIG. 10, this slot machine 60 has a configuration substantially similar to that of the above-mentioned slot machine 1, and the front face of its housing 3 is provided with an image display section 13 made of a liquid crystal display device for displaying game information.

In FIG. 10, members having functions similar to those of the above-mentioned slot machine 1 will be referred to with numerals or letters identical to the latter, without repeating their detailed explanations.

In the slot machine 60, symbols such as "cherry," "diamond," "ball," "dragon," "EXTRA," white "7," red "7," and the like are displayed on each of reels 5*a* to 5*c*; and, a combination of these symbols constitutes a winning mode or special winning mode.

Control Unit

Gaming operations in the slot machine 60 is controlled by a control unit.

This control unit will be explained with reference to FIGS. 11 and 12.

Figure 11:
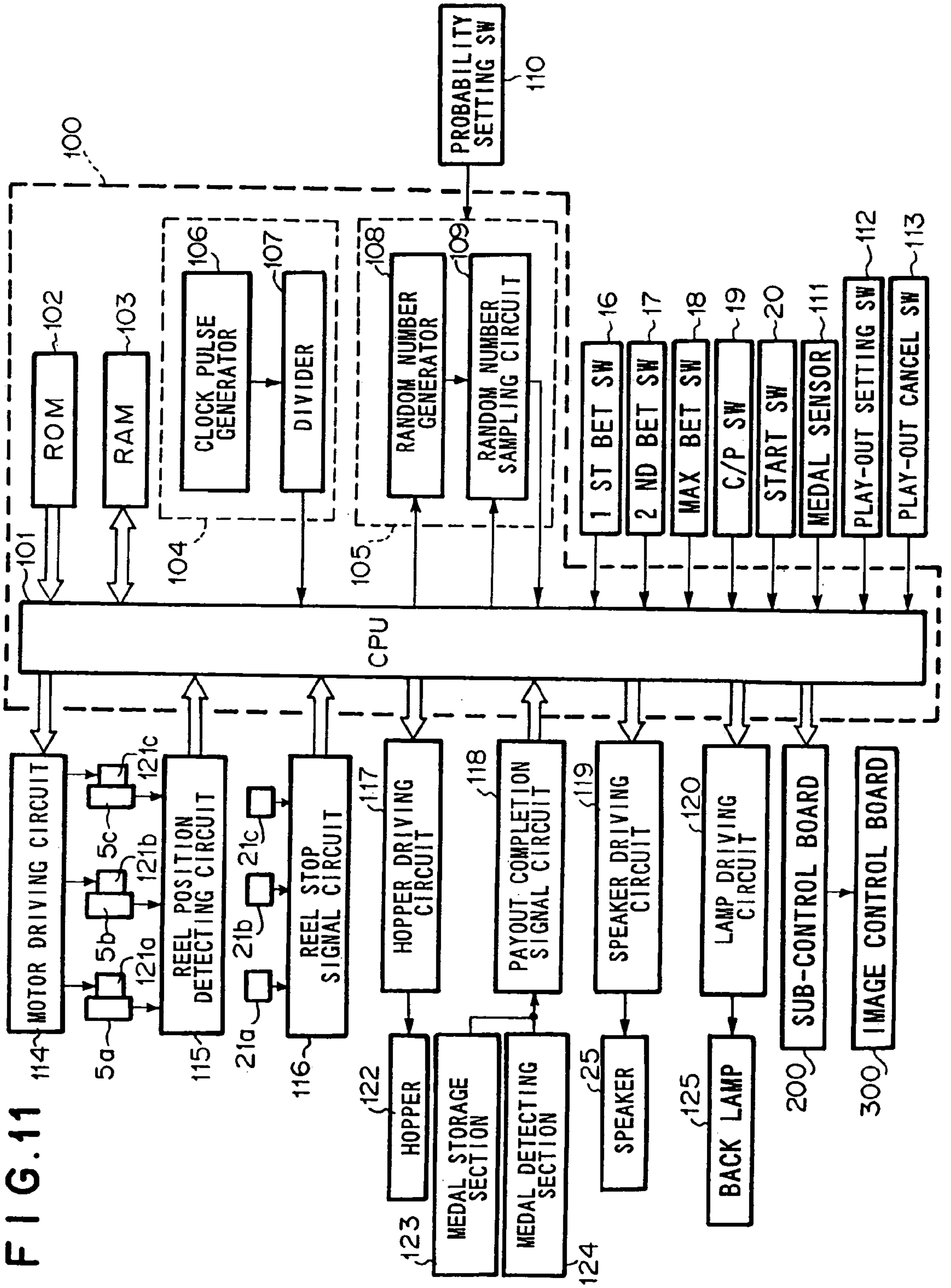
FIG. 11 is a schematic block diagram of the control unit (main control board) of the slot machine shown in FIG. 10.
Figure 12:
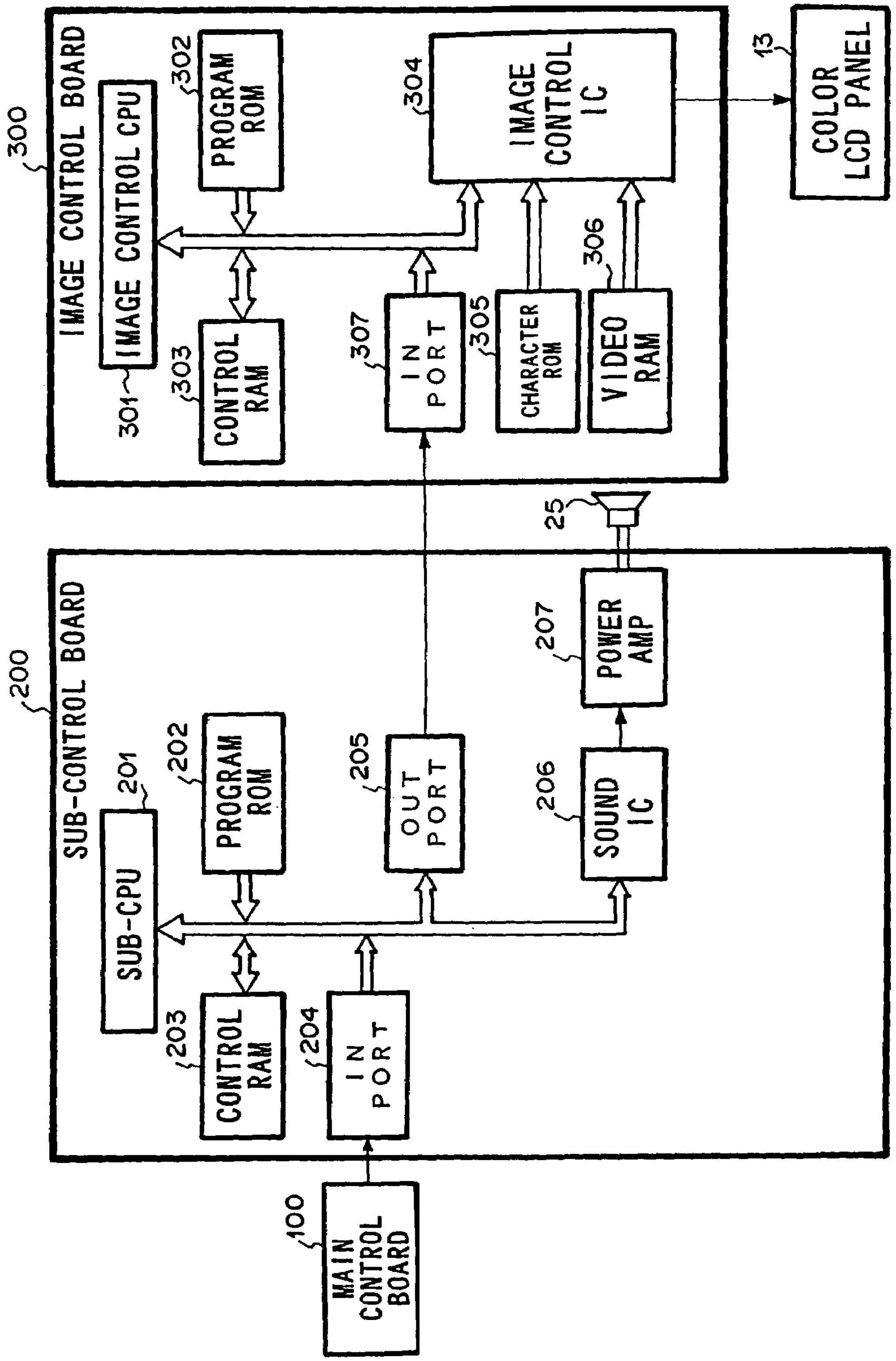
FIG. 12 is a schematic block diagram of the control unit (sub-control board and image control board) of the slot machine shown in FIG. 10.

As shown in FIGS. 11 and 12, the control unit comprises a main control board 100, a sub-control board 200, and an image control board 300.

As shown in FIG. 11, the main control board 100 is a board for carrying out the main control of gaming operations in the slot machine; and comprises a CPU 101, a ROM 102, a RAM 103, a clock circuit 104 for generating an operating clock signal for the CPU 101, and a probability setting section 105 for setting the probability of election of big bonus and the like.

The ROM 102 stores therein not only the procedure of processing in games of the slot machine 60 as a sequence program but also data such as a winning probability table for determining the probability of sampling, internally elected hands, a stop control table for controlling the reels 5*a* to 5*c* to stop according to the state of gaming, and the like. As the CPU 101 and the like operate according to the sequence program, games in the slot machine 60 are controlled.

The clock circuit 104 comprises a clock pulse generator 106 for generating a reference clock at a predetermined frequency, and a divider 107 for generating an operating clock signal for the CPU 101 by dividing the reference clock signal.

The probability setting section 105 comprises a random number generator 108 for generating random numbers within a predetermined range under the control of the CPU 101, and a random number sampling circuit 109 for extracting a given random number from the random numbers generated in the random number generator 108 and transmitting thus extracted random number to the CPU 101. Also, a setting switch 110 for setting the probability of occurrence of big bonus is connected to the probability setting section 105.

The probability setting section 105 generates random numbers used for normal games, big bonus, and the like. In a specific process, the random number value extracted at the instant when the start switch 20 is operated and the winning probability table stored in the ROM 102 are compared with each other, and whether there is an internal election or not, i.e., whether there is an internally elected hand or not, and the winning hand are determined according to the result of comparison. Internally elected bonus hands, which are the results of internal election of big bonus or regular bonus, can be transferred to the next and later games, whereas small hands and internally elected replay hands are only valid in the game in which they are internally elected.

Connected to a plurality of I/O ports provided with the CPU 101 are the first bet switch 16, the second bet switch 17, the max bet switch 18, the C/P switch 19, the start switch 20, a medal sensor 111 for detecting game medals inserted from the medal insertion slot 14 or collective medal insertion slot 15, a play-out setting switch 112 for selecting whether to effect a play-out process or not, a play-out cancel switch 113 for canceling the play-out state, a motor driving circuit 114, a reel position detecting circuit 115, a reel stop signal circuit 116, a hopper driving circuit 117, a payout completion signal circuit 118, a speaker driving circuit 119, and a lamp driving circuit 120.

In the following, the individual circuits mentioned above will be explained in detail.

Connected to the motor driving circuit 114 are stepping motors 121*a* to 121*c* for driving the respective reels 5*a* to 5*c* to rotate. As driving pulses are supplied or stopped being supplied to the individual stepping motors 121*a* to 121*c* under the control of the CPU 101, the respective reels 5*a* to 5*c* are caused to start or stop rotating.

The reel position detecting circuit 115 is provided with a position detecting sensor (not depicted) comprising an optical sensor or the like for detecting the rotating position of each of the reels 5*a* to 5*c*, so that the position detection signals concerning the reels 5*a* to 5*c* detected by the position detecting sensor are transmitted to the CPU 101.

Connected to the reel stop signal circuit 116 are stop switches 21*a* to 21*c*. As the player operates the stop switches 21*a* to 21*c*, the operation is detected, and the resulting stop switch detection signal is transmitted to the CPU 101. In a specific control operation, after the individual reels 5*a* to 5*c* attain a constant-speed rotation after the start switch 20 was operated, operations of the respective stop switches 21*a* to 21*c* are permitted. When each of the stop switches 21*a* to 21*c* is pressed, seven frames in total extending to the fourth frame from the shortest stoppable position are inspected according to the stop switch detection signal, the position detection signal, and the stop control table stored in the ROM 102. If there exists a symbol corresponding to the internally elected hand, the individual reels 5*a* to 5*c* are stopped so as to carry out a draw-in control operation such that this symbol aligns on the effective winning line, while carrying out a kick control operation so as not to establish any other winning hands which are not internally elected. In the case of losing in which there is no internally elected hand, the individual reels 5*a* to 5*c* are stopped such that no internally elected hand is established. Also, in a game in an internally elected bonus game to which the internally elected bonus hand has been transferred, internally elected hands other than the internally elected bonus hand are sampled; and, if a small hand or replay is internally elected, then a draw-in control operation is carried out so as to preferentially attain the small hand or replay.

Connected to the hopper driving circuit 117 is a hopper 122 for storing game medals.

Connected to the payout completion signal circuit 118 are a medal storage section 123 and a medal detecting section 124. The medal storage section 123 is a section for storing the game medals inserted from the medal insertion slot 14 or collective medal insertion slot 15 or the game medals to be paid out as a prize, and is adapted to store the game medals until they reach a predetermined maximum permissible storage number. The maximum permissible storage number is 50, for example, so that up to 50 game medals are stored, whereas the 51st and later game medals are actually paid out from the hopper 122 to the medal tray 22. The actually paid-out medals are counted by the medal detecting section 124 at the time when being paid out from the hopper 122 to the medal tray 22. In the operation of paying out game medals at the time of winning, if the sum value stored in the medal storage section 123 in an adding fashion or the counted value in the medal detecting section 124 reaches a predetermined payout number, then a payout completion signal is transmitted from the payout completion signal circuit 118 to the CPU 101.

Connected to the lamp driving circuit 120 are back lamps 125 for illuminating from inside the reels 5*a* to 5*c* in a transmitting manner the symbols seen through the display window 4. Three back lamps 125 in a vertical row are provided for each of the reels 5*a* to 5*c*, whereby nine back lamps 125 in total illuminate the reels 5*a* to 5*c* from inside in a transmitting manner.

The sub-control board 200 and the image control board 300 are mainly used for controlling the image display section 13; and, while receiving a signal from the main control board 100 so as to generate sound effects and the like out of the speaker 25, carry out image display operations in the image display section 13.

As shown in FIG. 12, the sub-control board 200 is mounted with a sub-CPU 201, a program ROM 202, and a control RAM 203; and receives a signal from the main control board 100 at the sub-CPU 201 by way of an IN port 204. Further, according to the data received from the main control board 100, selection tables stored in the program ROM 202, and the like, the sub-CPU 201 determines various attraction images for an attraction image selecting process, an appearing symbol attraction selecting process, and the like which will be explained later, and sends out a signal to the image control board 300 by way of an OUT port 205. Also, the sub-control board 200 is mounted with a sound IC 206, whereby sound effects and the like are generated from the speaker 25 by way of a power amplifier 207.

As shown in FIG. 12, the image control board 300 is mounted with an image control CPU 301, a program ROM 302, a control RAM 303, an image control IC 304, a character ROM 305, and a video RAM 306. The image control board 300 receives a signal from the sub-control board 200 by way of an IN port 307, and transmits a driving signal to the image control IC 304. Under the control of the image control CPU 301, the image control IC 304 receives signal inputs from the character ROM 305 and video RAM 306, and controls the image display section 13 (e.g., color liquid crystal panel), thereby effecting image displays.

Indication of Game Information

Another embodiment of game information displayed by the image display section 13 during gaming of the above-mentioned slot machine 60 will now specifically be explained with reference to drawings.

Figure 13:
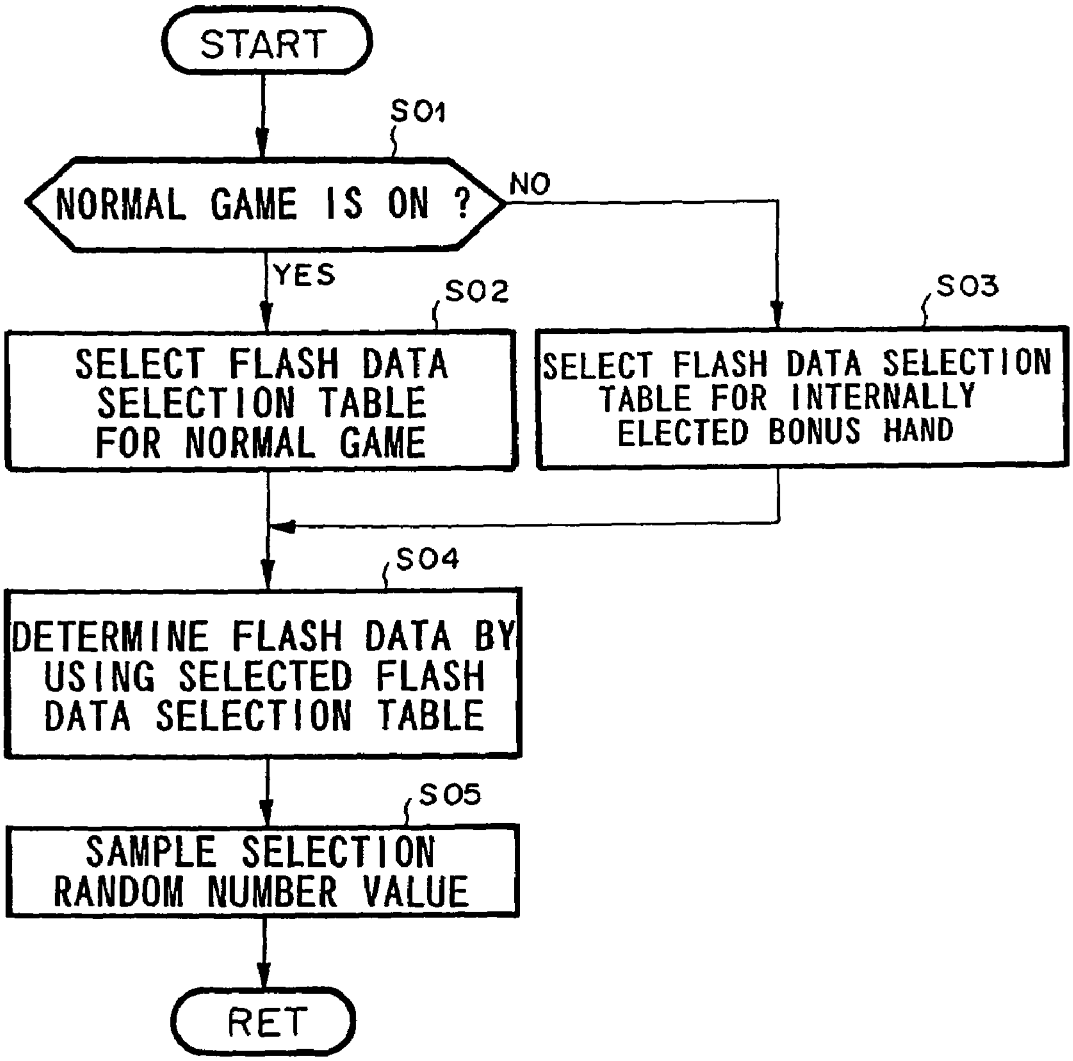
FIG. 13 is a flowchart showing a procedure of selecting flash data and a selection random number value to be transmitted to the sub-control board.

FIG. 13 is a flowchart showing a procedure of selecting flash data and a selection random number value to be transmitted to the sub-control board 200. Here, flash data refers to data for determining combinations between a pattern for blinking the back lamps 125, the sound effects generated from the speaker 25, and whether or not to light a definition lamp for notifying the player of the fact that a bonus hand (BB or RB) is internally elected, in order to foretell the player, under a predetermined condition, which winning hand is internally elected now.

As shown in FIG. 13, the main control board 100 determines whether a normal game is being played or not (S01). If the normal game is being played, i.e., no internally elected hand for permitting a special winning mode to occur is established, then a flash data table for normal game is selected (S02). If the normal game is not being played, i.e., if a big bonus, a regular bonus, or the like is internally elected, on the other hand, then a flash data table for internally elected bonus hand is selected (S03). Further, thus selected flash data table is used, so as to determine flash data to be transmitted to the sub-control board 200 according to the internally elected hand (S04). Finally, a flash data selecting random number value to be transmitted to the sub-control board 200 together with thus determined flash data is sampled (S05).

With reference to FIG. 43, the flash data selection table and flash data selecting random number value will now be explained.

As shown in FIG. 43, the flash data selection table comprises two kinds of tables, i.e., a flash data selection table for normal game and a flash data selection table for internally elected bonus.

In the flash data selection table for normal game, any of "0" to "5" in the flash data selection table corresponds to each of seven patterns of internally elected hands constituted by "miss," "group 1 (group election of "DB" or "cherry"), "DG," "diamond," "replay," "RB," and "BB." In the flash data selection table for internally elected bonus hand, any of "6" to "9" in the flash data selection table corresponds to each of five patterns of internally elected hands constituted by "miss," "DB," "DG," "diamond," and "replay."

The flash data selecting random number value is selected from 256 random number values from 0 to 255.

Here, "miss" refers to the case where no winning hands are internally elected, i.e., no winning hands are permitted to occur; "group 1 (group election of "DB (dragon break)" or "cherry")" refers to the case where the winning hand composed of "dragon," "dragon," and "EXTRA," or the winning hand of "cherry" is internally elected, i.e., the case where the winning mode in which symbols of "dragon," "dragon," and "EXTRA" are displayed in their stopped state is permitted to occur, or the winning mode in which "cherry" is stopped at any of the upper, center, and lower stages of the left reel is permitted to occur; "DG (dragon)" refers to the case where the winning hand composed of "dragon," "dragon," and "dragon" is internally elected, i.e., the case where the winning mode in which symbols of "dragon," "dragon," and "dragon" are displayed in their stopped state is permitted to occur; "diamond" refers to the case where the winning hand composed of "diamond," "diamond," and "diamond" is internally elected, i.e., the case where the winning mode in which symbols of "diamond," "diamond," and "diamond" are displayed in their stopped state is permitted to occur; "replay" refers to the case where the winning hand composed of "ball," "ball," and "ball" is internally elected, i.e., the case where the winning mode in which symbols of "ball," "ball," and "ball" are displayed in their stopped state is permitted to occur; "RB" refers to the case where the winning hand composed of "EXTRA," "EXTRA," and "EXTRA" is internally elected; "EXTRA" refers to the case in which a regular bonus winning mode in which symbols of "EXTRA," "EXTRA," and "EXTRA" are displayed in their stopped state is permitted to occur; and "BB" refers to the state where the winning hand composed of "red 7," "red 7," and "red 7" or the winning hand composed of "white 7," "white 7," and "white 7" is internally elected, i.e., a big bonus winning mode in which symbols of "red 7," "red 7," and "red 7" or symbols of "white 7," "white 7," and "white 7" are displayed in their stopped mode is permitted to occur.

Here, the reel blinking pattern refers to a pattern by which nine in total of the back lamps 125 arranged in a vertical row of three within each reel are turned on/off or blinked.

With reference to FIGS. 23 to 26, relationships between flash data tables/selection random number values and reel blinking patterns/attraction sounds (game-starting sounds) will now be explained.

As shown in FIGS. 23 to 26, flash data are classified into 10 kinds of flash data tables from "0" to "9." Each flash data table is selected according to the state of gaming and internally elected hand in the slot machine 60. More specifically, the flash data table "9" is selected when "diamond" occurring during internal election of a big bonus (BB) or regular bonus (RB) is internally elected; the flash data table “0” is selected when a miss is elected (no winning hands are elected) in a normal game; the flash data table “1” is selected when group 1 is internally elected in a normal game; the flash data “2” is selected when “dragon” is internally elected in a normal game; the flash data “3” is selected when “diamond” is internally elected in a normal game; the flash data “4” is selected when a replay is internally elected in a normal game; the flash data “5” is selected when a big bonus (BB) or regular bonus (RB) is internally elected in a normal game; the flash data table “6” is selected when a miss is internally elected (no winning hands are elected) during internal election of a big bonus (BB) or regular bonus (RB); the flash data table “7” is selected when group 1 is internally elected during internal election of a big bonus (BB) or regular bonus (RB); and the flash data table “8” is selected when “dragon” or “replay” is internally elected during internal election of a big bonus (BB) or regular bonus (RB).

Further, from thus selected flash data table, each flash data selects, according to the flash data selecting random number value, a combination of whether there is a winning definition data or not (whether the definition lamp is lit or not), one of two kinds of game-starting sounds constituted by “game-starting sound 1” and game starting sound 2,” and one of nine kinds of reel blinking patters constituted by “1” to “8” and “no blinking.” Here, the definition data is data concerning whether to definitely display that a bonus hand is internally elected (i.e., the bonus hand is always internally elected if this display is effected) or not. In addition, there are various modes of indicating the internal election. For example, without directly indicating the internally elected hand, even when a big bonus is internally elected, it may be kept from being indicated (the internal election may be indicated at a predetermined probability). Conversely, even when no big bonus is internally elected, an indication pattern emerging when a big bonus is internally elected may be executed (the internal election may be indicated at a predetermined reliability). Alternatively, a plurality of internal elections may be provided with a common indication pattern.

In a specific example, as shown in FIG. 23, in the flash data table “9,” when the flash data selecting random number is 25, “no” for the winning definition data, “game-starting sound 1,” and reel blinking pattern “4” are selected. In the flash data table “0,” when the flash data selecting random number is 225, “no” for the winning definition data, “game-starting sound 1,” and “no” for the reel blinking pattern are selected.

Here, the game-starting sound refers to sound effects generated from the speaker at the time when a game is started. In this embodiment, there are two kinds of different game-starting sound, i.e., game-starting sound 1 and game-starting sound 2.

The above-mentioned reel blinking patterns will now be explained with reference to FIGS. 27 to 34.

Figure 34:
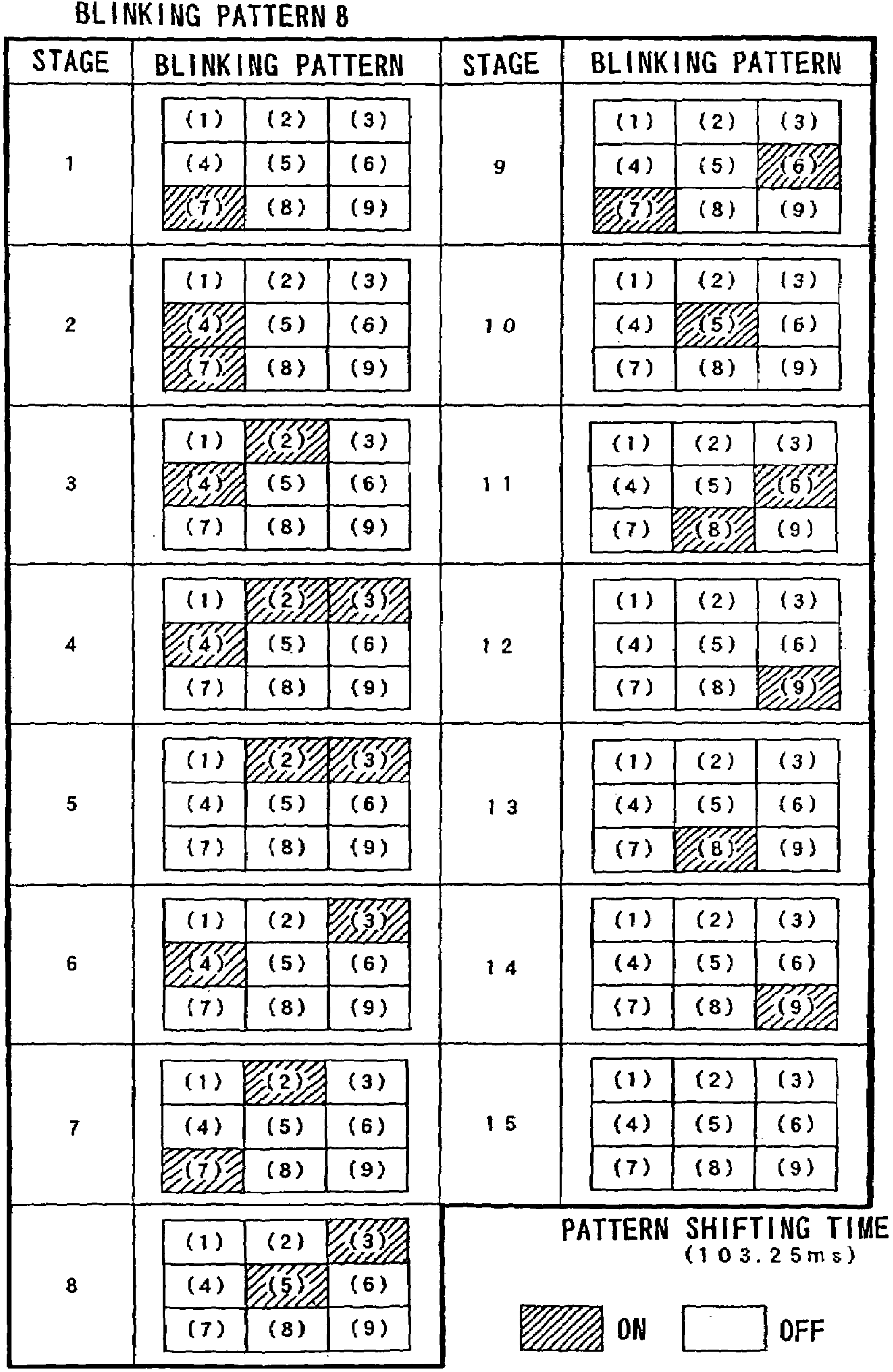
FIG. 34 is an explanatory chart of reel blinking pattern (8)

As shown in FIGS. 27 to 34, all the back lamps 125 are turned off during a period of 103.25 ms in the reel blinking pattern “1” (FIG. 27); the back lamps 125 are blinked such that 11 kinds of blinking patterns are successively repeated with a shifting time of 150.18 ms in the reel blinking pattern “2” (FIG. 28); the back lamps 125 are blinked such that 11 kinds of blinking patterns are successively repeated with a shifting time of 75.09 ms in the reel blinking pattern “3” (FIG. 29); the back lamps 125 are blinked such that 9 kinds of blinking patterns are successively repeated with a shifting time of 150.18 ms in the reel blinking pattern “4” (FIG. 30); the back lamps 125 are blinked such that 9 kinds of blinking patterns are successively repeated with a shifting time of 103.25 ms in the reel blinking pattern “5” (FIG. 31); the back lamps 125 are blinked such that 15 kinds of blinking patterns are successively repeated with a shifting time of 150.18 ms in the reel blinking pattern “6” (FIG. 32); the back lamps 125 are blinked such that 15 kinds of blinking patterns are successively repeated with a shifting time of 75.09 ms in the reel blinking pattern “7” (FIG. 33); and the back lamps 125 are blinked such that 15 kinds of blinking patterns are successively repeated with a shifting time of 103.25 ms in the reel blinking pattern “8” (FIG. 34). In addition, there is “no blinking” pattern in which no back lamps 125 are blinked, i.e., their lit state is kept.

With reference to FIG. 44, transmission commands transmitted from the main control board 100 to the sub-control board 200 will now be explained.

As shown in FIG. 44, there are eight kinds of transmission commands transmitted from the main control board 100 to the sub-control board 200, which are constituted by a command concerning the state of gaming, a command concerning internally elected hands, a command concerning the game-starting sound, a command concerning the all stop flash pattern, a command concerning definition data, a random number value for selecting a ready-state attraction, random number values (left, right, and center) for selecting appearing symbol attractions, and a random number value for selecting a single character attraction.

The command concerning the state of gaming indicates whether the state is during a normal game, during a normal game in a big bonus (BB), during internal election of a regular bonus (RB), during internal election of a big bonus (BB), or during the action of a regular bonus (RB).

The command concerning internally elected hands indicates any of the internally elected hands of “miss,” “group 1 (“cherry” or “dragon break” (DB: =“dragon,” “dragon,” and “EXTRA”)),” “diamond,” “regular bonus (RB),” “big bonus (BB),” and “replay.”

The command concerning the game-starting sound indicates whether the sound effects generated from the speaker 25 at the time of starting a game is game-starting sound 1 or game-starting sound 2.

The command concerning the all stop flash pattern indicates that the blinking pattern of the back lamps 125 effected when all the reels are stopped is any of nine patterns comprising the patterns from “1” to “8” and no blinking pattern (“0”).

The command concerning definition data indicates whether to turn on or off the definition lamp for notifying the player of the fact that BB or RB is internally elected (“1” when turning on, and “0” when turning off).

The random number value for selecting a ready-state attraction, random number values (left, right, and center) for selecting appearing symbol attractions, and random value for selecting a single character attraction are random numbers to be used for selecting the ready-state attraction, selecting appearing symbol attractions, and selecting a single character attraction, which will be explained later in detail, each being selected from 65536 random number values from 0 to 65535.

The procedure of display control of game information in the sub-control board 200 will now be explained with reference to FIGS. 14 to 21.

Figure 14:
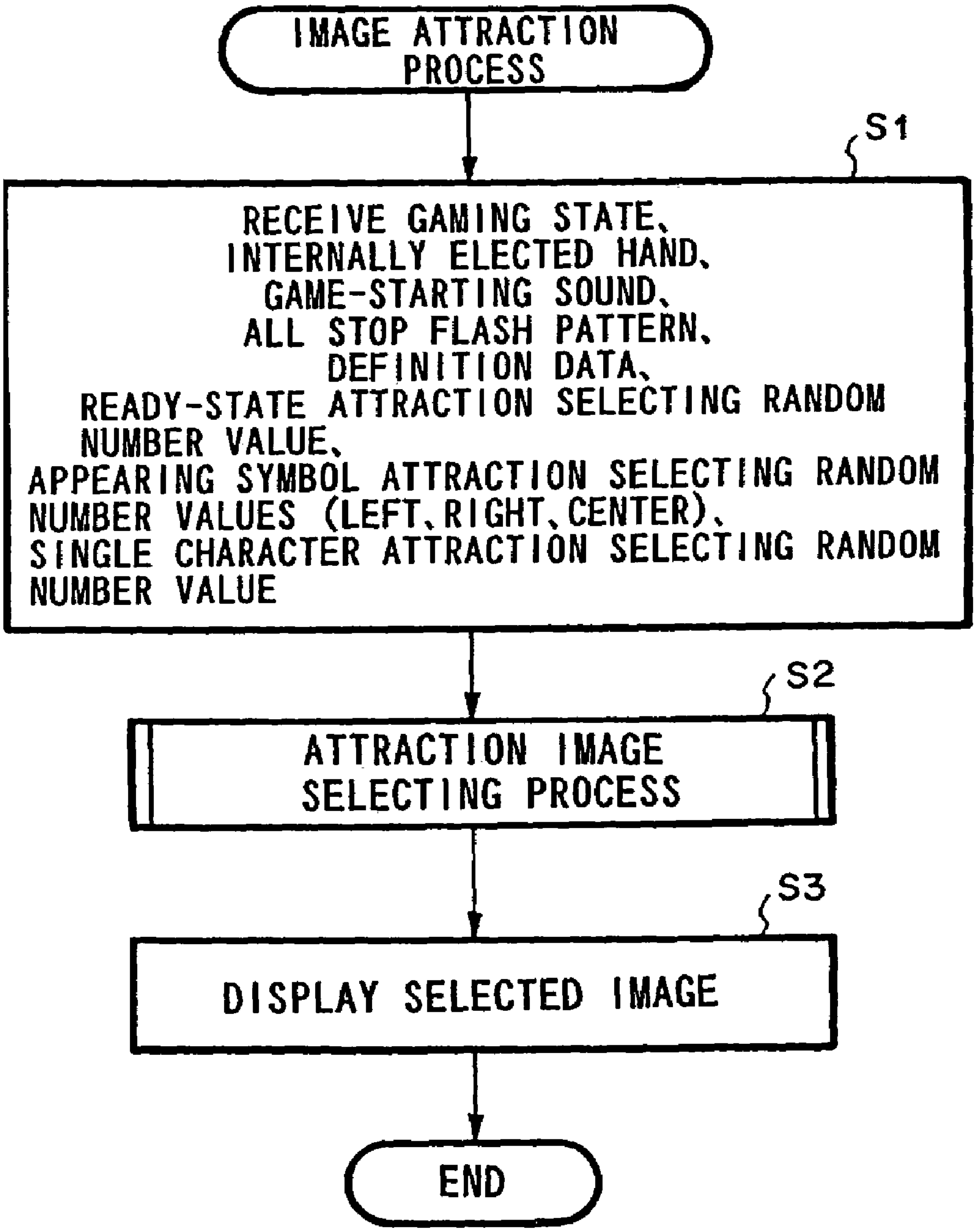
FIG. 14 is a flowchart showing a procedure of an image attraction process.

As shown in FIG. 14, the image attraction process in the image display section 13 is carried out in the sub-control board 200. First, in this image attraction process, the commands concerning the gaming state, internally elected hands, game-starting sound, all stop flash pattern, definition data, ready-state attraction selecting random number, appearing symbol attraction selecting random numbers (left, right, and center), and single character attraction selecting random number value are received (S1), an attraction image selecting process (S2) for selecting an attraction image is carried out, and the selected image is displayed in the image display section 13 (S3).

The attraction image selecting process (S2) is a process for selecting whether to carry out a ready-state attraction or not, and determining which mode of attraction is to be carried out.

Figure 15:
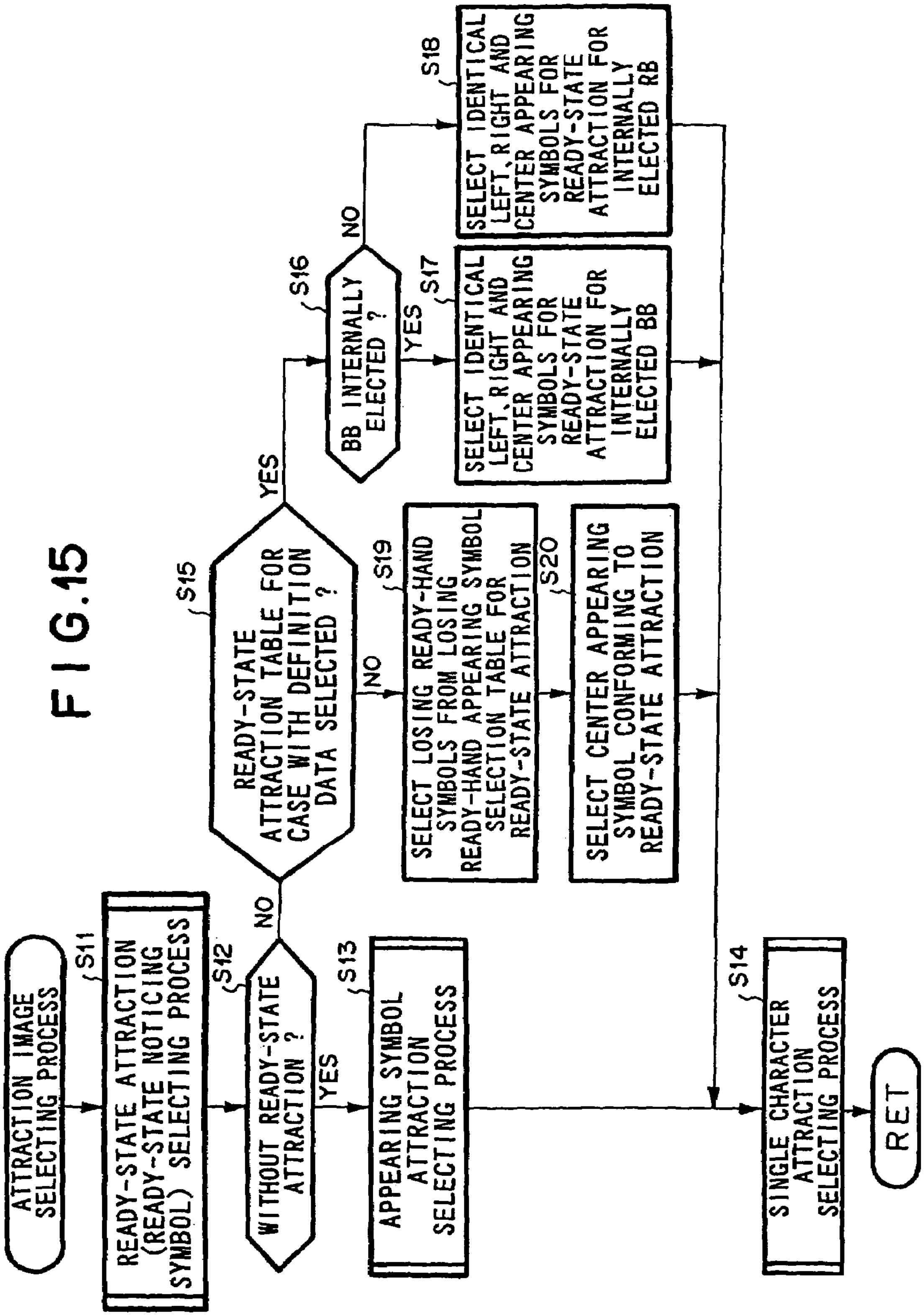
FIG. 15 is a flowchart showing a procedure of an attraction image selecting process.

Namely, in the attraction image selecting process (S2), as shown in FIG. 15, a ready-state attraction (ready-state attraction noticing symbol) selecting process is initially carried out (S11). Then, it is determined whether to carry out a ready-state attraction or not (S12). If no ready-state attraction is carried out, then an appearing symbol attraction selecting process (S13) is to be carried out, and a single character attraction selecting process (S14) is further carried out.

If the ready-state attraction is to be carried out, on the other hand, it is further determined whether a ready-state attraction data selection table for the case where with the definition data is selected or not (S15). If the ready-state attraction data selection table for the case where with the definition data is selected, then it is further determined whether a big bonus (hereinafter referred to as BB) is internally elected or not (S16).

If BB is internally elected, then appearing symbols are selected from an identical left, center, and right appearing symbol selection table for ready-state attraction for the internally elected big bonus (S17), and the flow shifts to the single character attraction selecting process (S14). If BB is not internally elected, on the other hand, appearing symbols are selected from an identical left, center, and right appearing symbol selection table for ready-state attraction for the internally elected regular bonus (S18), and the flow shifts to the single character attraction selecting process (S14).

If the ready-state attraction data selection table for the case with definition data is not selected, then ready-hand appearing symbols at the time of losing are selected from a losing ready-hand appearing symbol selection table for ready-state attraction (S19), a losing center appearing symbol in conformity to the ready-state attraction is selected (S20), and the flow shifts to the single character attraction selecting process (S14).

The losing appearing symbol selecting process at the ready-state attraction in the attraction image selecting process (S2) will further be explained in detail with reference to FIG. 16.

As mentioned above, in the attraction image selecting process (S2), if the ready-state attraction data selection table for the case with definition data is not selected, then the losing appearing symbol selecting process for the ready-state attraction (S19, S20) is carried out.

Figure 16:
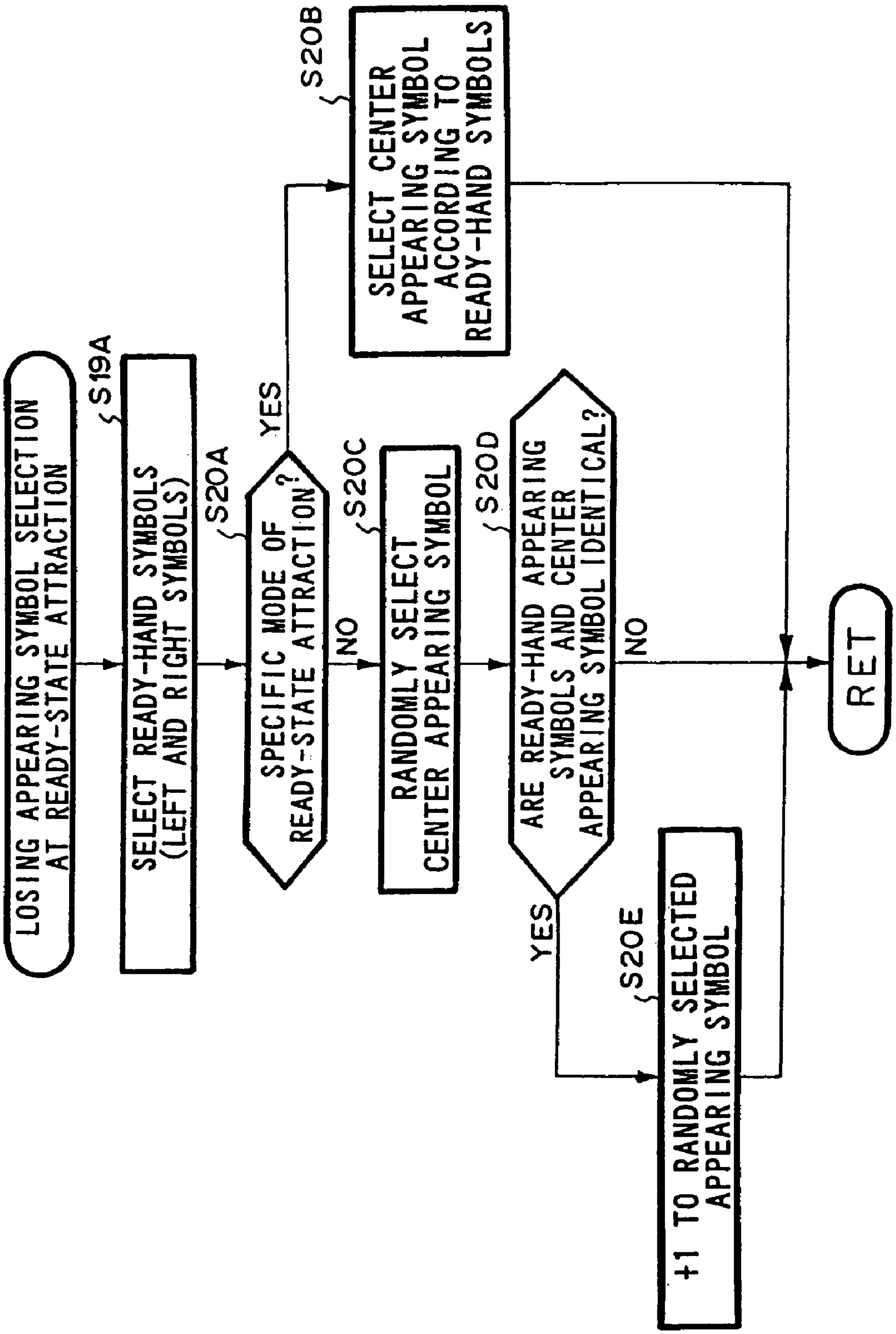
FIG. 16 is a flowchart showing a detail of a procedure of selecting a losing appearing symbol in the attraction image selecting process when a ready state is produced.

In the losing appearing symbol selecting process for the ready-state attraction, as shown in FIG. 16, ready-hand appearing symbols (left and right appearing symbols) are initially selected (S19A). The ready-hand symbols refer to a combination of appearing symbols in which, of the laterally-aligning three appearing symbols, those on the left and right sides are identical appearing symbols, so as to indicate a so-called ready-hand state.

Subsequently, it is determined whether it is a ready-state attraction of a specific mode or not (S20A). The specific mode of ready-state attraction refers to a specific mode of ready-state attraction selected beforehand from a plurality of ready-state attractions. For example, in this embodiment, three kinds of ready-hand attractions from "f" to "h" among nine kinds of ready-state attractions from "a" to "i" are defined as specific modes of ready-state attractions.

Here, the specific mode of ready-state attraction is a ready-state attraction including such a mode of an appearing symbol attraction that one frame each on the plus side and minus side of the reference appearing symbol is displayed so as to fluctuate in a reciprocating manner. Specific examples thereof include a ready-state attraction in which a leading character balances itself on a ball as shown in FIG. 142 and later. In such a case, if the center appearing symbol, which is the last-stopping appearing symbol, is separated from the left and right appearing symbols displayed in their stopped state in terms of arrangement of symbols, they will not match each other in terms of attraction. Hence, in the case of such a specific mode of ready-state attraction, a losing center appearing symbol selection table for specific mode of ready-state attraction is used, so as to select the appearing symbol at the center (hereinafter referred to as center appearing symbol) corresponding to the ready-state appearing symbol (S20B). If it is not a specific mode of ready-state attraction, then the center appearing symbol is randomly selected (S20C), and it is further determined whether the ready-hand appearing symbols and the center appearing symbol are identical or not (S20D). If the ready-hand appearing symbols and the center appearing symbol are identical, i.e., all of the left, center, and right appearing symbols are the same, the randomly selected appearing symbol (center appearing symbol) is processed to shift by one frame (S20E). As the center appearing symbol is shifted by one frame, all the three appearing symbols are prevented from becoming identical.

With reference to FIGS. 22A to 22D, the identical left, center, and right appearing symbol selection table for ready-state attraction for the internally elected big bonus; identical left, center, and right appearing symbol selection table for ready-state attraction for the internally elected regular bonus; losing ready-hand appearing symbol selection table for ready-state attraction; and losing center appearing symbol selection table for specific mode of ready-state attraction used in the above-mentioned attraction image selecting process (S2) will be explained.

In the identical left, center, and right appearing symbol selection table for ready-state attraction for the internally elected big bonus, identical left, center, and right appearing symbols are stored in order to indicate that a big bonus is internally elected. Specifically, four kinds of identical left, center, and right appearing symbols constituted by "7," "Do," "cake," and "cookie" exist, and the center appearing symbol is selected therefrom according to a random number value.

In the identical left, center, and right appearing symbol selection table for ready-state attraction for the internally elected regular bonus, identical left, center, and right appearing symbols are stored in order to indicate that a big bonus is internally elected. Specifically, four kinds of identical left, center, and right appearing symbols constituted by "BAR," "Do," "cake," and "cookie" exist, and the center appearing symbol is selected therefrom according to a random number value. As the random number, the appearing symbol attraction selecting random number value (left) shown in FIG. 44 is used.

In the losing ready-hand appearing symbol selection table for ready-state attraction, there are five kinds of ready-hand appearing symbols constituted by "7," "BAR," "Do," "cake," and "cookie," and each ready-hand symbol is selected therefrom according to a random number value. As the random number, the appearing symbol attraction selecting random number value (left) shown in FIG. 44 is used.

For selecting the center appearing symbol in the case where the ready-state attraction is that of losing (S20C), the losing ready-hand appearing symbol selection table for ready-state attraction is used. Here, for the random number, the appearing symbol attraction selecting random number value (center) shown in FIG. 44 is used.

In the losing center appearing symbol selection table for specific mode of ready-state attraction, there are five kinds of ready-hand appearing symbols constituted by "7," "BAR," "Do," "cake," and "cookie," whereas the center appearing symbols of "BAR," "Do," "E," "cookie," and "7" correspond to the respective ready-hand appearing symbols.

In the identical left, center, and right appearing symbol selection table for ready-state attraction for the internally elected big bonus; identical left, center, and right appearing symbol selection table for ready-state attraction for the internally elected regular bonus; losing ready-hand appearing symbol selection table for ready-state attraction; and losing center appearing symbol selection table for specific mode of ready-state attraction shown in FIGS. 22A to 22D, the numbers indicated in the columns of identical left, center, and right appearing symbol and ready-hand appearing symbol show reference values to be compared with random number values. According to the comparison of the reference values with random number values, the identical left, center, and right appearing symbols and the ready-hand appearing symbols are determined.

For example, in the identical left, center, and right appearing symbol selection table for ready-state attraction for the internally elected big bonus, the first identical left, center, and right appearing symbol "7" is selected when any random number value from 0 to 6553 is sampled. When any random number from 6554 to 32767 is sampled, then the second identical left, center, and right appearing symbol "Do" is selected. When any random number from 32777 to 52428 is sampled, then the third identical left, center, and right appearing symbol "cake" is selected. When any random number from 52429 to 65535 is sampled, then the fourth identical left, center, and right appearing symbol "cookie" is selected.

In a specific method of computing, a first computation result is initially determined by subtracting the reference value on the first line, 6553, from the sampled random number value. If this first computation result is 0 or less, then the identical left, center, and right appearing symbol on the first line, "7," is selected. If the first computation result is a positive value, then a second computation result is determined by subtracting the reference value on the second line, 26214, from the first computation result. If this second computation result is 0 or less, then the identical left, center, and right appearing symbol on the second line, "Do," is selected. If the second computation result is a positive value, then a third computation result is determined by subtracting the reference value on the third line, 19661, from the second computation result. If this third computation result is 0 or less, then the identical left, center, and right appearing symbol on the third line, "cake," is selected. Similar computations are successively carried out, so as to select the identical left, center, and right appearing symbols and ready-hand appearing symbols according to random number values up to 65535.

The above-mentioned ready-state attraction (ready-state attraction noticing symbol) selecting process (S11) is a process for displaying the possibility of occurrence of a winning mode to the player before all the reels 5*a* to 5*c* stop, in which whether a normal game is being played or not or whether definition data exist or not is determined, and whether to carry out a ready-state attraction or not or what ready-state attraction is carried out is determined depending on each case.

Figure 19:
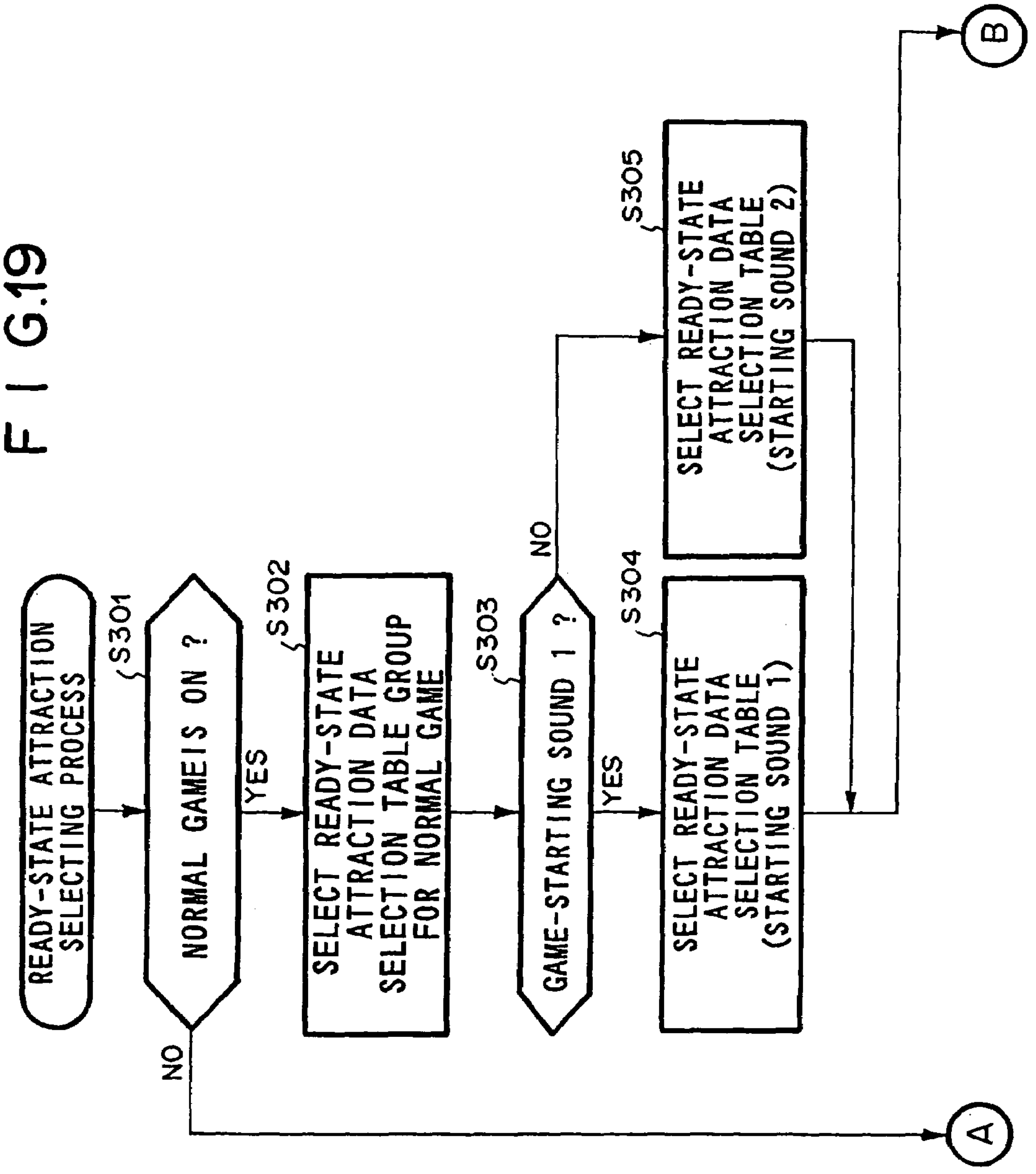
FIG. 19 is a flowchart showing a procedure of a ready-state attraction selecting process.

Namely, in the ready-state attraction (ready-state attraction noticing symbol) selecting process (S11), as shown in FIG. 19, it is initially determined whether a normal game is being played or not (S301). If the normal game is being played, then a ready-state attraction data selection table group for normal game is selected (S302), and it is further determined whether the command concerning the game-starting sound transmitted from the main control board 100 indicates game-starting sound 1 or not (S303). If game-starting sound 1 is indicated, then the ready-state attraction data selection table for normal game (starting sound 1) is selected (S304). If game-starting sound 2 is indicated, then the ready-state attraction data selection table for normal game (starting sound 2) is selected (S305).

Figure 20:
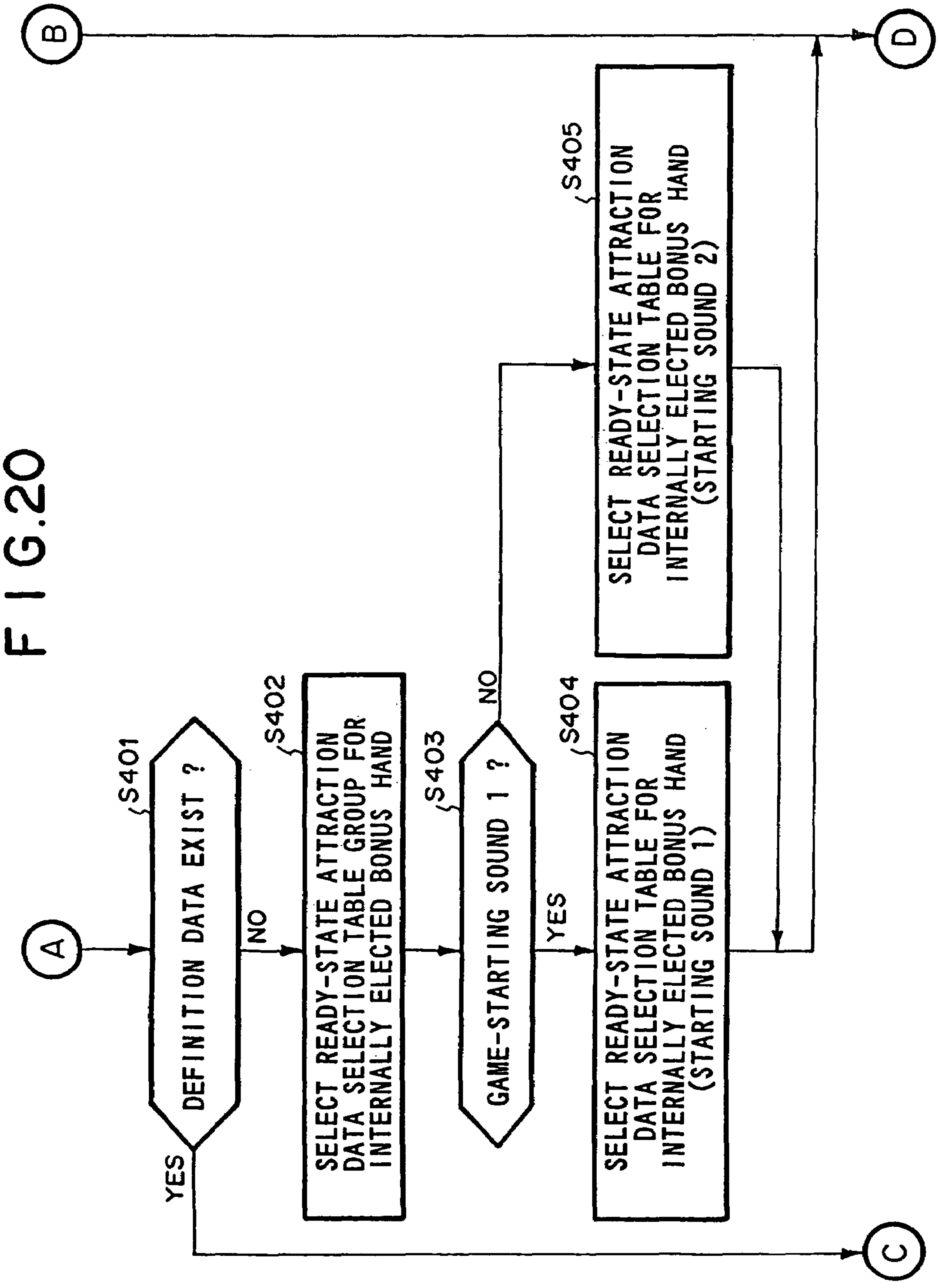
FIG. 20 is a flowchart showing a procedure of the ready-state attraction selecting process.

When no normal game is being played, as shown in FIG. 20, according to the command concerning definition data transmitted from the main control board 100, it is determined whether definition data exist or not (S401). If there are no definition data, then a ready-state attraction data selection table group for internally elected bonus hand is selected (S402), and it is further determined whether the command concerning the game-starting sound transmitted from the main control board 100 indicates game-starting sound 1 or not (S403). If game-starting sound 1 is indicated, then the ready-state attraction data selection table for internally elected bonus hand (starting sound 1) is selected (S404). If game-starting sound 2 is indicated, then the ready-state attraction data selection table for internally elected bonus hand (starting sound 2) is selected (S405).

Figure 21:
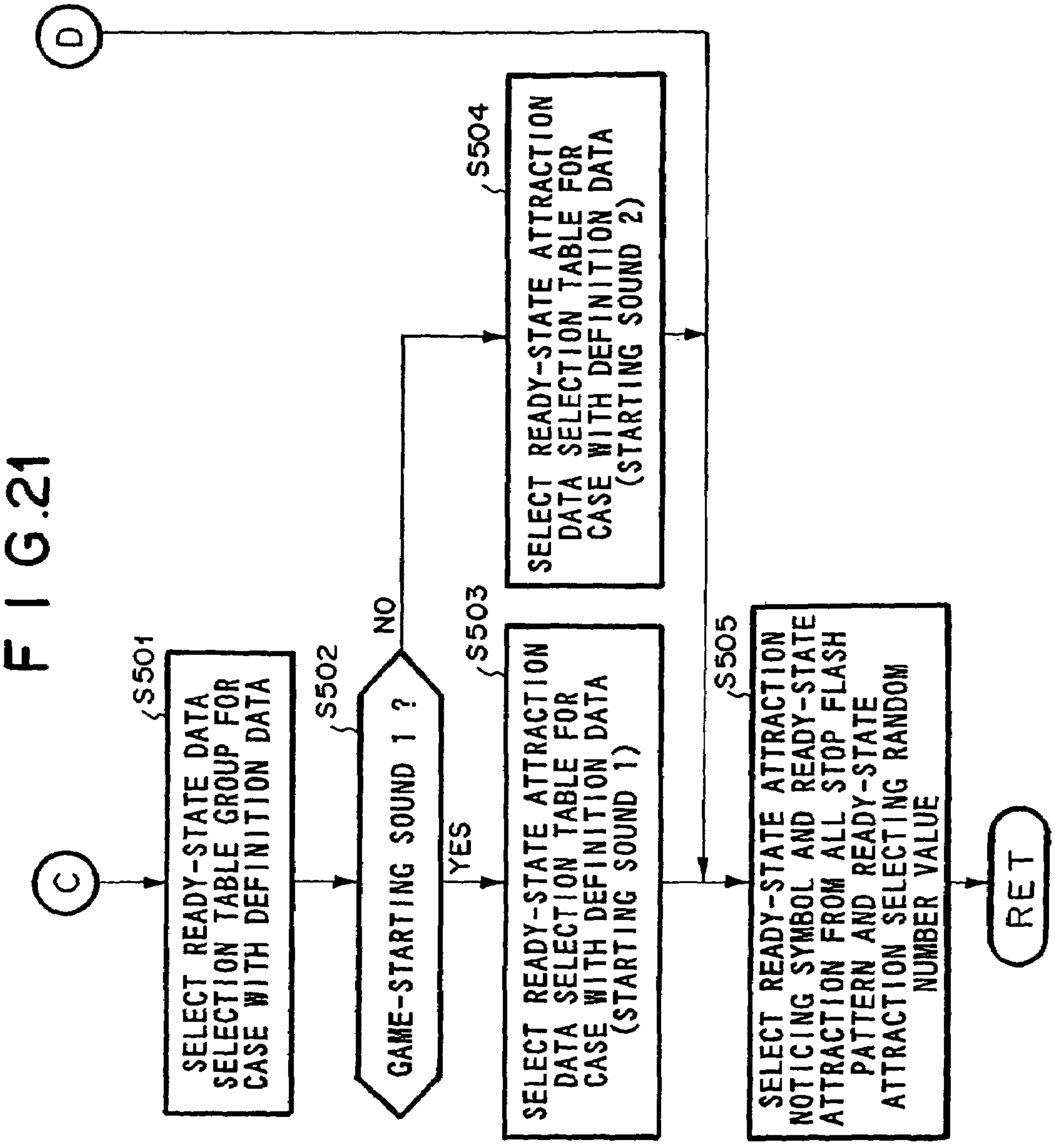
FIG. 21 is a flowchart showing a procedure of the ready-state attraction selecting process.
Figure 28:
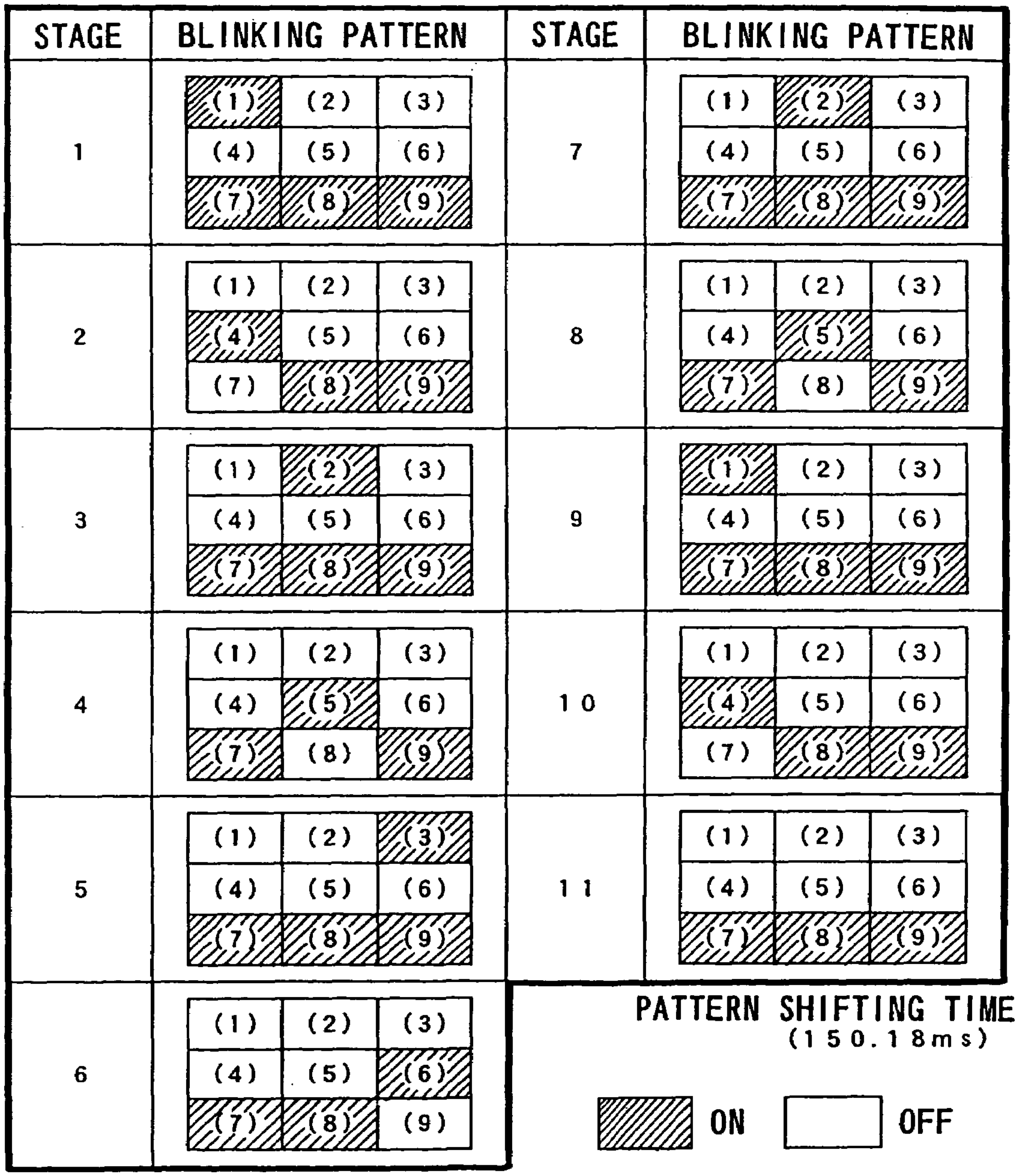
FIG. 28 is an explanatory chart of reel blinking pattern (2)
Figure 29:
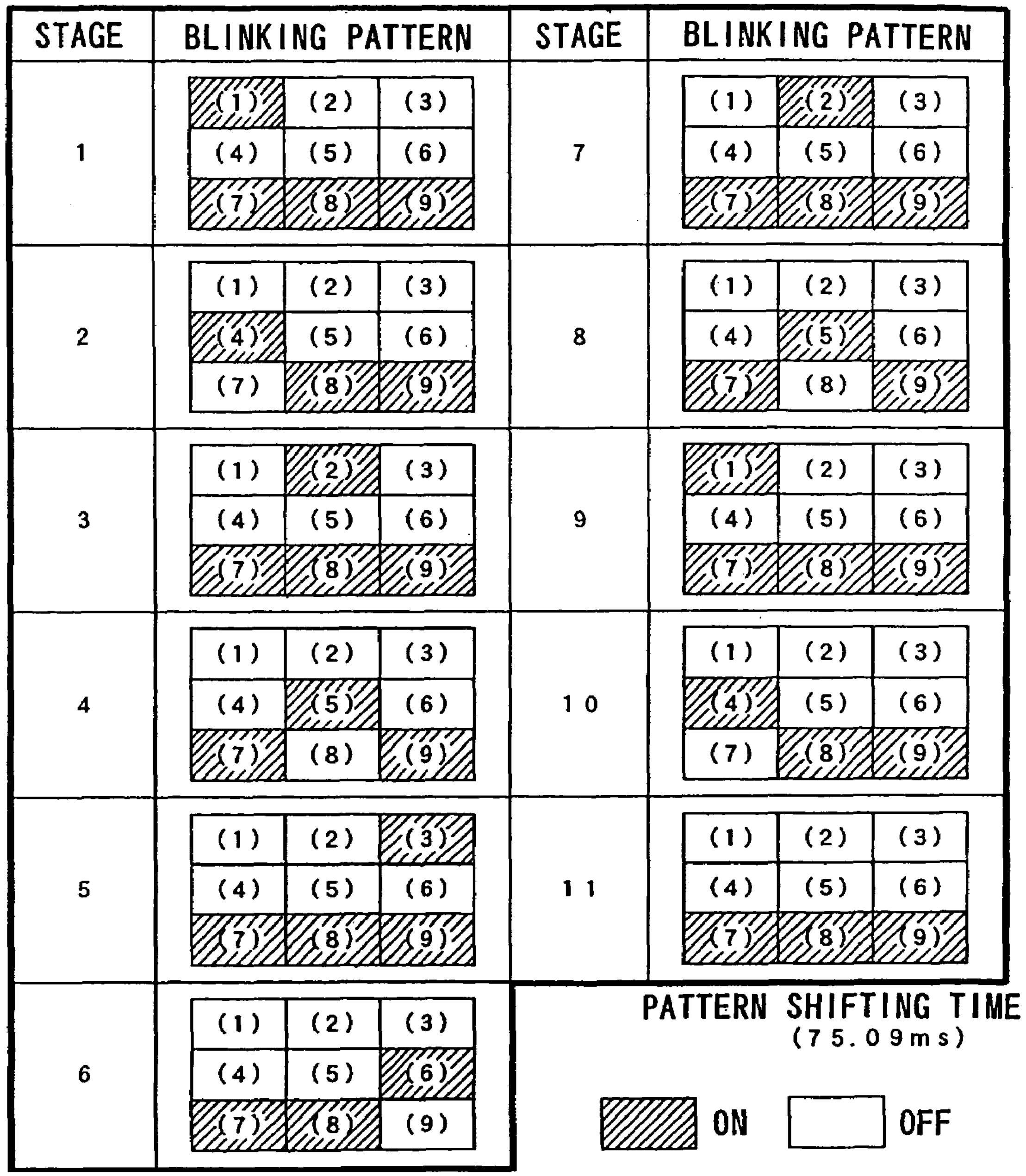
FIG. 29 is an explanatory chart of reel blinking pattern (3)
Figure 30:
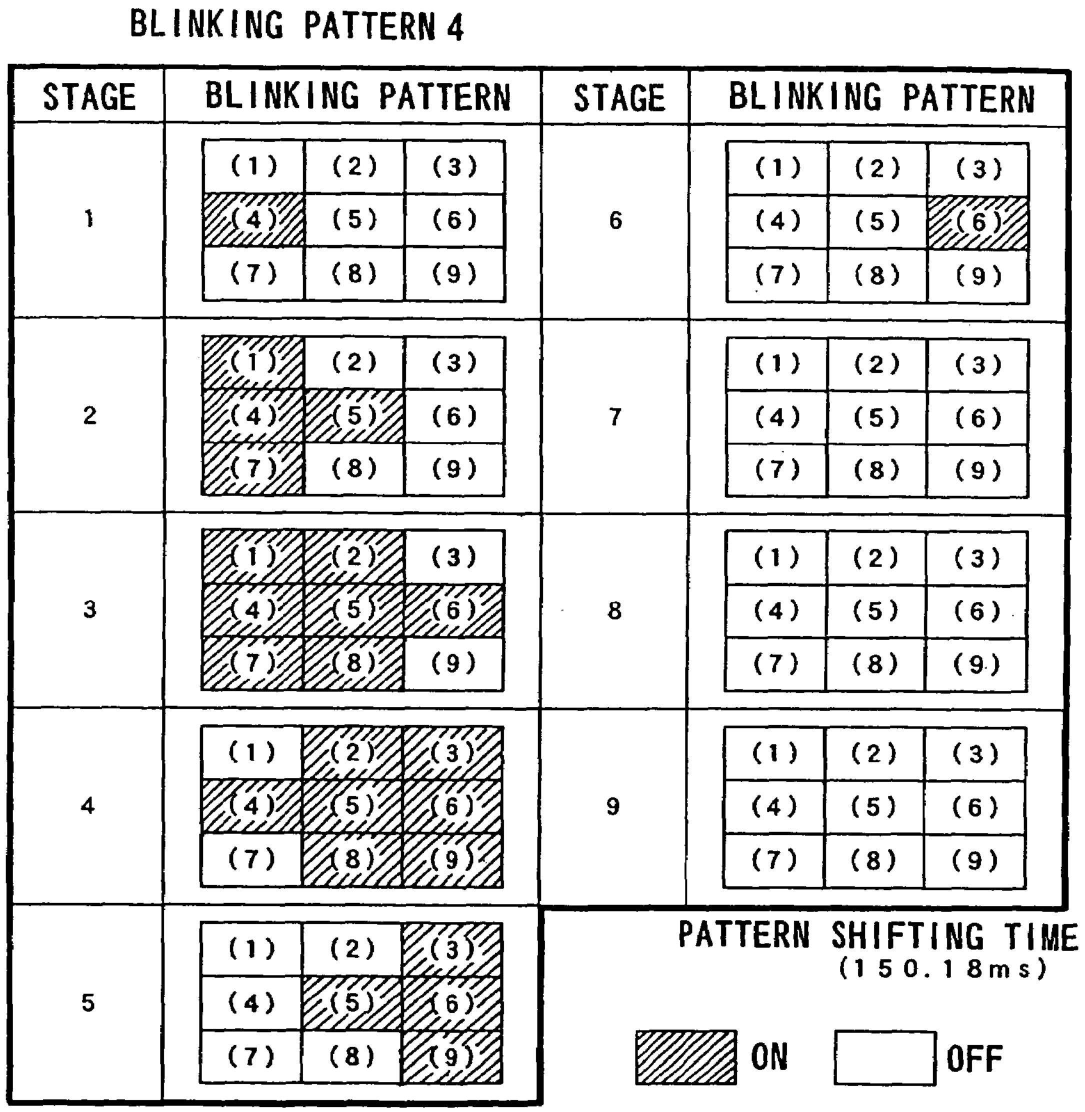
FIG. 30 is an explanatory chart of reel blinking pattern (4)
Figure 31:
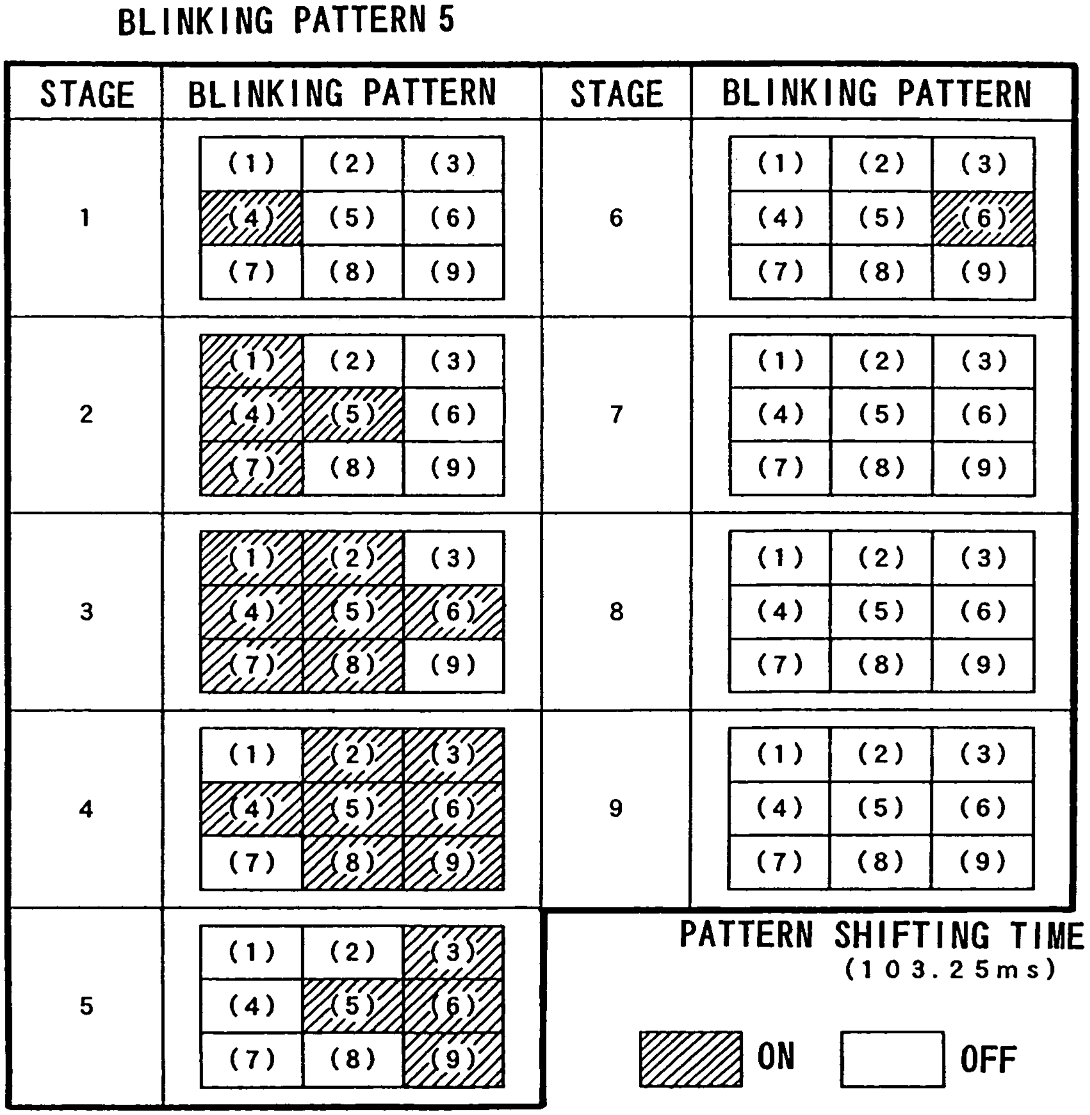
FIG. 31 is an explanatory chart of reel blinking pattern (5)
Figure 32:
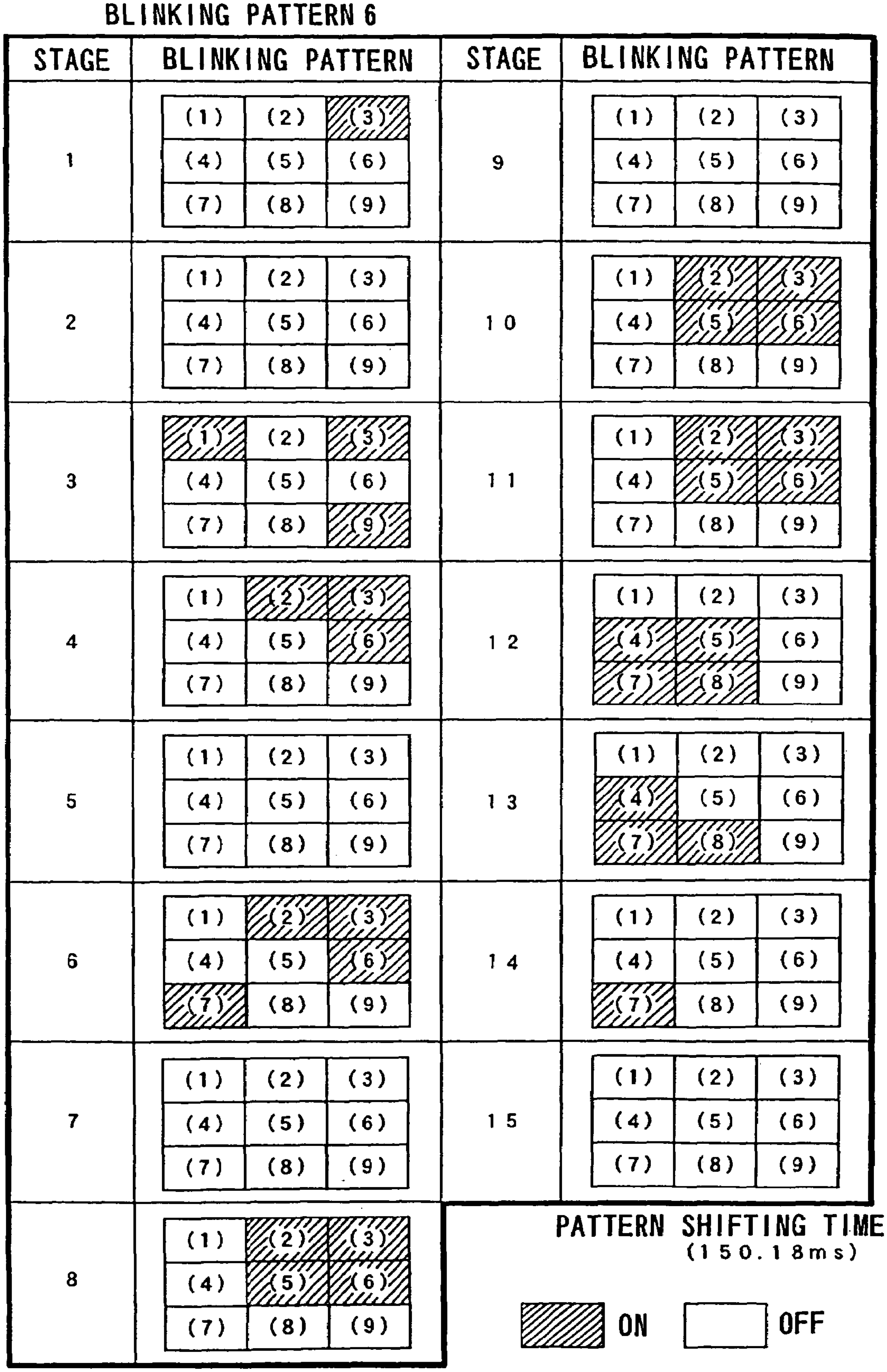
FIG. 32 is an explanatory chart of reel blinking pattern (6)
Figure 33:
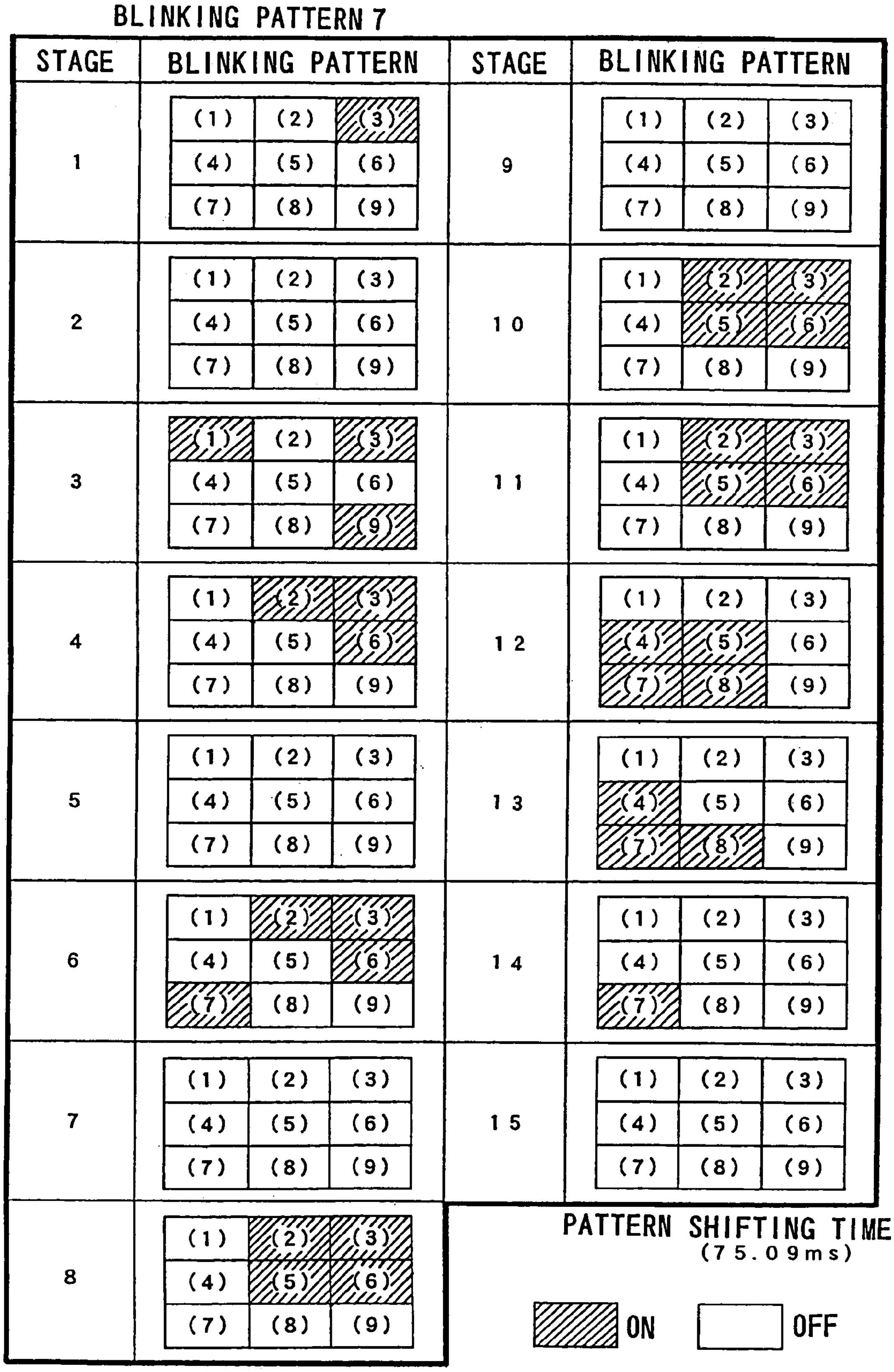
FIG. 33 an explanatory chart of reel blinking pattern (7)

When there are definition data according to the command concerning definition data transmitted from the main control board 100, as shown in FIG. 21, a ready-state attraction data selection table group for the case with definition data is selected (S501), and it is further determined whether the command concerning the game-starting sound transmitted from the main control board 100 indicates game-starting sound 1 or not (S502). If game-starting sound 1 is indicated, then the ready-state attraction data selection table for the case with definition data (starting sound 1) is selected (S503). If game-starting sound 2 is indicated, then the ready-state attraction data selection table for the case with definition data (starting sound 2) is selected (S504).

Then, by using the ready-state attraction data selection table group selected by the foregoing process (S301 to S504), a ready-state noticing symbols and a ready-state attraction noticing pattern are selected according to the all stop flash pattern and ready-state attraction selecting random number value (S505).

With reference to FIGS. 35 to 40, the above-mentioned ready-state attraction data selection table groups will be explained.

FIGS. 35 to 40 show the ready-state attraction data selection table groups used in the above-mentioned ready-state attraction (ready-state attraction noticing symbol) selecting process (S11), which are constituted by three kinds of ready-state attraction data selection table groups, i.e., the ready-state attraction data selection table group for normal game (FIGS. 35 and 36), the ready-state attraction data selection table group for internally elected bonus hand (FIGS. 37 and 38) and the ready-state attraction data selection table group for the case with definition data (FIGS. 39 and 40). Further, each data table group is composed of two kinds of data tables for starting sound 1 and starting sound 2, respectively.

In each data table, there are 5 kinds of ready-state attraction noticing pattern data constituted by "none" and "A" to "D." Further, in each ready-state attraction noticing pattern data, there are 10 kinds of ready-state attraction pattern data constituted by "none" and "a" to "i." Each ready-state attraction pattern data corresponds to any of the all stop flash patterns "0" to "8."

In the ready-state attraction data selection table group for the case with definition data, as shown in FIGS. 39 and 40, there are six kinds of ready-state attraction noticing pattern data constituted by "none" and "A" to "E."

A method of selecting the ready-state attraction noticing symbol and ready-state attraction according to the all stop flash pattern and ready-state attraction selecting random number value by using these ready-state attraction data selection tables will be explained with reference to the ready-state attraction data selection table (starting sound 1) for normal game shown in FIG. 35.

As shown in FIG. 35, the number listed on the column of each all stop flash pattern indicates the reference values to be compared with ready-state attraction selecting random number values. According to the comparison of the reference values with ready-state attraction selecting random number values, the ready-state attraction noticing pattern and ready-state attraction pattern are determined.

For example, on the first column of all stop flash pattern (flash pattern 0 or 1," if any random number value from 0 to 60115 is sampled, then the first ready-state attraction noticing pattern "none" and the first line of ready-state attraction pattern "none" in this ready-state attraction noticing pattern are selected. If any random number value from 60116 to 65115 is sampled, then the first ready-state attraction noticing pattern "none" and the second line of ready-state attraction pattern "a" in this ready-state attraction noticing pattern are selected. Further, if any random number value from 65116 to 65165 is sampled, then the first ready-state attraction noticing pattern "none" and the third line of ready-state attraction pattern "b" in this ready-state attraction noticing pattern are selected. Similarly, according to the random number values up to 65535, ready-state attraction noticing patterns and ready-state attraction patterns are selected.

On each all stop flash pattern column, the ready-state attraction noticing patterns and ready-state attraction patterns corresponding to lines without reference values are not selected.

In a specific method of computing, when the first all stop flash pattern column "flash pattern 0 or 1" is selected, then a first computation result is initially determined by subtracting the reference value on the first line, 60115, from the sampled random number value. If this first computation result is 0 or less, then the ready-state attraction noticing pattern "none" and ready-state attraction pattern "none" on the first line are selected. If the first computation result is a positive value, then a second computation result is determined by subtracting the reference value on the second line, 5000, from the first computation result. If this second computation result is 0 or less, then the ready-state attraction noticing pattern "none" and ready-state attraction pattern "a" on the second line are selected. If the second computation result is a positive value, then a third computation result is determined by subtracting the reference value on the third line, 50, from the second computation result. If this third computation result is 0 or less, then the ready-state attraction noticing pattern "none" and ready-state attraction pattern "b" on the third line are selected. Similar computations are successively carried out, so as to select ready-state attraction noticing patterns and ready-state attraction patterns according to the random number values up to 65535.

The above-mentioned appearing symbol attraction selecting process (S13) is a process executed when no ready-state attraction is carried out (S12: Yes) in the above-mentioned ready-state attraction selecting process (S11), so as to carry out an attraction concerning whether the respective stop modes of reels 5*a* to 5*c* permit a predetermined winning mode to occur or not, i.e., whether each winning hand is internally elected or not.

Figure 18:
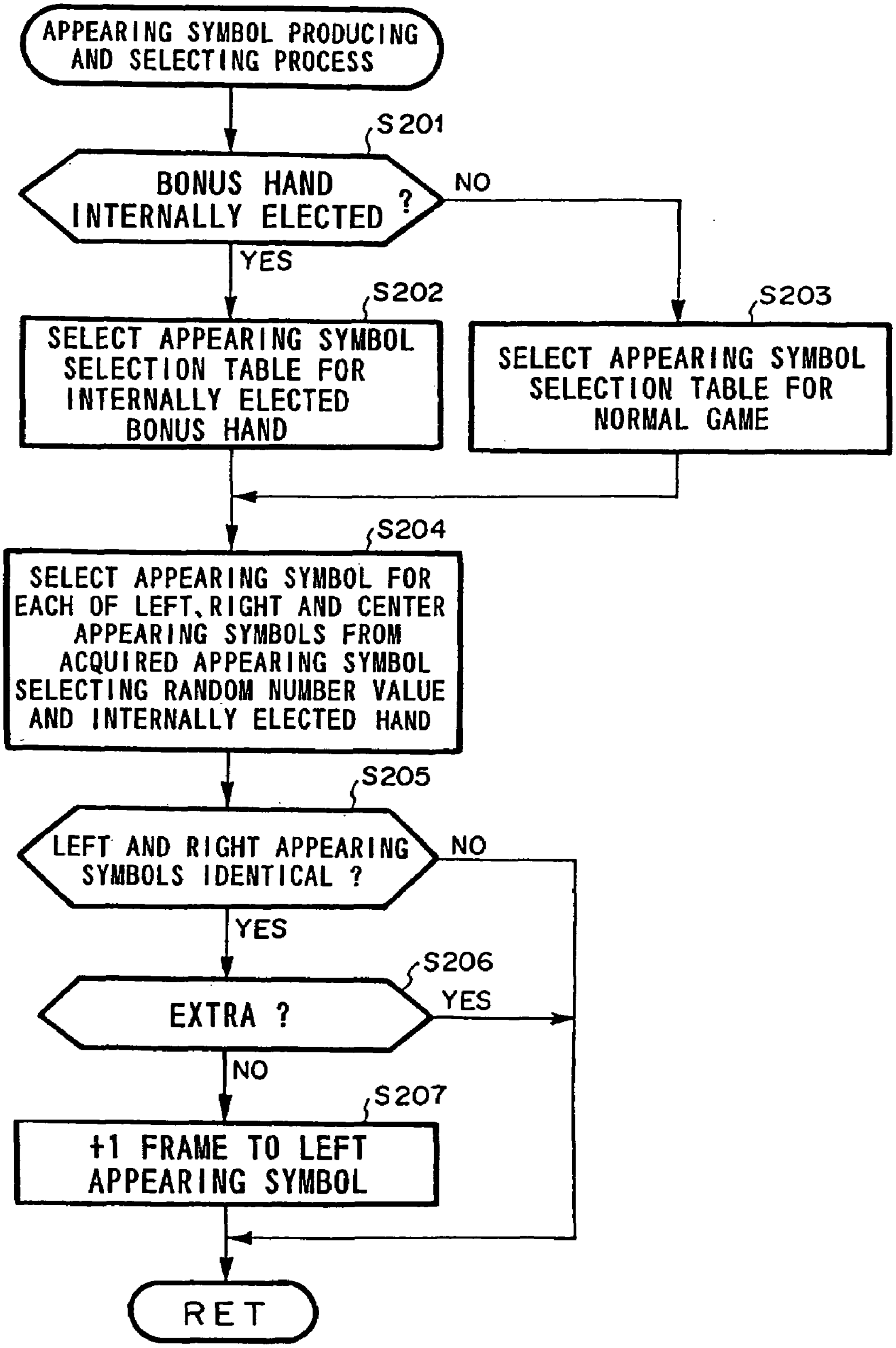
FIG. 18 is a flowchart showing a procedure of an appearing symbol attraction selecting process.

Namely, in the appearing symbol attraction selecting process (S13), as shown in FIG. 18, it is initially determined whether the internal sampling results in internally electing BB or RB or not (S201). If BB or RB is internally elected, then the appearing symbol selection table for internally elected bonus hand is selected (S202). If not, then the appearing symbol selection table for normal game is selected (S203).

Then, thus selected appearing symbol selection table is used, so as to select the respective appearing symbols for the left, right, and center reels according to the appearing symbol attraction selecting random number value and internally elected hand transmitted from the main control board 100 (S204).

With reference to FIGS. 42A and 42B, the above-mentioned appearing symbol selection tables will be explained.

FIGS. 42A and 42B show the appearing symbol selection tables used in the above-mentioned appearing symbol attraction selecting process (S13). There are two kinds of appearing symbol selection tables, i.e., the appearing symbol selection table for normal game (FIG. 42A) and the appearing symbol selection table for internally elected bonus (BB or RB) hand (FIG. 42B).

In the appearing symbol selection table for normal game, there are 10 kinds of appearing symbols constituted by "E," "X," "T" "R," "A, "7," "BAR," "cake," "cookie," and "Do." Basically, 7 kinds of internally elected hands constituted by group 1 ("cherry" or "DB")," "DG," "diamond," "replay," "RB," "BB," and "miss (none of internally elected hands being elected)" correspond to each of the above-mentioned appearing symbols. Also, in the appearing symbol selection table for internally elected bonus hand, there are 10 kinds of appearing symbols constituted by "E," "X," "T," "R," "A," "7," "BAR," "cake," "cookie," and "Do." Six kinds of internally elected hands constituted by "group 1 ("cherry" or "DB")," "DG," "diamond," "replay," "miss (not being internally elected except for BB)," and "miss (not being internally elected except for RB)" basically correspond to each of the above-mentioned appearing symbols.

Here, "basically correspond" indicates that, though a specific appearing symbol is more likely to be selected for each internally elected hand since the width of random number value for determining the selection of each appearing symbol is biased, the specific appearing symbol is not always selected when the internally elected hand is determined, and appearing symbols other than the specific appearing symbol may be selected.

A method of selecting appearing symbols according to internally elected hands by using these appearing symbol selection tables will be explained with reference to the appearing symbol selection table for normal game shown in FIG. 42A.

As shown in FIG. 42A, the numbers listed on each column of internally elected hands indicate reference values to be compared with appearing symbol attraction selecting random number values. According to the comparison of the reference values with the appearing symbol attraction selecting random number values, appearing symbols are determined.

Namely, for example, on the first internally elected hand pattern column "group 1 ("cherry" or "DB")," the first line of appearing symbol "E" is selected if any random number value from 0 to 1966 is sampled. If any random number value from 1967 to 3276 is sampled, then the second line of appearing symbol "X" is selected. Further, if any random number value from 3277 to 43252 is sampled, then the third line of appearing symbol "T" is selected.

In a specific method of computing, when the first internally elected hand pattern column "group 1 ("cherry" or "DB")" is selected, then a first computation result is initially determined by subtracting the reference value on the first line, 1966, from the sampled random number value. If this first computation result is 0 or less, then the first line of appearing symbol "E" is selected. If the first computation result is a positive value, then a second computation result is determined by subtracting the reference value on the second line, 1310, from the first computation result. If this second computation result is 0 or less, then the second line of appearing symbol "X" is selected. Further, if the second computation result is a positive value, then a third computation result is determined by subtracting the reference value on the third line, 39976, from the second computation result. If this third computation result is 0 or less, then the third line of appearing symbol "T" is selected. Similar computations are successively carried out, so as to select appearing symbols according to the random number values up to 65535.

After the above-mentioned selection of appearing symbols, it is determined whether the left and right appearing symbols are identical or not (S205). If both appearing symbols are identical, then it is further determined whether both appearing symbols are appearing symbols other than a specific appearing symbol or not. Namely, in this case, the specific appearing symbol is any of "7," "BAR," "cake," "cookie," and "Do," and it is determined whether both appearing symbols are any of the other appearing symbols "E," "X," "T," "R," and "A" or not (S206). If both appearing symbols are a specific appearing symbol, i.e., any of the appearing symbols other than "E," "X," "T," "R," and "A," one frame is added to the left appearing symbol (S207). That is, since the case where the appearing symbols are set to a predetermined specific appearing symbol (any of appearing symbols for internally elected bonus hands: 7, BAR, Do, cake, and cookie) has been subjected to S12 of the attraction image selecting process, particular appearing symbols must not be set in a ready-hand state, whereby a process is carried out so as not to form the ready-hand state. In the case of normal appearing symbols (E, X, T, R, and A), even if a ready-hand is attained, it will not develop to a ready-state attraction, whereby appearing symbols may accidentally form a ready hand or a set when the left, center, and right appearing symbols are selected. Therefore, in the next step, in the case where both appearing symbols differ from each other, or they are not a specific appearing symbol though being identical to each other, i.e., they are any of appearing symbols of "E," "X," "T," "R," and "A," then the process of S207 will not be carried out.

Figure 17:
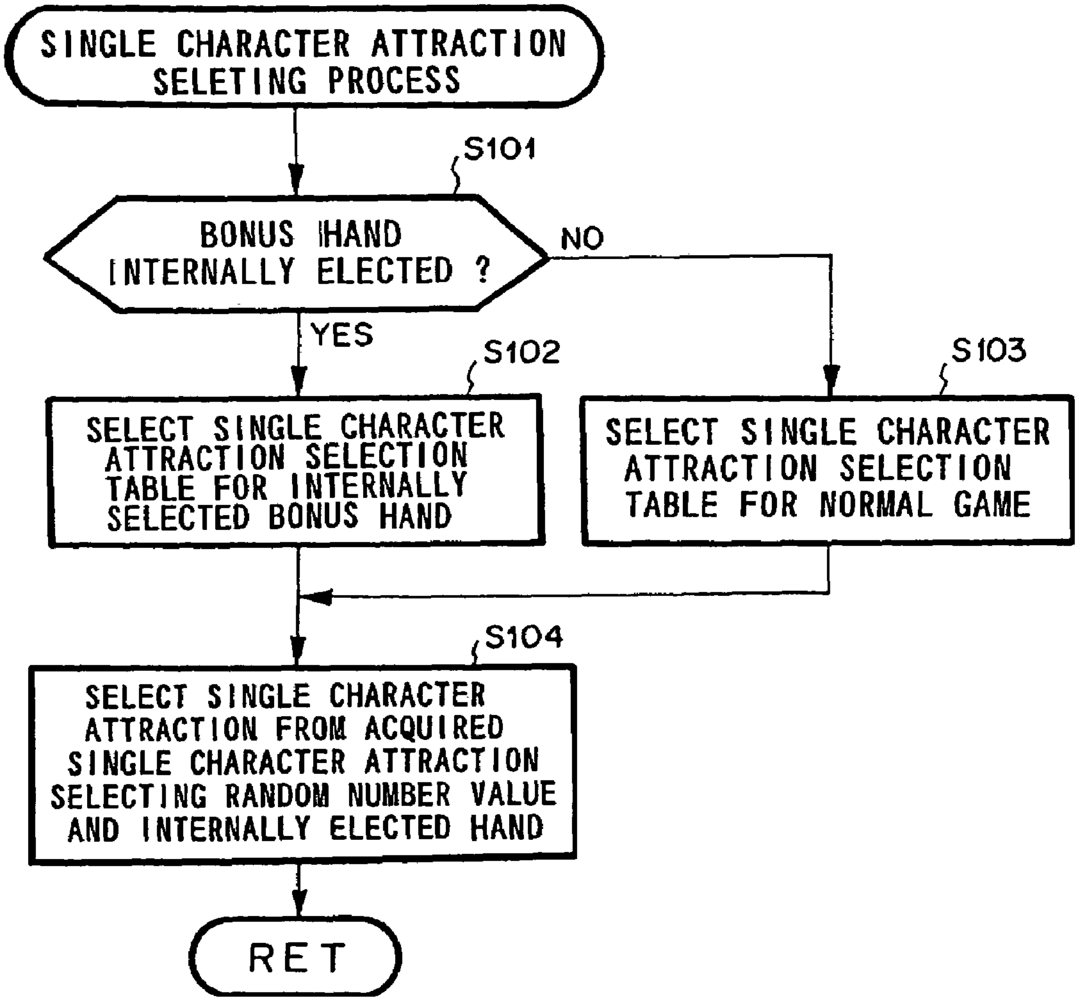
FIG. 17 is a flowchart showing a procedure of a single character attraction process.

In the single character attraction selecting process (S14), as shown in FIG. 17, it is initially determined whether BB or RB is internally elected or not (S101). If BB or RB is internally elected, then a single character attraction selection table for internally elected bonus hand is selected (S102). If not, then a single character attraction selection table for normal game is selected (S103).

Subsequently, thus selected single character attraction selection table is used for selecting a single character attraction according to the single character attraction selecting random number value and internally elected hand transmitted from the main control board 100 (S104).

The above-mentioned single character attraction selection tables will be explained with reference to FIGS. 41A and 41B.

FIGS. 41A and 41B show the single character attraction selection tables used in the above-mentioned single character attraction selecting process (S14). There are two kinds of single character attraction selection tables, i.e., the single character attraction selection table for normal game (FIG. 41A) and the single character attraction selection table for internally elected bonus hand (FIG. 41B).

In each table, there are eight kinds of single characters constituted by "a" to "g" and "none." Seven kinds of internally elected hands constituted by "group 1 ("cherry" or "DB")," "DG," "diamond," "replay," "RB," "BB," and "miss" basically correspond to each single character.

Here, "basically correspond" indicates that, though a specific single character is more likely to be selected for each internally elected hand since the width of random number value for determining the selection of each single character is biased, the specific appearing symbol is not always selected when the internally elected hand is determined, and single characters other than the specific single character may be selected.

As can be seen from the tables shown in FIGS. 41A and 41B, in the single character attraction selection table for normal game, three internally elected hands constituted by the internally elected BB hand, the internally elected RB hand, and another internally elected hand correspond to each internally elected hand noticing pattern; whereas, in the single character attraction selection table for internally elected bonus character, three or more internally elected hands other than the internally elected BB hand and the internally elected RB hand correspond to each internally elected hand noticing pattern.

As a consequence, the single characters selected according to each internally elected hand are limited in normal games, whereas the kinds of single characters to be selected enhance during internal election of bonus hands. By utilizing this fact, the player can appreciate changes in the state of gaming.

A method of selecting single characters according to internally elected hands will be explained with reference to the single character attraction selection table for normal game shown in FIG. 41A.

As shown in FIG. 41A, the numbers listed on each column of internally elected hand patterns indicate reference values to be compared with single character attraction selecting random number values. According to the comparison of the reference values with the single character attraction selecting random number values, single characters are determined.

Namely, for example, on the first internally elected hand pattern column "group 1 ("cherry" or "DB")," the first appearing symbol noticing pattern "a" is selected if any random number value from 0 to 52427 is sampled. If any random number value from 52428 to 58981 is sampled, then the second appearing symbol noticing pattern "b" is selected. Further, if any random number value from 58982 to 65535 is sampled, then the third appearing symbol noticing pattern "none" is selected.

On each internally elected hand pattern column, the single characters corresponding to lines in which no reference values are indicated would not be selected.

In a specific method of computing, when the first internally elected hand pattern column "group 1 ("cherry" or "DB")" is selected, then a first computation result is initially determined by subtracting the reference value on the first line, 52427, from the sampled random number value. If this first computation result is 0 less, then the first line of single character "a" is selected. If the first computation result is a positive value, then a second computation result is determined by subtracting the reference value on the second line, 6554, from the first computation result. If this second computation result is 0 or less, then the second line of single character "b" is selected. Further, if the second computation result is a positive value, then the remaining single character, i.e., the eighth line of single character "none" is selected. Similar computations are successively carried out for the other internally elected hands, so as to select single characters according to the random number values up to 65535. Though random number values for selecting various attractions are extracted on the main control board 100 side and transmitted to the sub-control board 200 side in this embodiment, random numbers may be extracted on the sub-control board 200 side as well.

Specific Examples of Indication of Game Information

First, FIGS. 285A to 285H are charts showing relationships between the overall flows of game information displayed in the image display section 13 of the above-mentioned slot machine and the drawings used for their explanations.

The overall flows shown in FIGS. 285A to 285H will be explained in brief.

In FIG. 285A, "wait for client" indicates the contents displayed when no game is being played. In FIG. 285B, "one game" explains the flow from starting gaming until one game is consumed and the flow in the case entering a big bonus (BB) FIGS. 285C to 285G further fragmentally show the flows shown in FIG. 285B. In FIG. 285H, "error display" lists the contents displayed when errors have occurred.

Figure 45:
FIG. 45 is an explanatory view of game information (maker name) displayed in the image display section in accordance with the other embodiment.
Figure 284A:
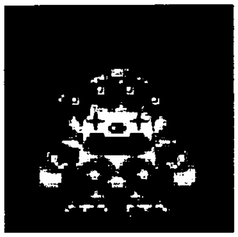
Figure 284B:
Figure 284C:
Figure 284D:
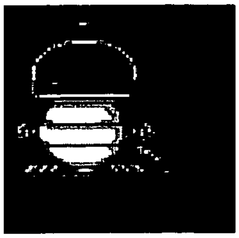
Figure 284E:
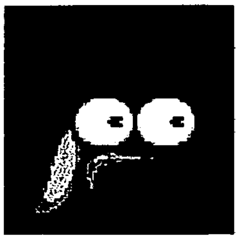
Figure 284F:
Figure 284G:
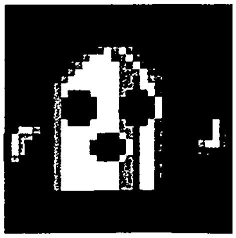

With reference to FIGS. 45 to 284F, the other embodiment of specific game information displayed in the image display section 13 in the above-mentioned slot machine (overall flows shown in FIGS. 285A to 285H) will now be explained in detail.

The game information displayed in the image display section 13 in this slot machine is expressed by a series of moving images, such that various kinds of game information are displayed as a story progresses along with the progress of gaming.

Maker Name

While no game is being played, the maker name is initially displayed.

Figure 46:
FIG. 46 is an explanatory view of game information (maker name) displayed in the image display section in accordance with the other embodiment.
Figure 47:
FIG. 47 is an explanatory view of game information (maker name) displayed in the image display section in accordance with the other embodiment.

In the display of maker name, a designed maker name is initially displayed (FIG. 45), a bird appears on the screen (FIG. 46), and this bird is trapped in the maker name, whereby a logo of the maker name is completed (FIG. 47).

Model Name

Subsequent to the maker name, the model name of the slot machine is displayed.

Figure 48:
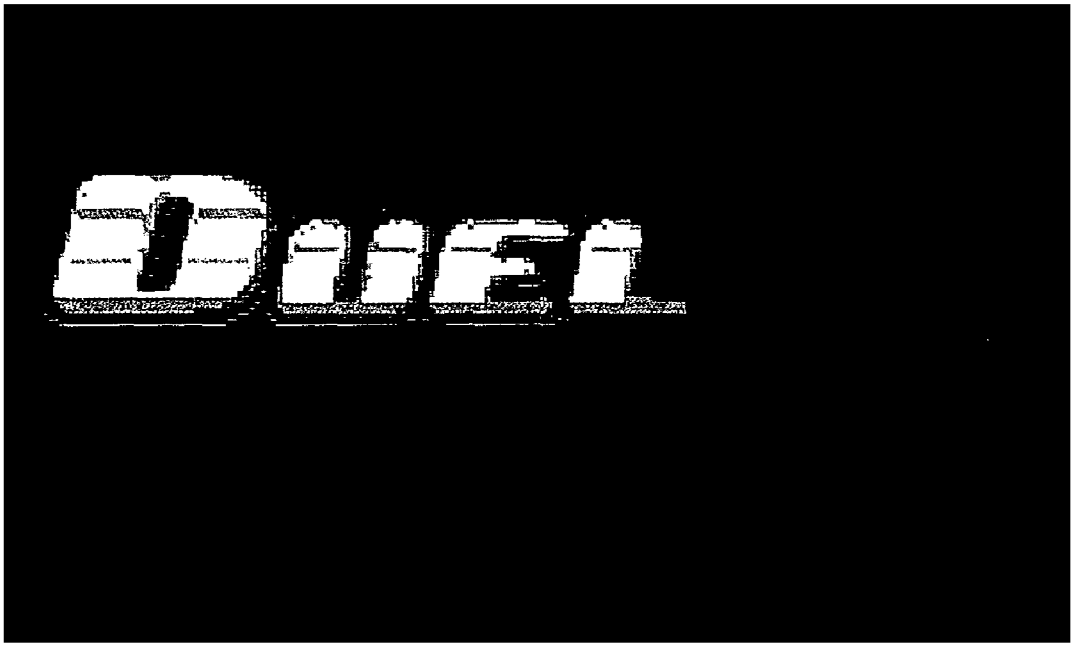
FIG. 48 is an explanatory view of game information (model name) displayed in the image display section in accordance with the other embodiment.
Figure 49:
FIG. 49 is an explanatory view of game information (model name) displayed in the image display section in accordance with the other embodiment.
Figure 50:
FIG. 50 is an explanatory view of game information (model name) displayed in the image display section in accordance with the other embodiment.

In the display of model name, two lines of the model name are successively displayed from the upper line to the lower line (FIGS. 48 and 49), and a symbol identifying the model name eventually appears, thus completing the display of model name (FIG. 50).

Dividend Display

Subsequent to the display of model name, the dividend display indicating the numbers of game medals to be paid out to the player according to stop modes of the reels 5*a* to 5*c* are displayed.

Figure 51:
FIG. 51 is an explanatory view of game information (dividend indication) displayed in the image display section in accordance with the other embodiment.
Figure 52:
FIG. 52 is an explanatory view of game information (dividend indication) displayed in the image display section in accordance with the other embodiment.
Figure 53:
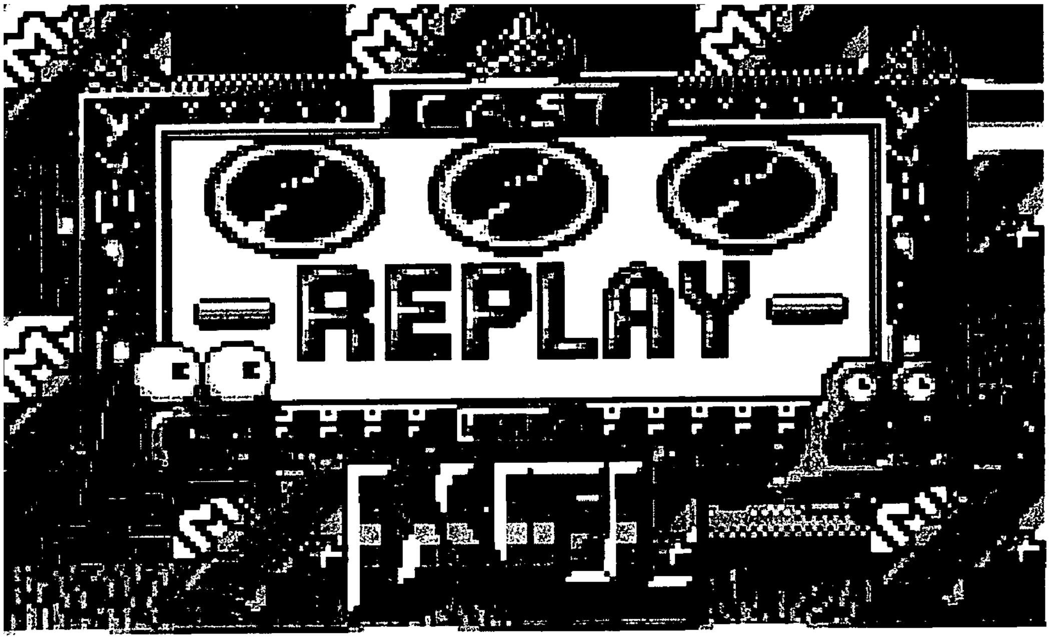
FIG. 53 is an explanatory view of game information (dividend indication) displayed in the image display section in accordance with the other embodiment.
Figure 54:
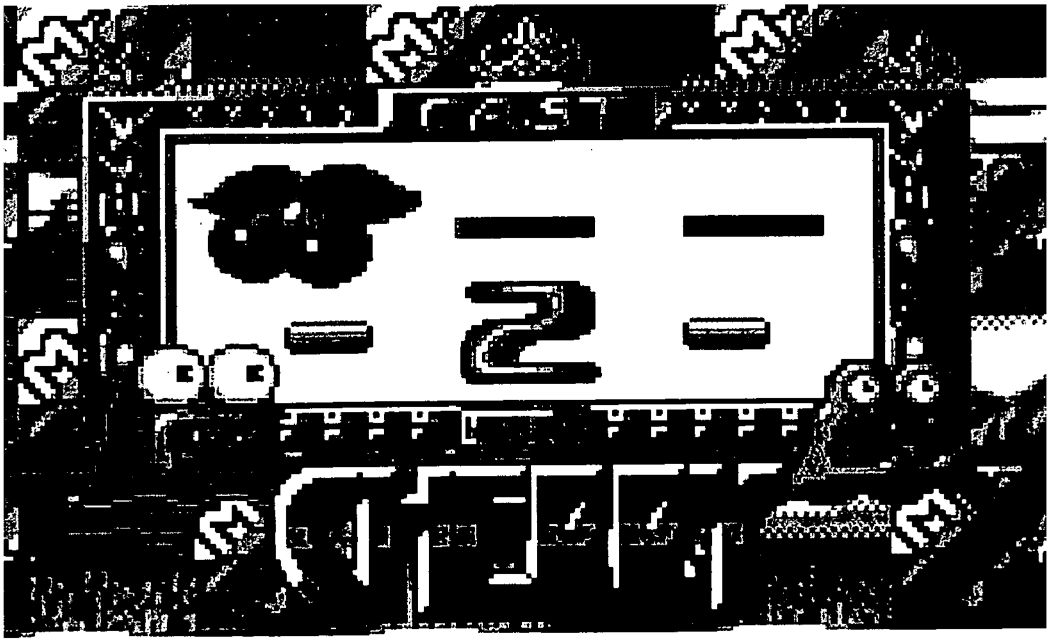
FIG. 54 is an explanatory view of game information (dividend indication) displayed in the image display section in accordance with the other embodiment.
Figure 55:
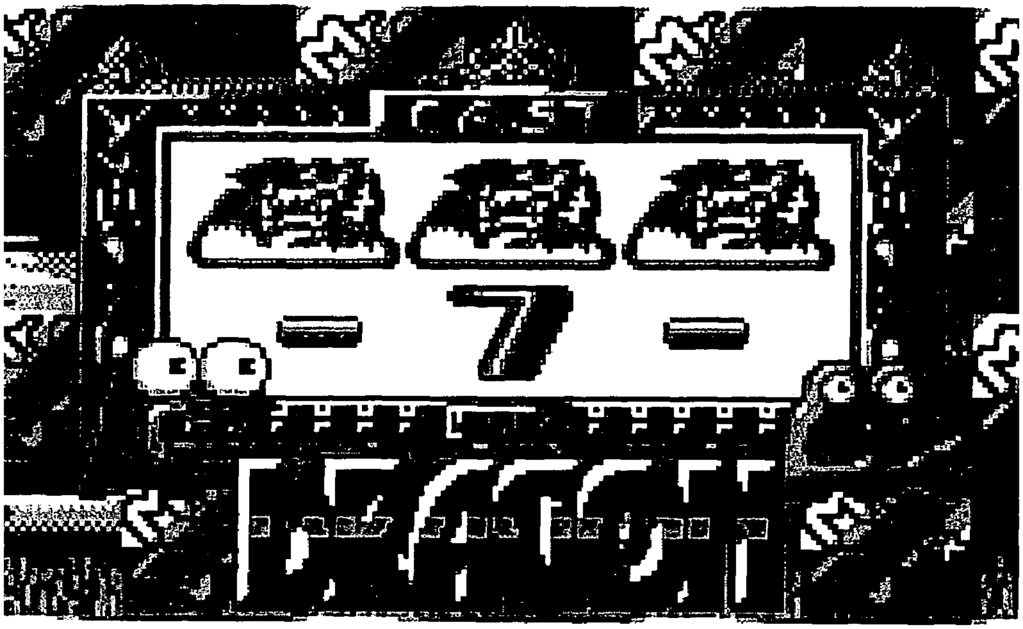
FIG. 55 is an explanatory view of game information (dividend indication) displayed in the image display section in accordance with the other embodiment.
Figure 56:
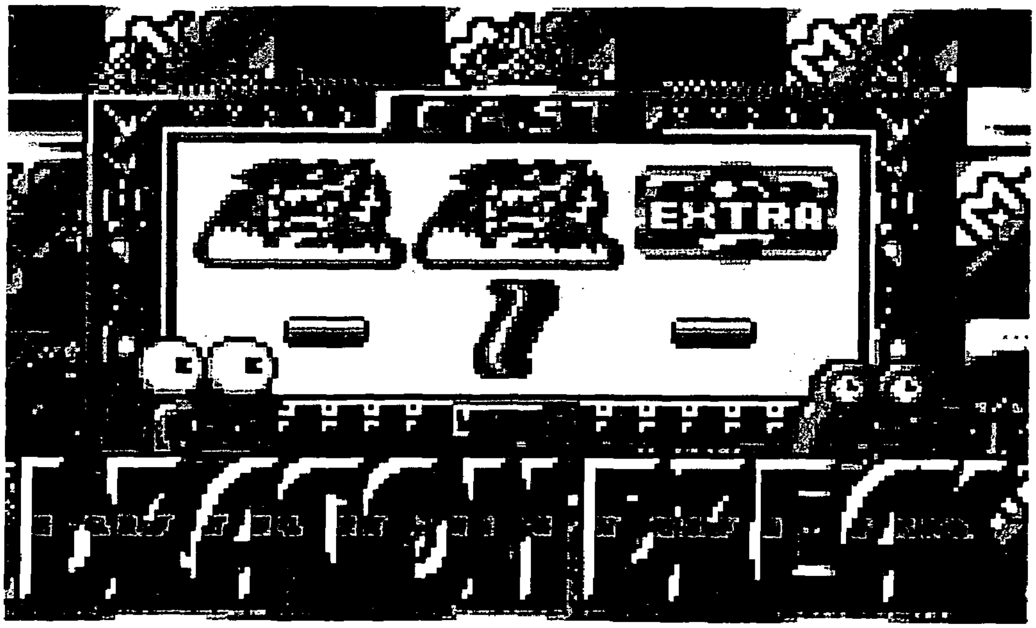
FIG. 56 is an explanatory view of game information (dividend indication) displayed in the image display section in accordance with the other embodiment.
Figure 57:
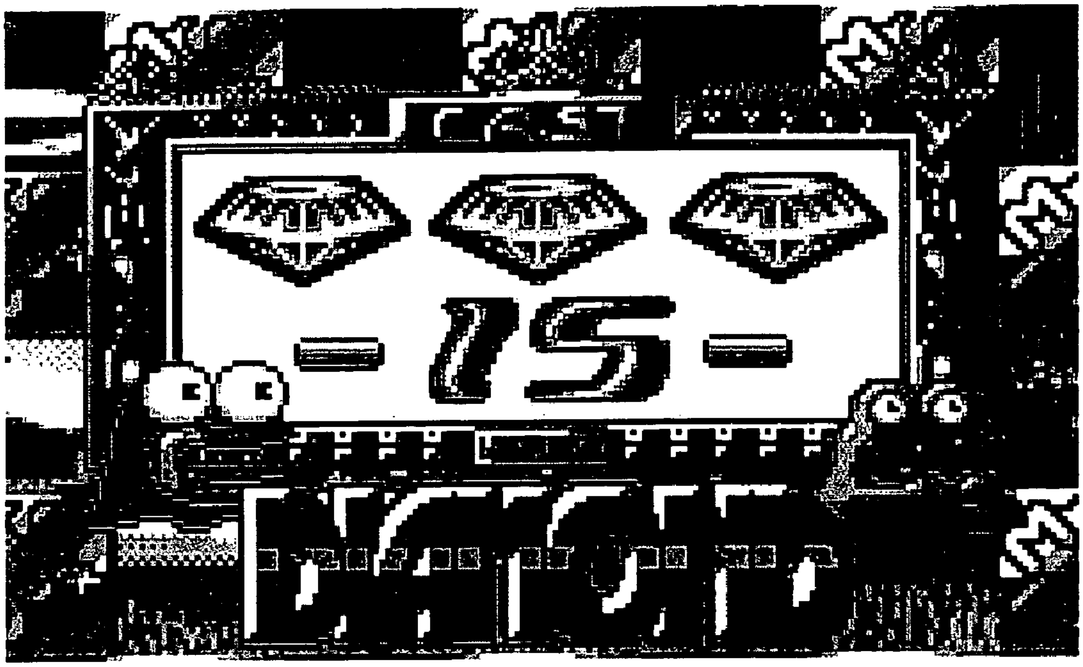
FIG. 57 is an explanatory view of game information (dividend indication) displayed in the image display section in accordance with the other embodiment.

In this dividend display, a background is initially displayed (FIG. 51), it is indicated that the following dividends are for a normal game (FIG. 52), and then the stop mode in which a replay in this normal game is attained (FIG. 53), the stop mode in which 2 game medals are paid out (FIG. 54), the stop mode in which 7 game medals are paid out (FIG. 55), the stop mode in which 1 game medal is paid out (FIG. 56), and the stop mode in which 15 game medals are paid out (FIG. 57) are successively displayed.

Figure 58:
FIG. 58 is an explanatory view of game information (dividend indication) displayed in the image display section in accordance with the other embodiment.
Figure 59:
FIG. 59 is an explanatory view of game information (dividend indication) displayed in the image display section in accordance with the other embodiment.
Figure 60:
FIG. 60 is an explanatory view of game information (dividend indication) displayed in the image display section in accordance with the other embodiment.

Subsequently, the stop mode for shifting to a regular bonus game and its number of game medals to be paid out (FIG. 58), the first stop mode for shifting to a big bonus game and its number of game medals to be paid out (FIG. 59), and the second stop mode for shifting to a big bonus game and its number of game medals to be paid out (FIG. 60) are successively displayed.

Figure 61:
FIG. 61 is an explanatory view of game information (dividend indication) displayed in the image display section in accordance with the other embodiment.
Figure 62:
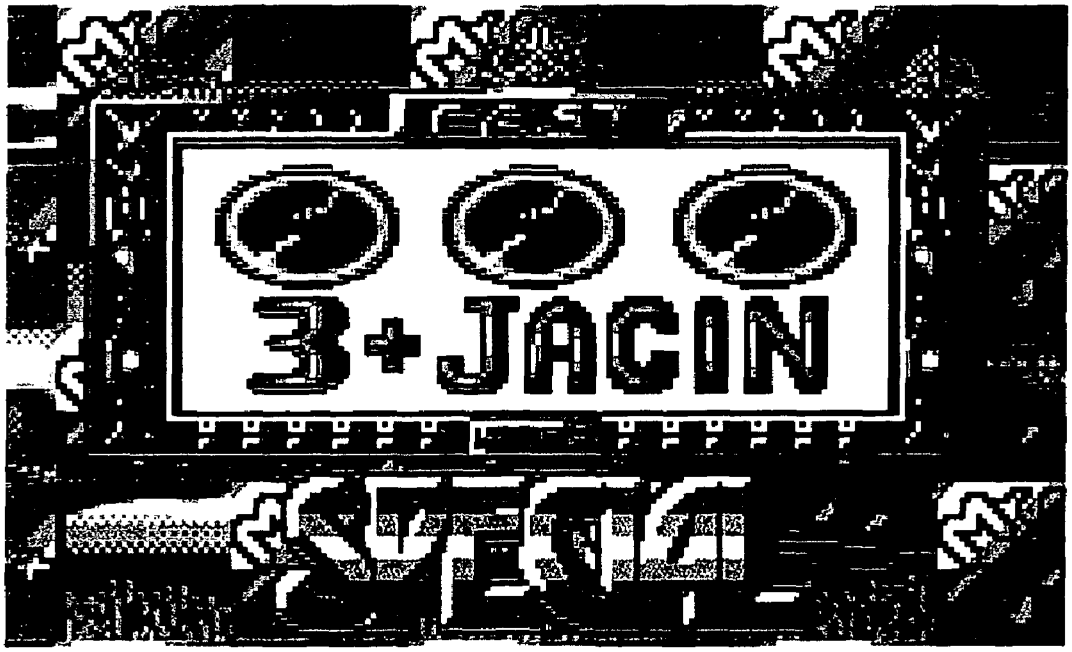
FIG. 62 is an explanatory view of game information (dividend indication) displayed in the image display section in accordance with the other embodiment.
Figure 63:
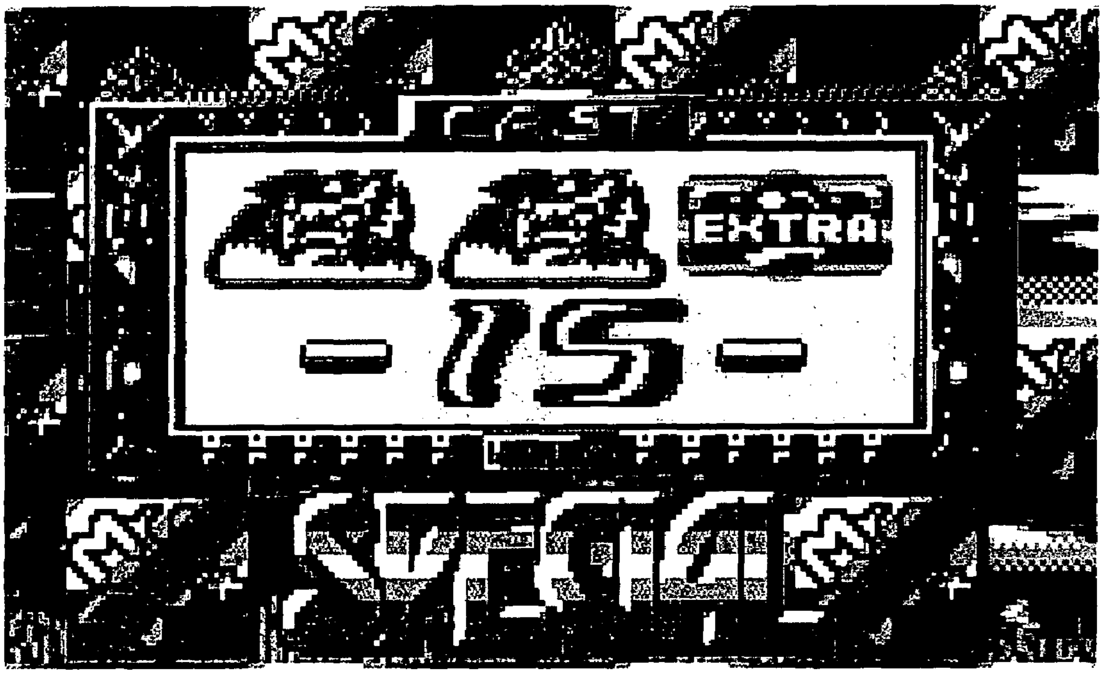
FIG. 63 is an explanatory view of game information (dividend indication) displayed in the image display section in accordance with the other embodiment.

Then, it is indicated that the following dividends are for a normal game in a big bonus game (FIG. 61), and then the stop mode for shifting to a JAC game in the big bonus game and its number of game medals to be paid out (FIG. 62), and the stop mode in which 15 game medals are paid out (FIG. 63) are successively displayed.

Figure 64:
FIG. 64 is an explanatory view of game information (dividend indication) displayed in the image display section in accordance with the other embodiment.
Figure 65:
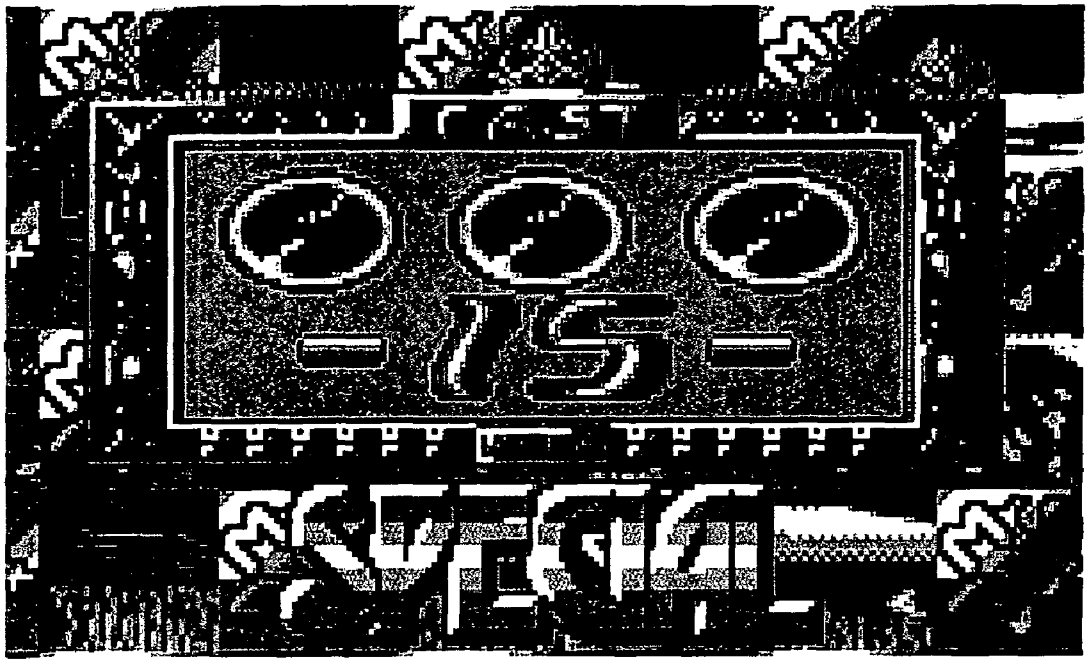
FIG. 65 is an explanatory view of game information (dividend indication) displayed in the image display section in accordance with the other embodiment.

Then it is indicated that the following dividends are for a JAC game (FIG. 64), and then the stop mode of win in the JAC game and its number of game medals to be paid out (FIG. 65) are successively displayed.

Conventionally, a dividend table has simply been printed on a panel in the upper part of the housing or the like. Such a printed display has exhibited a lower degree of visual impact. Also, in the case where dividends vary depending on the state of gaming even in similar winning modes or the like, it has been difficult for the player to understand from the printed display at which timing the reels 5*a* to 5*c* should be stopped. When the dividends are explained by an animated display and the like in the image display section 13 as mentioned above, then not only the degree of visual impression on the player enhances, but also the dividends are easier to understand since they are explained in sequence for each gaming state or each winning mode.

Game Explanation

Subsequent to the dividend display, an explanation of games in this slot machine is displayed.

Figure 66:
FIG. 66 is an explanatory view of game information (game explanation) displayed in the image display section in accordance with the other embodiment.
Figure 67:
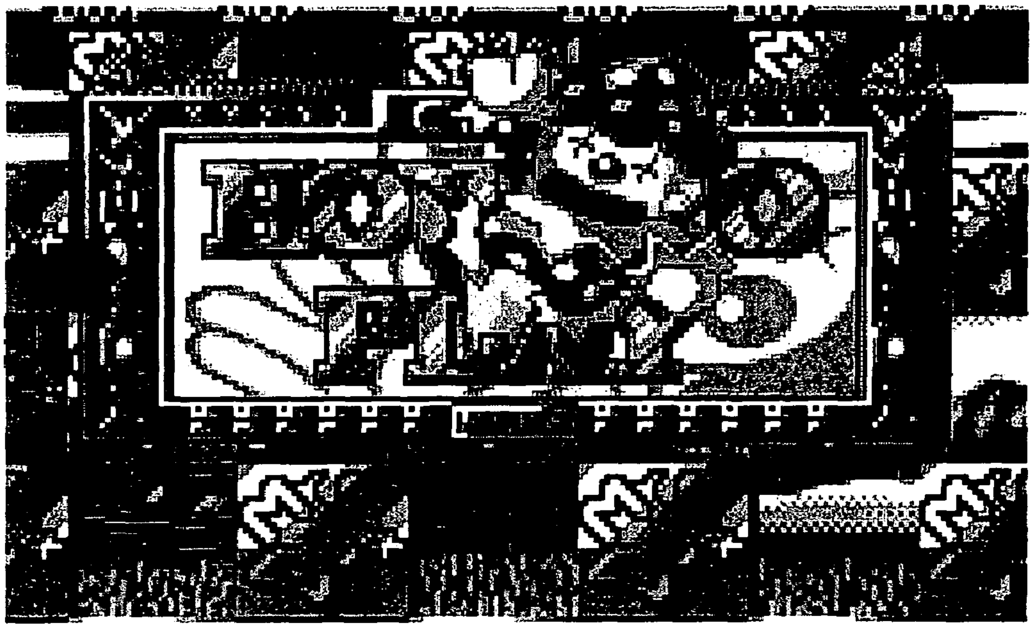
FIG. 67 is an explanatory view of game information (game explanation) displayed in the image display section in accordance with the other embodiment.
Figure 68:
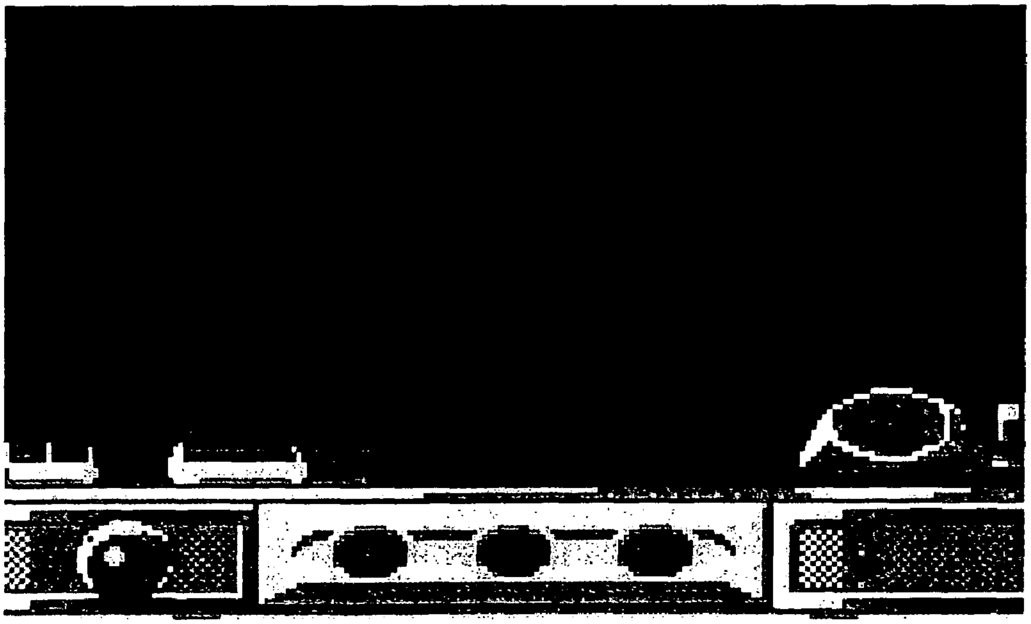
FIG. 68 is an explanatory view of game information (game explanation) displayed in the image display section in accordance with the other embodiment.
Figure 69:
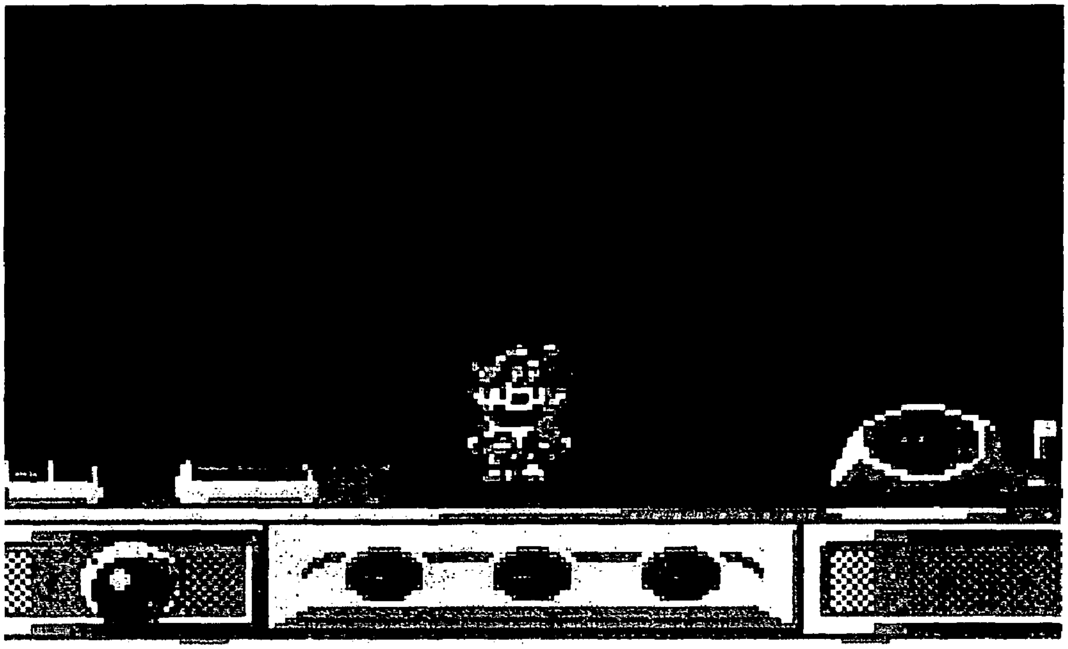
FIG. 69 is an explanatory view of game information (game explanation) displayed in the image display section in accordance with the other embodiment.

In this display of explanation, it is initially indicated that the following is the game explanation (FIG. 66), a character which acts as a leading character for displaying the game information emerges (FIG. 67), and an explanatory view for operations of the start switch 20, stop switches 21*a* to 21*c*, and the like is displayed (FIG. 68). Subsequently, the leading character emerges in a slightly scaled-down state (FIG. 69), and a specific game explanation begins.

Figure 70:
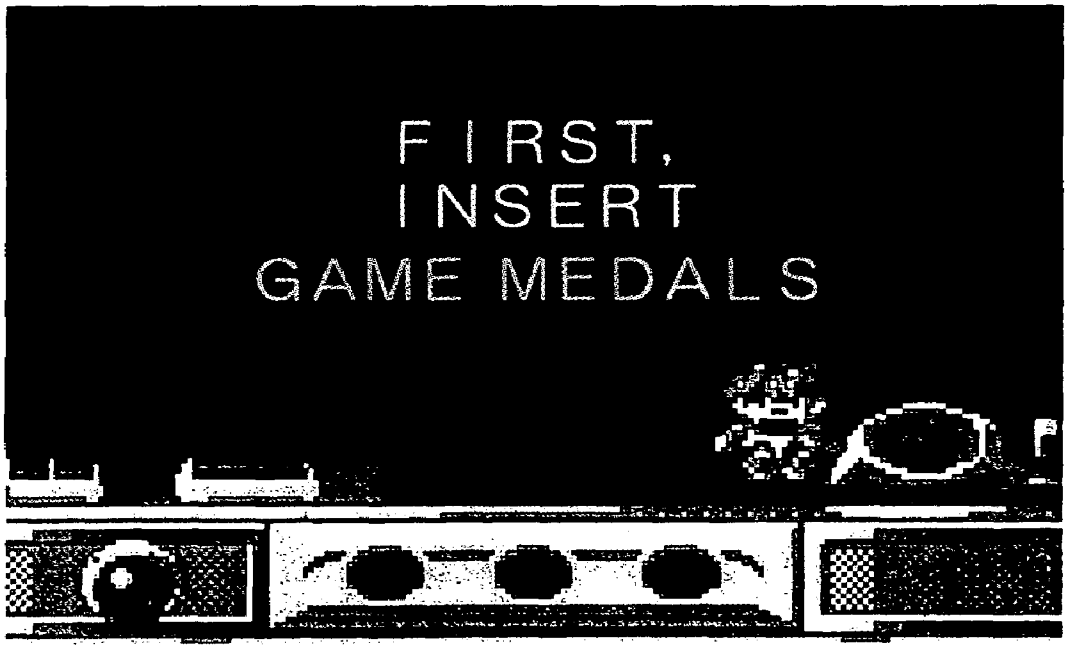
FIG. 70 is an explanatory view of game information (game explanation) displayed in the image display section in accordance with the other embodiment.
Figure 71:
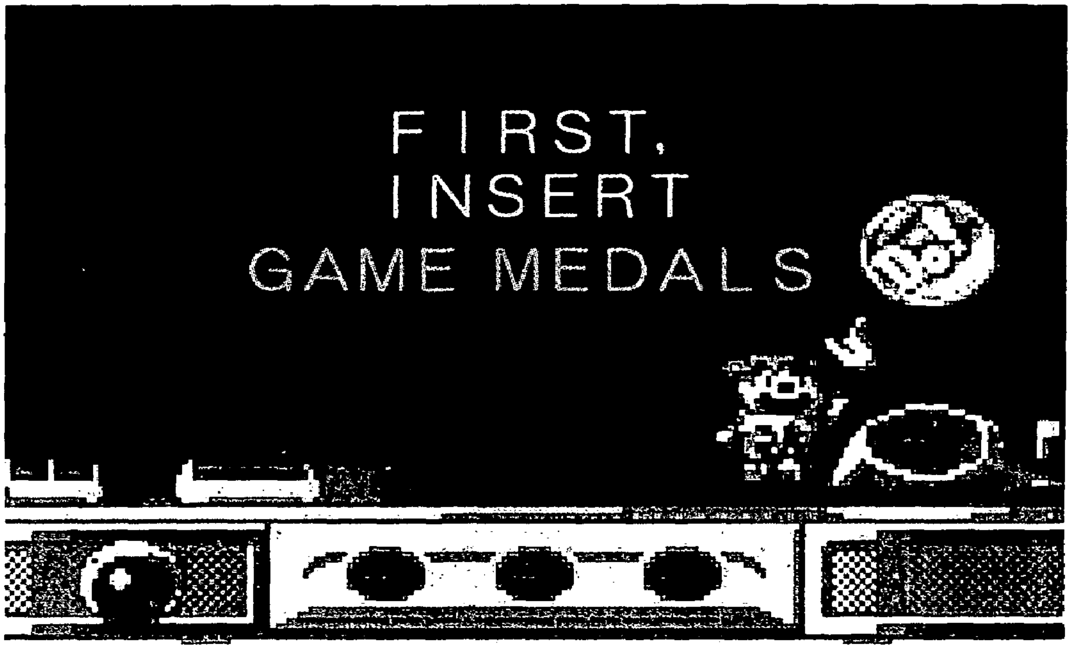
FIG. 71 is an explanatory view of game information (game explanation) displayed in the image display section in accordance with the other embodiment.
Figure 72:
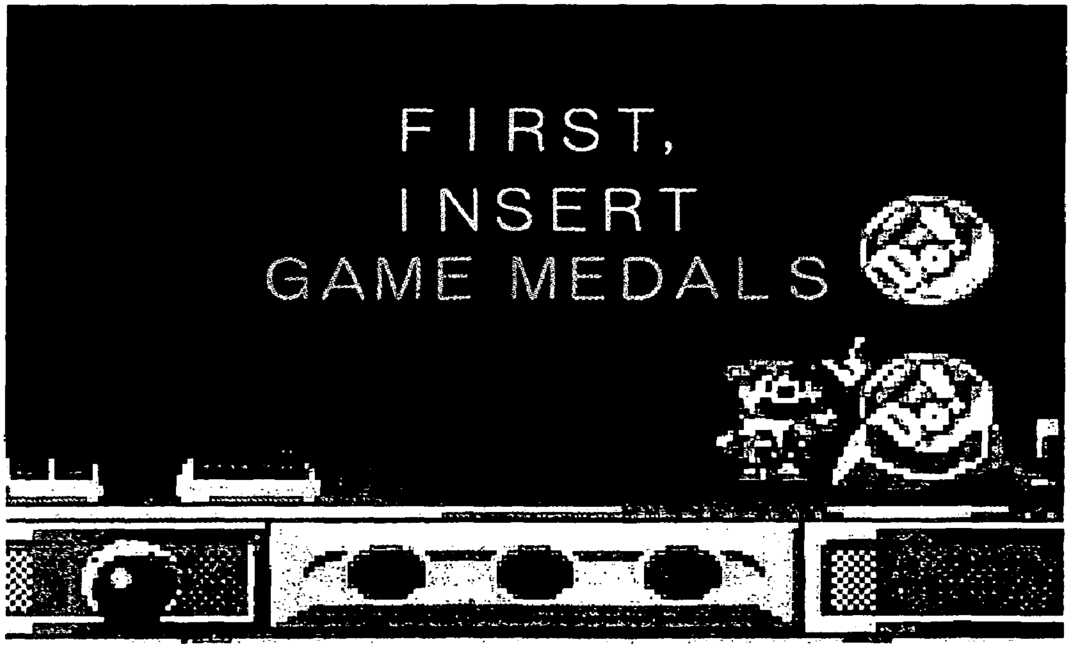
FIG. 72 is an explanatory view of game information (game explanation) displayed in the image display section in accordance with the other embodiment.
Figure 73:
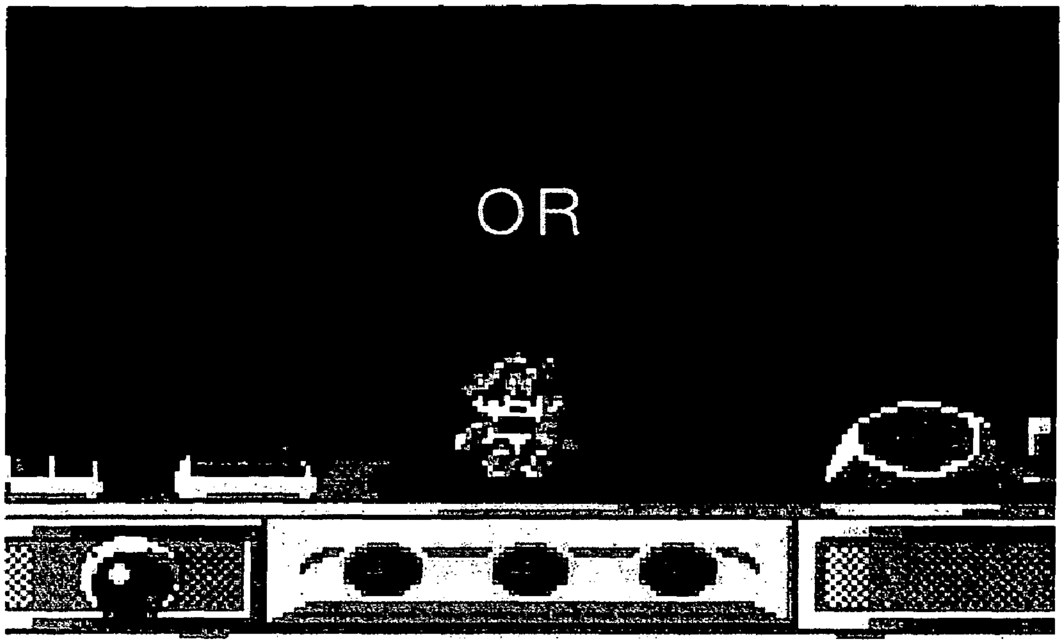
FIG. 73 is an explanatory view of game information (game explanation) displayed in the image display section in accordance with the other embodiment.
Figure 74:
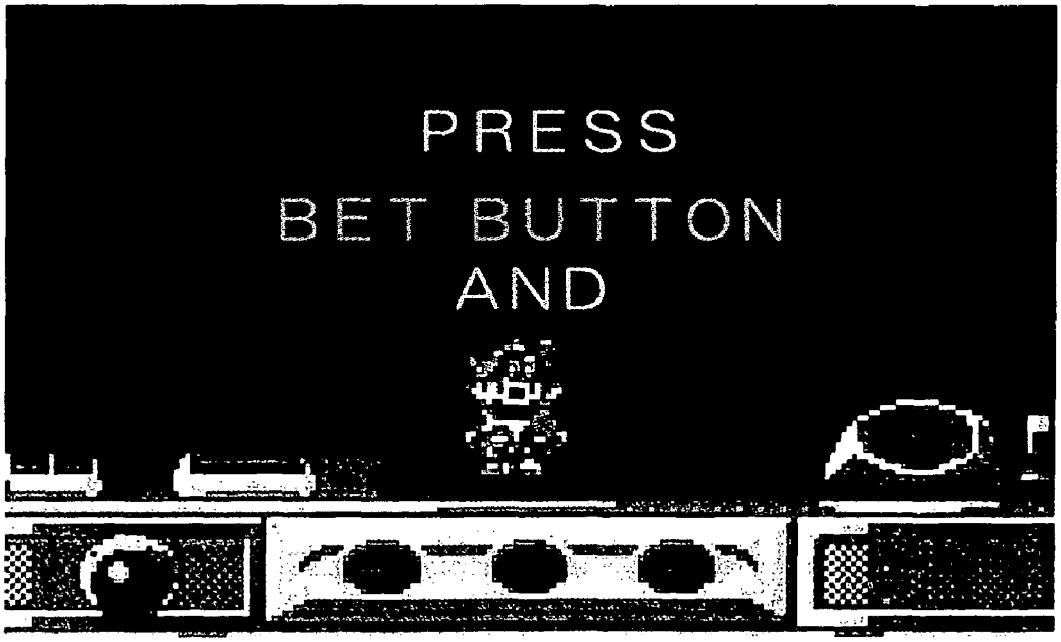
FIG. 74 is an explanatory view of game information (game explanation) displayed in the image display section in accordance with the other embodiment.
Figure 75:
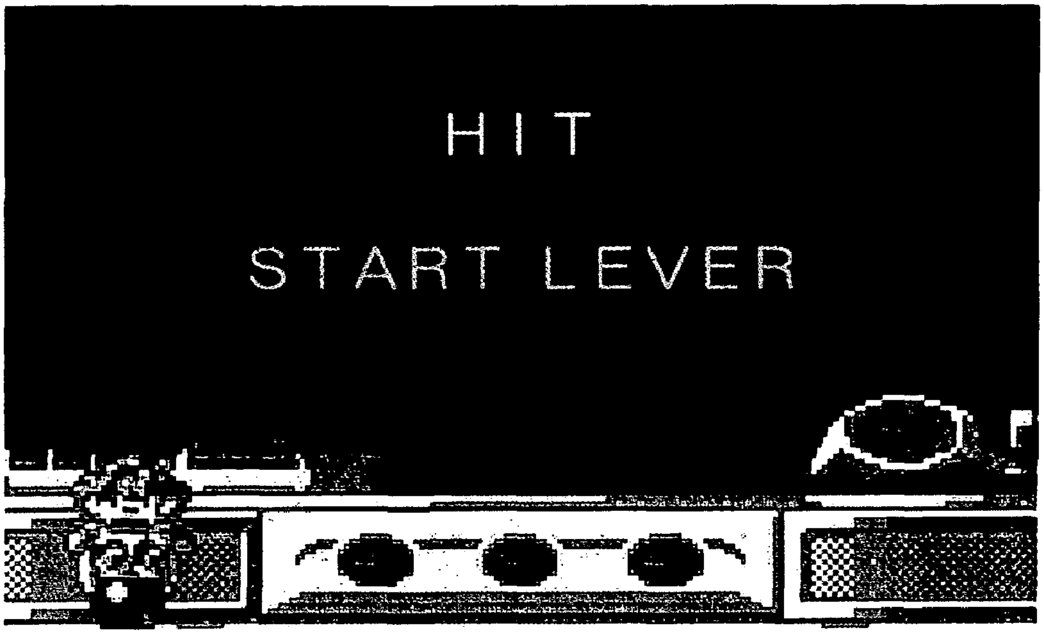
FIG. 75 is an explanatory view of game information (game explanation) displayed in the image display section in accordance with the other embodiment.
Figure 76:
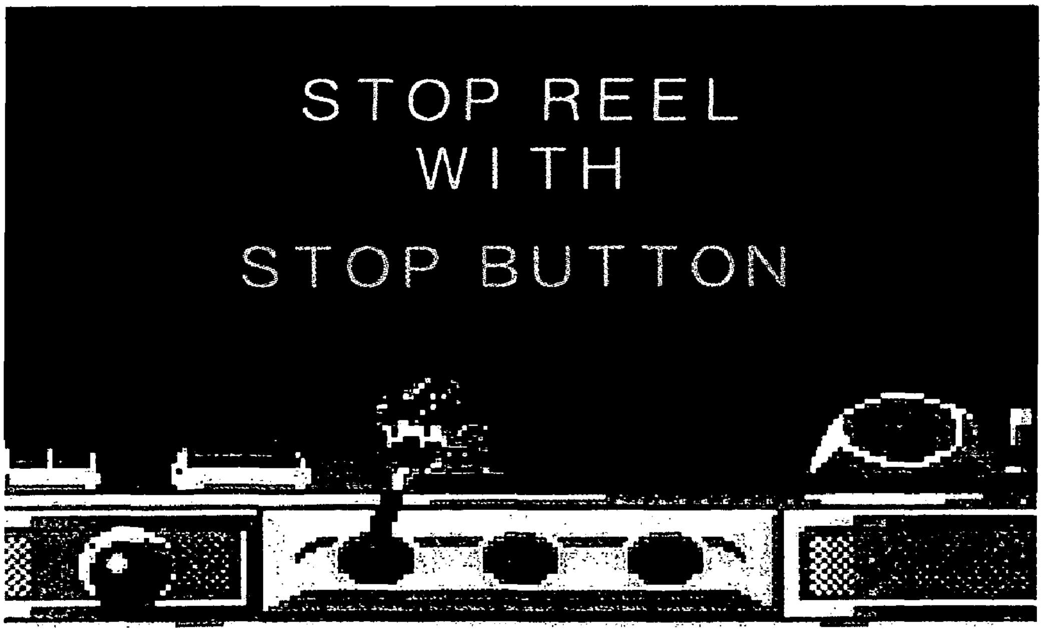
FIG. 76 is an explanatory view of game information (game explanation) displayed in the image display section in accordance with the other embodiment.
Figure 77:
FIG. 77 is an explanatory view of game information (game explanation) displayed in the image display section in accordance with the other embodiment.

The specific game explanation is successively carried out for how to insert medals (FIGS. 70 to 72) or how to operate the bet switches 16, 17, and 18 (FIGS. 73 and 74), how to operate the start switch 20 (FIG. 75), and how to operate the stop switches 21*a* to 21*c* (FIG. 76), whereby the game explanation for one game ends (FIG. 77). Conventionally, a game explanation sheet attached to the housing or the like is used for the game explanation. In a dim parlor or the like, it has been difficult or impossible for the player to read the contents of explanation. Also, the player may have failed to notice the game explanation sheet attached to the housing.

When the game explanation is carried out by an animated display using a character or the like, texts of the explanation are displayed in the image display section 13, whereby the contents of explanation can clearly be seen even in a dim parlor. Also, since the explanation is carried out by an animated display, even a novice player can reliably grasp the flow of gaming.

Attraction in Normal Game

FIG. 283 is an enlarged view of the image display section. In the upper part of the screen, there is an appearing symbol variable display area 400, in which a left appearing symbol 400*a*, a center appearing symbol 400*b*, and a right appearing symbol 400*c* are displayed. Each appearing symbol is any of "E," "X," " T," "R" "A," "7," "BAR," "cake," and "cookie" as shown on the left-end column of the appearing symbol selection tables of FIGS. 42A and 42B. These symbols are displayed in a scrolling manner from the upper side to the lower side upon the starting operation by the player, and then are displayed in their stopped state according to the stopping operation by the player.

Figure 93:
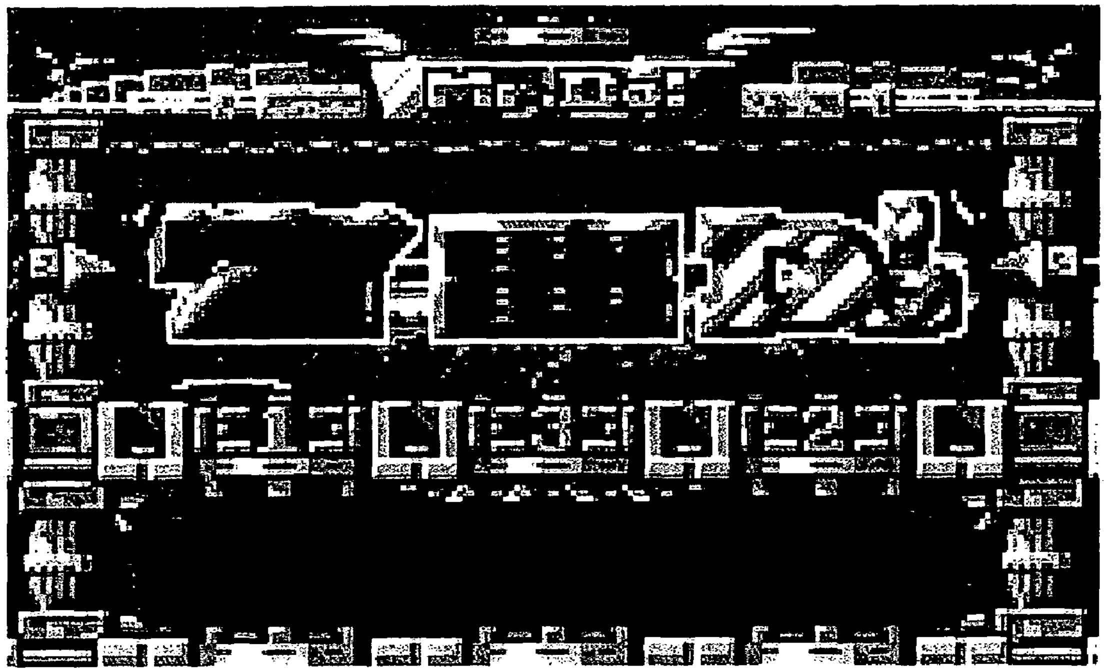
FIG. 93 is an explanatory view of game information (attraction in a normal game) displayed in the image display section in accordance with the other embodiment.
Figure 94:
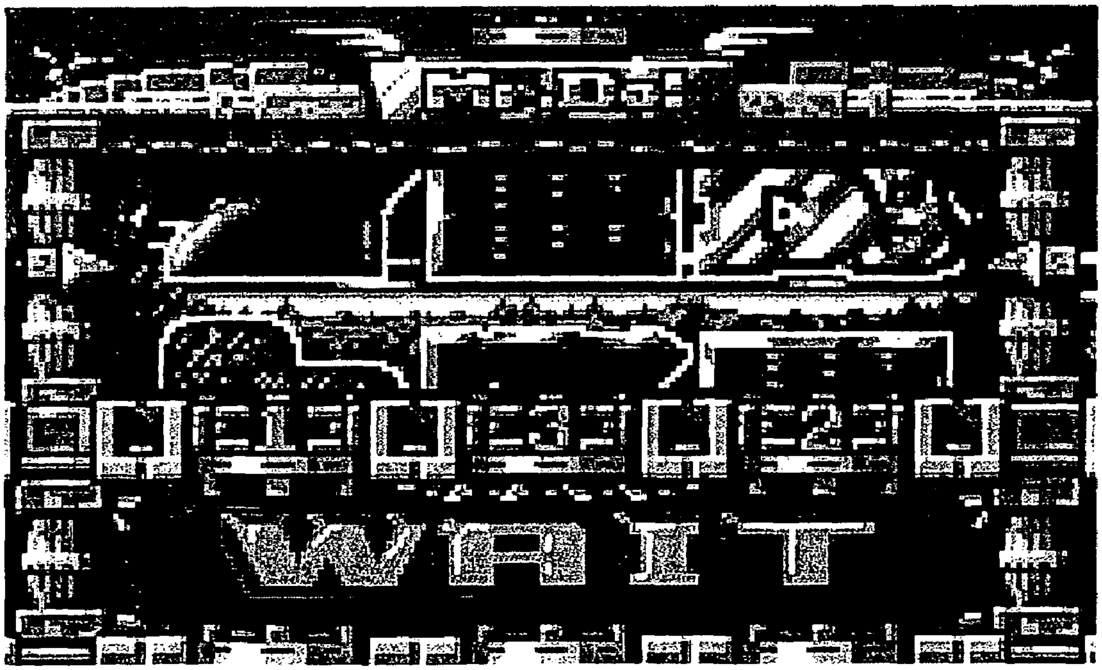
FIG. 94 is an explanatory view of game information (attraction in the normal game) displayed in the image display section in accordance with the other embodiment.
Figure 95:
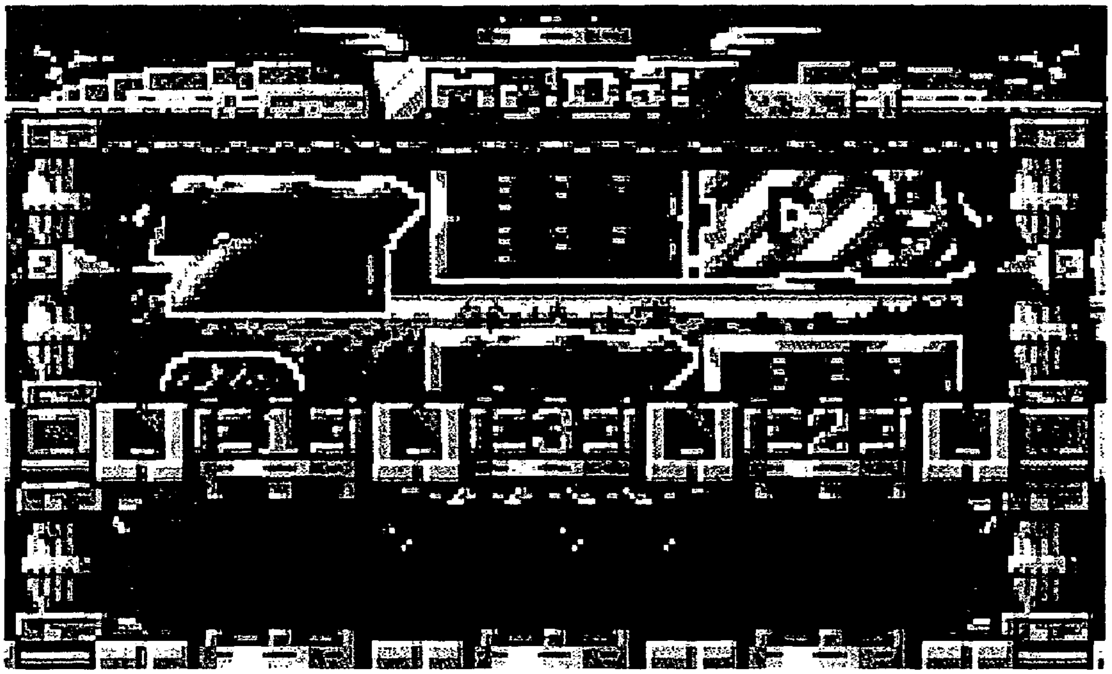
FIG. 95 is an explanatory view of game information (attraction in the normal game) displayed in the image display section in accordance with the other embodiment.

When game medals are inserted into the medal insertion slot 14 or the bet switches 16, 17, and 18 are operated, so that a game is ready to start, then the start switch 20 is made effective, whereby the game is started. Then, attractions in the game are carried out in the image display section 13. In attractions in a normal game, three appearing symbols are initially displayed from side to side in their stopped state (FIG. 93), letters of "WAIT" are displayed on the lower side of the screen so as to indicate that it is a wait time until the start switch 20 is made effective (FIG. 94), and then, while letters of "GO" emerge on the lower side of the screen, the appearing symbols begin to change along with rotations of the reels 5*a* to 5*c* (FIG. 95).

Figure 96:
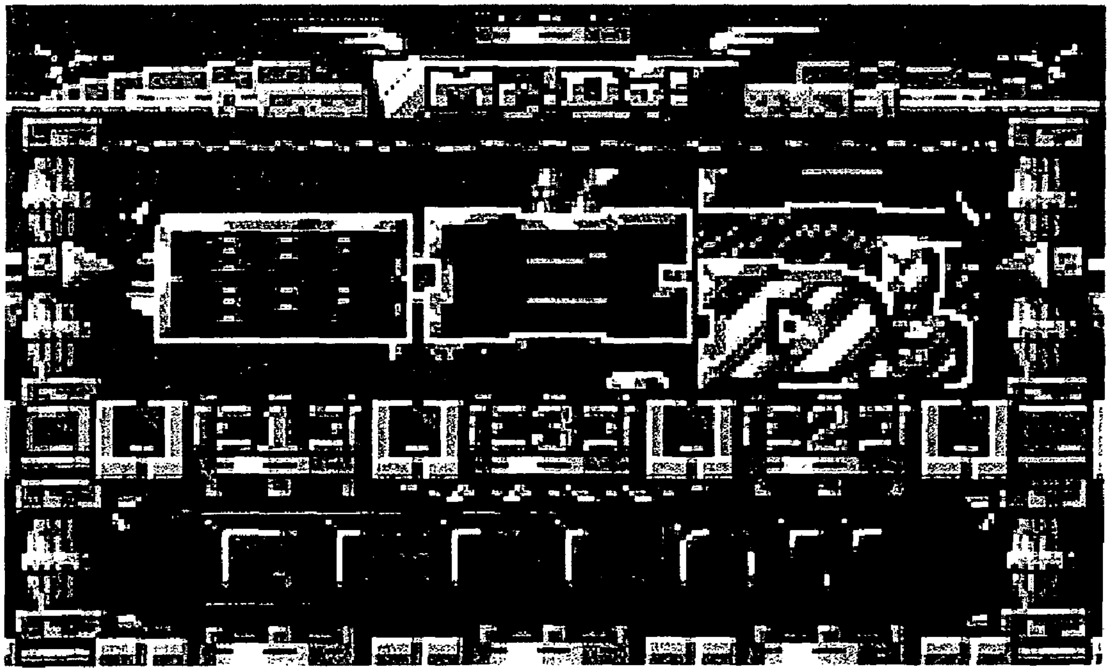
FIG. 96 is an explanatory view of game information (attraction in the normal game) displayed in the image display section in accordance with the other embodiment.
Figure 97:
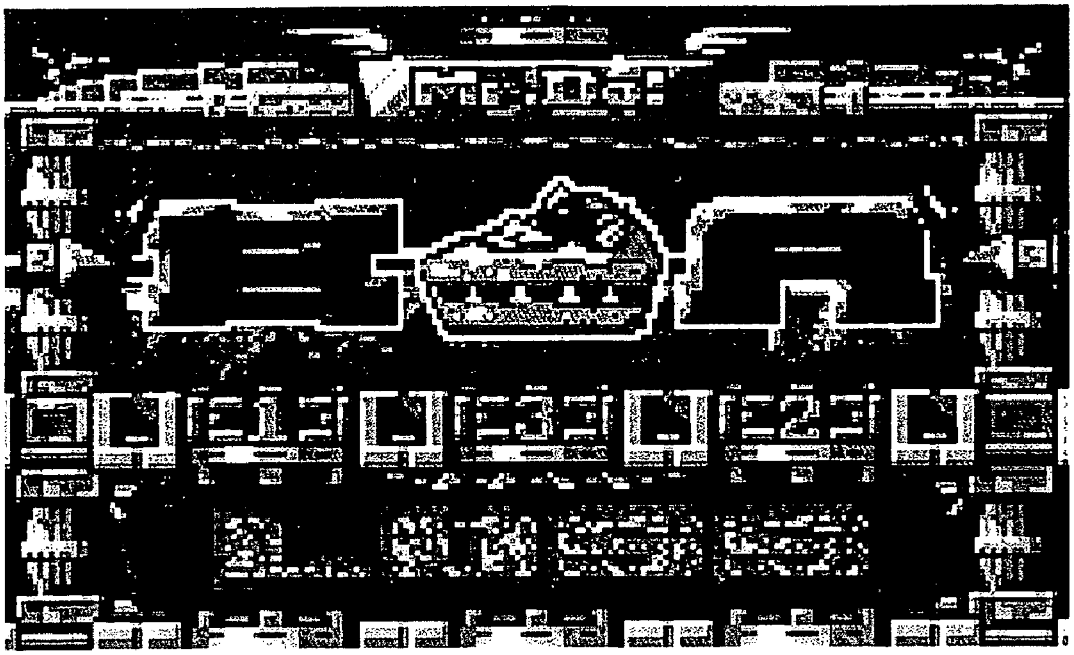
FIG. 97 is an explanatory view of game information (attraction in the normal game) displayed in the image display section in accordance with the other embodiment.

Then, in response to timings at which the reels 5*a* to 5*c* stop as the stop switches 21*a* to 21*c* are operated, the appearing symbols stop changing. If a winning mode is actually constructed on a winning line, e.g., a replay is won, then letters of "REPLAY" is displayed (FIG. 96). If no winning mode is constructed, then letters of "LOSS" are displayed (FIG. 97).

Figure 98:
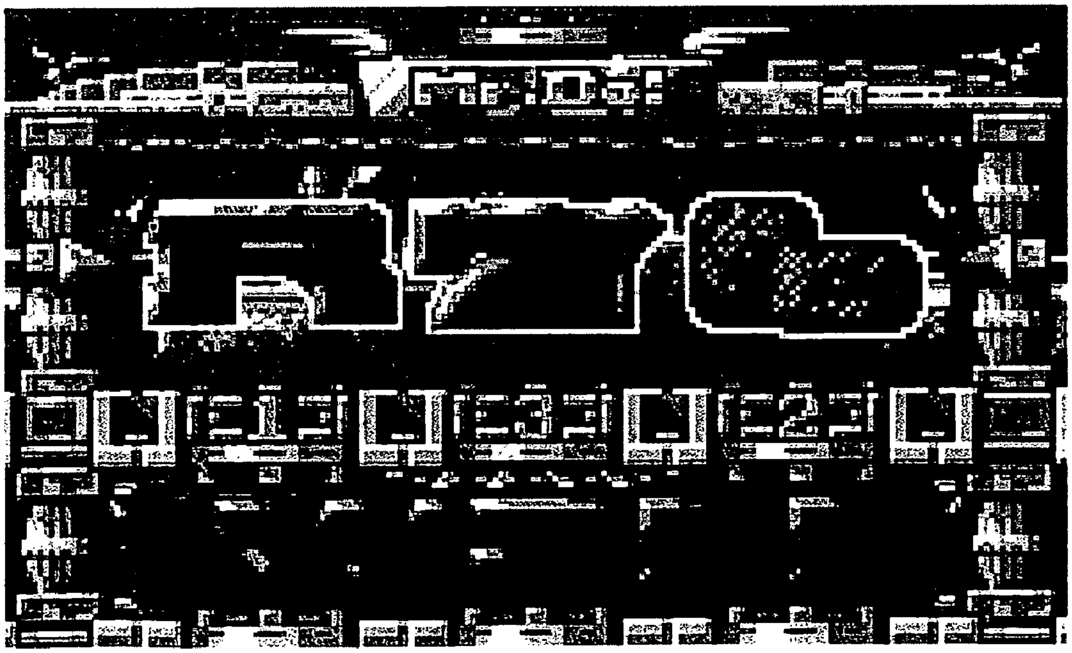
FIG. 98 is an explanatory view of game information (attraction in the normal game) displayed in the image display section in accordance with the other embodiment.

Also, as an attraction in the case where an actual stop mode in the reels 5*a* to 5*c* constructs a winning mode, letters of "WIN" indicating a winning are displayed notwithstanding the fact that no winning mode is constructed by the appearing symbols displayed in the image display section 13 (FIG. 98). Namely, the display of "WIN" or "LOSS" indicates whether each winning mode is constructed on the effective winning line or not.

Though the variable display of appearing symbols is started at the timing at which the variable display of reels 5*a* to 5*c* is started in the above-mentioned embodiment, without being restricted thereto, it may be started at any timing, for example, when the insertion of game medals is detected, when the first stopping operation for the stop switches 21*a* to 21*c* is effected, when all the reels 5*a* to 5*c* are displayed in their stopped state, or at a totally random timing using a random number.

Also, though the appearing symbols being variably displayed are stopped at stopping timings of the reels 5*a* to 5*c*, without being restricted thereto, they may be stopped at any timing, for example, after the lapse of a predetermined time from the starting of the variable display, when the first stopping operation for the stop switches 21*a* to 21*c* is effected, when all the reels 5*a* to 5*c* are displayed in their stopped state, or at a totally random timing using a random number.

Conventionally, displays such as "WAIT," "WIN," and the like have been indicated to the player by lighting their corresponding lamps and the like which are separately provided. When all items of game information are displayed by the image display section 13 as mentioned above, the player can appreciate the information without moving the viewing point, whereby the current state is easier to grasp.

Conventionally, though the display of "WIN" has been effected (by lighting a lamp or the like), "LOSS" has not been displayed, whereby it has been difficult to discern whether it is won or not. When any of "WIN" or "LOSS" is displayed as mentioned above, whether it is won or not can be clearly discerned.

Notification of Internally Elected Hand in Appearing Symbol Attraction

Figure 99:
FIG. 99 is an explanatory view of game information (attraction in the normal game) displayed in the image display section in accordance with the other embodiment.
Figure 100:
FIG. 100 is an explanatory view of game information (attraction in the normal game) displayed in the image display section in accordance with the other embodiment.

In this notification of internal election, three appearing symbols are once stopped in their disordered state as shown in FIG. 98, and then changing is restarted (FIG. 99). Subsequently, they are stopped again while constructing a winning mode (FIG. 100). FIG. 100 shows a case where the winning hand "cherry" is internally elected, and letters of "CHERRY" and the winning mode are displayed, whereby the internally elected hand ("CHERRY" indicating that group 1 including "DB" is internally elected) is indicated. Nothing is displayed when there is no internally elected hand (i.e., a miss).

Figure 101:
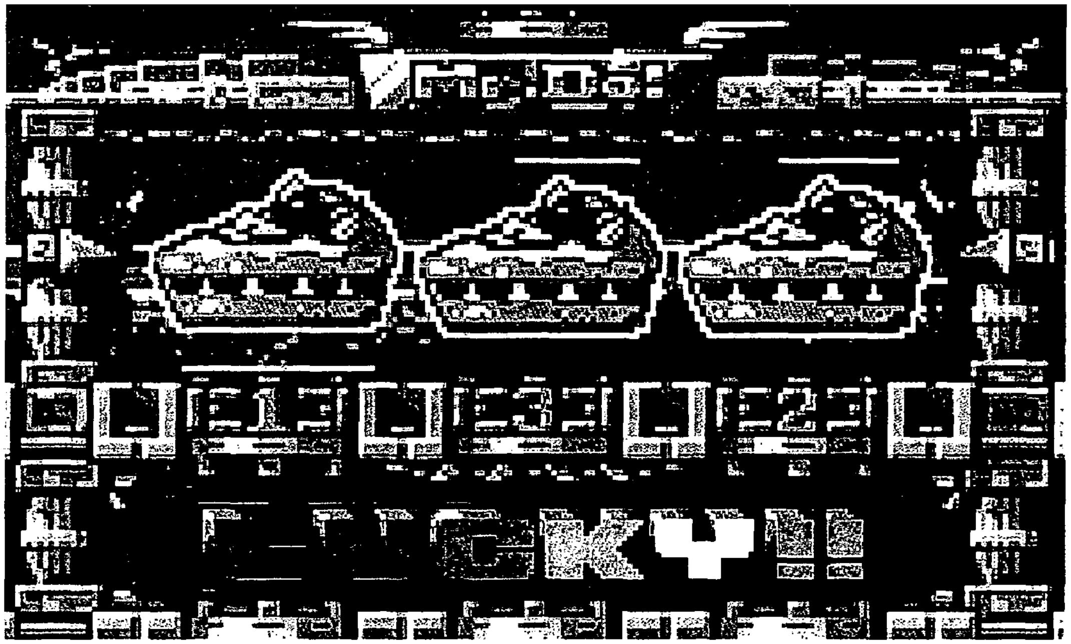
FIG. 101 is an explanatory view of game information (notification of an internal election) displayed in the image display section in accordance with the other embodiment.
Figure 102:
FIG. 102 is an explanatory view of game information (notification of the internal election) displayed in the image display section in accordance with the other embodiment.
Figure 103:
FIG. 103 is an explanatory view of game information (notification of the internal election) displayed in the image display section in accordance with the other embodiment.
Figure 104:
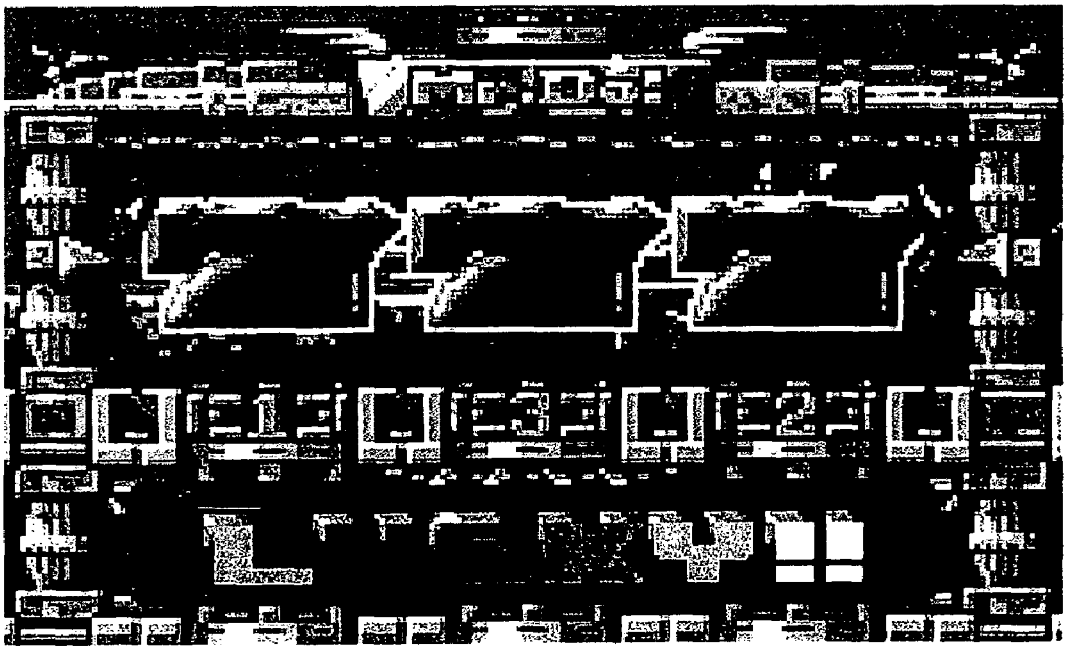
FIG. 104 is an explanatory view of game information (notification of the internal election) displayed in the image display section in accordance with the other embodiment.

In another mode of notification, three appearing symbols are once stopped in the state where identical symbols align from side to side (FIG. 101), and then they are changed again (FIGS. 102 to 103), so as to start displaying what the internally elected hand is (FIG. 104).

Figure 105:
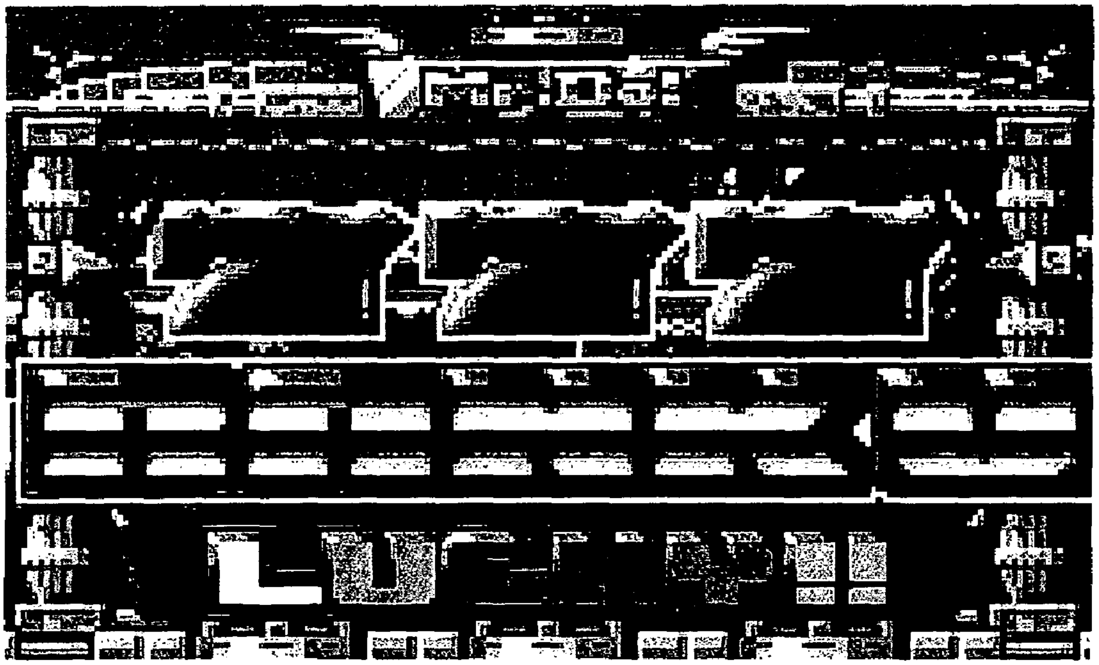
FIG. 105 is an explanatory view of game information (notification of the internal election) displayed in the image display section in accordance with the other embodiment.
Figure 106:
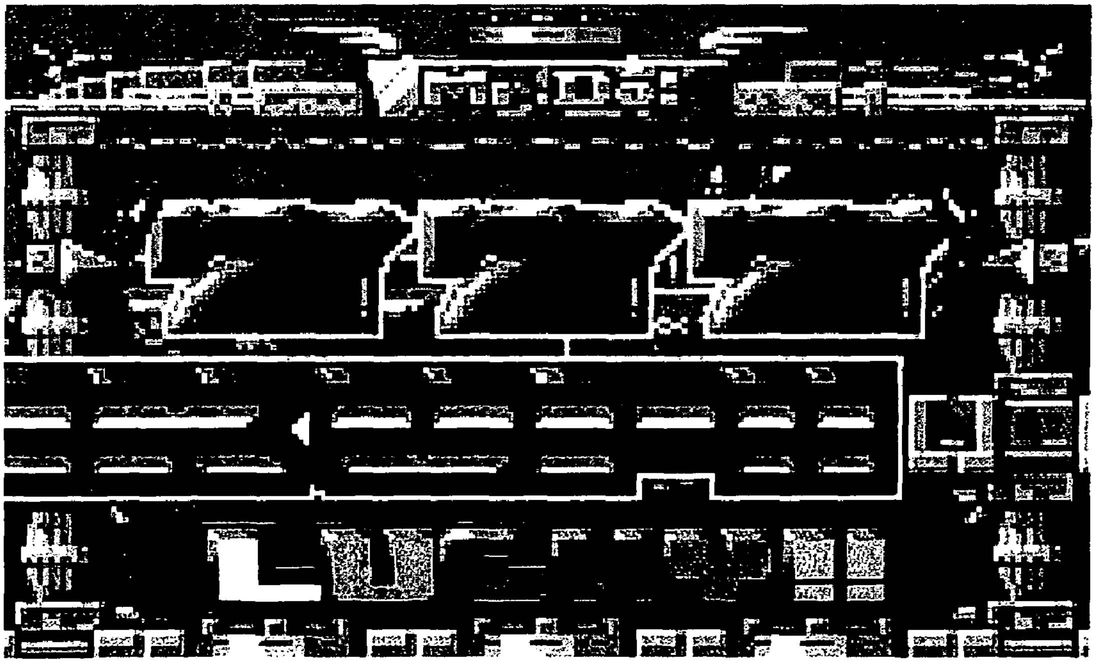
FIG. 106 is an explanatory view of game information (notification of the internal election) displayed in the image display section in accordance with the other embodiment.
Figure 107:
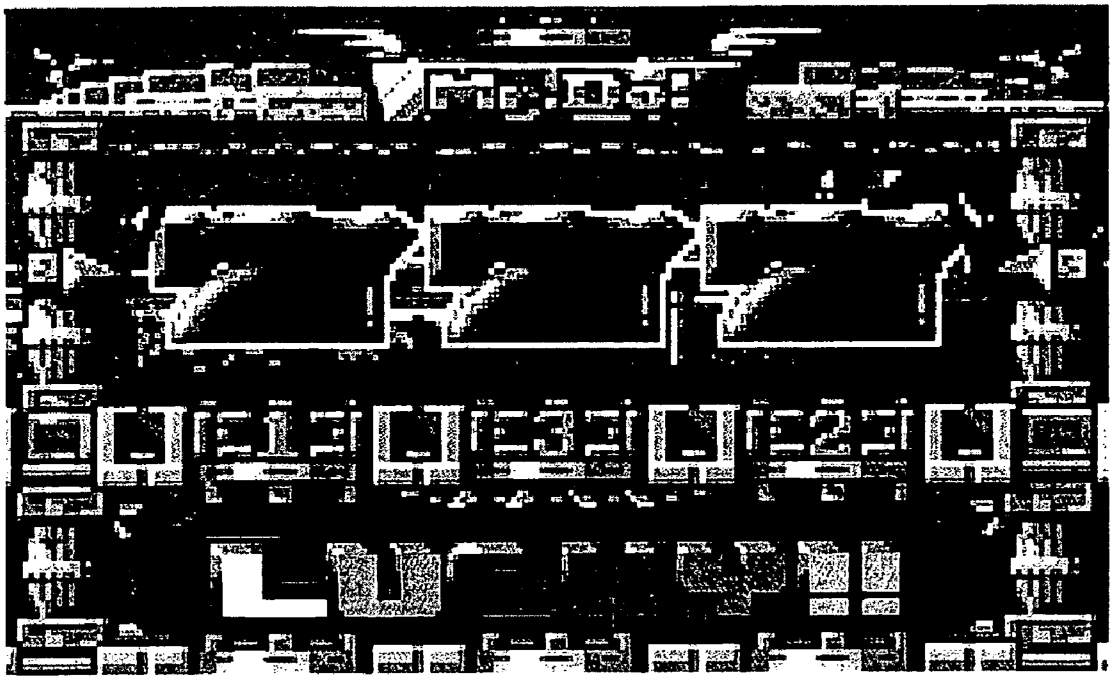
FIG. 107 is an explanatory view of game information (notification of the internal election) displayed in the image display section in accordance with the other embodiment.

In the display of internally elected hand in this case, for example, letters of "RANK UP" are displayed in a laterally flowing manner (FIGS. 105 and 106), and then three frames of "7" are displayed from side to side in their stopped state, so as to indicate that a big bonus has been internally elected (FIG. 107).

Figure 108:
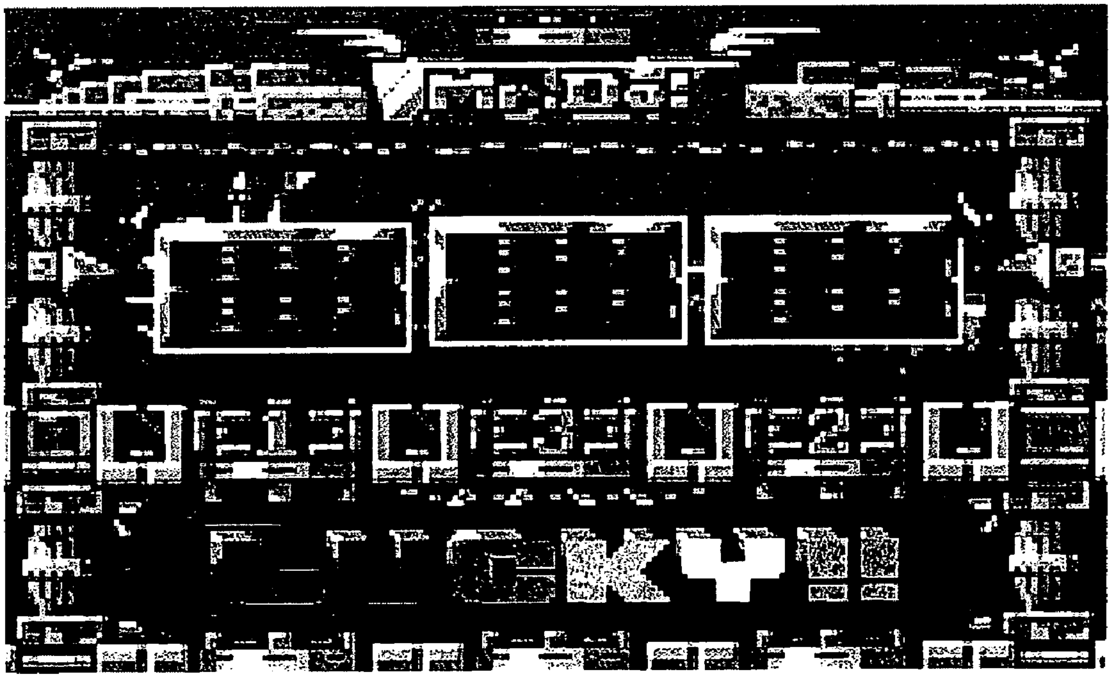
FIG. 108 is an explanatory view of game information (notification of the internal election) displayed in the image display section in accordance with the other embodiment.
Figure 109:
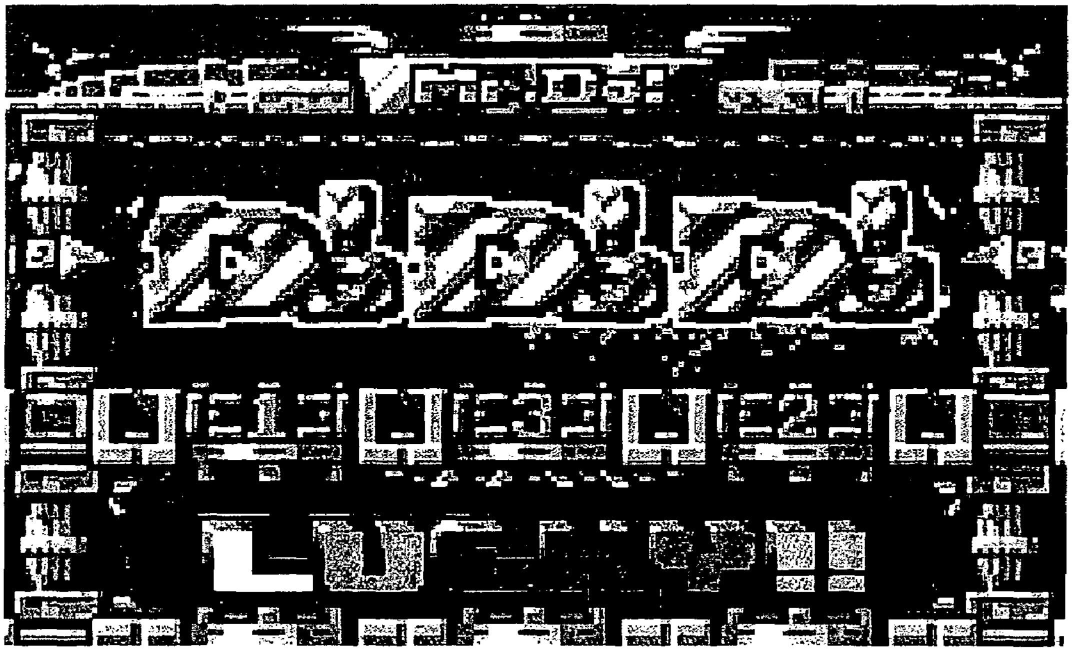
FIG. 109 is an explanatory view of game information (notification of the internal election) displayed in the image display section in accordance with the other embodiment.
Figure 110:
FIG. 110 is an explanatory view of game information (notification of the internal election) displayed in the image display section in accordance with the other embodiment.
Figure 111:
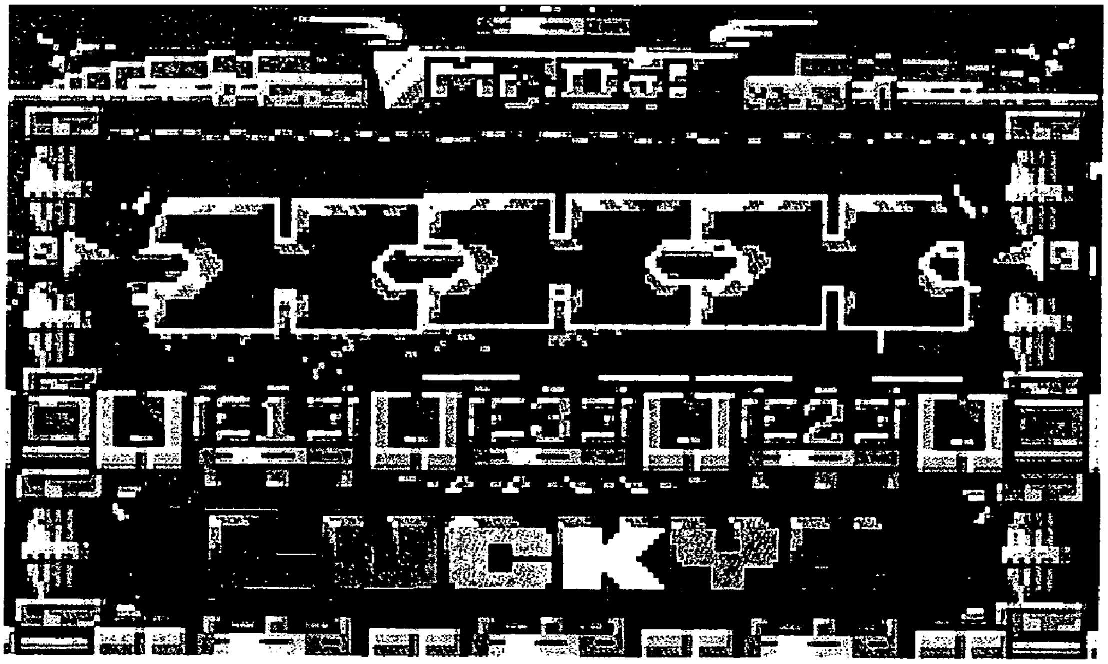
FIG. 111 is an explanatory view of game information (notification of the internal election) displayed in the image display section in accordance with the other embodiment.
Figure 112:
FIG. 112 is an explanatory view of game information (notification of the internal election) displayed in the image display section in accordance with the other embodiment.
Figure 113:
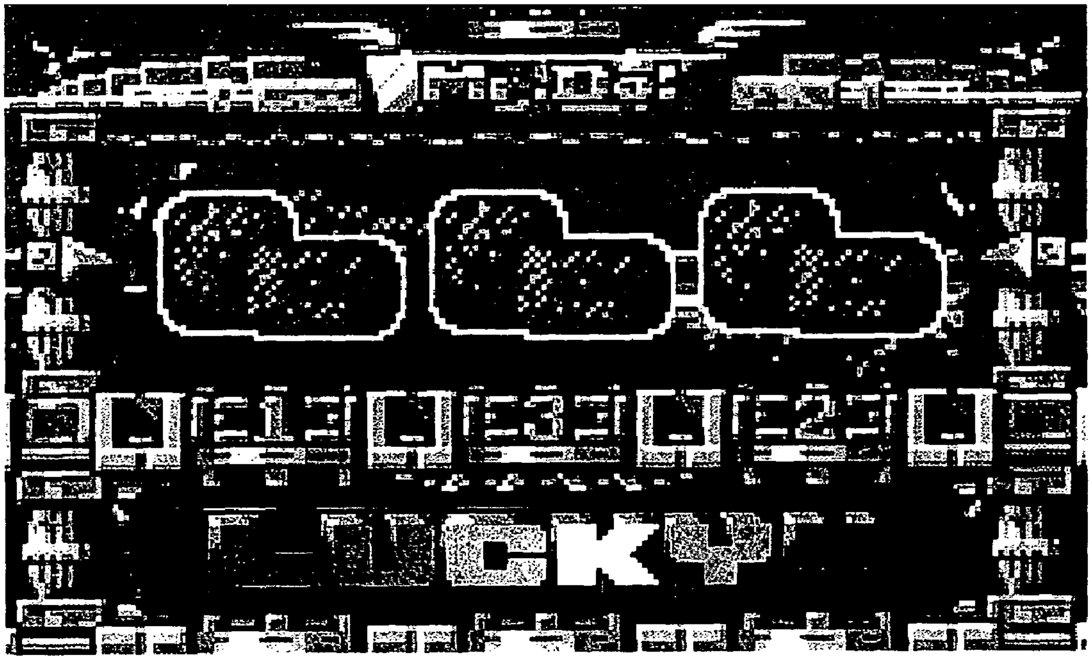
FIG. 113 is an explanatory view of game information (notification of the internal election) displayed in the image display section in accordance with the other embodiment.

In other examples of display, three frames of "BAR" are displayed from side to side in their stopped state, so as to indicate that a regular bonus has been internally elected (FIG. 108); three frames of "Do!" are displayed from side to side in their stopped state, so as to indicate that a big bonus or regular bonus has been internally elected (FIG. 109); three frames of "R" are displayed from side to side in their stopped state, so as to indicate that a replay winning mode has been internally elected (FIG. 110); three frames of "X" are displayed from side to side in their stopped state, so as to indicate that a so-called small hand winning mode has been internally elected (FIG. 111); three frames of "cake" are displayed from side to side in their stopped state, so as to indicate that a big bonus or regular bonus has been internally elected (FIG. 112); and three frames of "cookie" are displayed from side to side in their stopped state, so as to indicate that a big bonus or regular bonus has been internally elected (FIG. 113).

Thus, when indicating an internally elected hand, if it is displayed in two separate stages, the enjoyment of the player can further be enhanced.

Though the ranking of appearing symbols is raised from the BB/RB common appearing symbols to the BB definition appearing symbols in the above-mentioned embodiment, it may be conversely lowered from the BB definition appearing symbols to the BB/RB common appearing symbols.

Notice of Internally Elected Hand by Ready-State Attraction

In addition to the above-mentioned attractions in normal games, a ready-state attraction, which is one of attractions concerning whether a big bonus or regular bonus is internally elected or not, is carried out. In this embodiment, broadly-classified seven modes of ready-state attraction will be explained. Here, the possibility of internal election of the big bonus or regular bonus is noticed with a predetermined reliability, and the noticed bonus hand is not always internally elected.

Ready-State Attraction 1

Figure 114:
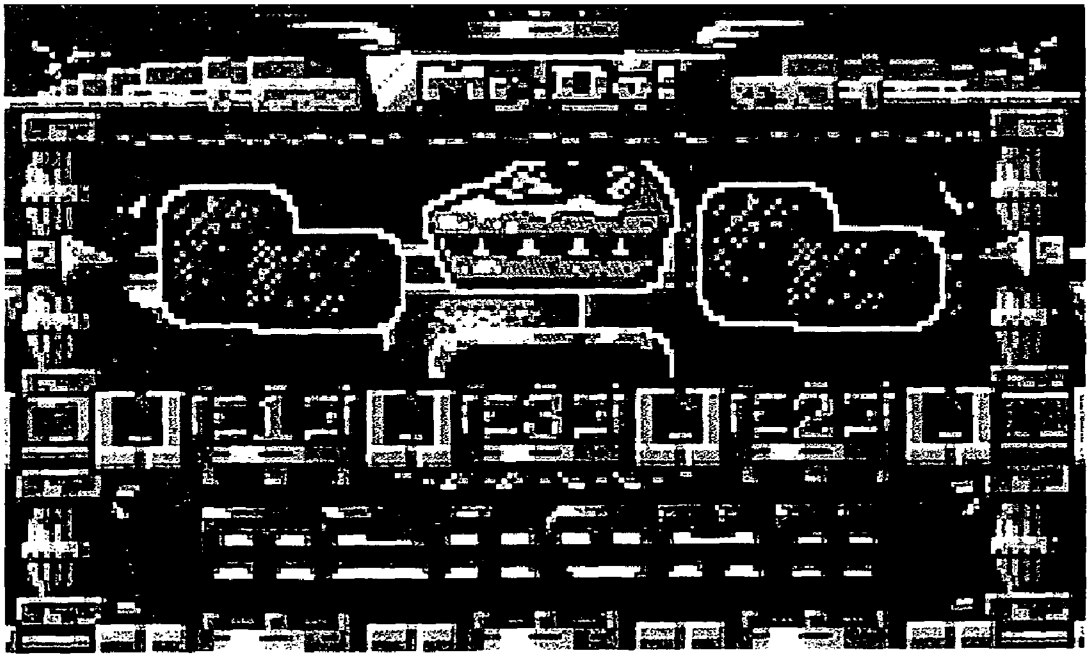
FIG. 114 is an explanatory view of game information (notice of an internally elected hand by a ready-state attraction: ready-state attraction 1) displayed in the image display section in accordance with the other embodiment.
Figure 115:
FIG. 115 is an explanatory view of game information (notice of the internally elected hand by the ready-state attraction: ready-state attraction 1) displayed in the image display section in accordance with the other embodiment.

In ready-state attraction 1, of three appearing symbols displayed from side to side, identical appearing symbols "cookie" are initially displayed on the left and right sides in their stopped state, and then, while the appearing symbol "cookie" identical to the left and right is displayed at the center in its stopped state, letters of "REACH" are displayed on the lower side of the screen (FIG. 114), so as to indicate that there is a possibility of a bonus hand being internally elected (FIG. 115).

Ready-State Attraction 2

Figure 116:
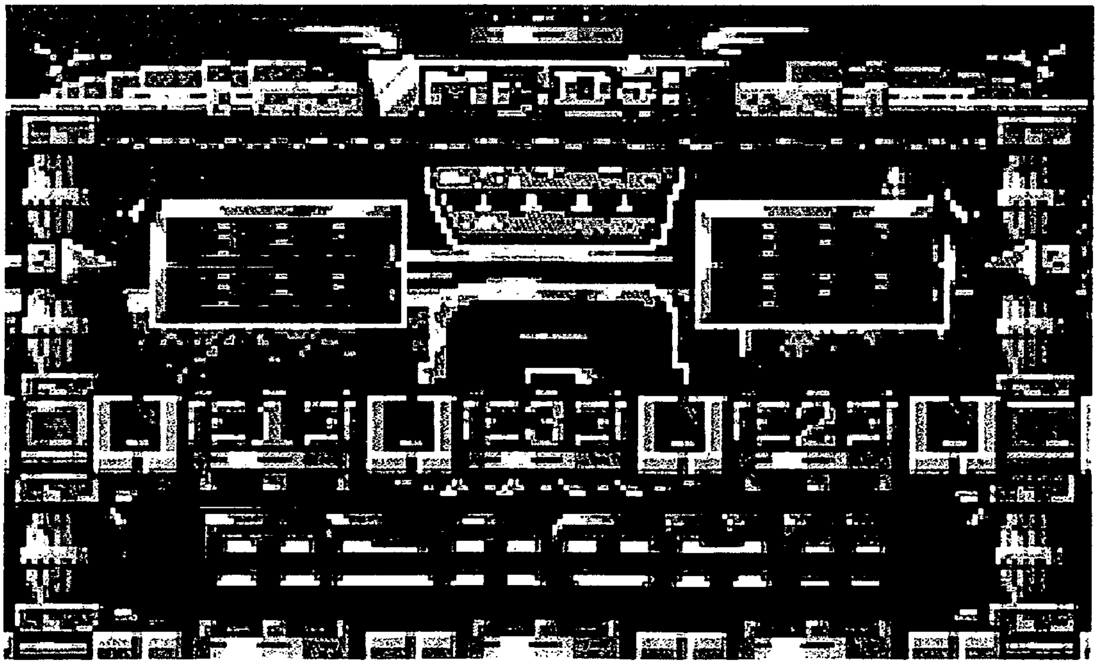
FIG. 116 is an explanatory view of game information (notice of an internally elected hand by a ready-state attraction: ready-state attraction 2) displayed in the image display section in accordance with the other embodiment.
Figure 117:
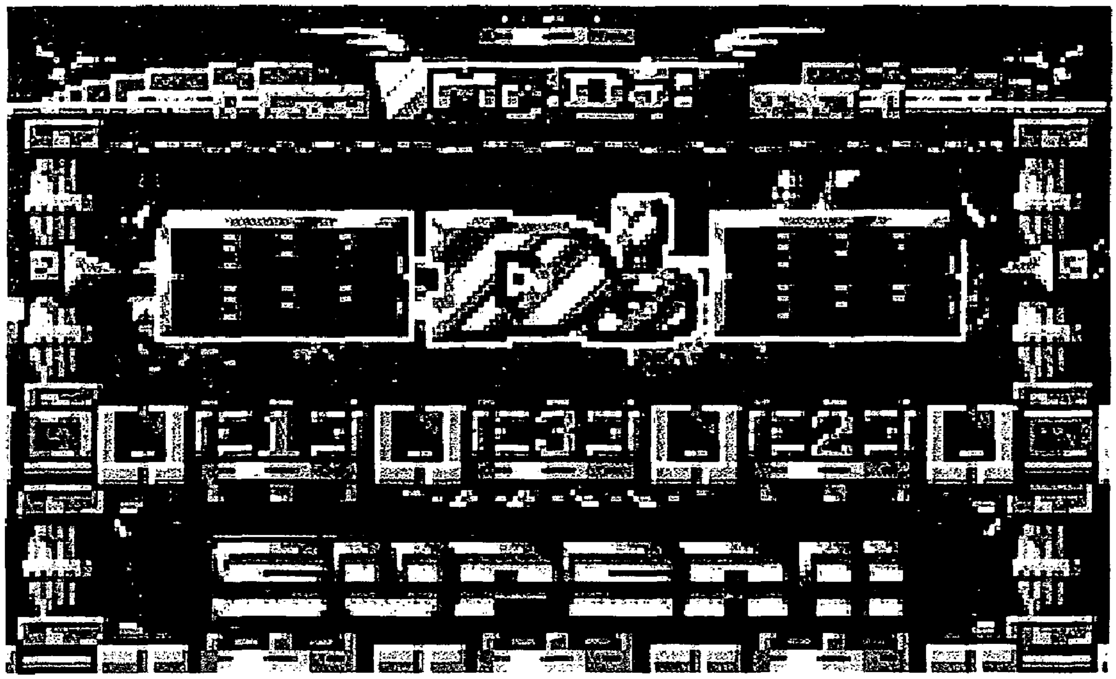
FIG. 117 is an explanatory view of game information (notice of the internally elected hand by the ready-state attraction: ready-state attraction 2) displayed in the image display section in accordance with the other embodiment.
Figure 118:
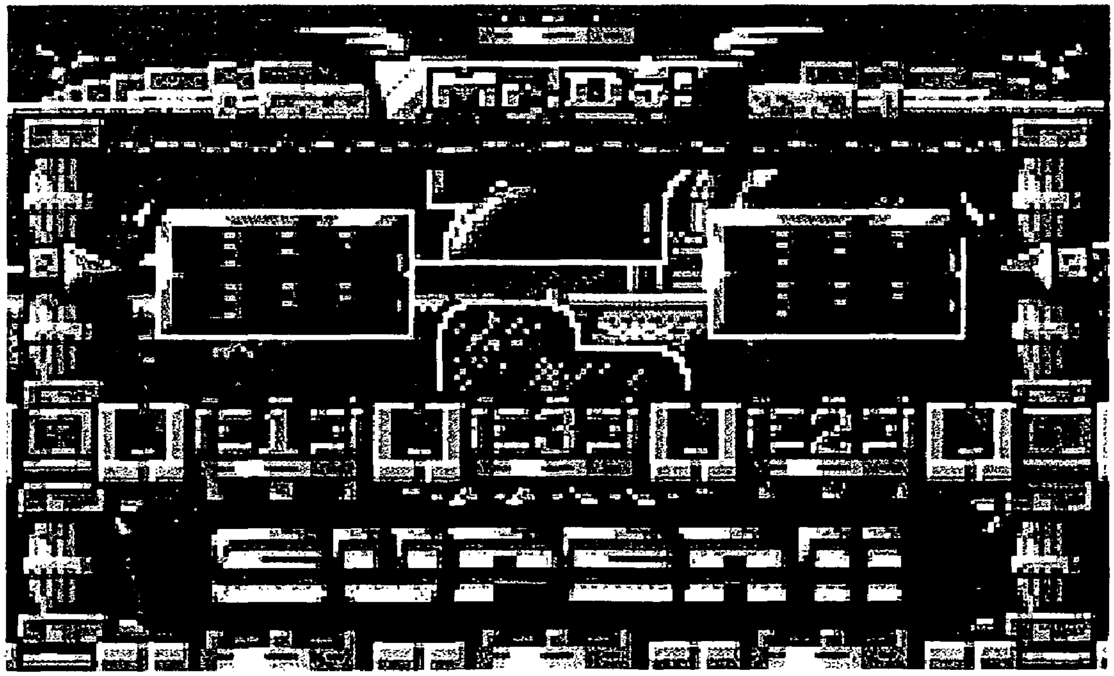
FIG. 118 is an explanatory view of game information (notice of the internally elected hand by the ready-state attraction: ready-state attraction 2) displayed in the image display section in accordance with the other embodiment.

In ready-state attraction 2, of three appearing symbols displayed from side to side, identical appearing symbols "BAR" are initially displayed on the left and right sides in their stopped state, and then, while the appearing symbol "BAR" identical to the left and right is displayed at the center in its stopped state, letters of "REACH" are displayed on the lower side of the screen, so as to indicate that it is a ready state (FIG. 116). Further, after letters of "SUPER" are displayed on the lower side of the screen (FIG. 117), the gaming state shifts to a so-called super ready state in which the reliability is higher than that in the normal ready state (FIG. 118), so as to effect a display similar to the above-mentioned ready-state attraction 1, thereby indicating that there is a possibility of a bonus hand being internally elected.

Ready-State Attraction 3

Figure 119:
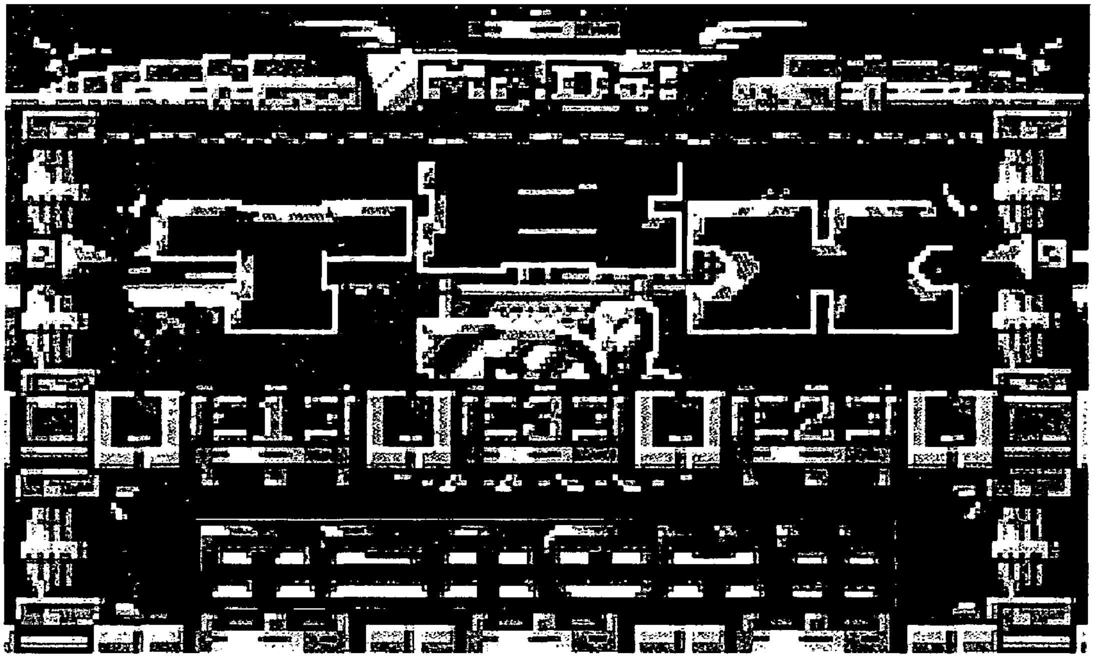
FIG. 119 is an explanatory view of game information (notice of an internally elected hand by a ready-state attraction: ready-state attraction 3) displayed in the image display section in accordance with the other embodiment.
Figure 120:
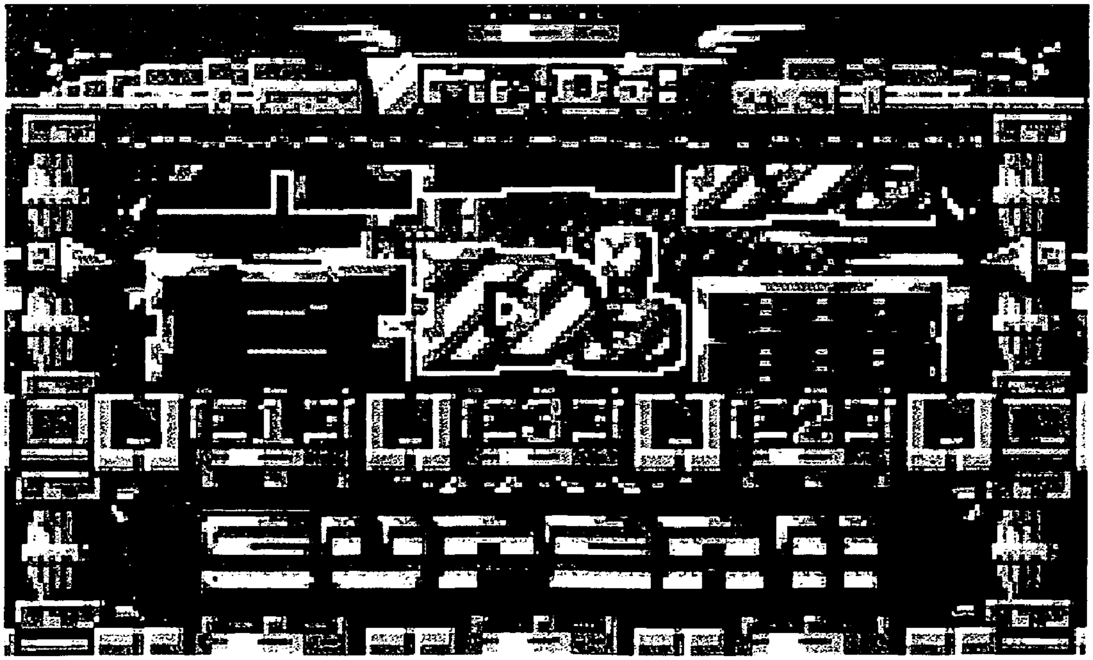
Figure 121:
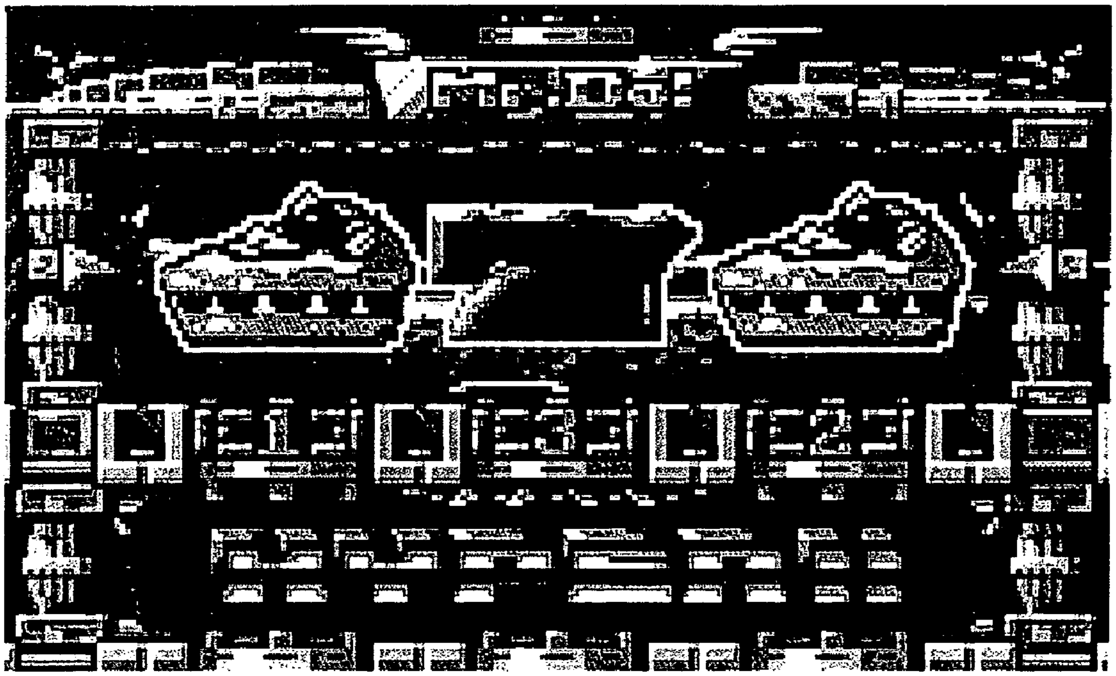
Figure 122:
Figure 123:
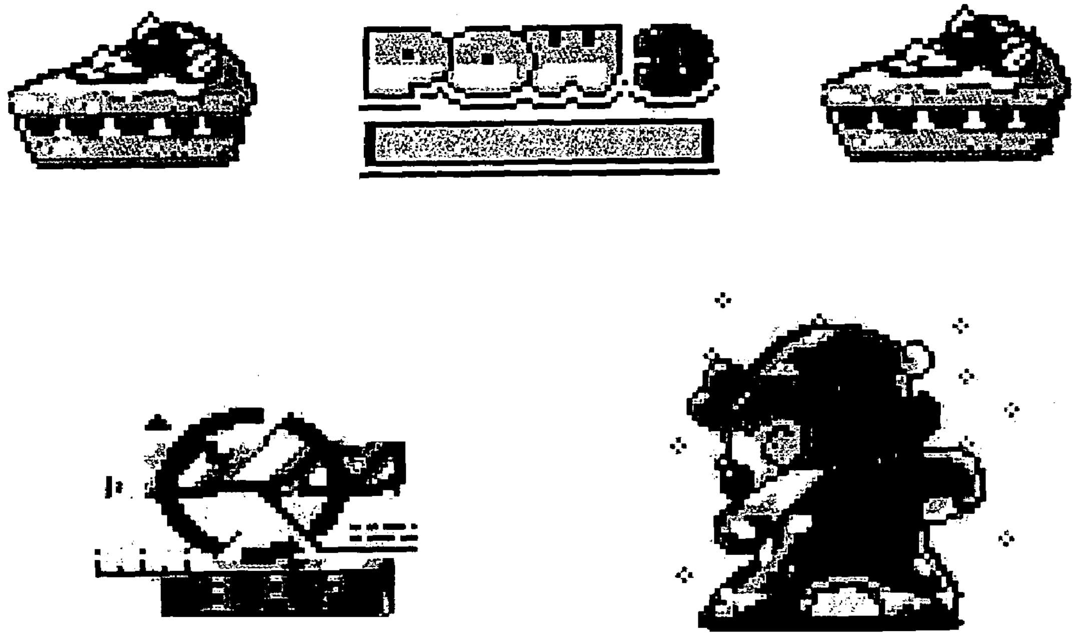
Figure 124:
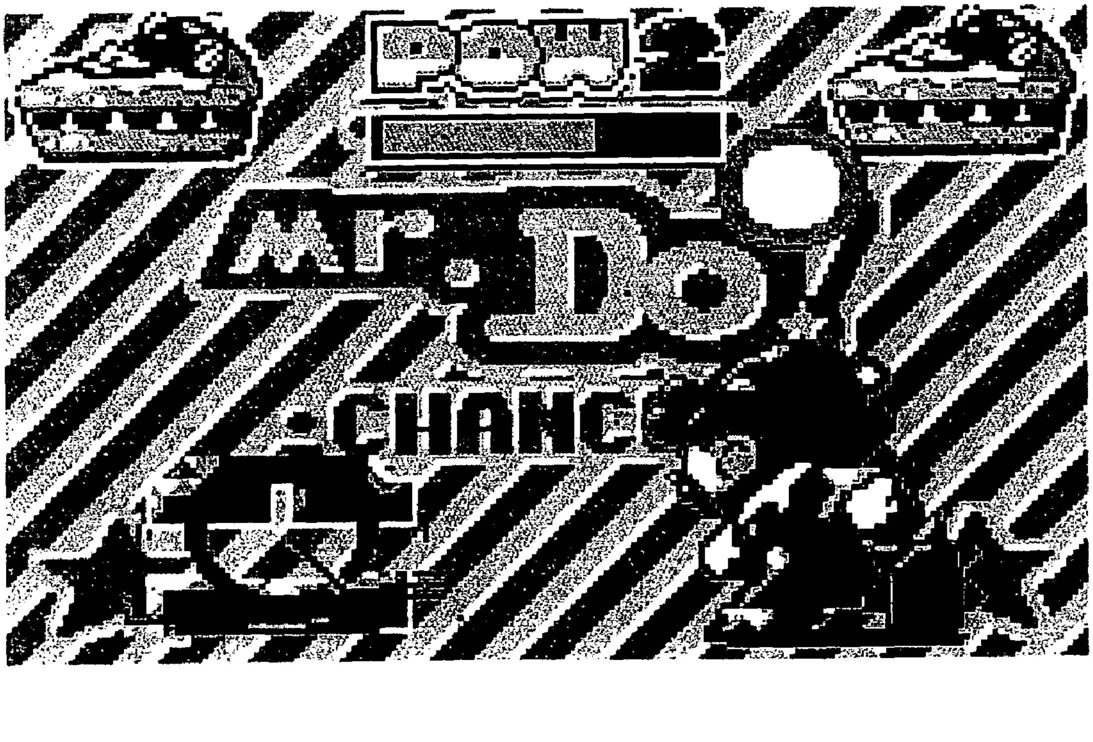
Figure 125:
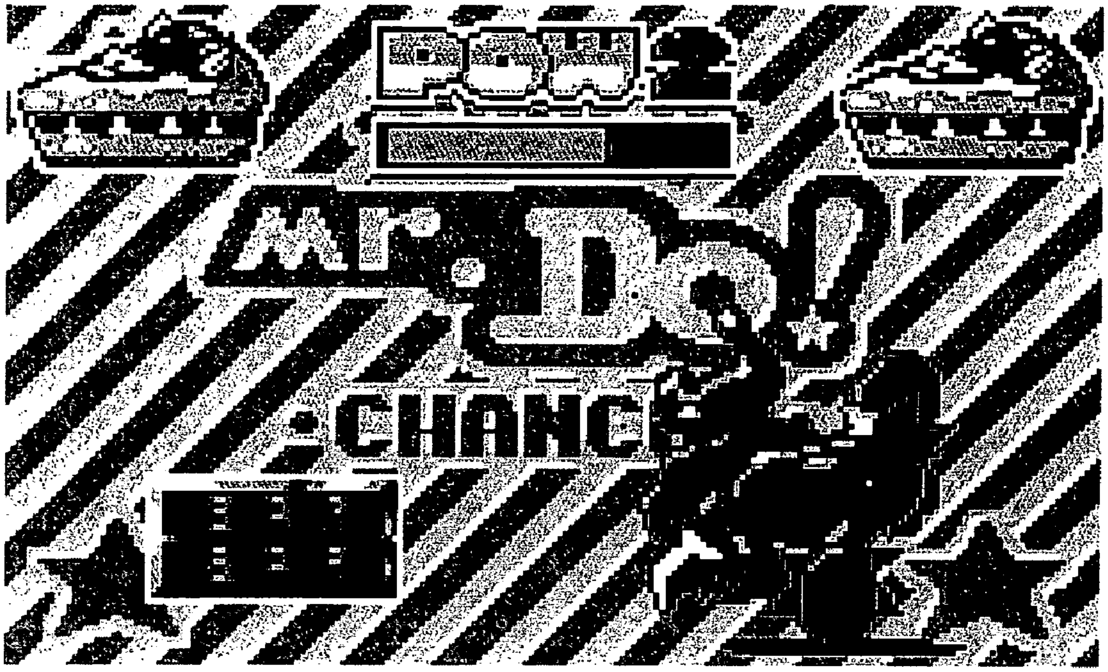
Figure 126:
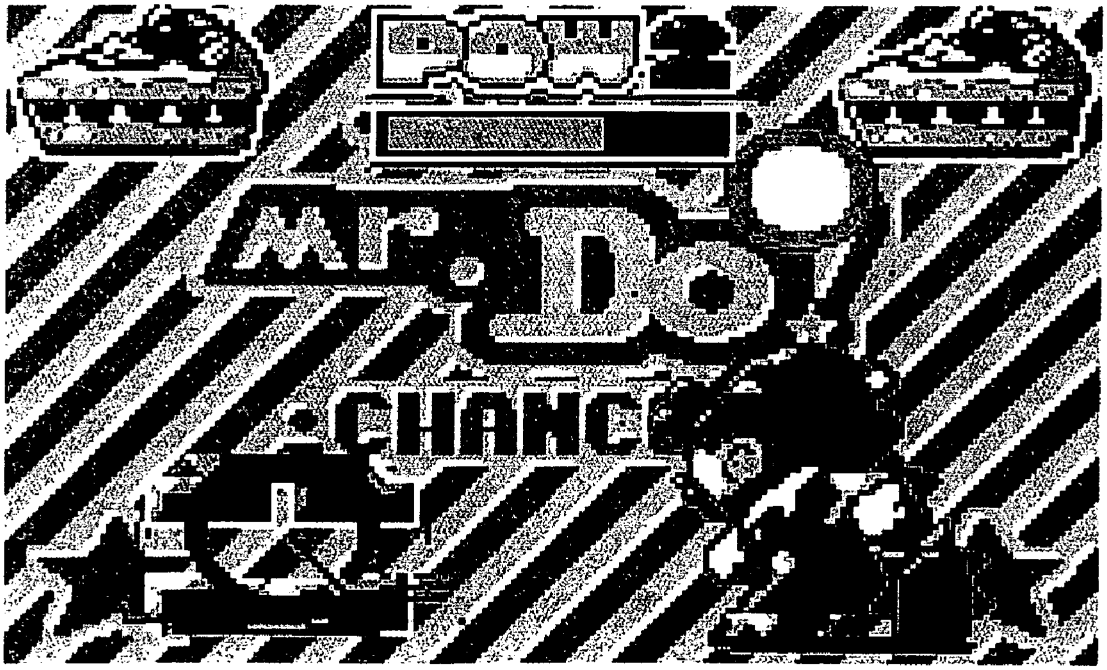
Figure 127:
Figure 128:
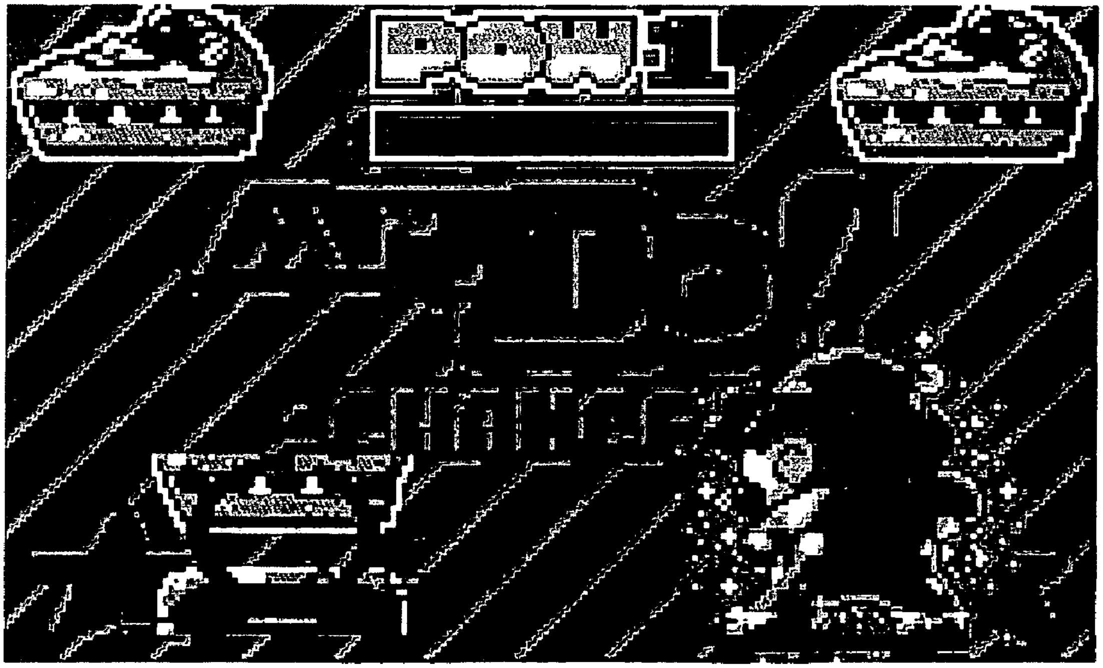
Figure 129:
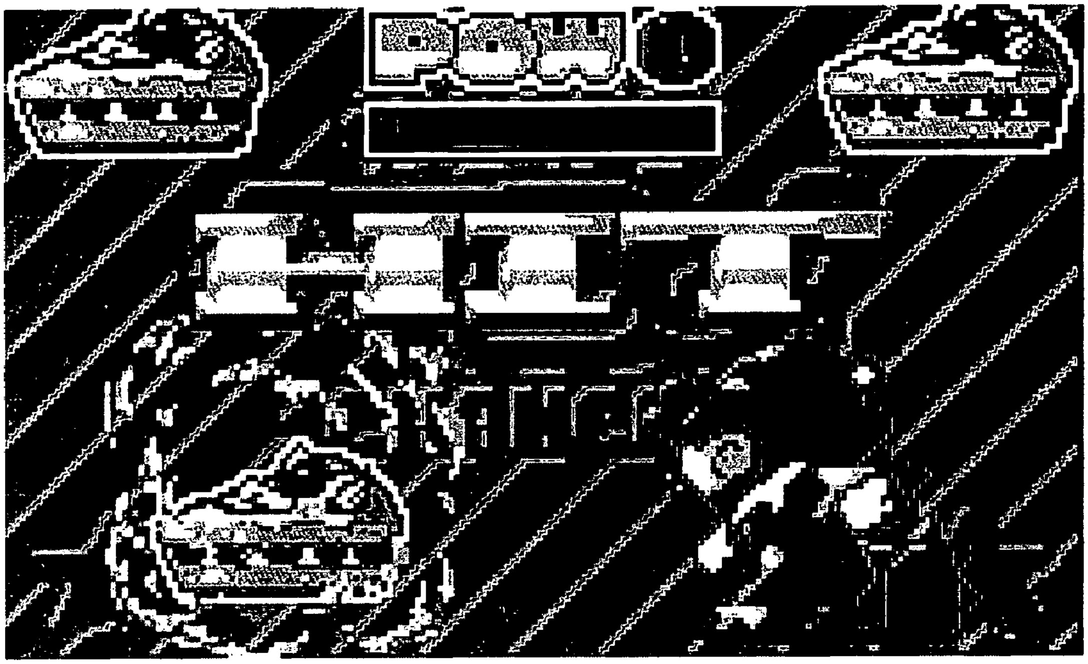

In ready-state attraction 3, letters of "REACH" are displayed on the lower side of the screen, so as to indicate that it is a ready state (FIG. 119). Then, letters of "SUPER" are displayed on the lower side of the screen, so as to indicate that the gaming state has shifted to a so-called super ready state in which the reliability is higher than that in the normal ready state (FIG. 120). Further, letters of "HYPER" are displayed on the lower side of the screen, so as to indicate that the gaming state has shifted to a so-called hyper ready state in which the reliability is higher than that in the super ready state (FIG. 121).

This hyper ready state include three patterns.

In the first pattern of hyper ready state, the leading character emerges and acts to throw balls at a target. After the first and second balls miss the target, the third ball hits the target, whereby all the three appearing symbols displayed on the screen become identical, and letters of "HIT" are displayed, so as to indicate that there is a possibility of a bonus hand being internally elected (FIGS. 122 to 129).

Figure 130:
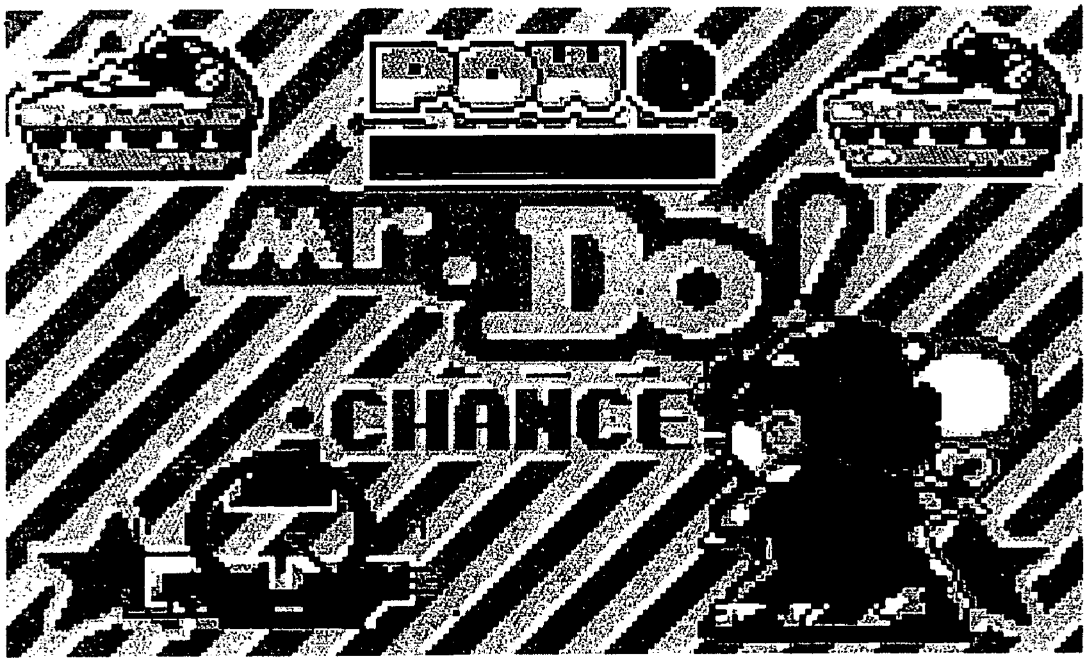
Figure 131:
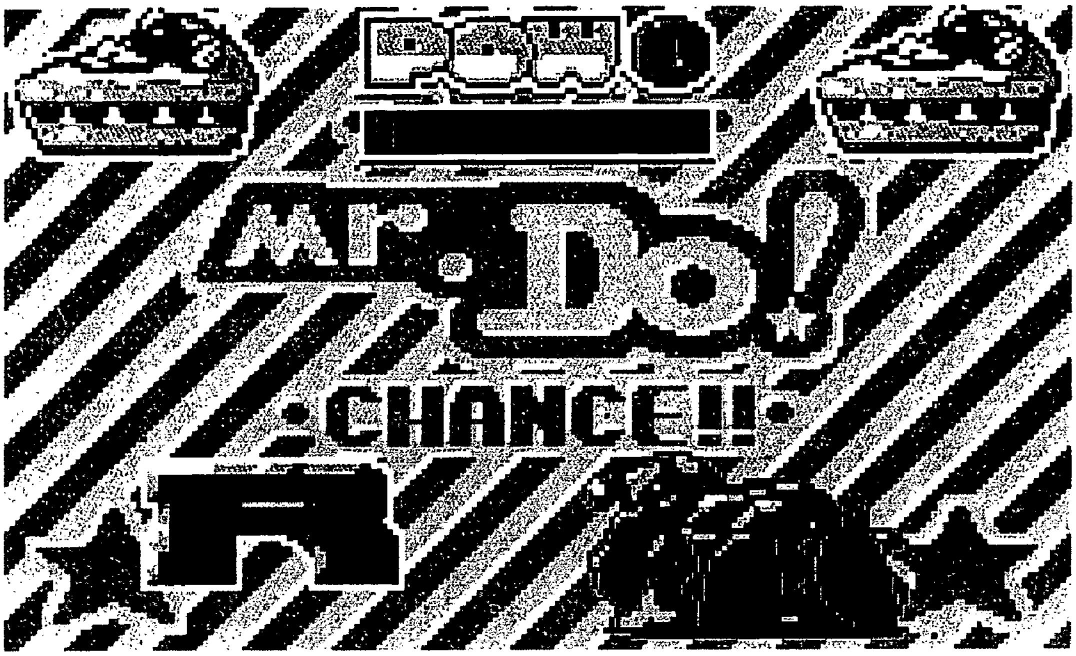

In the second pattern of hyper ready state, the leading character emerges and acts to throw balls at a target. After the first and second balls miss the target, the third ball also misses the target, and the leading character falls down, thereby indicating that the possibility of a bonus hand being internally elected is weaker (FIGS. 130 to 132).

In the third pattern of hyper ready state, though the leading character emerges and acts to throw balls at a target, without three balls being thrown, powers for throwing the three balls are stored, the target is aimed at, and then a ball is thrown and hits the target. At this instant, all the three appearing symbols displayed on the screen become identical, and letters of "HIT" are displayed, whereby it is indicated that there is a possibility of a bonus hand being internally elected (FIGS. 133 to 138).

Ready-State Attraction 4

In ready-state attraction 4, letters of "REACH" are displayed on the lower side of the screen (FIG. 139). Then, letters of "SUPER" are displayed on the lower side of the screen, so as to indicate a so-called super ready state in which the reliability is higher than that in the normal ready state (FIG. 140). Further, letters of "HYPER" are displayed on the lower side of the screen, so as to indicate a so-called hyper ready state in which the reliability is higher than that in the super ready state (FIG. 141).

This hyper ready state includes four patterns.

In the first pattern of hyper ready state, the leading character emerges and starts balancing itself on a ball. While almost falling down from the ball sometimes, the leading character safely lands on the ground. At this instant, all the three appearing symbols displayed on the screen become identical, and the leading character makes a V sign, so as to indicate that there is a possibility of a bonus hand being internally elected (FIGS. 142 to 147).

In the second pattern of hyper ready state, after the gaming state shifts to the hyper ready state (FIG. 148), the leading character emerges and starts balancing itself on a ball. Then, the leading character falls down from the ball, thereby indicating that the possibility of a bonus hand being internally elected is weaker (FIGS. 149 to 151).

In the third pattern of hyper ready state, the leading character emerges, starts balancing itself on a ball, and then falls down from the ball. At this instant, while all the three appearing symbols displayed on the screen become identical, the leading character makes a V sign, so as to indicate that there is a possibility of a bonus hand being internally elected (FIGS. 152 to 156).

In the fourth pattern of hyper ready state, the leading character emerges, starts balancing itself on a ball, and jumps up. Then, letters of "SPECIAL" are displayed, so as to indicate that the gaming state has shifted to a so-called special ready state in which the reliability is higher than that in the hyper ready state (FIGS. 157 to 159). In this special ready state, the ball is displayed in a laterally moving state. Then, the leading character descends from thereabove, jumps on the ball, and lands on the ground. At this instant, all the three appearing symbols displayed on the screen become identical, and the leading character makes a V sign, so as to indicate that a bonus hand is internally elected (FIGS. 160 to 164).

Ready-State Attraction 5

In ready-state attraction 5, of three appearing symbols displayed from side to side, identical appearing symbols "7" are initially displayed on the left and right sides in their stopped state, and then, while the appearing symbol "7" identical to the left and right is displayed at the center in its stopped state, letters of "REACH" are displayed on the lower side of the screen, so as to indicate that it is a ready state (FIG. 165). Then, letters of "SUPER" are displayed on the lower side of the screen, so as to indicate that the gaming state has shifted to a so-called super ready state in which the reliability is higher than that in the normal ready state (FIG. 166). Further, letters of "HYPER" are displayed on the lower side of the screen, so as to indicate that the gaming state has shifted to a so-called hyper ready state in which the reliability is higher than that in the super ready state (FIG. 167).

This hyper ready state includes three patterns.

In the first pattern of hyper ready state, while letters of "READY" are displayed, the leading character and a character simulating a monster (hereinafter referred to as monster) oppose each other across an apple (FIG. 168). When letters of "GO" are displayed, they start pushing the apple against each other (FIG. 169). While they push the apple against each other, the leading character wins, and another apple falls upon and crushes down the monster and then splits itself. Subsequently, a winning appearing symbol emerges from within the split apple, whereby all the appearing symbols displayed on the screen become identical, and letters of "LUCKY" are displayed, so as to indicate that a big bonus is internally elected (FIGS. 170 to 176).

In the second pattern of hyper ready state, while the leading character and the monster push the apple against each other, the monster gains the superiority and pushes back the leading character. Subsequently, another apple falls upon and crushes down the leading character and then splits itself, and a losing appearing symbol emerges from within the split apple, so as to indicate that the possibility of a big bonus being internally elected is weaker (FIGS. 177 to 181).

In the third pattern of hyper ready state, while the leading character and the monster push the apple against each other, the leading character transforms itself and pushes back the monster at once. Subsequently, another apple falls upon and crushes down the monster. Then, the leading character transforms itself into the original figure again, and letters of "LUCKY" are displayed, so as to indicate that a big bonus is internally elected (FIGS. 182 to 189).

Ready-State Attraction 6

In ready-state attraction 6, though the three appearing symbols displayed on the screen in their stopped state are disordered, letters of "LUCKY" are displayed. Subsequently, while an angel character and a devil character emerge, letters of "READY" are displayed, and then letters of "7 OR BAR" are displayed, so as to indicate that there is a possibility of a bonus hand being internally elected (FIGS. 190 to 192).

Subsequently, the angel character and the devil character emerge alternately, the angel character and "7," "7," and "7" are displayed at last, and letters of "LUCKY" are further displayed, so as to indicate that a big bonus is internally elected (FIGS. 193 to 198).

Ready-State Attraction 7

In ready-state attraction 7, after three appearing symbols are individually displayed from side to side in a changing manner, they are displayed in a vertically moving manner such that all the three appearing symbols become identical. Subsequently, while letters of "RAINBOW" are displayed, a rainbow emerges behind the appearing symbols, and a sky is further displayed on the background (FIGS. 199 to 203). Then, the displayed appearing symbols become "7," "7," and "7," the main character emerges, and letters of "LUCKY" are displayed, so as to indicate that a big bonus is internally elected (FIGS. 204 and 205).

Notice of Occurrence of Ready-State Attraction

When game medals are inserted into the medal insertion slot 14 or the bet switches 16, 17, 18 are operated so that a game is ready to start, then the start switch 20 is made effective, whereby the game is started. Then, the notice of whether to carry out the above-mentioned ready-state attraction or not is effected in the image display section 13. Here, the possibility of occurrence of ready-state attraction is noticed with a predetermined reliability, so that the noticed ready-state attraction does not always occur.

As the notice of possibility of occurrence of the ready-state attraction in this embodiment, three modes of ready-state attraction notice 1 to 3 will be explained.

Ready-State Notice 1

Figure 78:
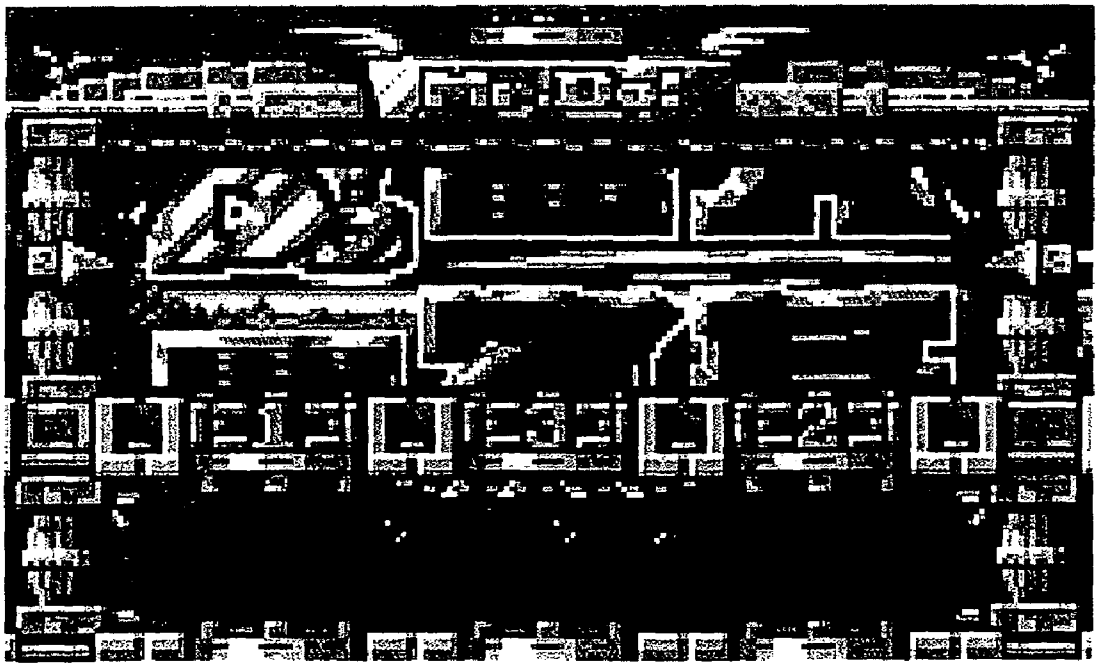
FIG. 78 is an explanatory view of game information (notice of occurrence of a ready state: ready-state notice 1) displayed in the image display section in accordance with the other embodiment.
Figure 79:
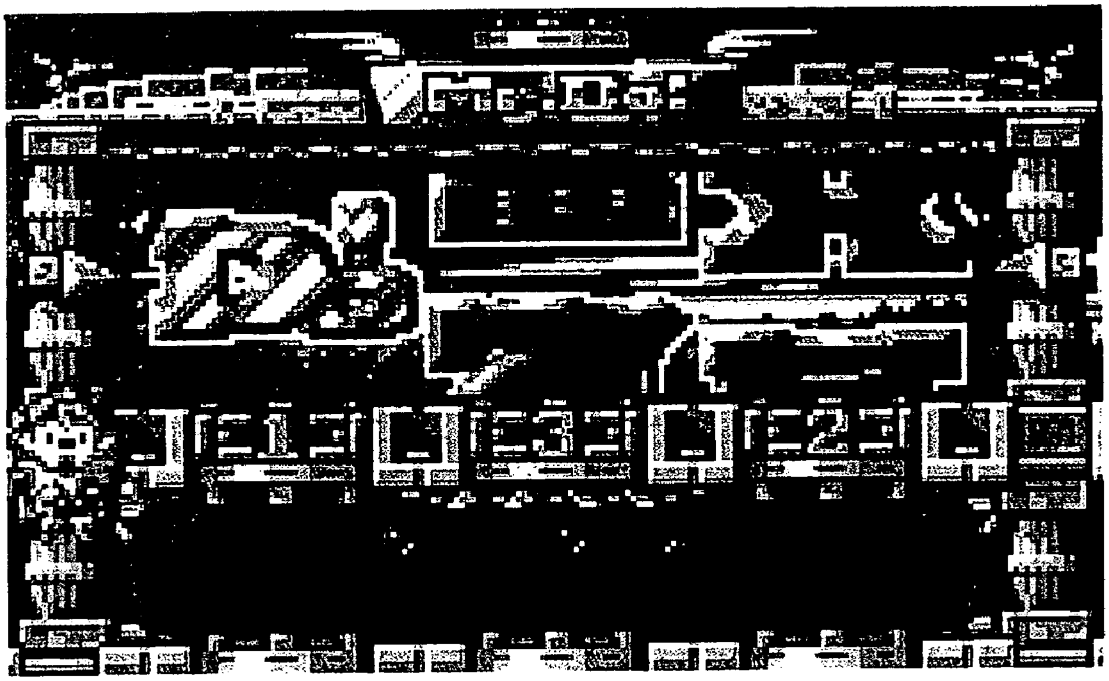
FIG. 79 is an explanatory view of game information (notice of occurrence of a ready state: ready-state notice 1) displayed in the image display section in accordance with the other embodiment.
Figure 80:
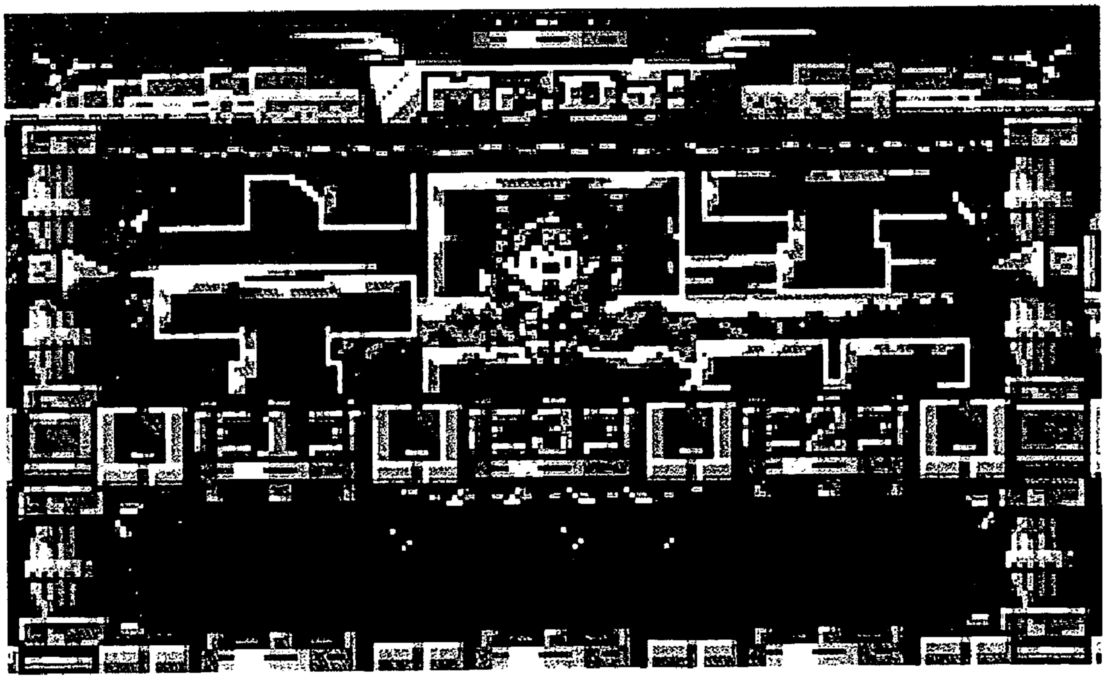
FIG. 80 is an explanatory view of game information (notice of occurrence of a ready state: ready-state notice 1) displayed in the image display section in accordance with the other embodiment.
Figure 81:
FIG. 81 is an explanatory view of game information (notice of occurrence of a ready state: ready-state notice 1) displayed in the image display section in accordance with the other embodiment.
Figure 82:
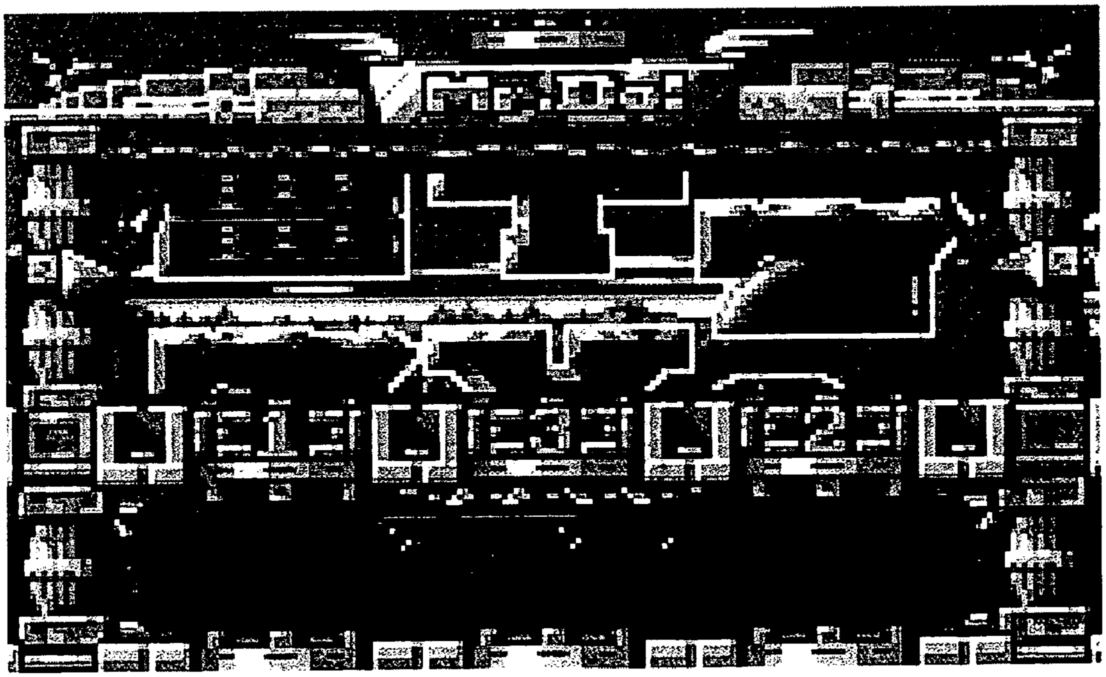
FIG. 82 is an explanatory view of game information (notice of occurrence of a ready state: ready-state notice 1) displayed in the image display section in accordance with the other embodiment.

In ready-state notice 1, three appearing symbols displayed from side to side initially start changing (FIG. 78), and the leading character appears from the left side of the screen (FIG. 79). Subsequently, the leading character passes through the center part of the screen while jumping (FIG. 80) and lands on the right side of the screen (FIG. 81). Then, the leading character exits, thereby foretelling a possibility of the ready-state attraction occurring (FIG. 82).

Ready-State Notice 2

Figure 83:
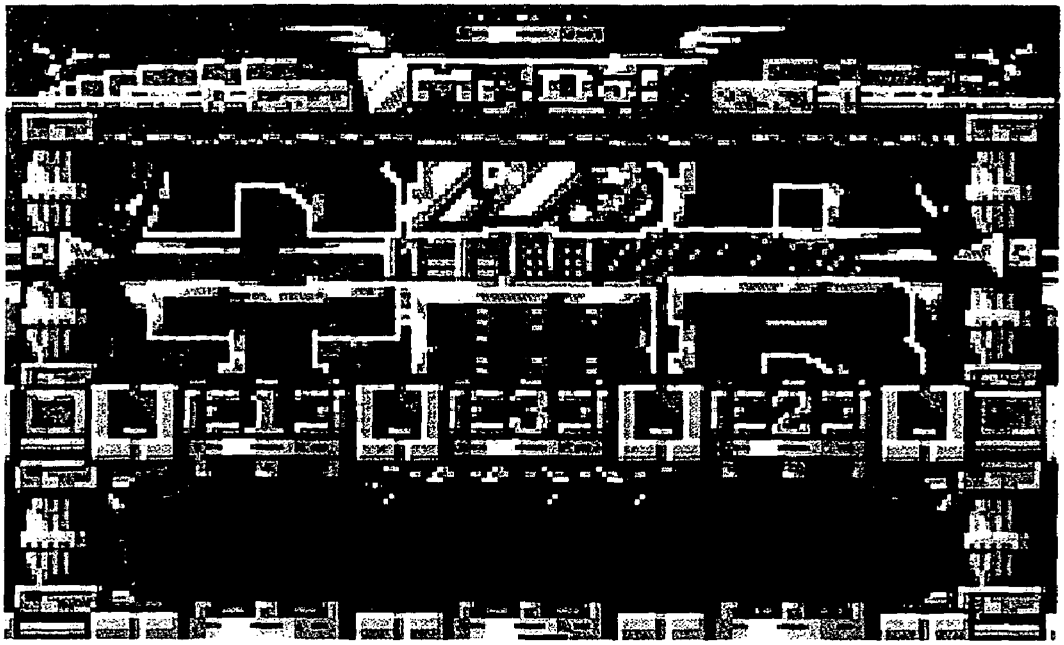
FIG. 83 is an explanatory view of game information (notice of occurrence of a ready state: ready-state notice 2) displayed in the image display section in accordance with the other embodiment.
Figure 84:
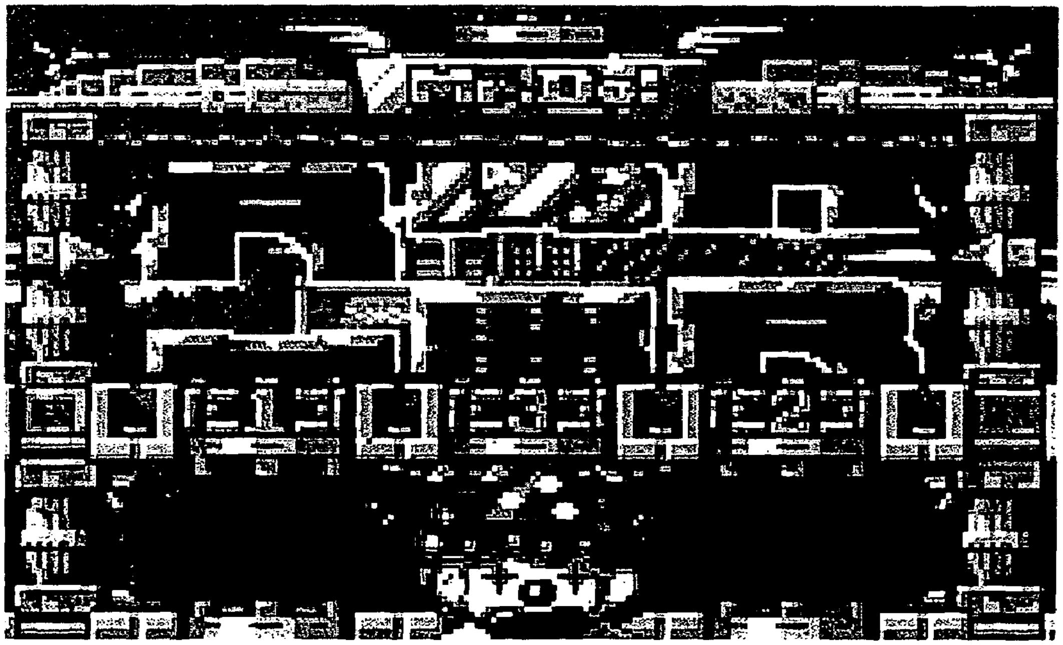
FIG. 84 is an explanatory view of game information (notice of occurrence of a ready state: ready-state notice 2) displayed in the image display section in accordance with the other embodiment.
Figure 85:
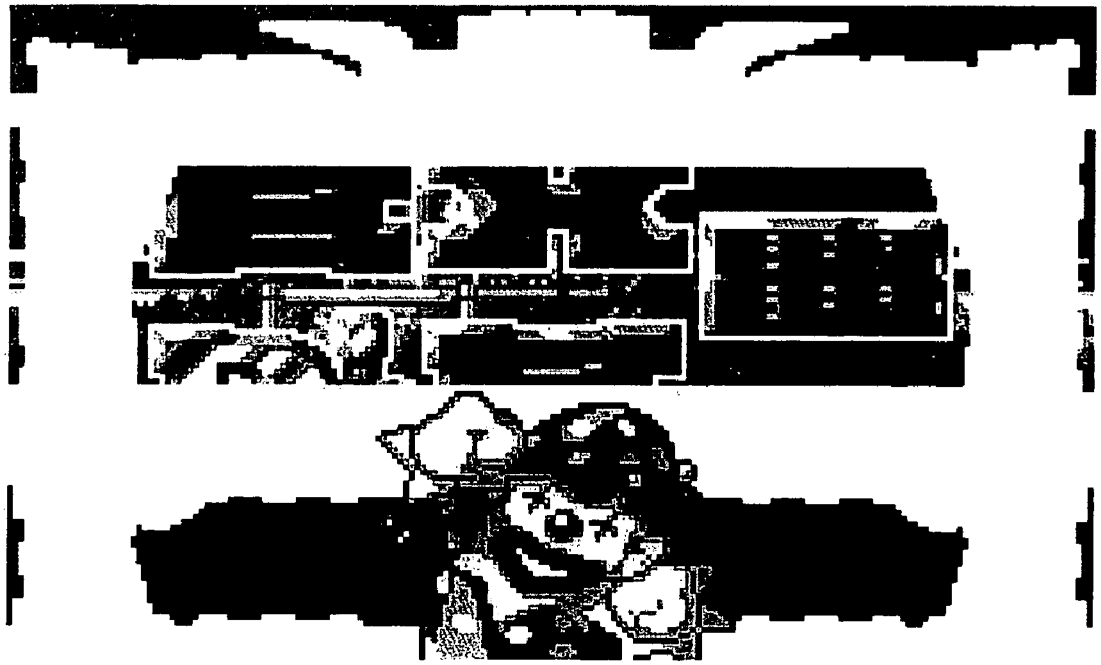
FIG. 85 is an explanatory view of game information (notice of occurrence of a ready state: ready-state notice 2) displayed in the image display section in accordance with the other embodiment.
Figure 86:
FIG. 86 is an explanatory view of game information (notice of occurrence of a ready state: ready-state notice 2) displayed in the image display section in accordance with the other embodiment.
Figure 87:
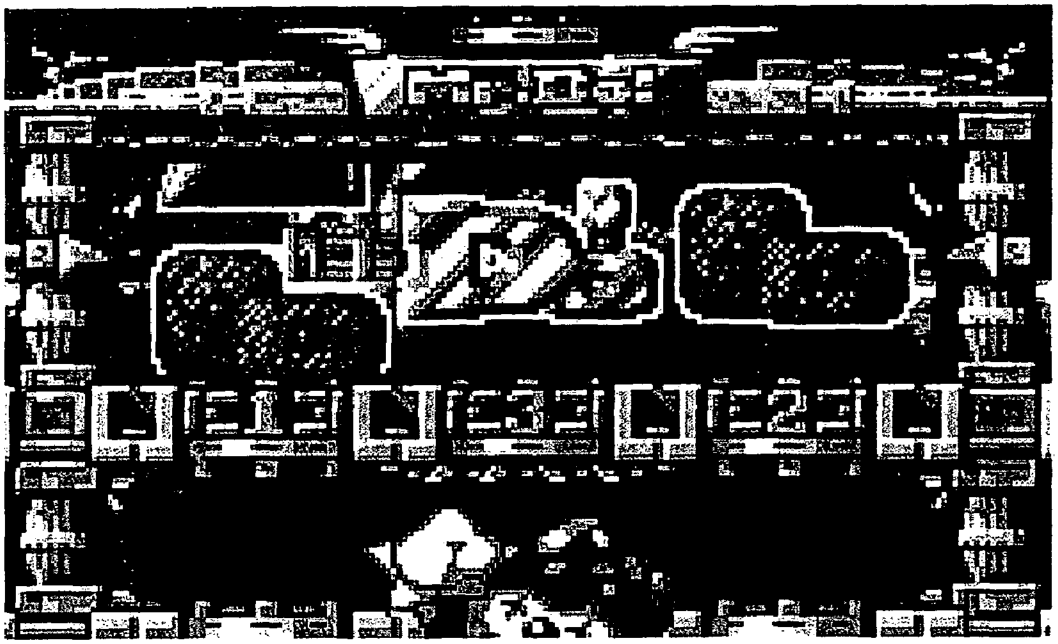
FIG. 87 is an explanatory view of game information (notice of occurrence of a ready state: ready-state notice 2) displayed in the image display section in accordance with the other embodiment.

In ready-state notice 2, three appearing symbols displayed from side to side initially start changing (FIG. 83), and the leading character emerges from the lower side in the center part of the screen (FIG. 84). Subsequently, while the screen flashes, the leading character jumps up (FIG. 85), and then sinks to the lower side of the screen (FIG. 86). Thereafter, the leading character exits to the lower side, thereby foretelling a possibility of the ready-state attraction occurring (FIG. 87).

Ready-State Notice 3

Figure 88:
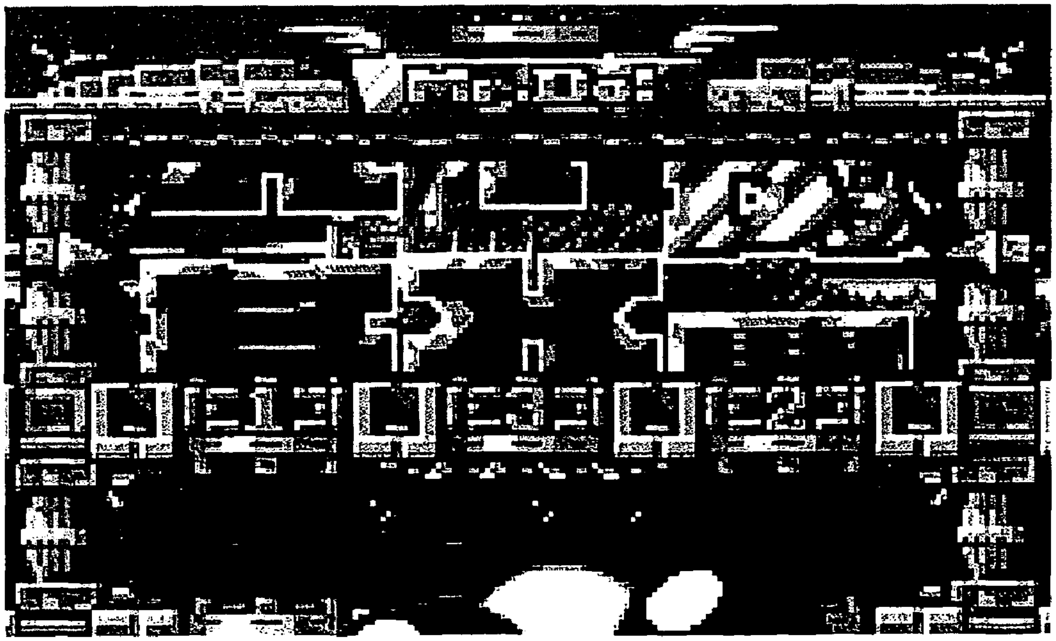
FIG. 88 is an explanatory view of game information (notice of occurrence of a ready state: ready-state notice 3) displayed in the image display section in accordance with the other embodiment.
Figure 89:
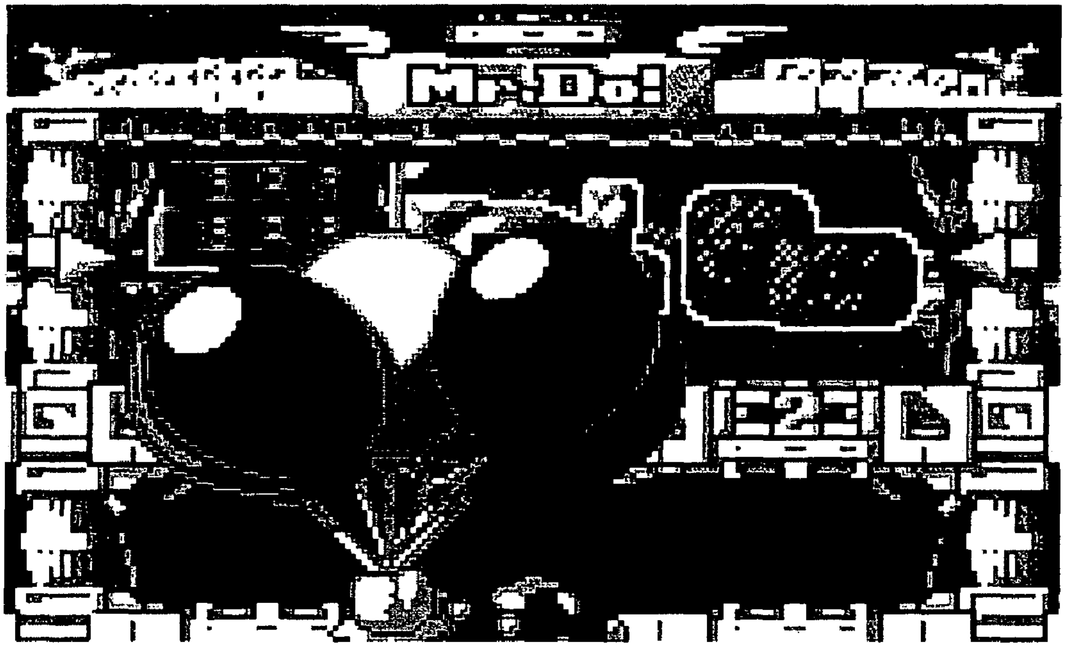
FIG. 89 is an explanatory view of game information (notice of occurrence of a ready state: ready-state notice 3) displayed in the image display section in accordance with the other embodiment.
Figure 90:
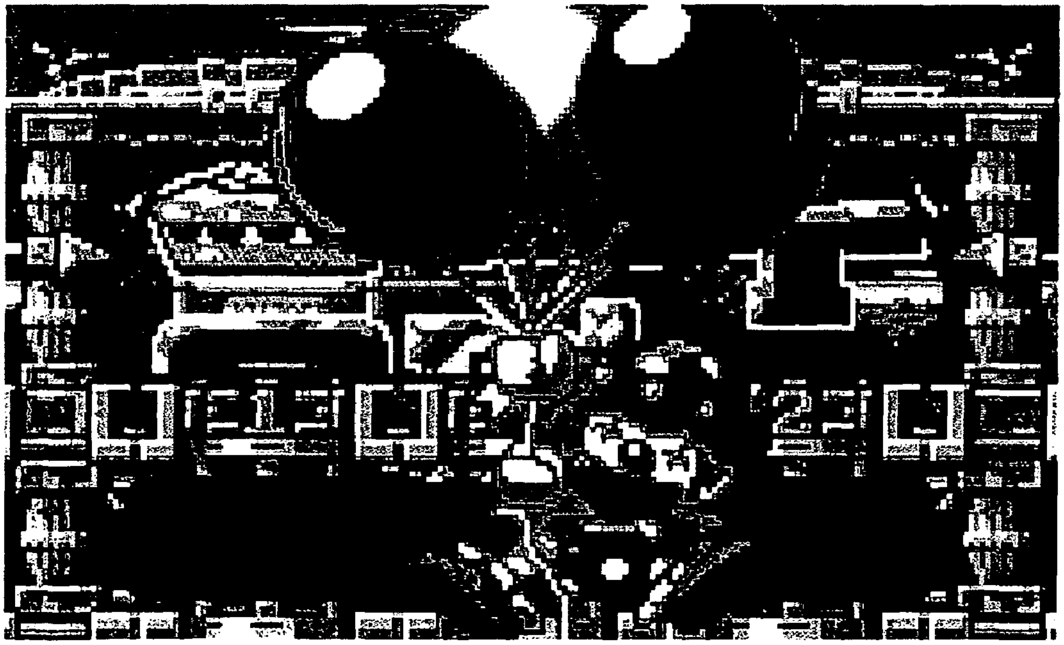
FIG. 90 is an explanatory view of game information (notice of occurrence of a ready state: ready-state notice 3) displayed in the image display section in accordance with the other embodiment.
Figure 91:
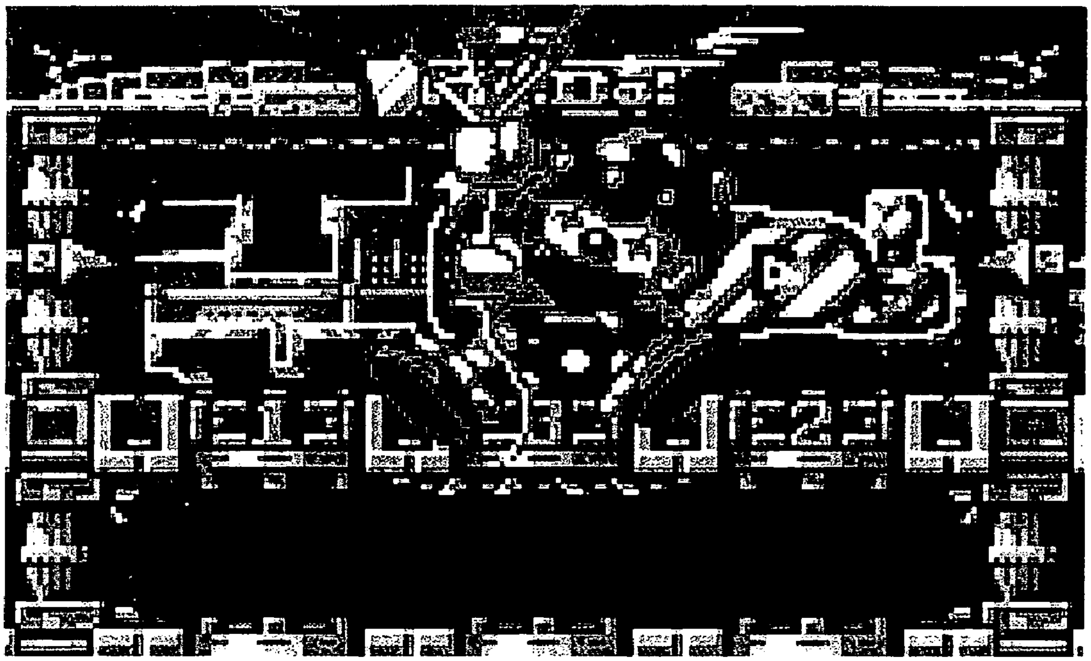
FIG. 91 is an explanatory view of game information (notice of occurrence of a ready state: ready-state notice 3) displayed in the image display section in accordance with the other embodiment.
Figure 92:
FIG. 92 is an explanatory view of game information (notice of occurrence of a ready state: ready-state notice 3) displayed in the image display section in accordance with the other embodiment.

In ready-state notice 3, three appearing symbols displayed from side to side initially start changing (FIG. 88), and a balloon appears from the lower side in the center part of the screen (FIG. 89). Subsequently, as the balloon moves up, the leading character hanging on the balloon emerges (FIG. 90), and the leading character further moves up (FIG. 91). Then, the leading character exits to the upper side of the screen, thereby foretelling a possibility of the ready-state attraction occurring (FIG. 92).

Notice of Internally Elected Hand in Single Character

As the notice of an internally elected hand, there is a notice by the emergence of a single character.

Examples (a) to (g) of the single character are shown in FIGS. 284A to 284G, respectively. During the period from the starting of changes in appearing symbols to the stopping thereof, the single character is displayed at the center of the screen with a predetermined probability according to the internally elected hand, whereby a notice of the internally elected hand is given to the player.

The display of the single character is as explained with reference to the single character attraction selection tables of FIGS. 41A and 41B. For example, when "group 1 (cherry or DB)" is internally elected during a normal game, the character (a) or the character (b) is displayed or no character is displayed. Conversely, if the character (a) or the character (b) appears, any of group 1, BB, and RB is internally elected.

Thus, as the character (a) or the character (b) is displayed, the player can see that there is a possibility of any of group 1, BB, and RB being internally elected, whereby the player not only feels an expectation but also is able to operate the reels 5*a* to 5*c* to stop in response thereto.

Also, when "group 1 (cherry or DB)" is internally elected during internal election of a bonus hand, then any of the characters (a) to (e) is displayed. Therefore, if the reels 5*a* to 5*c* construct the winning mode of "group 1" although any of the characters (c), (d), and (e) is displayed, the player can see that the current state of gaming is during internal election of a bonus hand.

Without being restricted to the center of the screen, the single character can be displayed at any location on the screen. Also, without being restricted to the period from the starting of changes in appearing symbols to the stopping thereof, the single character can be displayed at any timing.

Specific examples concerning what attractions are carried out according to various game data determined in the main control board 100 will now be explained. Explained as the first specific example will be the case where the current state is such that the gaming state is during a normal game, the internally elected hand is “diamond,” the flash data selecting random number value is 114, the ready-state attraction selecting random number value is 64500, the appearing symbol attraction selecting random number values are 5050 for left, 740 for right, and 30000 for center, and the single character attraction selecting random number value is 20000; the individual ready-state attractions described in “Notification of Internally Elected Hand by Ready-State Attraction” for ready states a to i in the ready-state attraction data selection table are ready-state attraction 2 for a, ready-state attraction 6 for b, the first pattern of ready-state attraction 3 for c, the second pattern of ready-state attraction 3 for d, the third pattern of ready-state attraction 3 for e, the first pattern of ready-state attraction 4 for f, the second pattern of ready-state attraction 4 for g, the third pattern of ready-state attraction 4 for h, and the fourth pattern of ready-state attraction 4 for i (though the above-mentioned explanation of “Notification of Internally Elected Hand by Ready-State Attraction” relates to only one of the ready-state attraction in which appearing symbols are set in order by the ready-state attraction and that in which appearing symbols are disordered, there are actually cases where the appearing symbols are in order and not in order even in the same ready-state attraction); and the respective ready-state notice attractions described in “Notice of Occurrence of Ready-State Attraction” for ready-state notices A to E are ready-state attraction notice 1 for ready-state notice A, ready-state attraction notice 2 for ready-state notice B, ready-state attraction notice 3 for ready-state notice C, ready-state attraction notice 1 and ready-state attraction notice 2 for ready-state notice D, and ready-state attraction notice 2 and ready-state attraction notice 3 for ready-state notice E. First, according to the flash data selecting random number value 114, the second flash data from the upper side in the flash data table 3 (diamond in normal game) in FIG. 24, i.e., “no winning definition data, game-starting sound 1, blinking pattern 4 after stopping all reels,” is selected. Subsequently, on the sub-control board 200 side, the flow shifts to the attraction image selecting process in the image attraction process. In its ready-state attraction selecting process, the ready-state attraction data selection table for normal game (starting sound 1) in FIG. 35 is selected; and, according to the blinking pattern 4 after stopping all reels and the ready-state attraction selecting random number value of 64500, ready-state notice B (i.e., “ready-state attraction notice 2”) and ready-state attraction d (i.e., “the second pattern of ready-state attraction 3”) are selected. Subsequently, since there is no winning definition data, the flow shifts to the losing appearing symbol selecting process for ready-state attraction. Since it is not a specific mode of ready state, in the losing ready-hand appearing symbol selection table for ready-state attraction in FIG. 22C, a ready-hand appearing symbol of “7” is selected according to the appearing symbol selecting random number value (left) of 5050, and a center appearing symbol of “Do” is selected according to the appearing symbol attraction selecting random number value (center) of 30000. Subsequently, the flow shifts to the single character attraction selecting process. Since a normal game is being played, the single character attraction selection table for normal game in FIG. 41A is selected; and, according to the internally elected hand of “diamond” and the single character attraction selecting random number value of 20000, the single character (e) is selected, and the respective attractions are carried out.

A second specific example will now be explained. Explained will be the case where the current state is such that the gaming state is during a normal game, the internally elected hand is “miss,” the flash data selecting random number value is 164, the ready-state attraction selecting random number value is 35000, the appearing symbol attraction selecting random number values are 2000 for left, 20000 for right, and 100 for center, and the single character attraction selecting random number value is 10000 (the relation of the items of ready state and ready-state notice in the ready-state attraction data selection table to the actual ready-state attraction and ready-state notice is assumed to be identical to the above-mentioned first specific example).

First, according to the flash data selecting random number value 164, the first flash data from the upper side in the flash data table 0 (miss in normal game) in FIG. 23, i.e., “no winning definition data, game-starting sound 1, no blinking pattern after stopping all reels,” is selected. Subsequently, on the sub-control board 200 side, the flow shifts to the attraction image selecting process in the image attraction process. In its ready-state attraction selecting process, the ready-state attraction data selection table for normal game (starting sound 1) in FIG. 35 is selected; and, according to the blinking pattern 0 after stopping all reels and the ready-state attraction selecting random number value of 35000, “no ready-state attraction” and “no ready-state notice” are selected. Subsequently, since there is no winning definition data, the flow shifts to the appearing symbol selecting process; and, the left appearing symbol “E” is selected according to the miss and the appearing symbol attraction selecting random number value (left) of 2000, the right appearing symbol “X” is selected according to the appearing symbol attraction selecting random number value (right) of 20000, and center appearing symbol “E” is selected according to the appearing symbol attraction selecting random number value (center) of 100. Subsequently, the flow shifts to the single character attraction selecting process. Since a normal game is being played, the single character attraction selection table for normal game in FIG. 41A is selected; and, according to the miss and the single character attraction selecting random number value of 10000, no single character is selected, and the respective attractions are carried out.

A third specific example will now be explained. Explained will be the case where the current state is such that the gaming state is during a normal game, the internally elected hand is “BB and replay,” the flash data selecting random number value is 252, the ready-state attraction selecting random number value is 18000, the appearing symbol attraction selecting random number values are 2000 for left, 10050 for right, and 4520 for center, and the single character attraction selecting random number value is 8200 (the relation of the items of ready state and ready-state notice in the ready-state attraction data selection table to the actual ready-state attraction and ready-state notice is assumed to be identical to the above-mentioned first specific example).

First, according to the flash data selecting random number value 252, the eleventh flash data from the upper side in the flash data table 8 (DG, replay during internal election of BB or RB) in FIG. 26, i.e., “winning definition data exist, game-starting sound 2, blinking pattern 7 after stopping all reels,” is selected. Subsequently, on the sub-control board 200 side, the flow shifts to the attraction image selecting process in the image attraction process. In its ready-state attraction selecting process, the ready-state attraction data selection table for the case with definition data (starting sound 2) in FIG. 40 is selected; and, according to the blinking pattern 7 after stopping all reels and the ready-state attraction selecting random number value of 18000, ready-state attraction g (i.e., “the second pattern of ready-state attraction 4") and ready-state notice C (i.e., "ready-state notice 3") are selected. Subsequently, since there are winning definition data, and BB is internally elected, appearing symbols "7-7-7" are selected according to the identical left, center, right appearing symbol selection table for ready-state attraction for internally elected BB in FIG. 22A and the appearing symbol attraction selecting random number value (left) of 2000. Then, the flow shifts to the appearing symbol selecting process. Since a bonus hand is internally elected, the single character attraction selection table for internally elected bonus hand in FIG. 41B is selected; and, according to the replay and the single character attraction selecting random number value of 8200, the single character (b) is selected, and the respective attractions are carried out.

Attraction in Special Game

When the gaming state shifts to a big bonus game or regular bonus game, which is a special game, an attraction in the special game is carried out.

As explained above, in a big bonus game, games similar to a normal game with a raised sampling probability of small hands, i.e., normal games in a big bonus game (normal games in BB), can be played up to 30 times. During the normal games in BB, if the appearing symbols displayed on an effective winning line in their stopped state constitute a predetermined combination, then a predetermined number of game medals are paid out. Also, if the appearing symbols displayed on an effective winning line in their stopped state constitute a specific combination for shifting to a JAC game, then JAC games are allowed to play up to 3 times.

First Normal Game Attraction in BB

First, the attraction in normal games played during a big bonus game will be explained. This attraction is constituted by four patterns, i.e., a first normal game attraction in BB, a second normal game attraction in BB, a third normal game attraction in BB, and a big bonus ending attraction.

If the reels 5*a* to 5*c* attain a stop mode of "7," "7," and "7" or the like, so that the gaming state shifts to a big bonus, then letters of "BIG BONUS" are displayed, so as to indicate that the gaming state has shifted to a big bonus. Subsequently, letters of "Let's GO!" are displayed, and a map is displayed so as to indicate the current position of the leading character (FIGS. 206 to 208), thereby starting an adventure story of the leading character.

Subsequently, as the first normal game attraction, the leading character lands on a plain, and picks up an object from the ground (FIGS. 209 and 210). This action of the leading character for picking up the object from the ground corresponds to the payout of game medals when a winning mode is attained in an actual game (reels 5*a* to 5*c*). Hence, while the number of game medals to be paid out is displayed as an image (FIGS. 211 and 212), the kind of winning hand is displayed. At this time, the number of game medals to be paid out is displayed within a speech balloon as if the leading character is speaking.

In another attraction, when a stop mode of miss is attained in an actual game (reels 5*a* to 5*c*) although a certain winning mode is internally elected, i.e., it has failed to attain a winning mode corresponding to the internally elected hand, then "?" is displayed in a speech balloon of the leading character (FIG. 213).

Conventionally, when a winning mode is attained, a winning attraction has been effected by blinking decorating lamps, and the number of game medals to be paid out has been displayed by a seven-segment indicator or the like. In this embodiment, by contrast, winning and losing are expressed by actions of a character, messages concerning the number of winning game medals and those to the player (congratulations on winning, "LUCKY," in this case) are spoken by the character, and the winning symbols are displayed. As a consequence, a variety of visual attractions are possible. Also, it becomes easier for novice players to grasp the results of gaming or the current gaming state. Since these displays are collectively displayed in the image display section 13, all kinds of game information can be seen from the single image display section 13. Hence, without the trouble of confirming the fact that symbols are set in order on an effective winning line by seeing the reels 5*a* to 5*c* and then confirming how many game medals are paid out at the current winning by looking at the dividend table or seven-segment indicator, the player can correctly recognize these kinds of information in the single image display section 13.

Though the speaking state of the character is expressed by speech balloons and the letters displayed therein in this embodiment, simulated voices may be employed to express: "It's a winning of 10-medal hand," "Sorry, it's a miss," and so forth. While the payout of game medals occurs at the time of winning, a character may be animated as the game medals are paid out.

Though no display is effected when no winning hand is internally elected, i.e., in the case of so-called miss, in this embodiment, a display may be effected so as to indicate that it is a miss.

When shifting to a JAC game, letters of "FIGHT" are displayed (FIG. 215).

In another attraction, when replay symbols, which are a stop mode for shifting to the JAC game, are intentionally kept from being constructed (replay avoidance), letters of "NICE" are displayed (FIG. 214).

The replay avoidance will now be explained.

While games similar to a normal game with a raised sampling probability of small hands, i.e., normal games in a big bonus game (normal games in BB), can be played up to 30 times in a big bonus game; if a specific symbol (e.g., similar to a replay symbol) for shifting to a JAC game is constructed during this game, the gaming state shifts to a JAC game. Namely, while games similar to a normal game can be played up to the maximum permissible number (30) in a big bonus game, winning modes are often generated during these games, so that many game medals can be acquired. If a specific symbol for shifting to a JAC game is constructed so as to shift to the JAC game before the maximum permissible number (30) is attained, the number of game medals to be acquired would decrease. Therefore, before the maximum permissible number approaches, e.g., up to 25 games, notwithstanding the fact that the starting condition for shifting to the JAC game is internally elected, the so-called see-and-push technique may be fully used so as to stop the reels 5*a* to 5*c* such that the specific symbol is not attained. When the number of games is as close as possible to the maximum permissible number (30), then the reels 5*a* to 5*c* are operated to stop such that the specific symbol for shifting to the JAC game is constructed. As a consequence, the player can obtain the maximum profit.

Here, the first normal game in BB refers to a normal game from the starting of the big bonus game until the starting of the first JAC game. Similarly, the second normal game in BB refers to a normal game from the ending of the first JAC game until the starting of the second JAC game, and the third normal game in BB refers to a normal game after the ending of the second JAC game.

Conventionally, the number of consumed normal games in a big bonus game has been displayed by a seven-segment indicator or lamps. By contrast, when a background image or character which varies by a predetermined unit is used for carrying out attractions, then the player can correctly grasp the progress of gaming. Also, along therewith, the player can correctly determine whether to execute replay avoidance or enter the JAC game. (If the replay avoidance is executed so much that the big bonus game is terminated while not fully consuming the JAC games, then it is meaningless to acquire many small hands during normal games; thus making it necessary to acquire the default number of JAC games while acquiring small hands in the normal game as much as possible.)

Second Normal Game Attraction in BB

In the second normal game attraction in BB, a map is displayed, so as to indicate the current position of the leading character (FIG. 216), thereby starting an adventure story of the leading character.

Subsequently, the leading character lands on a forest (FIG. 217), and an attraction similar to the first normal game attraction in BB is effected. When a winning mode is attained in an actual game (reels 5*a* to 5*c*), the number of game medals to be paid out in response to thus attained winning mode is displayed as the leading character picks up an object from the ground (FIG. 218), for example, and letters of "FIGHT" are displayed when shifting to a JAC game (FIG. 219).

Third Normal Game Attraction in BB

In the third normal game attraction in BB, a map is displayed, so as to indicate the current position of the leading character (FIG. 220), thereby starting an adventure story of the leading character.

Subsequently, the leading character enters a cavern (FIG. 221), and an attraction similar to the first normal game attraction in BB is effected. When a winning mode is attained in an actual game (reels 5*a* to 5*c*), the number of game medals to be paid out in response to thus attained winning mode is displayed as the leading character picks up an object from the ground (FIG. 222), for example, and letters of "I'm BOSS" are displayed when shifting to a JAC game so as to indicate that it is the final JAC game, together with a dragon character which is an opponent in the story (FIG. 223).

Big Bonus Ending Attraction

The big bonus ending attraction is constituted by two patterns, i.e., so-called completion attraction for the case where the player has succeeded in obtaining the acquirable profits, and so-called puncture attraction for the case where the big bonus game has ended before the player obtains the acquirable profits.

In the completion attraction, the dragon character, which is the opponent in the story, is defeated, so as to indicate that the third JAC game has completely been won, and then letters of "WIN" are displayed (FIGS. 224 to 226). Subsequently, the leading character acquires the treasure of the dragon, letters of "SEE YOU" are displayed, and a curtain falls (FIGS. 227 to 229).

In the puncture attraction, the number of playable games is counted down as "3," "2," and "1" (FIGS. 230 to 232), letters of "LOSS ONE'S WAY" are displayed so as to indicate that it is so-called puncture, and letters of "GAME OVER" are eventually displayed (FIGS. 233 and 234).

When such an attraction is effected, then the player can further enhance the feeling of fretfulness and expectation so as to wish a replay symbol (JAC game actuating symbol) to be set in order soon as the puncture will occur in three games from now, for example, whereby the amusement of gaming increases.

First JAC Game Attraction

The attraction effected when shifting to a JAC game will now be explained. This attraction is constituted by three patterns, i.e., the first JAC game attraction, the second JAC game attraction, and the third JAC game attraction.

Further, each JAC game attraction is constituted by three patterns, i.e., a winning attraction in the JAC game, a losing attraction in the JAC game, and a so-called puncture attraction for the case where the JAC game has ended before the acquirable profits are obtained.

To begin with, the first JAC game attraction will be explained.

In the winning attraction in the first JAC game, the leading character and a monster oppose each other at the timing when the player operates the start switch 20, and the number of games in the JAC game is displayed (FIGS. 235 and 236). Subsequently, the leading character stores energy, and throws an energy ball at the monster at the timing when the player carries out the third stopping operation of the stop switches 21*a* to 21*c* (FIGS. 237 to 240). Then, the energy ball hits the monster, whereby the monster disappears, and coins emerge. Also, the number of acquired coins (game medals) is displayed, and the number of winnings in the JAC game is displayed (FIGS. 241 to 244).

In the losing attraction in the first JAC game, the leading character and a monster 1 oppose each other, and the number of games in the JAC game is displayed (FIGS. 245 and 246). Subsequently, the leading character stores energy, and throws an energy ball at the monster 1 (FIGS. 247 and 248). Then, the energy ball misses the monster 1 with a large margin, letters of "MISS" are displayed, and the leading character falls down, so as to indicate that it is a miss (FIGS. 249 and 250).

Thus, in addition to the conventional fun of gaming in which a winning mode is constructed as the player operates the stop switches 21*a* to 21*c* to stop, the fun of visual attraction in which the opponent monster or the leading character is defeated as the stop switches 21*a* to 21*c* are operated to stop is obtained, whereby the amusement of gaming enhances.

Without being restricted to the foregoing, the stopping operations of the stop switches 21*a* to 21*c* by the player and the starting of attraction display in the image display section 13 may be carried out at any timing.

The puncture attraction in the first JAC game is effected when the maximum permissible number of (e.g., 8) winnings are not obtained at the time when the maximum number of (e.g., 12) games are consumed. After the leading character falls down, letters of "ESCAPE" are displayed, and the leading character runs away, thereby indicating that it is so-called puncture (FIGS. 251 to 253). Here, the puncture in the JAC game refers to the case where the maximum permissible number of (e.g., 8) winnings are not obtained in the maximum number of (e.g., 12) games.

In a special game, such as the above-mentioned JAC game, in which predetermined games are constructed as one set, and the number of acquirable game medals varies according to the state of gaming (they are fully acquired, puncture occurs, or the like), if an image corresponding to the winning and losing in one game is set, and the image attraction is carried out according to the result of this game, the feeling of suspense for each game can be enhanced so as to feel, for example, that "it's won now" or "oops, it's a miss." Also, as an image attraction corresponding to the time of puncture is effected, the feeling of the player can further be enhanced, whereby the amusement of gaming can further be increased.

Second JAC Game Attraction

The second JAC game attraction will now be explained.

In the winning attraction in the second JAC game, an attraction substantially similar to that in the first JAC game is carried out. Namely, the leading character and a monster 2 oppose each other, and the number of games in the JAC game is displayed (FIG. 254). Subsequently, the leading character throws an energy ball at the monster 2. Then, the energy ball hits the monster 2, whereby the monster 2 disappears, coins emerge, and the number of winnings in the JAC game is displayed (FIGS. 255 to 257).

In the second JAC game attraction, not only the background image but also the opponent monster is made different from that in the first JAC game, so that the player can clearly distinguish the first and second times from each other.

In the losing attraction in the second JAC game, an attraction substantially similar to that in the first JAC game is carried out. Namely, the leading character and the monster 2 oppose each other, the energy ball thrown at the monster 2 by the leading character misses it by a large margin, letters of "MISS" are displayed, and the leading character falls down, thereby indicating that it is a miss (FIGS. 258 and 259).

In the puncture attraction in the second JAC game, an attraction substantially similar to that in the first JAC game is carried out. Namely, after the leading character falls down, letters of "ESCAPE" are displayed, and the leading character runs away, thereby indicating that it is so-called puncture (FIGS. 260 to 262).

Third JAC Game Attraction

The third JAC game attraction will now be explained.

In the winning attraction in the third JAC game, an attraction substantially similar to that in the first JAC game is carried out. Namely, the leading character and a dragon, which is the final opponent, oppose each other, and the number of games in the JAC game is displayed (FIG. 263). Subsequently, the leading character throws an energy ball at the dragon. Then, the energy ball hits the dragon, and the number of winnings in the JAC is displayed together with the number of acquired coins (game medals) (FIGS. 264 to 266).

If 12 games, which constitute the maximum number of games, are played, or 8 winnings, which constitute the maximum number of winnings, are attained in the third JAC game, then the completion attraction in the big bonus explained above is carried out.

In the losing attraction in the third JAC game, an attraction substantially similar to that in the first JAC game is carried out. Namely, the leading character and the dragon oppose each other, and the leading character throws an energy ball at the dragon. Then, the dragon emits fire, the leading falls down, and letters of "MISS" are displayed, so as to indicate that it is a miss (FIGS. 267 to 270).

In the puncture attraction in the third JAC game, the leading character and the dragon oppose each other, and the leading character throws an energy ball at the dragon. Then, the dragon emits fire, the leading character falls down, and letters of "MISS" are displayed (FIGS. 271 to 273). Subsequently, letters of "DEAD" are displayed, the leading character is displayed to ascend to heaven as an angel, and letters of "GAME IS OVER" are finally displayed (FIGS. 274 to 276).

Conventionally, only similar attractions have been carried out in each JAC game by use of a seven-segment indicator or lamps. When different attractions are effected according to the number of JAC games, by contrast, an attraction can be represented as if the leading character leads the game according a story. In particular, in a gaming machine such as a pachislo gaming machine in which the number of acquirable game medals (i.e., the state of progress of image attraction) changes according to the stopping operation by the player, it is possible to provide not only the conventional fun of gaming of setting symbols in order, but also the fun emerging from the image attraction (story) such as a desire to see the scene in which the final dragon is defeated. As a consequence, the player enthusiastically carries out stopping operations, thus being able to further enhance the amusement of gaming.

Though this embodiment explains a so-called A-type slot machine in which JAC games can be played up to three times, the present invention is also applicable to B-type slot machines in which JAC games can be played up to two times as a matter of course.

Error Display

Indications of error information when an error occurs in the slot machine will now be explained.

When an error occurs in the slot machine, together with the character appearing in the above-mentioned story, letters of "CALL STAFF" and the contents of the error are displayed, so as to indicate how to deal with the error.

For example, in the case of an abnormality in a control board, letters of "BOARD ABNORMALITY FOUND" are displayed (FIG. 277). In the case where the medal tray is full of game medals, letters of "MEDAL FULL" is displayed (FIG. 278). In the case where the medal selector is choked, letters of "SELECTOR CHOKED" are displayed (FIG. 279). In the case where there is no more game medal stored in the hopper 122, letters of "FEED MEDALS" are displayed (FIG. 280). In the case where the hopper 122 is choked with game medals, letters of "HOPPER CHOKED" are displayed (FIG. 281). In the case of so-called play-out, letters of "GAME OVER" are displayed (FIG. 282). Also, in each error display, an error code composed of two letters corresponding to the respective error may also be displayed.

From the conventional error display effected by displaying two letters in a seven-segment indicator or the like, it has been hard to see what kind of error was generated. When the error display is effected as in this embodiment, then what kind of error has occurred can instantly be indicated to both the player and the staff of the game parlor.

The above-mentioned game information indicated in the slot machine 60 is an example of game information indicated in the gaming machine in accordance with the present invention. The gaming machine in accordance with the present invention can indicate other modes of game information. For example, the appearing characters, the progressing story, and the like can appropriately be changed, so as to indicate game information.

As a consequence of the above-mentioned configurations, the gaming machine in accordance with the present invention can achieve effects as follows.

The gaming machine in accordance with the first aspect of the present invention comprises an image display section for displaying special game information in a special game to a player, whereas game special information corresponding to the state of gaming is displayed in the image display section.

Therefore, without being lost in the display by a plurality of display sections and decorating lamps provided in the gaming machine, sound effects from a speaker, and the like, the special game information corresponding to the gaming state can correctly be displayed, whereby the special game information can be reported to the player reliably and effectively. Therefore, according to the reported special game information, the player can fully enjoy the fun of gaming.

In the second aspect of the present invention, the gaming machine is constituted by a slot machine.

Hence, the slot machine can also achieve the effects of the first aspect of the present invention.

In the gaming machine in accordance with the third aspect of the present invention, the image display section displays special game information concerning the state of progress of the special game.

As a consequence, the state of the progress of the special game can reliably be reported to the player, so that the special game would not end suddenly without the player's knowledge, whereby the player can fully enjoy the fun of gaming.

In the gaming machine in accordance with the fourth aspect of the present invention, the image display section displays special game information concerning the history of provision of value information provided as a profit for the player in the special game.

As a consequence, the history of provision of value information in the special game can reliably be reported to the player, so that the player can see the own gaming skill and grasp the unit of acquired value information. Hence, the player can feel the satisfaction of acquiring the value information and fully enjoy the fun of gaming.

In the gaming machine in accordance with the fifth aspect of the present invention, the image display section displays special game information concerning the winning history in the special game.

As a consequence, the winning history in the special game can reliably be reported to the player, whereby the player can play the special game more advantageously. Namely, while confirming the winning history, the player can exert so-called "see-and-push" skill or the like, so as to play the maximum permissible number of games in the special game, thereby being able to receive a greater amount of value information and fully enjoy the fun of gaming.

In the gaming machine in accordance with the sixth aspect of the present invention, the image display section displays special game information concerning the gaming mode in the special game.

As a consequence, the gaming mode in the special game can reliably be reported to the player, whereby the player can fully enjoy the fun of gaming by playing the game according to the gaming mode.

In the gaming machine in accordance with the seventh aspect of the present invention, the image display section displays special game information concerning the maximum permissible input unit of bet information in the special game.

As a consequence, the maximum permissible input unit of bet information in the special game can reliably be reported to the player, so that the player is kept from misunderstanding the maximum permissible input unit. Also, as the bet information is inputted by the unit corresponding to the gaming mode, value information can efficiently be acquired, whereby the player can fully enjoy the fun of gaming.

In the gaming machine in accordance with the eighth aspect of the present invention, the image display section displays special game information for indicating that the special game is over.

As a consequence, the ending of the special game can reliably be reported to the player, so that the special game would not end suddenly for the player who is getting into the special game, whereby the player can fully enjoy the fun of the special game and feel the satisfaction at the time when the special game is over.

The gaming machine in accordance with the ninth aspect of the present invention is provided with an indicating section for indicating related special game information relating to the special game information displayed in the image display section, so as to indicate the related special game information.

Since the indication by the indicating section is carried out in addition to the display of special game information in the image display section, special game information corresponding to the game can further reliably be reported to the player, whereby the player can fully enjoy the fun of normal games according to the indicated special game information.

In the gaming machine in accordance with the 10th aspect of the present invention, the image display section also displays each special game information item while a normal game is being played.

As a consequence, even when the normal game is being played, each special game information item can reliably be reported to the player, whereby the player can refer to each special game information item, thus being able to fully enjoy the fun of gaming.

The gaming machine in accordance with the 11th aspect of the present invention is provided with an image display section for displaying game information to the player, whereas the image display section displays game information concerning the history of provision of value information provided as a prize for the player.

As a consequence, the player can see the acquired unit of value information, i.e., the investment per unit game. Therefore, in a normal game in which the unit of value information acquirable for the investment is not so high in particular, the player can be play the game with reference to the investment per unit game, thus being able to fully enjoy the fun of gaming.

The gaming machine in accordance with the 12th aspect of the present invention is provided with an image display section for displaying game information to the player, whereas the image display section displays game information concerning the winning history to the player.

As a consequence, the player can visually be notified of the winning history, whereby an amusement occurs in the progress of games which have been monotonous. In particular, as the image display section displays the winning history in normal games which tend to be played aimlessly and thus are hard to be memorized, the latter can be confirmed at a glance, whereby the player can fully enjoy the fun of gaming.

The gaming machine in accordance with the 13th aspect of the present invention is constituted by a slot machine.

As a consequence, the effects of the above-mentioned 11th or 12th aspect of the present invention can be obtained in the slot machine as well.

What is claimed is:

1. A gaming machine comprising:

a variable display section for variably displaying a plurality of kinds of symbols necessary for gaming;

a starting device for starting variable display of the symbols; and a stopping device, disposed so as to be operable by a player, for stopping said symbols being variably displayed;

wherein, on condition that a combination of symbols displayed when said symbols are stopped constitutes a predetermined special winning mode, said player is allowed to start playing a special game which is more advantageous to said player than is a normal game said special game having a first mode and a second mode allowed from the first mode;

wherein said gaming machine further comprises an image display section for displaying special game information in said special game to said player, and wherein said special game information is displayed by figures representing objects and is presented as a progressing story so that when said player is allowed to start playing games in said special game a progressing story begins for said first mode and, when said second mode is allowed, a new progressing story which is related to said first mode begins, said new progressing story being distinguishable by said player from progressive story in said first mode.

2. A gaming machine according to claim 1, wherein said gaming machine is a slot machine comprising:

a variable display section comprising a plurality of reels displaying a plurality of symbols necessary for gaming;

a starting device comprising a start switch for starting rotating said plurality of reels; and a stopping device comprising a stop switch for individually stopping said plurality of reels;

wherein said player is provided with a predetermined unit of value information if a combination of symbols displayed when said plurality of reels is stopped constitutes a predetermined stop mode.

3. A gaming machine according to claim 1, wherein said special game information displayed in said image display section is special game information concerning a state of progress of said special game.

4. A gaming machine according to claim 1, wherein said special game information displayed in said image display section is special game information concerning a history of provision of value information provided as a profit for said player in said special game.

5. A gaming machine according to claim 1, wherein said special game information displayed in said image display section is special game information concerning a winning history in said special game.

6. A gaming machine according to claim 1, wherein said special game information displayed in said image display section is special game information concerning a gaming mode in said special game.

7. A gaming machine according to claim 1, wherein said starting device uses an input of predetermined bet information as an actuating condition; and wherein said special game information displayed in said image display section is special game information concerning a maximum permissible input unit of said bet information in said special game.

8. A gaming machine according to claim 1, wherein said special game information displayed in said image display section is special game information for indicating that said special game is over.

9. A gaming machine according to claim 1, further comprising an indicating section for indicating related special game information relating to said special game information displayed in said image display section.

10. A gaming machine according to claim 1, wherein said special game information displayed in said image display section is also displayable while said normal game is being played.

11. A gaming machine according to claim 1, wherein said special game information displayed in said image display section is a moving image.

12. A gaming machine according to claim 1, wherein the figures representing objects represent animate objects.

13. A gaming machine according to claim 1, wherein the special game information is presented as a progressing adventure story.

14. A gaming machine as in claim 1, wherein a plurality of second mode games can be allowed from a first mode game in one cycle of the first mode game and each of said plurality of second mode games begins a different progressive story.

15. A gaming machine comprising:

a variable display section for variably displaying a plurality of kinds of symbols necessary for gaming;

a starting device for starting variable display of said symbols; and a stopping device, disposed so as to be operable by a player, for stopping said symbols being variably displayed;

wherein, on condition that a combination of symbols displayed when said symbols are stopped constitutes a predetermined special winning mode, said player is allowed to start playing a special game which is more advantageous to said player than is a normal game said special game comprised of a predetermined number of individual special games, wherein said gaming machine further comprises an image display section for displaying game information to said player;

wherein said game information displayed in said image display section includes information showing an outcome of each said predetermined number of special games;

wherein the special game information is displayed by figures representing objects and written information and is presented as a progressing story; and a device for allowing a player to interact with said objects and exert control over displayed action as said story progresses.

16. A gaming machine that allows a player to play a predetermined number individual games in a first special game mode and a result in a game in said first special game mode allowing the player to play a predetermined number individual games in second special game mode, comprising in combination:

a variable display section for variably displaying a plurality of kinds of symbols necessary for gaming;

a starting device for starting variable display of the symbols;

a stopping device, disposed so as to be operable by a player, for stopping said symbols being variably displayed;

wherein, on condition that a combination of symbols displayed when said symbols are stopped constitutes a predetermined special winning mode, said player is allowed to start playing games in the first special game mode which is more advantageous to said player than is a normal game, and wherein on occurrence of a predetermined symbol displayed a game in said first special game mode the player is allowed to play games in the second special game mode;

wherein said gaming machine further comprises an image display section for displaying special game information results to said player including a display that simultaneously shows individual outcomes of past plays in said first special game mode and individual outcome of past plays in said second special game mode.

17. A gaming machine as in claim 16, wherein said display includes an icon to indicate to the player when the player is in the first special game mode and when the play r is in the second special game mode.

18. A gaming machine as in claim 16, wherein said image display section shows a variable display of symbols that comprise the games in first special game mode and a variable display of symbols that comprise games in the second special game mode.

19. A gaming machine as in claim 18, wherein the variable display of symbols that comprise the first special game are figures representing objects and written information and is presented as a progressing story.

20. A gaming machine as in claim 18, wherein the variable display of symbols that comprise the second special game are figures representing objects and written information and is presented as a progressing story.

21. A gaming machine as in claim 19, further including a device for allowing a player to interact with the objects and exert control of displayed action as the story progresses.

22. A gaming machine as in claim 20, further including a device for allowing a player to interact with the objects and exert control of displayed action as the story progresses.

* * * * *

UNITED STATES PATENT AND TRADEMARK OFFICE

CERTIFICATE OF CORRECTION

PATENT NO. : 7,066,813 B1
APPLICATION NO. : 09/456833
DATED : June 27, 2006
INVENTOR(S) : Yoshikazu Sakamoto and Hiroshi Yoshida It is certified that error appears in the above-identified patent and that said Letters Patent is hereby corrected as shown below:

Column 71

Lines 3 - 4, delete “play r” and substitute therefore -- player --

Signed and Sealed this

Twenty-first Day of November, 2006

JON W. DUDAS

*Director of the United States Patent and Trademark Office*